(12) United States Patent
Kimura et al.

(10) Patent No.: US 12,475,361 B2
(45) Date of Patent: Nov. 18, 2025

(54) SEMICONDUCTOR DEVICE AND ELECTRONIC DEVICE

(71) Applicant: Semiconductor Energy Laboratory Co., Ltd., Atsugi (JP)

(72) Inventors: Hajime Kimura, Atsugi (JP); Munehiro Kozuma, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 1030 days.

(21) Appl. No.: 17/611,207

(22) PCT Filed: May 7, 2020

(86) PCT No.: PCT/IB2020/054307
§ 371 (c)(1),
(2) Date: Nov. 15, 2021

(87) PCT Pub. No.: WO2020/234681
PCT Pub. Date: Nov. 26, 2020

(65) Prior Publication Data
US 2022/0237440 A1     Jul. 28, 2022

(30) Foreign Application Priority Data

May 17, 2019   (JP) ................................. 2019-093998

(51) Int. Cl.
*G11C 11/54*       (2006.01)
*G06N 3/063*       (2023.01)
(Continued)

(52) U.S. Cl.
CPC .............. *G06N 3/063* (2013.01); *G11C 11/54* (2013.01); *H10B 12/09* (2023.02); *H10D 30/6755* (2025.01)

(58) Field of Classification Search
CPC ........ G06N 3/063; G11C 11/54; H10B 12/09; H10B 12/50; H10D 30/6755; H10D 87/00;
(Continued)

(56) References Cited

U.S. PATENT DOCUMENTS 6,363,002 B1 * 3/2002 Nishimura .............. G11C 11/22
365/207
6,493,263 B1   12/2002 Shibata et al.
(Continued)

FOREIGN PATENT DOCUMENTS

EP       1076309 A       2/2001
JP    2001-052101 A       2/2001
(Continued)

OTHER PUBLICATIONS

International Search Report (Application No. PCT/IB2020/054307) Dated Jul. 21, 2020.
(Continued)

*Primary Examiner* — Michael T Tran
(74) *Attorney, Agent, or Firm* — Eric J. Robinson; Robinson Intellectual Property Law Office, P.C.

(57) ABSTRACT

A semiconductor device capable of performing arithmetic operation with low power consumption is provided. The semiconductor device includes first and second circuits, a first amplifier circuit, first to fourth switches, and a capacitor, the first circuit is electrically connected to a first wiring, and the second circuit is electrically connected to a second wiring. The first wiring is electrically connected to a first terminal of the capacitor through the first switch, and the second wiring is electrically connected to the first terminal of the capacitor through the third switch. The first terminal of the capacitor is electrically connected to a first terminal of the second switch, and a second terminal of the capacitor is (Continued)

electrically connected to the first amplifier circuit through the fourth switch. Current corresponding to the result of product-sum operation flows through each of the first and second wirings, and the current is converted into potentials by the first and second circuits. A difference between the converted potentials is held in the capacitor, and the difference is input to the first amplifier circuit and is output as a potential corresponding to the arithmetic operation result.

12 Claims, 45 Drawing Sheets

(51) Int. Cl.
  *H10B 12/00* (2023.01)
  *H10D 30/67* (2025.01)
(58) Field of Classification Search
  CPC ............ G06G 7/16; G06G 7/184; G06G 7/19; G06G 7/60
  USPC .................................................. 365/149, 205
  See application file for complete search history.

(56) References Cited

U.S. PATENT DOCUMENTS

| | | | |
|---|---|---|---|
| 7,747,668 | B2 | 6/2010 | Nomura et al. |
| 9,275,702 | B2 | 3/2016 | Giridhar et al. |
| 11,004,493 | B1* | 5/2021 | Vimercati ........... G11C 11/4094 |
| 11,056,178 | B1* | 7/2021 | Bedeschi ............ G11C 11/2273 |
| 2007/0253266 | A1* | 11/2007 | Leung .................. G11C 7/1069 365/208 |
| 2010/0061137 | A1* | 3/2010 | Kim ......................... G11C 7/18 365/194 |
| 2012/0195103 | A1* | 8/2012 | Kajigaya ............. G11C 11/4096 365/210.1 |
| 2015/0294706 | A1* | 10/2015 | Bonaccio ............. G11C 29/026 365/158 |
| 2016/0172410 | A1 | 6/2016 | Kurokawa |
| 2016/0295152 | A1 | 10/2016 | Kurokawa |
| 2016/0343452 | A1 | 11/2016 | Ikeda et al. |
| 2017/0154909 | A1* | 6/2017 | Ishizu ....................... G11C 7/04 |
| 2017/0244398 | A1 | 8/2017 | Okamoto. et al. |
| 2017/0263291 | A1 | 9/2017 | Kurokawa |
| 2017/0270405 | A1 | 9/2017 | Kurokawa |
| 2017/0277459 | A1* | 9/2017 | Rodriguez ............ G11C 11/221 |
| 2017/0301376 | A1 | 10/2017 | Kurokawa |
| 2017/0317085 | A1 | 11/2017 | Kurokawa |
| 2018/0005588 | A1 | 1/2018 | Kurokawa |
| 2018/0018565 | A1 | 1/2018 | Kurokawa |
| 2018/0018752 | A1 | 1/2018 | Kurokawa |
| 2018/0039882 | A1 | 2/2018 | Ikeda et al. |
| 2018/0047443 | A1* | 2/2018 | Yabuuchi .............. G11C 11/419 |
| 2018/0061344 | A1 | 3/2018 | Kurokawa |
| 2018/0101359 | A1* | 4/2018 | Harada .................. G06N 3/065 |
| 2018/0181862 | A1 | 6/2018 | Ikeda |
| 2018/0211620 | A1 | 7/2018 | Kurokawa et al. |
| 2020/0004357 | A1 | 1/2020 | Harada et al. |
| 2020/0007114 | A1* | 1/2020 | Kimura .................. G06N 3/063 |
| 2020/0028498 | A1 | 1/2020 | Kimura et al. |
| 2020/0091214 | A1 | 3/2020 | Ikeda |
| 2020/0110990 | A1 | 4/2020 | Harada et al. |
| 2020/0160158 | A1 | 5/2020 | Okamoto. et al. |
| 2020/0201603 | A1 | 6/2020 | Kozuma et al. |
| 2021/0384193 | A1 | 12/2021 | Kimura et al. |

FOREIGN PATENT DOCUMENTS

| | | | |
|---|---|---|---|
| JP | 2005-122465 | A | 5/2005 |
| JP | 2007-241475 | A | 9/2007 |
| JP | 2019-003464 | A | 1/2019 |
| JP | 2021-043712 | A | 3/2021 |
| KR | 2001-0067064 | A | 7/2001 |
| KR | 2015-0062937 | A | 6/2015 |
| TW | 543005 | | 7/2003 |
| WO | WO-2005/038704 | | 4/2005 |
| WO | WO-2018069785 | A1 * | 4/2018 ........... G06F 7/5443 |
| WO | WO-2020/079523 | | 4/2020 |
| WO | WO-2020/165685 | | 8/2020 |
| WO | WO-2020/183263 | | 9/2020 |
| WO | WO-2021/009607 | | 1/2021 |
| WO | WO-2022/013676 | | 1/2022 |
| WO | WO-2022/013680 | | 1/2022 |

OTHER PUBLICATIONS

Written Opinion (Application No. PCT/IB2020/054307) Dated Jul. 21, 2020.
Kang.M et al., "A Multi-Functional In-Memory Inference Processor Using a Standard 6T SRAM Array", IEEE Journal of Solid-State Circuits, Jan. 4, 2018, vol. 53, No. 2, pp. 642-655.
Zhang.J et al., "In-Memory Computation of a Machine-Learning Classifier in a Standard 6T SRAM Array", IEEE Journal of Solid-State Circuits, Mar. 10, 2017, vol. 52, No. 4, pp. 915-924.
Kang.M et al., "A 19.4-nJ/Decision, 364-K Decisions/s, In-Memory Random Forest Multi-Class Inference Accelerator", IEEE Journal of Solid-State Circuits, May 2, 2018, vol. 53, No. 7, pp. 2126-2135.
Agrawal.A et al., "X-SRAM: Enabling In-Memory Boolean Computations in CMOS Static Random Access Memories", IEEE Transactions on Circuits and Systems, Jul. 2, 2018, pp. 1-14.
Wicht.B et al., "Yield and Speed Optimization of a Latch-Type Voltage Sense Amplifier", IEEE Journal of Solid-State Circuits, Jun. 28, 2004, vol. 39, No. 7, pp. 1148-1158.
Akyel.K et al., "DRC2: Dynamically Reconfigurable Computing Circuit based on memory architecture", IEEE International Conference on Rebooting Computing, Oct. 17, 2016, pp. 1-8pages.
Moradi.S et al., "An Event-Based Neural Network Architecture With an Asynchronous Programmable Synaptic Memory", IEEE Transactions on Biomedical Circuits and Systems, Jun. 4, 2013, vol. 8, No. 1, pp. 98-107.

* cited by examiner

100

ISC1(ISC2,ISC3)

ISC1(ISC2,ISC3)

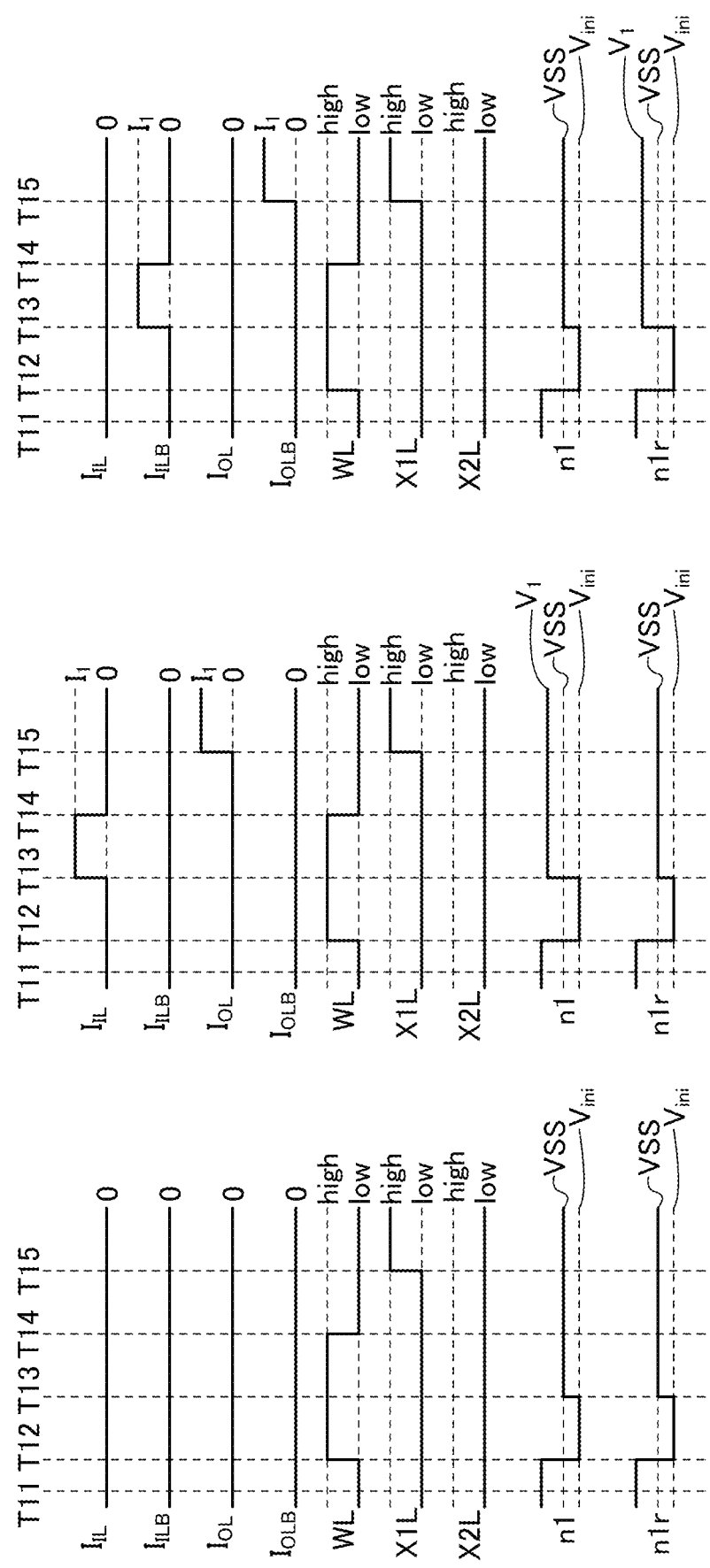

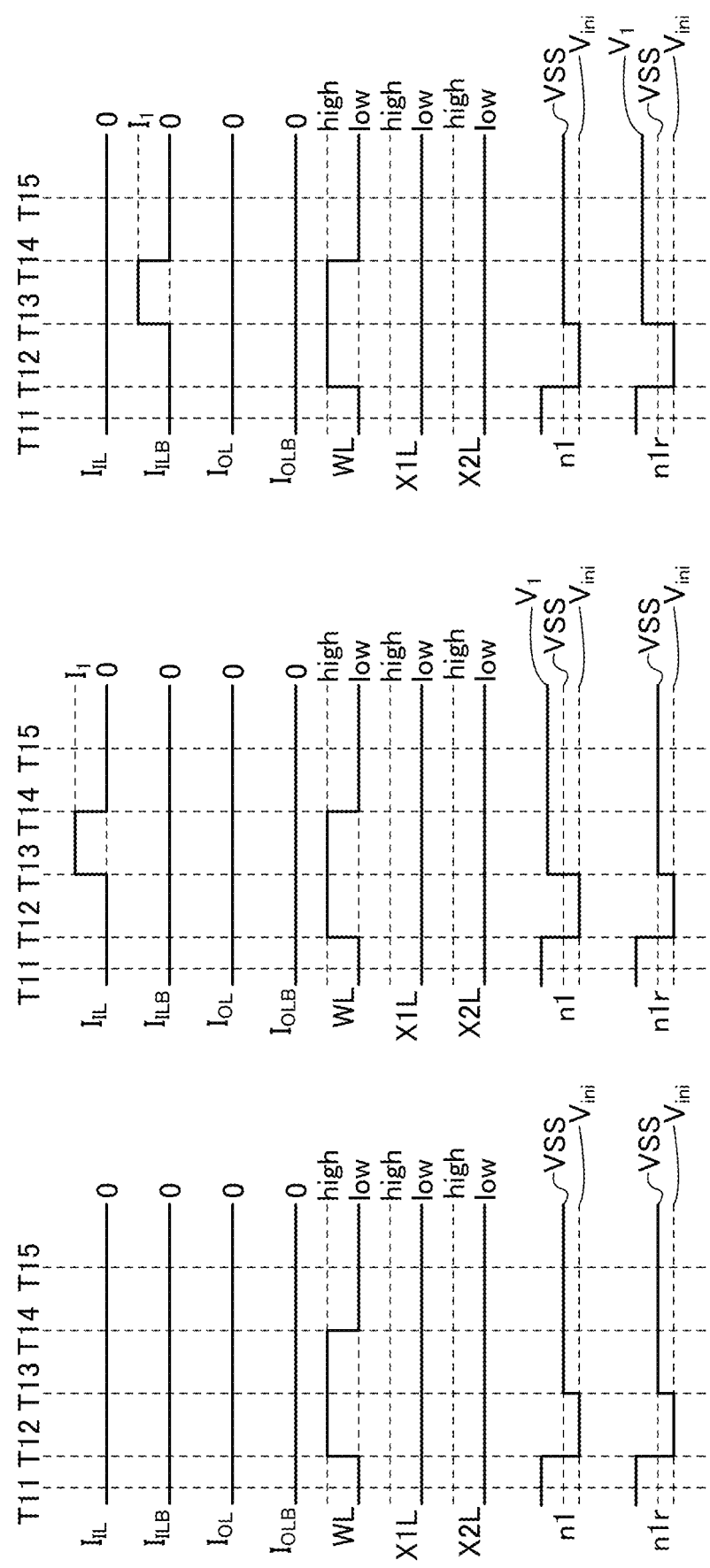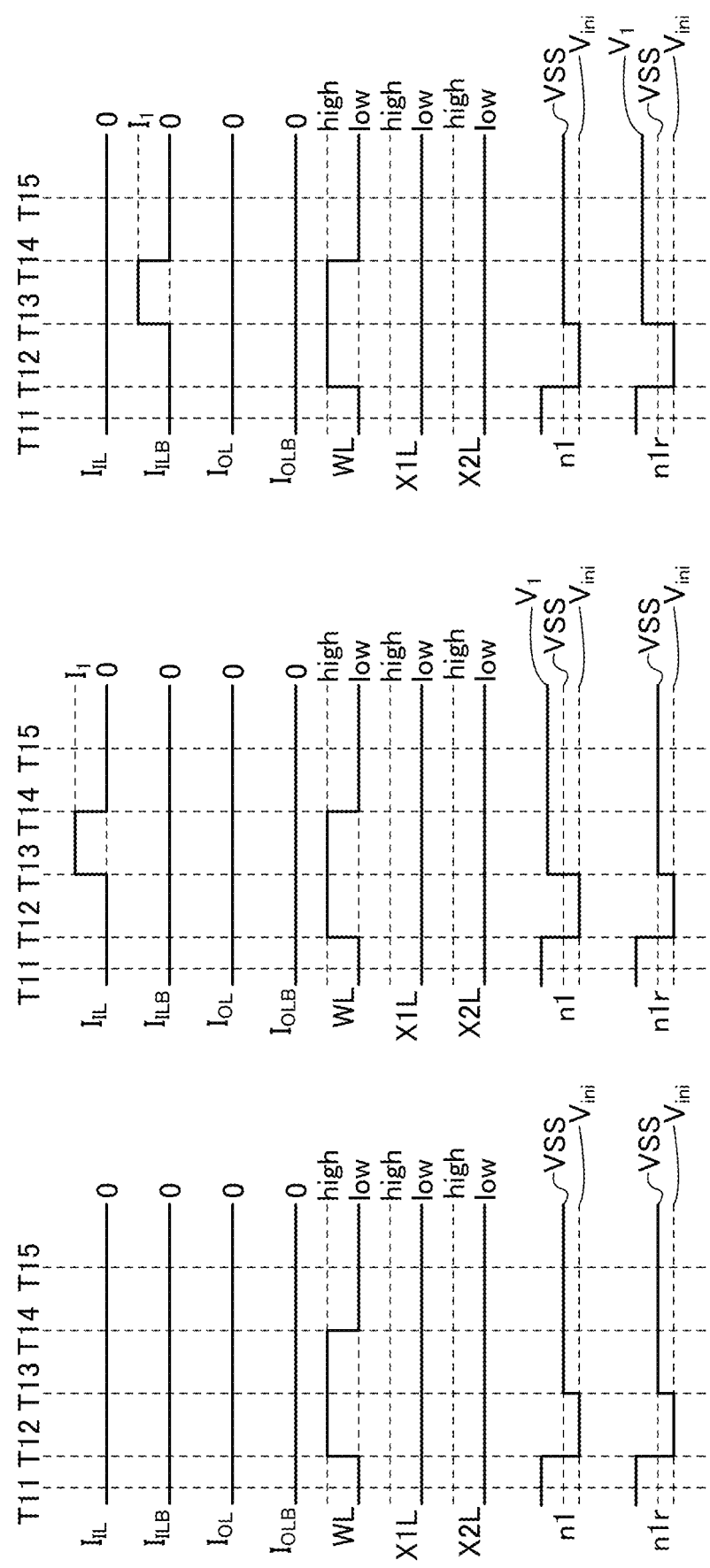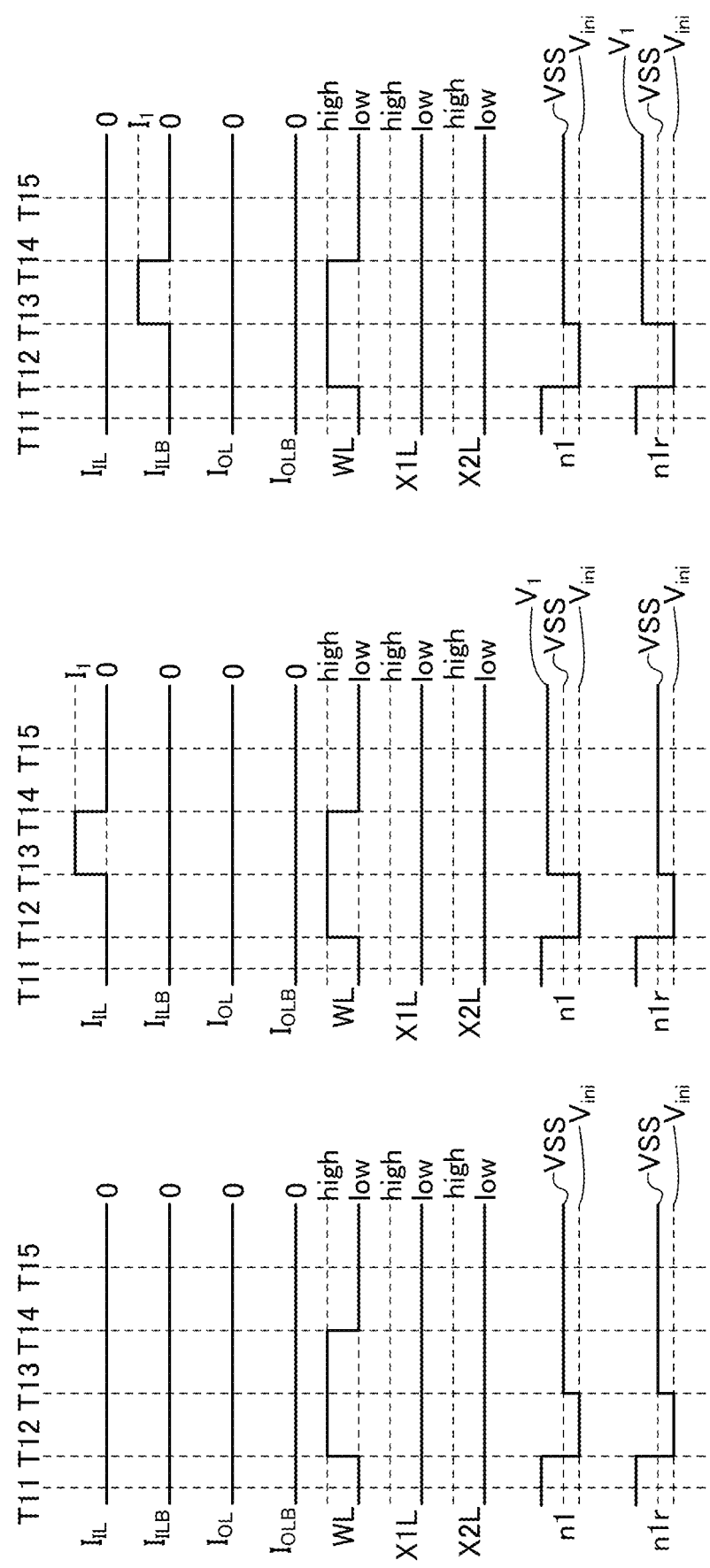

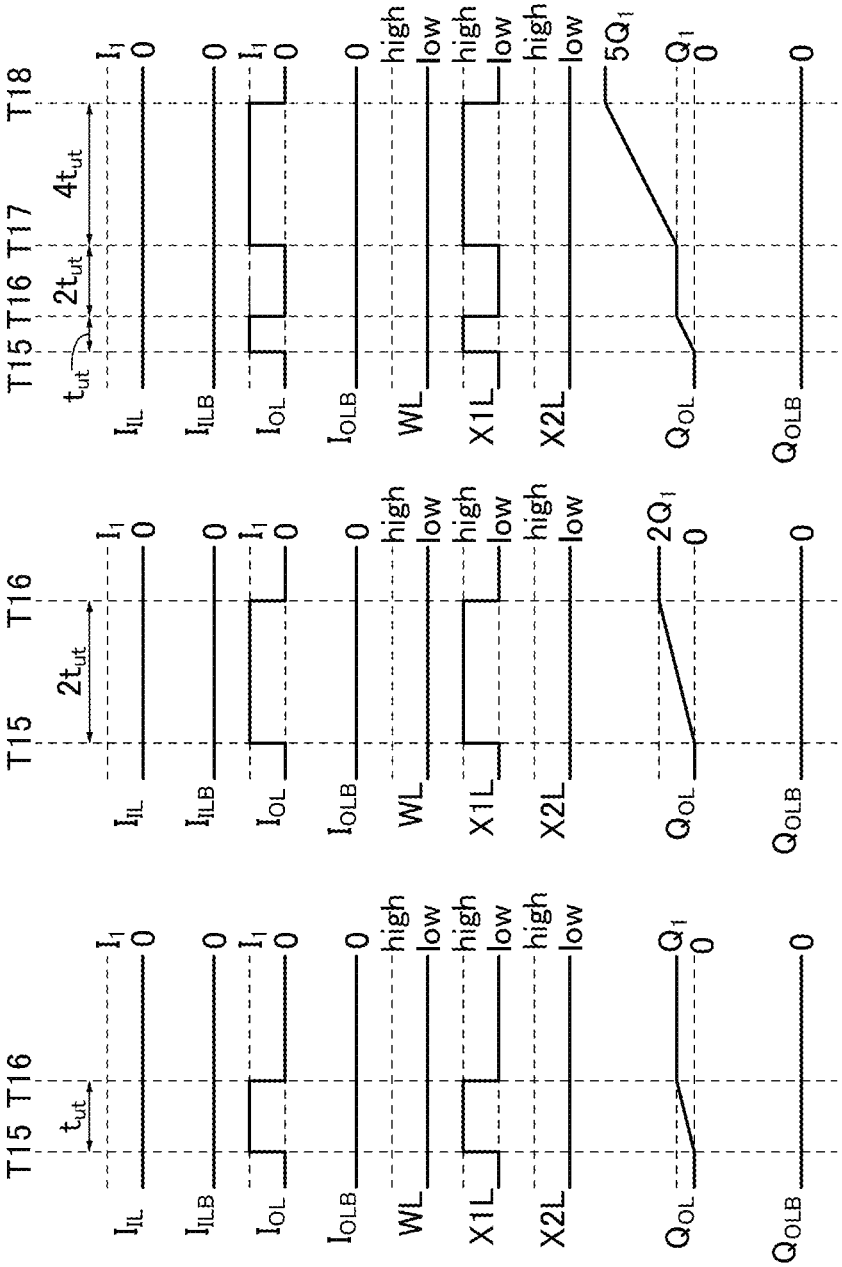

FIG. 42A
| | Intermediate state<br>New crystalline phase | |
|---|---|---|
| Amorphous | Crystalline | Crystal |
| •completely amorphous | •CAAC<br>•nc<br>•CAC<br>excluding single crystal and poly crystal | •single crystal<br>•poly crystal |
FIG. 42B
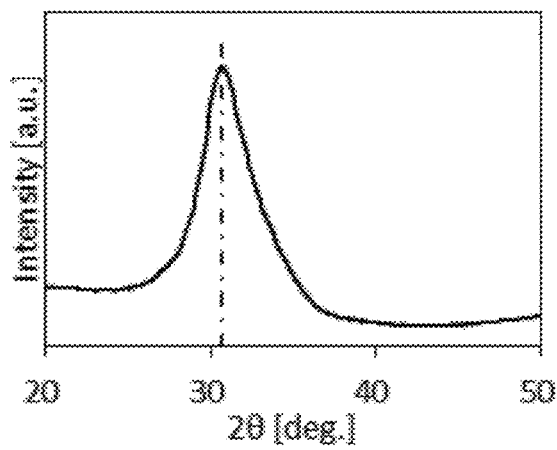
FIG. 42C
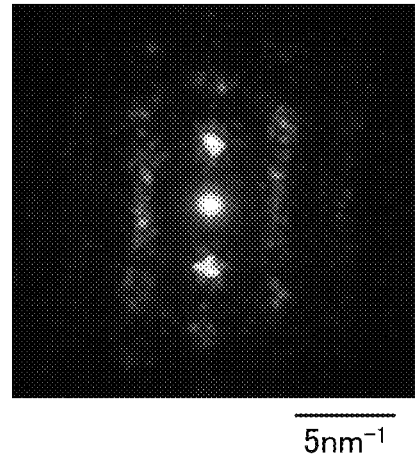

SEMICONDUCTOR DEVICE AND ELECTRONIC DEVICE

TECHNICAL FIELD

One embodiment of the present invention relates to a semiconductor device and an electronic device.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an imaging device, a memory device, a signal processing device, a processor, an electronic device, a system, a driving method thereof, a manufacturing method thereof, and a testing method thereof.

BACKGROUND ART

Integrated circuits that imitate the mechanism of the human brain are currently under active development. The integrated circuits incorporate electronic circuits as the brain mechanism and include circuits corresponding to "neurons" and "synapses" of the human brain. Such integrated circuits may therefore be called "neuromorphic", "brain-morphic", or "brain-inspired" circuits. The integrated circuits have a non-von Neumann architecture and are expected to be able to perform parallel processing with extremely low power consumption as compared with a von Neumann architecture, in which power consumption increases with increasing processing speed.

An information processing model that imitates a biological neural network including "neurons" and "synapses" is referred to as an artificial neural network (ANN). For example, Non-Patent Document 1 and Non-Patent Document 2 each disclose an arithmetic device including an artificial neural network constructed using an SRAM (Static Random Access Memory).

REFERENCES

Non-Patent Documents

[Non-Patent Document 1] M. Kang et al., "IEEE Journal Of Solid-State Circuits", 2018, Volume 53, No. 2, pp. 642-655.
[Non-Patent Document 2] J. Zhang et al., "IEEE Journal Of Solid-State Circuits", 2017, Volume 52, No. 4, pp. 915-924.

SUMMARY OF THE INVENTION

Problems to be Solved by the Invention

An artificial neural network performs calculations in which the connection strength (sometimes referred to as weight coefficient) of a synapse that connects two neurons is multiplied by a signal transmitted between the two neurons. In particular, in a hierarchical artificial neural network, the connection strength of synapses between a plurality of first neurons in a first layer and one of second neurons in a second layer and signals input from the plurality of first neurons in the first layer to the one of the second neurons in the second layer need to be multiplied and summed (subjected to product-sum operation); for example, the number of connection strengths and the number of parameters indicating the signals are determined in accordance with the scale of the artificial neural network. That is, in the artificial neural network, as the number of layers, the number of neurons, and the like increase, the number of circuits corresponding to the "neurons" and "synapses" also increases, which sometimes makes the amount of arithmetic operation enormous.

Examples of arithmetic operation in a neural network include product-sum operation and arithmetic operation of an activation function. For the arithmetic operation of the activation function, a larger scale of an artificial neural network tends to result in higher power consumption.

An object of one embodiment of the present invention is to provide a semiconductor device and the like including a hierarchical artificial neural network. Another object of one embodiment of the present invention is to provide a semiconductor device and the like with low power consumption. Another object of one embodiment of the present invention is to provide a novel semiconductor device and the like. Another object of one embodiment of the present invention is to provide an electronic device including the semiconductor device.

Note that the objects of one embodiment of the present invention are not limited to the objects listed above. The objects listed above do not preclude the existence of other objects. Note that the other objects are objects that are not described in this section and will be described below. The objects that are not described in this section will be derived from the description of the specification, the drawings, and the like and can be extracted from the description by those skilled in the art. Note that one embodiment of the present invention is to solve at least one of the objects listed above and the other objects. Note that one embodiment of the present invention does not necessarily solve all the objects listed above and the other objects.

Means for Solving the Problems (1)
One embodiment of the present invention is a semiconductor device including a cell and a first circuit; the first circuit includes a first capacitor, a first input terminal, and a second input terminal; the cell is electrically connected to the first input terminal through a first wiring; the cell is electrically connected to the second input terminal through a second wiring; the cell has a function of holding first data, and functions of passing a first current corresponding to the first data and second data between the cell and the first wiring and passing a second current corresponding to the first data and the second data between the cell and the second wiring when the second data is input to the cell; and the first capacitor has a function of holding a differential voltage between a first potential corresponding to the first current and a second potential corresponding to the second current.

(2)
Another embodiment of the present invention is the semiconductor device having the above structure (1), in which the first circuit includes a second circuit, and the second circuit has functions of obtaining the differential voltage and outputting a signal corresponding to the differential voltage.

(3)

Another embodiment of the present invention is the semiconductor device having the above structure (2), in which the first circuit includes a first current-voltage converter circuit, a second current-voltage converter circuit, a first switch, a second switch, a third switch, and a fourth switch; the first input terminal is electrically connected to a first terminal of the first switch and a first terminal of the first current-voltage converter circuit; a second terminal of the first switch is electrically connected to a first terminal of the second switch and a first terminal of the first capacitor; the second input terminal is electrically connected to a first terminal of the third switch and a first terminal of the second current-voltage converter circuit; a second terminal of the third switch is electrically connected to a first terminal of the fourth switch and a second terminal of the first capacitor; a second terminal of the fourth switch is electrically connected to a first terminal of the second circuit; the first current-voltage converter circuit has a function of setting a potential of the first terminal of the first current-voltage converter circuit to the first potential on the basis of the first current input to the first terminal of the first current-voltage converter circuit; and the second current-voltage converter circuit has a function of setting a potential of the first terminal of the second current-voltage converter circuit to the second potential on the basis of the second current input to the first terminal of the second current-voltage converter circuit.

(4)

Another embodiment of the present invention is the semiconductor device having the above structure (3), in which a second terminal of the second switch is electrically connected to a third wiring supplying a reference potential, and the first circuit has a function of setting the first terminal of the first capacitor to the first potential and setting the second terminal of the first capacitor to the second potential by turning on the first switch and the third switch and turning off the second switch and the fourth switch, a function of changing the second potential of the second terminal of the first capacitor to a third potential owing to capacitive coupling caused by a change of the potential of the first terminal of the first capacitor from the first potential to the reference potential by turning off the first switch, the third switch, and the fourth switch and turning on the second switch, and a function of inputting the third potential corresponding to the differential voltage to the first terminal of the second circuit by turning off the first switch, the second switch, and the third switch and turning on the fourth switch.

(5)

Another embodiment of the present invention is a semiconductor device including a cell and a first circuit; the first circuit includes a first capacitor, a second capacitor, a first input terminal, and a second input terminal; the cell is electrically connected to the first input terminal through a first wiring; the cell is electrically connected to the second input terminal through a second wiring; the cell has a function of holding first data and functions of passing a first current corresponding to the first data and second data between the cell and the first wiring and passing a second current corresponding to the first data and the second data between the cell and the second wiring when the second data is input to the cell; the first capacitor has a function of holding a first differential voltage between a first potential corresponding to the first current and a second potential corresponding to the second current; and the second capacitor has a function of holding a second differential voltage between the first potential corresponding to the first current and the second potential corresponding to the second current.

(6)

Another embodiment of the present invention is the semiconductor device having the above structure (5), in which the first circuit includes a second circuit and a third circuit; the second circuit has functions of obtaining the first differential voltage based on a potential of a first terminal of the first capacitor and outputting a first signal corresponding to the first differential voltage; and the third circuit has functions of obtaining the second differential voltage based on a potential of a second terminal of the second capacitor and outputting a second signal corresponding to the second differential voltage.

(7)

Another embodiment of the present invention is the semiconductor device having the above structure (6), in which the first circuit includes a first current-voltage converter circuit, a second current-voltage converter circuit, a first switch, a second switch, a third switch, a fourth switch, a fifth switch, a sixth switch, a seventh switch, and an eighth switch; the first input terminal is electrically connected to a first terminal of the first switch, a first terminal of the fifth switch, and a first terminal of the first current-voltage converter circuit; a second terminal of the first switch is electrically connected to a first terminal of the second switch and the first terminal of the first capacitor; a second terminal of the fifth switch is electrically connected to a first terminal of the sixth switch and a first terminal of the second capacitor; the second input terminal is electrically connected to a first terminal of the third switch, a first terminal of the seventh switch, and a first terminal of the second current-voltage converter circuit; a second terminal of the third switch is electrically connected to a first terminal of the fourth switch and a second terminal of the first capacitor; a second terminal of the seventh switch is electrically connected to a first terminal of the eighth switch and the second terminal of the second capacitor; a second terminal of the fourth switch is electrically connected to a first terminal of the second circuit; a second terminal of the sixth switch is electrically connected to a first terminal of the third circuit; the first current-voltage converter circuit has a function of setting a potential of the first terminal of the first current-voltage converter circuit to the first potential on the basis of the first current input to the first terminal of the first current-voltage converter circuit; and the second current-voltage converter circuit has a function of setting a potential of the first terminal of the second current-voltage converter circuit to the second potential on the basis of the second current input to the first terminal of the second current-voltage converter circuit.

(8)

Another embodiment of the present invention is the semiconductor device having the above structure (7), in which a second terminal of the second switch is electrically connected to a third wiring supplying a reference potential; a second terminal of the eighth switch is electrically connected to the third wiring supplying the reference potential; and the first circuit has a function of setting the first terminal of the first capacitor to the first potential and setting the second terminal of the first capacitor to the second potential by turning on the first switch and the third switch and turning off the second switch and the fourth switch, a function of setting the first terminal of the second capacitor to the first potential and setting the second terminal of the second capacitor to the second potential by turning on the fifth switch and the seventh switch and turning off the sixth switch and the eighth switch, a function of changing the second potential of the second terminal of the first capacitor to a third potential owing to capacitive coupling caused by a change of the potential of the first terminal of the first capacitor from the first potential to the reference potential by turning off the first switch, the third switch, and the fourth switch and turning on the second switch, a function of changing the first potential of the first terminal of the first capacitor to a fourth potential owing to capacitive coupling caused by a change of the potential of the second terminal of the second capacitor from the second potential to the reference potential by turning off the fifth switch, the sixth switch, and the seventh switch and turning on the eighth switch, a function of inputting the third potential corresponding to the first differential voltage to the first terminal of the second circuit by turning off the first switch, the second switch, and the third switch and turning on the fourth switch, and a function of inputting the fourth potential corresponding to the second differential voltage to the first terminal of the third circuit by turning off the fifth switch, the seventh switch, and the eighth switch and turning on the sixth switch.

(9)

Another embodiment of the present invention is the semiconductor device having any one of the above structures (1) to (8), in which the cell includes a first cell and a second cell; the first cell is electrically connected to the first wiring, the second wiring, a first input wiring, and a second input wiring; the second cell is electrically connected to the first wiring, the second wiring, the first input wiring, and the second input wiring; each of the first input wiring and the second input wiring has a function of supplying a potential corresponding to the second data; the first cell has a function of passing the first current to the first wiring when a first input potential is input to the first input wiring and a second input potential is input to the second input wiring, a function of passing the second current to the second wiring when the second input potential is input to the first input wiring and the first input potential is input to the second input wiring, and a function of breaking electrical continuity between the first cell and the first wiring and between the first cell and the second wiring when the second input potential is input to the first input wiring and the second input potential is input to the second input wiring; and the second cell has a function of passing the second current to the second wiring when the first input potential is input to the first input wiring and the second input potential is input to the second input wiring, a function of passing the first current to the first wiring when the second input potential is input to the first input wiring and the first input potential is input to the second input wiring, and a function of breaking electrical continuity between the second cell and the first wiring and between the second cell and the second wiring when the second input potential is input to the first input wiring and the second input potential is input to the second input wiring.

(10)

Another embodiment of the present invention is the semiconductor device having the above structure (9), in which the first cell includes a first transistor, a ninth switch, a tenth switch, an eleventh switch, a twelfth switch, and a third capacitor; the second cell includes a second transistor, a thirteenth switch, a fourteenth switch, a fifteenth switch, a sixteenth switch, and a fourth capacitor; a first terminal of the first transistor is electrically connected to a first terminal of the ninth switch, a first terminal of the tenth switch, and a first terminal of the eleventh switch; a gate of the first transistor is electrically connected to a first terminal of the third capacitor and a first terminal of the twelfth switch; a second terminal of the ninth switch is electrically connected to a second terminal of the twelfth switch; a second terminal of the tenth switch is electrically connected to the first wiring; a control terminal of the tenth switch is electrically connected to the first input wiring; a second terminal of the eleventh switch is electrically connected to the second wiring; a control terminal of the eleventh switch is electrically connected to the second input wiring; a first terminal of the second transistor is electrically connected to a first terminal of the thirteenth switch, a first terminal of the fourteenth switch, and a first terminal of the fifteenth switch; a gate of the second transistor is electrically connected to a first terminal of the fourth capacitor and a first terminal of the sixteenth switch; a second terminal of the thirteenth switch is electrically connected to a second terminal of the sixteenth switch; a second terminal of the fourteenth switch is electrically connected to the second wiring; a control terminal of the fourteenth switch is electrically connected to the first input wiring; a second terminal of the fifteenth switch is electrically connected to the first wiring; and a control terminal of the fifteenth switch is electrically connected to the second input wiring.

(11)

Another embodiment of the present invention is the semiconductor device having the above structure (10), in which the twelfth switch includes a third transistor, the third transistor includes a metal oxide in a channel formation region, the sixteenth switch includes a fourth transistor, and the fourth transistor includes a metal oxide in a channel formation region.

(12)

Another embodiment of the present invention is an electronic device including the semiconductor device having any one of the above structures (1) to (11) and a housing, in which arithmetic operation in a neural network is performed by the semiconductor device.

Note that in this specification and the like, a semiconductor device refers to a device that utilizes semiconductor characteristics, and means a circuit including a semiconductor element (a transistor, a diode, a photodiode, and the like), a device including the circuit, and the like. The semiconductor device also means all devices that can function by utilizing semiconductor characteristics. For example, an integrated circuit, a chip including an integrated circuit, and an electronic component including a chip in a package are examples of the semiconductor device. Moreover, a memory device, a display device, a light-emitting device, a lighting device, an electronic device, and the like themselves are semiconductor devices, or include semiconductor devices in some cases.

In the case where there is description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, and a load) can be connected between X and Y. Note that a switch has a function of being controlled to be turned on or off. That is, the switch has a function of being in a conduction state (on state) or a non-conduction state (off state) to determine whether current flows or not.

For example, in the case where X and Y are functionally connected, one or more circuits that allow functional connection between X and Y (e.g., a logic circuit (an inverter, a NAND circuit, a NOR circuit, or the like); a signal converter circuit (a DA converter circuit, an AD converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; or a control circuit) can be connected between X and Y. For example, even when another circuit is provided between X and Y, X and Y are regarded as being functionally connected when a signal output from X is transmitted to Y.

Note that an explicit description "X and Y are electrically connected" includes the case where X and Y are electrically connected (i.e., the case where X and Y are connected with another element or another circuit interposed therebetween) and the case where X and Y are directly connected (i.e., the case where X and Y are connected without another element or another circuit interposed therebetween).

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, it can be expressed as "a source (or a first terminal or the like) of a transistor is electrically connected to X; a drain (or a second terminal or the like) of the transistor is electrically connected to Y; and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples, and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: a function of the wiring and a function of the electrode. Thus, "electrical connection" in this specification includes in its category such a case where one conductive film has functions of a plurality of components.

In this specification and the like, a "resistor" can be, for example, a circuit element or a wiring having a resistance value higher than 0Ω. Therefore, in this specification and the like, a "resistor" includes a wiring having a resistance value, a transistor in which current flows between a source and a drain, a diode, a coil, and the like. Thus, the term "resistor" can be replaced with the terms "resistance", "load", "a region having a resistance value", and the like; conversely, the terms "resistance", "load", and "a region having a resistance value" can be replaced with the term "resistor" and the like. The resistance value can be, for example, preferably greater than or equal to 1 mΩ and less than or equal to 10Ω, further preferably greater than or equal to 5 mΩ and less than or equal to 5Ω, still further preferably greater than or equal to 10 mΩ and less than or equal to 1Ω. As another example, the resistance value may be greater than or equal to 1Ω and less than or equal to $1 \times 10^9$ Ω.

In this specification and the like, a "capacitor" can be, for example, a circuit element having an electrostatic capacitance value higher than 0 F, a region of a wiring having an electrostatic capacitance value, parasitic capacitance, or gate capacitance of a transistor. Therefore, in this specification and the like, a "capacitor" includes not only a circuit element that has a pair of electrodes and a dielectric between the electrodes, but also parasitic capacitance generated between wirings, gate capacitance generated between a gate and one of a source and a drain of a transistor, and the like. The terms "capacitor", "parasitic capacitance", "gate capacitance", and the like can be replaced with the term "capacitance" and the like; conversely, the term "capacitance" can be replaced with the terms "capacitor", "parasitic capacitance", "gate capacitance", and the like. The term "pair of electrodes" of "capacitor" can be replaced with "pair of conductors", "pair of conductive regions", "pair of regions", and the like. Note that the electrostatic capacitance value can be greater than or equal to 0.05 fF and less than or equal to 10 pF, for example. Alternatively, the electrostatic capacitance value may be greater than or equal to 1 pF and less than or equal to 10 μF, for example.

In this specification and the like, a transistor includes three terminals called a gate, a source, and a drain. The gate is a control terminal for controlling the conduction state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" can be replaced with each other in this specification and the like. In this specification and the like, expressions "one of a source and a drain" (or a first electrode or a first terminal) and "the other of the source and the drain" (or a second electrode or a second terminal) are used in description of the connection relation of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a node can be referred to as a terminal, a wiring, an electrode, a conductive layer, a conductor, an impurity region, or the like depending on the circuit structure, the device structure, or the like. Furthermore, a terminal, a wiring, or the like can be referred to as a node.

In this specification and the like, "voltage" and "potential" can be replaced with each other as appropriate. The "voltage" refers to a potential difference from a reference potential, and when the reference potential is a ground potential, for example, the "voltage" can be replaced with the "potential". Note that the ground potential does not necessarily mean 0 V. Moreover, potentials are relative values, and a potential supplied to a wiring, a potential applied to a circuit and the like, and a potential output from a circuit and the like, for example, are changed with a change of the reference potential.

"Current" is a charge transfer (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The direction of current in a wiring or the like refers to the direction in which a positive carrier moves, and the amount of current is expressed as a positive value. In other words, the direction in which a negative carrier moves is opposite to the direction of current, and the amount of current is expressed as a negative value. Thus, in the case where the polarity of current (or the direction of current) is not specified in this specification and the like, the description "current flows from element A to element B" can be rephrased as "current flows from element B to element A", for example. The description "current is input to element A" can be rephrased as "current is output from element A", for example.

Ordinal numbers such as "first", "second", and "third" in this specification and the like are used to avoid confusion among components. Thus, the terms do not limit the number of components. In addition, the terms do not limit the order of components. In this specification and the like, for example, a "first" component in one embodiment can be referred to as a "second" component in other embodiments or claims. Furthermore, in this specification and the like, for example, a "first" component in one embodiment can be omitted in other embodiments or claims.

In this specification and the like, terms for describing arrangement, such as "over" and "under", are sometimes used for convenience to describe the positional relation between components with reference to drawings. The positional relation between components is changed as appropriate in accordance with a direction in which the components are described. Thus, terms for the description are not limited to terms used in the specification and the like, and the description can be made appropriately depending on the situation. For example, the expression "an insulator positioned over (on) a top surface of a conductor" can be replaced with the expression "an insulator positioned on a bottom surface of a conductor" when the direction of a drawing showing these components is rotated by 180°.

Furthermore, the term "over" or "under" does not necessarily mean that a component is placed directly over or directly under and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B.

In this specification and the like, the terms "film", "layer", and the like can be interchanged with each other depending on the situation. For example, the term "conductive layer" can be changed to the term "conductive film" in some cases. Moreover, for example, the term "insulating film" can be changed to the term "insulating layer" in some cases. Alternatively, the term "film", "layer", or the like is not used and can be interchanged with another term depending on the case or the situation. For example, the term "conductive layer" or "conductive film" can be changed to the term "conductor" in some cases. Furthermore, for example, the term "insulating layer" or "insulating film" can be changed to the term "insulator" in some cases.

In this specification and the like, the term such as an "electrode", a "wiring", or a "terminal" does not limit the function of a component. For example, an "electrode" is used as part of a "wiring" in some cases, and vice versa. Furthermore, the term "electrode" or "wiring" also includes the case where a plurality of "electrodes" or "wirings" are formed in an integrated manner, for example. For example, a "terminal" is used as part of a "wiring" or an "electrode" in some cases, and vice versa. Furthermore, the term "terminal" also includes the case where a plurality of "electrodes", "wirings", "terminals", or the like are formed in an integrated manner, for example. Therefore, for example, an "electrode" can be part of a "wiring" or a "terminal", and a "terminal" can be part of a "wiring" or an "electrode". Moreover, the terms "electrode", "wiring", and "terminal" are sometimes replaced with the term "region" depending on the case, for example.

In this specification and the like, the terms "wiring", "signal line", "power supply line", and the like can be interchanged with each other depending on the case or the situation. For example, the term "wiring" can be changed to the term "signal line" in some cases. As another example, the term "wiring" can be changed to the term "power supply line" or the like in some cases. Conversely, the term "signal line", "power supply line", or the like can be changed to the term "wiring" in some cases. The term "power supply line" or the like can be changed to the term "signal line" or the like in some cases. Conversely, the term "signal line" or the like can be changed to the term "power supply line" or the like in some cases. The term "potential" that is applied to a wiring can be changed to the term "signal" or the like depending on the case or the situation. Conversely, the term "signal" or the like can be changed to the term "potential" in some cases.

In this specification and the like, an impurity in a semiconductor refers to an element other than a main component of a semiconductor layer, for example. For example, an element with a concentration of lower than 0.1 atomic % is an impurity. If a semiconductor contains an impurity, formation of the DOS (Density of States) in the semiconductor, a decrease in the carrier mobility, or a decrease in the crystallinity may occur, for example. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (contained also in water), lithium, sodium, silicon, boron, phosphorus, carbon, and nitrogen. Specifically, when the semiconductor is a silicon layer, examples of an impurity that changes characteristics of the semiconductor include oxygen, Group 1 elements except hydrogen, Group 2 elements, Group 13 elements, and Group 15 elements.

In this specification and the like, a switch is in a conduction state (on state) or a non-conduction state (off state) to determine whether current flows or not. Alternatively, a switch has a function of selecting and changing a current path. For example, an electrical switch or a mechanical switch can be used. That is, a switch can be any element capable of controlling current, and is not limited to a certain element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conduction state" of the transistor refers to a state where a source electrode and a drain electrode of the transistor can be regarded as being electrically short-circuited. Furthermore, a "non-conduction state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical system) technology. Such a switch includes an electrode that can be moved mechanically, and operates by controlling conduction and non-conduction with movement of the electrode.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, the term "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 85° and less than or equal to 95° is also included. Furthermore, "approximately perpendicular" or "substantially perpendicular" indicates a state where two straight lines are placed at an angle greater than or equal to 60° and less than or equal to 120°.

Effect of the Invention

One embodiment of the present invention can provide a semiconductor device and the like including a hierarchical artificial neural network. Another embodiment of the present invention can provide a semiconductor device and the like with low power consumption. Another embodiment of the present invention can provide a novel semiconductor device and the like. Another embodiment of the present invention can provide an electronic device including the semiconductor device.

Note that the effects of one embodiment of the present invention are not limited to the effects listed above. The effects listed above do not preclude the existence of other effects. Note that the other effects are effects that are not described in this section and will be described below. The effects that are not described in this section will be derived from the description of the specification, the drawings, and the like and can be extracted from the description as appropriate by those skilled in the art. Note that one embodiment of the present invention has at least one of the effects listed above and the other effects. Accordingly, depending on the case, one embodiment of the present invention does not have the effects listed above in some cases.

BRIEF DESCRIPTION OF THE DRAWINGS

FIG. 23A to FIG. 23C are timing charts showing operation examples of a semiconductor device.

FIG. 25A to FIG. 25C are timing charts showing operation examples of a semiconductor device.

FIG. 26A to FIG. 26C are timing charts showing operation examples of a semiconductor device.

FIG. 42A is a diagram showing classification of crystal structures of IGZO, FIG. 42B is a graph showing an XRD spectrum of crystalline IGZO, and FIG. 42C is an image showing nanobeam electron diffraction patterns of crystalline IGZO.

MODE FOR CARRYING OUT THE INVENTION

Figure 1A:
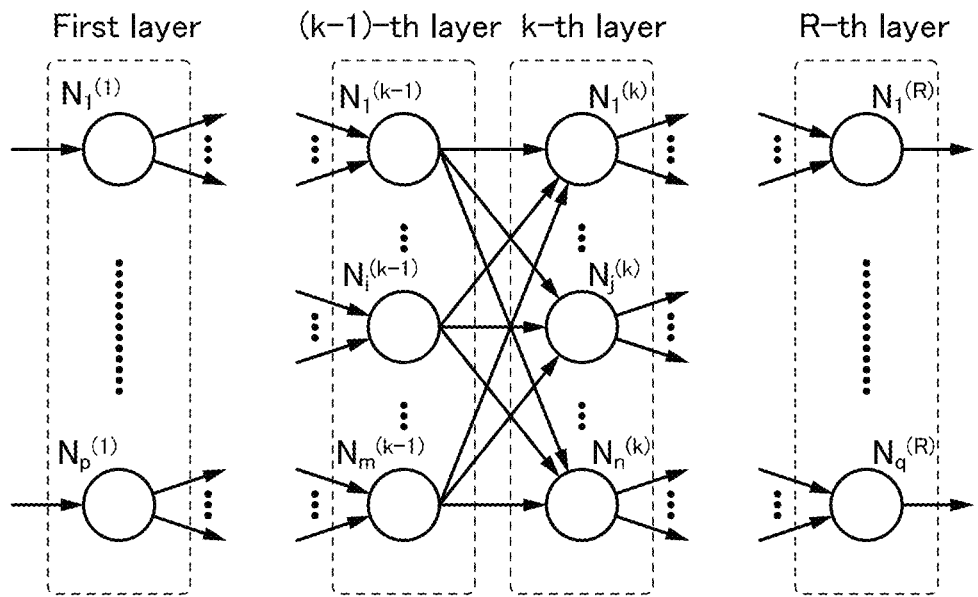
FIG. 1A and FIG. 1B are diagrams illustrating a hierarchical neural network.

In an artificial neural network (hereinafter, referred to as a neural network), the connection strength between synapses can be changed when existing information is given to the neural network. The processing for determining a connection strength by providing a neural network with existing information in such a manner is called "learning" in some cases.

Furthermore, when a neural network in which "learning" has been performed (the connection strength has been determined) is provided with some type of information, new information can be output on the basis of the connection strength. The processing for outputting new information on the basis of provided information and the connection strength in a neural network in such a manner is called "inference" or "recognition" in some cases.

Examples of the model of a neural network include a Hopfield type and a hierarchical type. In particular, a neural network with a multilayer structure is called a "deep neural network" (DNN), and machine learning using a deep neural network is called "deep learning" in some cases.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor or shortly as an OS. In the case where an OS FET or an OS transistor is described, it can also be referred to as a transistor including a metal oxide or an oxide semiconductor.

Furthermore, in this specification and the like, a metal oxide containing nitrogen is also collectively referred to as a metal oxide in some cases. A metal oxide containing nitrogen may be referred to as a metal oxynitride.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined as appropriate.

Note that a content (or part of the content) described in one embodiment can be applied to, combined with, or replaced with at least one of another content (or part of the content) in the embodiment and a content (or part of the content) described in one or a plurality of different embodiments.

Note that in each embodiment, a content described in the embodiment is a content described with reference to a variety of diagrams or a content described with text in the specification.

Note that by combining a diagram (or part thereof) described in one embodiment with at least one of another part of the diagram, a different diagram (or part thereof) described in the embodiment, and a diagram (or part thereof) described in one or a plurality of different embodiments, much more diagrams can be formed.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be interpreted as being limited to the description in the embodiments. Note that in the structures of the invention in the embodiments, the same portions or portions having similar functions are denoted by the same reference numerals in different drawings, and repeated description thereof is omitted in some cases. In perspective views and the like, some components might not be illustrated for clarity of the drawings.

In this specification and the like, when a plurality of components are denoted by the same reference numerals, and in particular need to be distinguished from each other, an identification numeral such as "_1", "[n]", or "[m, n]" is sometimes added to the reference numerals.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes or values shown in the drawings. For example, variations in signal, voltage, or current due to noise, variations in signal, voltage, or current due to difference in timing, or the like can be included.

Note that in this specification and the like, In:Ga:Zn=4:2:3 or a neighborhood thereof refers to an atomic ratio where, when In is 4 with respect to the total number of atoms, Ga is greater than or equal to 1 and less than or equal to 3 ($1 \leq Ga \leq 3$) and Zn is greater than or equal to 2 and less than or equal to 4.1 ($2 \leq Zn \leq 4.1$). In:Ga:Zn=5:1:6 or a neighborhood thereof refers to an atomic ratio where, when In is 5 with respect to the total number of atoms, Ga is greater than 0.1 and less than or equal to 2 ($0.1 < Ga \leq 2$) and Zn is greater than or equal to 5 and less than or equal to 7 ($5 \leq Zn \leq 7$). In:Ga:Zn=1:1:1 or a neighborhood thereof refers to an atomic ratio where, when In is 1 with respect to the total number of atoms, Ga is greater than 0.1 and less than or equal to 2 ($0.1 < Ga \leq 2$) and Zn is greater than 0.1 and less than or equal to 2 ($0.1 < Zn \leq 2$). In:Ga:Zn=5:1:3 or a neighborhood thereof refers to an atomic ratio where, when In is 5 with respect to the total number of atoms, Ga is greater than or equal to 0.5 and less than or equal to 1.5 ($0.5 \leq Ga \leq 1.5$) and Zn is greater than or equal to 2 and less than or equal to 4.1 ($2 \leq Zn \leq 4.1$). In:Ga:Zn=10:1:3 or a neighborhood thereof refers to an atomic ratio where, when In is 10 with respect to the total number of atoms, Ga is greater than or equal to 0.5 and less than or equal to 1.5 ($0.5 \leq Ga \leq 1.5$) and Zn is greater than or equal to 2 and less than or equal to 4.1 ($2 \leq Zn \leq 4.1$). In:Zn=2:1 or a neighborhood thereof refers to an atomic ratio where, when In is 1 with respect to the total number of atoms, Zn is greater than 0.25 and less than or equal to 0.75 ($0.25 < Zn \leq 0.75$). In:Zn=5:1 or a neighborhood thereof refers to an atomic ratio where, when In is 1 with respect to the total number of atoms, Zn is greater than 0.12 and less than or equal to 0.25 ($0.12 < Zn \leq 0.25$). In:Zn=10:1 or a neighborhood thereof refers to an atomic ratio where, when In is 1 with respect to the total number of atoms, Zn is greater than 0.07 and less than or equal to 0.12 ($0.07 < Zn \leq 0.12$).

Embodiment 1

In this embodiment, an arithmetic circuit that is a semiconductor device of one embodiment of the present invention and performs arithmetic operation of a neural network will be described.

<Hierarchical Neural Network>

First, a hierarchical neural network is described. A hierarchical neural network includes one input layer, one or a plurality of intermediate layers (hidden layers), and one output layer, for example, and is configured with a total of at least three layers. A hierarchical neural network 100 illustrated in FIG. 1A shows one example, and the neural network 100 includes a first layer to an R-th layer (here, R can be an integer greater than or equal to 4). Specifically, the first layer corresponds to the input layer, the R-th layer corresponds to the output layer, and the other layers correspond to the intermediate layers. Note that FIG. 1A illustrates the (k−1)-th layer and the k-th layer (here, k is an integer greater than or equal to 3 and less than or equal to R−1) as the intermediate layers, and does not illustrate the other intermediate layers.

Each of the layers of the neural network 100 includes one or a plurality of neurons. In FIG. 1A, the first layer includes a neuron $N_1^{(1)}$ to a neuron $N_p^{(1)}$ (here, p is an integer greater than or equal to 1); the (k−1)-th layer includes a neuron $N_1^{(k-1)}$ to a neuron $N_m^{(k-1)}$ (here, m is an integer greater than or equal to 1); the k-th layer includes a neuron $N_1^{(k)}$ to a neuron $N_n^{(k)}$ (here, n is an integer greater than or equal to 1); and the R-th layer includes a neuron $N_1^{(R)}$ to a neuron $N_q^{(R)}$ (here, q is an integer greater than or equal to 1).

Note that FIG. 1A illustrates a neuron $N_i^{(k-1)}$ (here, i is an integer greater than or equal to 1 and less than or equal to m) in the (k−1)-th layer and a neuron $N_j^{(k)}$ (here, j is an integer greater than or equal to 1 and less than or equal to n) in the k-th layer, in addition to the neuron $N_1^{(1)}$, the neuron $N_p^{(1)}$, the neuron $N_1^{(k-1)}$, the neuron $N_m^{(k-1)}$, the neuron $N_1^{(k)}$, the neuron $N_n^{(k)}$, the neuron $N_1^{(R)}$, and the neuron $N_q^{(R)}$; the other neurons are not illustrated.

Next, signal transmission from a neuron in one layer to a neuron in the subsequent layer and signals input to and output from the neurons are described. Note that description here is made focusing on the neuron $N_j^{(k)}$ in the k-th layer.

Figure 1B:
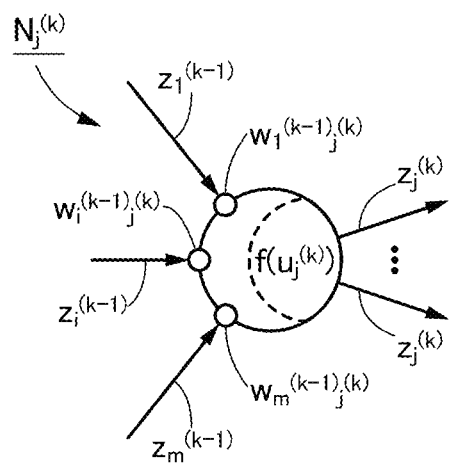

FIG. 1B illustrates the neuron $N_j^{(k)}$ in the k-th layer, signals input to the neuron $N_j^{(k)}$, and a signal output from the neuron $N_j^{(k)}$.

Specifically, $z_1^{(k-1)}$ to $z_m^{(k-1)}$ that are output signals from the neuron $N_1^{(k-1)}$ to the neuron $N_m^{(k-1)}$ in the (k−1)-th layer are output to the neuron $N_j^{(k)}$. Then, the neuron $N_j^{(k)}$ generates $z_j^{(k)}$ in accordance with $z_1^{(k-1)}$ to $z_m^{(k-1)}$, and outputs $z_j^{(k)}$ as the output signal to the neurons in the (k+1)-th layer (not illustrated).

The efficiency of transmitting a signal input from a neuron in one layer to a neuron in the subsequent layer depends on the connection strength (hereinafter, referred to as weight coefficient) of the synapse that connects the neurons to each other. In the neural network 100, a signal output from a neuron in one layer is multiplied by a corresponding weight coefficient and then is input to a neuron in the subsequent layer. When i is an integer greater than or equal to 1 and less than or equal to m and the weight coefficient of the synapse between the neuron $N_i^{(k-1)}$ in the (k−1)-th layer and the neuron $N_j^{(k)}$ in the k-th layer is $w_i^{(k-1)}{}_j^{(k)}$, a signal input to the neuron $N_j^{(k)}$ in the k-th layer can be expressed by Formula (1.1).

[Formula 1]

$$w_i^{(k-1)(k)}_j \cdot z_i^{(k-1)} \quad (1.1)$$

That is, when the signals are transmitted from the neuron $N_1^{(k-1)}$ to the neuron $N_m^{(k-1)}$ in the (k-1)-th layer to the neuron $N_j^{(k)}$ in the k-th layer, the signals $z_1^{(k-1)}$ to $z_m^{(k-1)}$ are multiplied by the corresponding weight coefficients ($w_1^{(k-1)(k)}_j$ to $w_m^{(k-1)(k)}_j$). Then, $w_1^{(k-1)(k)}_j \cdot z_1^{(k-1)}$ to $w_m^{(k-1)(k)}_j \cdot z_m^{(k-1)}$ are input to the neuron $N_j^{(k)}$ in the k-th layer. At this time, the total sum $u_j^{(k)}$ of the signals input to the neuron $N_j^{(k)}$ in the k-th layer is expressed by Formula (1.2).

[Formula 2]

$$u_j^{(k)} = \sum_{i=1}^{m} w_i^{(k-1)(k)}_j \cdot z_i^{(k-1)} \quad (1.2)$$

In addition, a bias may be applied to the product-sum result of the weight coefficients $w_1^{(k-1)(k)}_j$ to $w_m^{(k-1)(k)}_j$ and the signals $z_1^{(k-1)}$ to $z_m^{(k-1)}$ of the neurons. When the bias is denoted by b, Formula (1.2) can be rewritten as the following formula.

[Formula 3]

$$u_j^{(k)} = \sum_{i=1}^{m} w_i^{(k-1)(k)}_j \cdot z_i^{(k-1)} + b \quad (1.3)$$

The neuron $N_j^{(k)}$ generates the output signal $z_j^{(k)}$ in accordance with $u_j^{(k)}$. Here, the output signal $z_j^{(k)}$ from the neuron $N_k^{(k)}$ is defined by the following formula.

[Formula 4]

$$z_j^{(k)} = f(u_j^{(k)}) \quad (1.4)$$

A function $f(u_j^{(k)})$ is an activation function in a hierarchical neural network, and a step function, a linear ramp function, a sigmoid function, or the like can be used. Note that the activation function may be the same or different among all neurons. In addition, the neuron activation function may be the same or different between the layers.

Signals output from the neurons in the layers, the weight coefficient w, or the bias b may be an analog value or a digital value. For example, a binary or ternary digital value may be used. A value with a larger bit number may also be used. In the case of an analog value, for example, a linear ramp function, a sigmoid function, or the like is used as the activation function. In the case of a binary digital value, a step function with an output of −1 or 1 or an output of 0 or 1 is used, for example. Alternatively, the neuron in each layer may output a ternary or higher-level signal. For example, as an activation function that outputs a ternary value, a step function with an output of −1, 0, or 1, a step function with an output of 0, 1, or 2, or the like is used. Alternatively, as an activation function that outputs a quinary value, a step function with an output of −2, −1, 0, 1, or 2 may be used, for example. The use of a digital value as at least one of the signals output from the neurons in the layers, the weight coefficient w, and the bias b enables a reduction of the circuit scale, a reduction of power consumption, or an increase of arithmetic operation speed, for example. Furthermore, the use of an analog value as at least one of the signals output from the neurons in the layers, the weight coefficient w, and the bias b can improve the arithmetic operation accuracy.

The neural network 100 performs operation in which by input of an input signal to the first layer (the input layer), output signals are sequentially generated in the layers from the first layer (the input layer) to the last layer (the output layer) according to Formula (1.1), Formula (1.2) (or Formula (1.3)), and Formula (1.4) on the basis of the signals input from the previous layers, and the output signals are output to the subsequent layers. The signal output from the last layer (the output layer) corresponds to the calculation results of the neural network 100.

<Structure Example 1 of Arithmetic Circuit>

Described here is an example of an arithmetic circuit that is capable of performing the arithmetic operation of Formula (1.2) (or Formula (1.3)) and Formula (1.4) in the above-described neural network 100. Note that in the arithmetic circuit, for example, a weight coefficient of a synapse circuit of the neural network 100 can be a binary or higher-level digital value or an analog value, and a step function or the like can be used as a neuron activation function. In this specification and the like, one of a weight coefficient and a value of a signal (sometimes referred to as an arithmetic value) input from a neuron in one layer to a neuron in the subsequent layer is referred to as first data, and the other is referred to as second data in some cases. Note that the arithmetic value and the weight coefficient of the synapse circuit of the neural network 100 are not limited to digital values, and an analog value can be used as at least one of them.

Figure 2A:
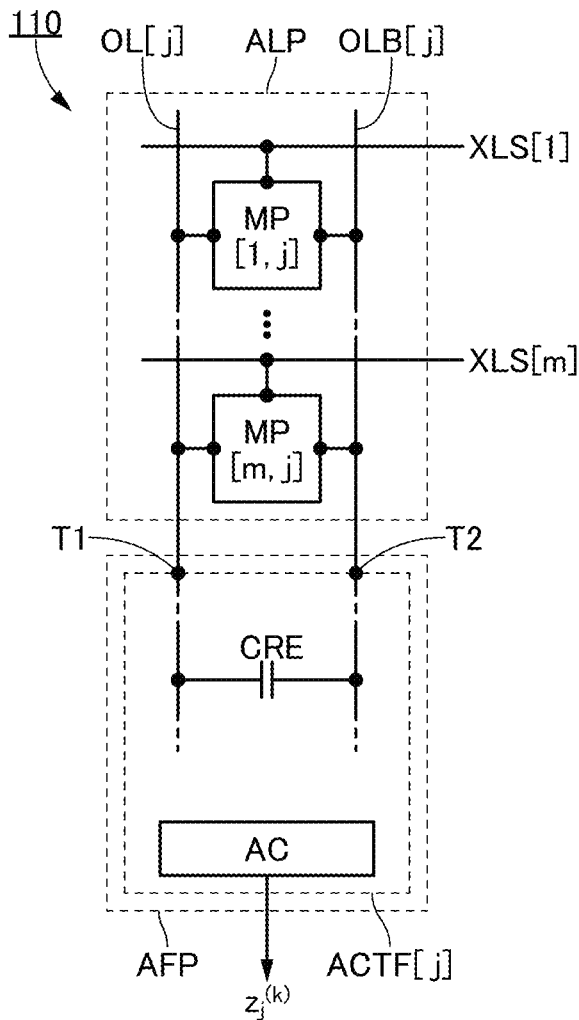
FIG. 2A is a circuit diagram illustrating a structure example of a semiconductor device.

An arithmetic circuit 110 illustrated in FIG. 2A is a semiconductor device including an array portion ALP and a circuit AFP, for example. The arithmetic circuit 110 processes signals input to the neuron $N_1^{(k)}$ in the k-th layer in FIG. 1A and FIG. 1B and generates the signal $z_j^{(k)}$ output from the neuron $N_j^{(k)}$, for example. Note that one embodiment of the present invention is not limited thereto. For example, the arithmetic circuit 110 may function as a memory device or a memory circuit. For example, the arithmetic circuit 110 may function as a DRAM, an SRAM, or a flash memory. For another example, the arithmetic circuit 110 may function as a circuit that performs calculation in a memory circuit, that is, an in-memory computing circuit.

The array portion ALP includes a circuit MP[1, j] to a circuit MP[m, j], for example. The circuit AFP includes a circuit ACTF[j], for example, and the circuit ACTF[j] includes a capacitor CRE, a circuit AC, a terminal T1, and a terminal T2.

Figure 2B:
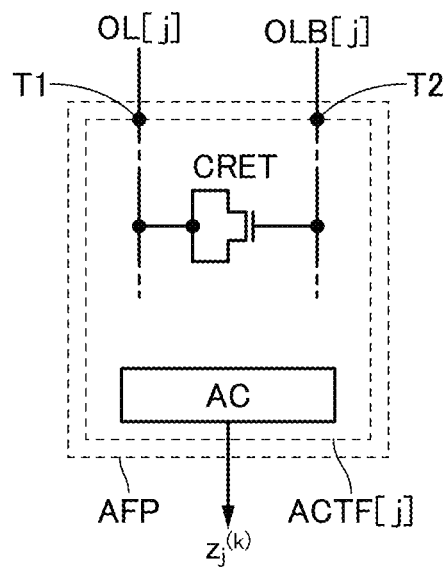
FIG. 2B and FIG. 2C are circuit diagrams illustrating structure examples of a circuit included in a semiconductor device.
Figure 2C:
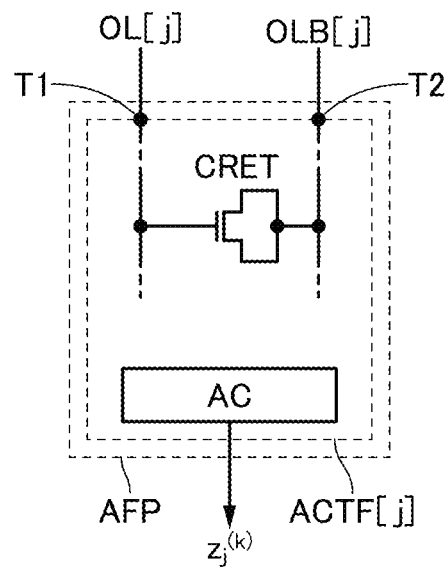

Note that a general capacitor may be used as the capacitor CRE; however, one embodiment of the present invention is not limited thereto. For example, gate capacitance of a transistor may be used as the capacitor CRE as illustrated in FIG. 2B, FIG. 2C, or the like. In that case, the transistor may be an N-channel transistor or a P-channel transistor, or these transistors may be connected in parallel. Note that in FIG. 2B and FIG. 2C, a transistor CRET is used instead of the capacitor CRE. As the transistor CRET, an OS transistor can be used, for example. Note that the OS transistor will be described in detail in Embodiment 5. Besides the OS transistor, a transistor containing silicon in a channel formation region (hereinafter, referred to as a Si transistor) can be used, for example. As the silicon, single crystal silicon, hydrogenated amorphous silicon, microcrystalline silicon, or polycrystalline silicon can be used, for example. As transistors other than the OS transistor and the Si transistor, it is possible to use, for example, a transistor containing Ge in an active layer; a transistor containing a compound semiconductor such as ZnSe, CdS, GaAs, InP, GaN, or SiGe in an active layer; a transistor containing a carbon nanotube in an active layer; and a transistor containing an organic semiconductor in an active layer.

The circuit MP[1, j] to the circuit MP[m, j] are each electrically connected to a wiring OL[j] and a wiring OLB [j]. The circuit MP[1, j] to the circuit MP[m, j] are electrically connected to a wiring XLS[1] to a wiring XLS[m], respectively. The wiring OL[j] is electrically connected to the terminal T1, the terminal T1 is electrically connected to a first terminal of the capacitor CRE, the wiring OLB[j] is electrically connected to the terminal T2, and the terminal T2 is electrically connected to a second terminal of the capacitor CRE. Note that, for example, an element or a circuit (e.g., a switch or a transistor) may be connected between the terminal T1 and the first terminal of the capacitor CRE. Similarly, for example, an element or a circuit (e.g., a switch or a transistor) may be connected between the terminal T2 and the second terminal of the capacitor CRE.

For example, the wiring XLS[1] to the wiring XLS[m] have a function of transmitting potentials corresponding to the signals $z_1^{(k-1)}$ to $z_m^{(k-1)}$ output from the neuron $N_1^{(k-1)}$ to the neuron $N_m^{(k-1)}$.

The circuit MP[1, j] has a function of holding the weight coefficient $w_1^{(k-1)(k)}{}_j$ (here, the first data) between the neuron $N_1^{(k-1)}$ and the neuron $N_j^{(k)}$, for example, and similarly, the circuit MP[m, j] has a function of holding the weight coefficient $w_m^{(k-1)(k)}{}_j$ between the neuron $N_m^{(k-1)}$ and the neuron $N_j^{(k)}$, for example.

The circuit MP[1, j] has a function of outputting the product of the signal $z_1^{(k-1)}$ (here, the second data) output from the neuron $N_1^{(k-1)}$ and the first data $w_1^{(k-1)(k)}{}_j$, for example. Similarly, the circuit MP[m, j] has a function of outputting the product of the signal $z_m^{(k-1)}$ (here, the second data) output from the neuron $N_m^{(k-1)}$ and the first data $w_m^{(k-1)(k)}{}_j$, for example.

For a specific example, when a potential corresponding to the second data $z_1^{(k-1)}$ is input to the circuit MP[1, j] through the wiring XLS[1], the circuit MP[1, j] outputs information (e.g., current or voltage) corresponding to the product of the first data $w_1^{(k-1)(k)}{}_j$ and the second data $z_1^{(k-1)}$ to the wiring OL[j] and/or the wiring OLB[j]. For another specific example, similarly, when a potential corresponding to the second data $z_m^{(k-1)}$ is input to the circuit MP[m, j] through the wiring XLS[m], the circuit MP[m, j] outputs information (e.g., current or voltage) corresponding to the product of the first data $w_m^{(k-1)(k)}{}_j$ and the second data $z_m^{(k-1)}$ to the wiring OL[j] and/or the wiring OLB[j].

Thus, the pieces of information (e.g., current or voltage) output from the circuit MP[1, j] to the circuit MP[m, j] are added up in the wiring OL, for example. Similarly, the pieces of information (e.g., current or voltage) output from the circuit MP[1, j] to the circuit MP[m, j] are added up in the wiring OLB, for example. That is, information (e.g., current or voltage) corresponding to the sum of the products of the first data $w_1^{(k-1)(k)}{}_j$ to $w_m^{(k-1)(k)}{}_j$ and the second data $z_1^{(k-1)}$ to $z_m^{(k-1)}$ flows through each of the wiring OL and the wiring OLB. However, one embodiment of the present invention is not limited thereto. For example, information (e.g., current or voltage) serving as a reference (e.g., a reference, a precharge, or a bias) may flow through at least one of the wiring OL and the wiring OLB.

Specific circuit structures of the circuit MP[1, j] to the circuit MP[m, j] will be described later.

The circuit ACTF[j] functions as a circuit that obtains the information (e.g., current or voltage) corresponding to the sum of the products of the first data and the second data from the wiring OL[j] and the wiring OLB[j] and generates the signal $z_j^{(k)}$ output from the neuron $N_j^{(k)}$, for example. Specifically, the circuit AC included in the circuit ACTF[j] generates, from the information, the output signal $z_j^{(k)}$ (sometimes referred to as an arithmetic value) represented by a binary or multilevel digital value or an analog value, for example. That is, the circuit AC is used as an activation function circuit, for example.

The circuit AC can be an analog-digital converter circuit (sometimes referred to as a sense amplifier or the like), for example. Specifically, the circuit AC can be an analog-digital converter circuit or the like that outputs a digital signal with a value of "0" as the output signal $z_j^{(k)}$ when the product-sum result is less than or equal to "0", and outputs a "positive" digital value as the output signal $z_j^{(k)}$ when the product-sum result is "positive", for example.

In this specification and the like, in the case where the circuit MP[1, j] to the circuit MP[m, j] are not distinguished from each other, they are referred to as circuits MP. Similarly, in the case where the wiring XLS[1] to the wiring XLS[m] are not distinguished from each other, they are referred to as wirings XLS. In addition, [j] of the wiring OL[j] and the wiring OLB[j] is omitted and they are referred to as the wiring OL and the wiring OLB in some cases. Similarly, [j] of the circuit ACTF[j] is omitted and it is referred to as the circuit ACTF in some cases.

<Operation Example 1 of Arithmetic Circuit>

Figure 3A:
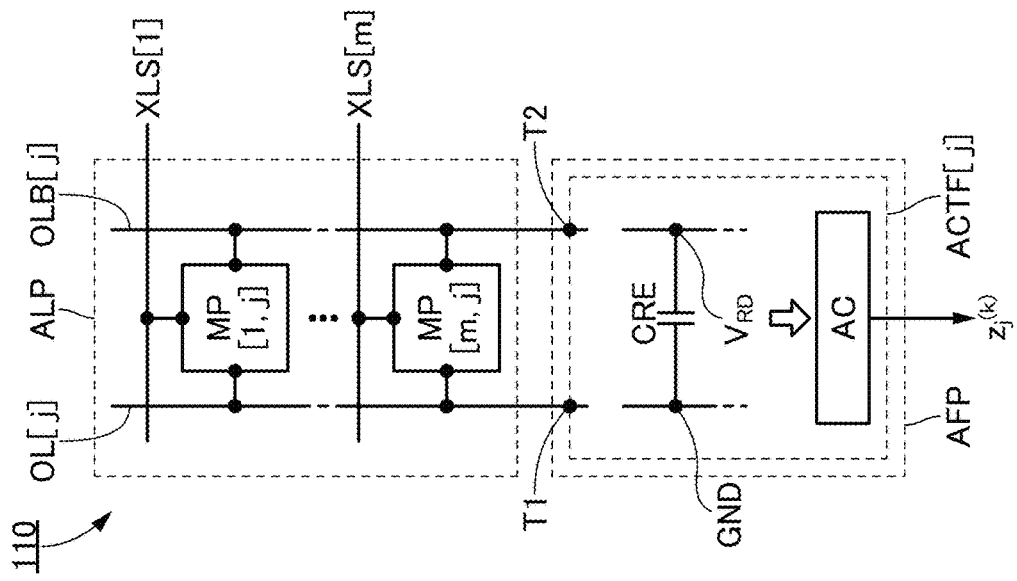
FIG. 3A to FIG. 3C are circuit diagrams illustrating structure examples and operation examples of a semiconductor device.
Figure 3B:
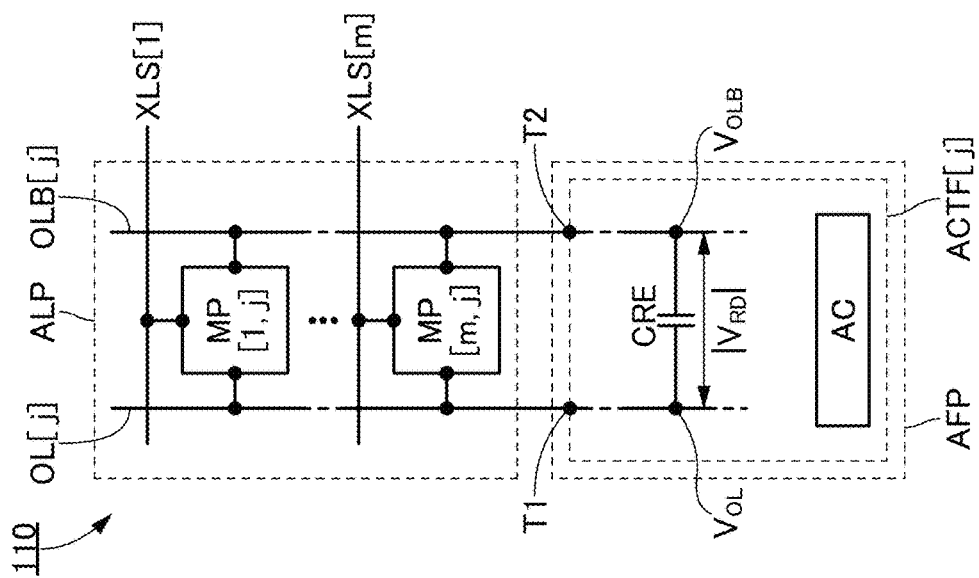
Figure 3C:
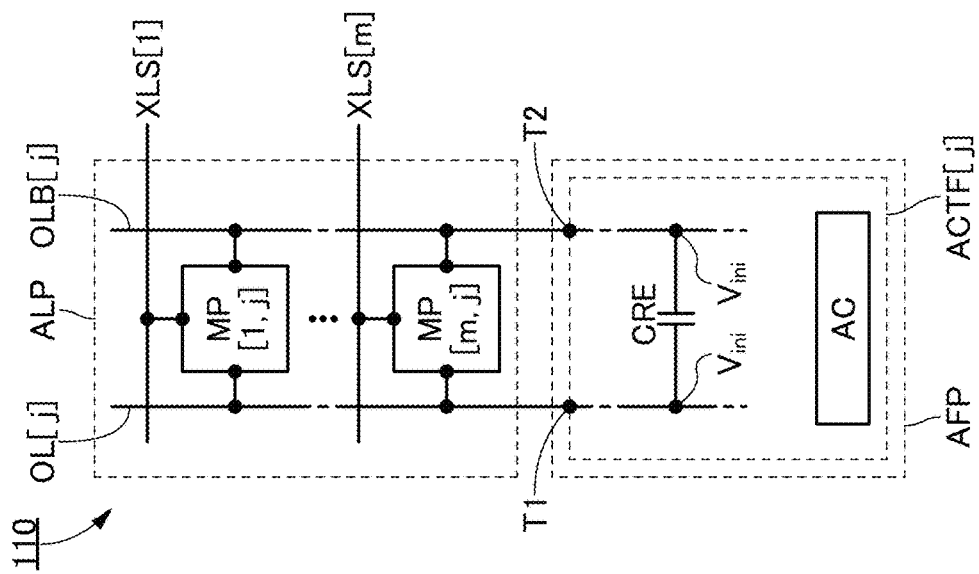

Next, operation examples of the circuit ACTF[j] in FIG. 2A will be described. FIG. 3A to FIG. 3C are circuit diagrams illustrating the order of the operation examples of the circuit ACTF[j].

FIG. 3A illustrates an operation example in which voltage between the first terminal and the second terminal of the capacitor CRE in the circuit ACTF[j] is initialized to 0 V. Specifically, in the circuit in FIG. 3A, $V_{ini}$ is supplied as an initialization potential, for example, to each of the wiring OL[j] and the wiring OLB[j]. For example, $V_{ini}$ becomes VDD in the case where current flows from the wiring OL to the circuit MP, and $V_{ini}$ becomes VSS or GND in the case where current flows from the circuit MP to the wiring OL.

FIG. 3B illustrates an operation example in which information (e.g., current, voltage, or charge) corresponding to the sum of the products of the first data $w_1^{(k-1)(k)}{}_j$ to $w_m^{(k-1)(k)}{}_j$ and the second data $z_1^{(k-1)}$ to $z_m^{(k-1)}$ is output to the wiring OL[j] and the wiring OLB[j] by the circuit MP[1, j] to the circuit MP[m, j], and the information is obtained by the circuit ACTF[j]. In that case, the potential $V_{ini}$ of the first terminal of the capacitor CRE changes to a potential $V_{OL}$ on the basis of the information input to the circuit ACTF[j] from the circuit MP through the wiring OL[j], and the potential $V_{ini}$ of the second terminal of the capacitor CRE changes to a potential $V_{OLB}$ on the basis of the information input to the circuit ACTF[j] from the circuit MP through the wiring OLB[j]. Note that at this time, the voltage between the first terminal and the second terminal of the capacitor CRE is set to $|V_{RD}|$ ($=|V_{OLB}-V_{OL}|$). Here, $|V_{RD}|$ corresponds to, for example, a difference between the sum of amounts of the information flowing through the wiring OL[j] and the sum of amounts of the information flowing through the wiring OLB[j]. Given that the sum of positive values flows through the wiring OL[j] and the sum of negative values flows through the wiring OLB[j], for example, $|V_{RD}|$ corresponds to a difference between the sum of the positive values and the sum of the negative values. Thus, $|V_{RD}|$ corresponds to the result of the product-sum operation. That is, the result of the product-sum of the first data $w_1^{(k-1)(k)}{}_j$ to $w_m^{(k-1)(k)}{}_j$ and the second data $z_1^{(k-1)}$ to $z_m^{(k-1)}$ in the circuit MP[1, j] to the circuit MP[m, j] can be held between the first terminal and the second terminal of the capacitor CRE as the voltage $|V_{RD}|$.

In an example of FIG. 3C, the voltage (charge) stored in the capacitor CRE is input to the circuit AC, and the amount of voltage (charge) stored in the capacitor CRE is sensed. In that case, the potential $V_{OL}$ and the potential $V_{OLB}$ largely change on the basis of the product-sum result. Thus, in the case where the potentials themselves are input to the circuit AC, disadvantages such as complexity of a circuit structure of the circuit AC and a reduction in the operating range of the circuit AC sometimes arise. Accordingly, for example, in the case where the potential $V_{OL}$ and the potential $V_{OLB}$ have different levels but $|V_{RD}|$ ($=|V_{OLB}-V_{OL}|$), which is a difference between the potentials, becomes the same voltage, the same voltage is desirably input to the circuit AC. For example, $|V_{RD}|$ is 1 both in the case where the potential $V_{OL}$ is 1 and the potential $V_{OLB}$ is 2 and in the case where the potential $V_{OL}$ is 3 and the potential $V_{OLB}$ is 4, which means that $|V_{RD}|$ has the same level. Even in those cases, the same voltage is desirably input to the circuit AC. Thus, for example, at least one of the first terminal and the second terminal of the capacitor CRE is brought into an electrically floating state, and then a reference potential (here, a GND potential (0 V) is used, for example; however, one embodiment of the present invention is not limited thereto, and a VDD potential, a precharge potential, a potential of (VDD/2), or the like may be used) is supplied to one of the first terminal of the capacitor CRE and the second terminal of the capacitor CRE. As a result, the potential of the other of the first terminal of the capacitor CRE and the second terminal of the capacitor CRE can be $|V_{RD}|$. That is, even when the potential $V_{OL}$ and the potential $V_{OLB}$ have different levels, the same $|V_{RD}|$ enables the same potential to be input to the circuit AC. The circuit AC senses the potential of the second terminal of the capacitor CRE and outputs the signal $z_j^{(k)}$ based on the voltage $V_{RD}$, for example. In other words, in the operation example illustrated in FIG. 3C, the signal $z_j^{(k)}$ is output as the product-sum result of the first data and the second data output from the circuit MP[1, j] to the circuit MP[m, j].

Here, specific examples of the above operations will be described.

For simplification of the description, each of the first data $w_1^{(k-1)(k)}{}_j$ to $w_m^{(k-1)(k)}{}_j$ has any of the values "+1", "0", and "−1", for example, and each of the second data $z_1^{(k-1)}$ to $z_m^{(k-1)}$ has any of the values "+1", "0", and "−1", for example.

In the operation example of FIG. 3A, the potential $V_{ini}$ supplied to the wiring OL and the wiring OLB is precharged as a high-level potential.

When the product of the first data and the second data is "+1" in the circuit MP, electrical continuity is established between the circuit MP and the wiring OL and electrical continuity is not established between the circuit MP and the wiring OLB. As a result, current corresponding to "|+1|" flows from the wiring OL to the circuit MP. When the product of the first data and the second data is "−1" in the circuit MP, electrical continuity is not established between the circuit MP and the wiring OL and electrical continuity is established between the circuit MP and the wiring OLB. As a result, current corresponding to "|−1|" (i.e., current with the same value as the current corresponding to "|+1|") flows from the wiring OLB to the circuit MP. When the product of the first data and the second data is "0" in the circuit MP, electrical continuity is not established between the circuit MP and the wiring OL and between the circuit MP and the wiring OLB. That is, current with a level corresponding to the sum of positive values flows through the wiring OL, and current with a level corresponding to the absolute value of the sum of negative values flows through the wiring OLB.

In that case, in the operation example of FIG. 3B, the level of the potential $V_{OL}$ depends on the number of circuits MP in which the product of the first data and the second data is "+1". Specifically, a larger number of circuits MP in which the product of the first data and the second data is "+1" results in a larger total amount of current flowing from the wiring OL to the circuit MP[1, j] to the circuit MP[m, j]. Since the wiring OL is precharged with the high-level potential $V_{ini}$, a larger total amount of current flowing through the circuit MP[1, j] to the circuit MP[m, j] causes a larger voltage drop from the potential $V_{ini}$ of the wiring OL. That is, a larger number of circuits MP in which the product of the first data and the second data is "+1" lowers the potential $V_{OL}$.

Similarly, the level of the potential $V_{OLB}$ depends on the number of circuits MP in which the product of the first data and the second data is "−1". Specifically, a larger number of circuits MP in which the product of the first data and the second data is "−1" results in a larger total amount of current flowing from the wiring OLB to the circuit MP[1, j] to the circuit MP[m, j]. Since the wiring OLB is precharged with the high-level potential $V_{ini}$, a larger total amount of current flowing through the circuit MP[1, j] to the circuit MP[m, j] causes a larger voltage drop from the potential $V_{ini}$ of the wiring OLB. That is, a larger number of circuits MP in which the product of the first data and the second data is "−1" lowers the potential $V_{OLB}$.

Accordingly, when the number of circuits MP in which the product of the first data and the second data is "+1" is larger than the number of circuits MP in which the product of the first data and the second data is "−1", the potential $V_{OL}$ of the first terminal of the capacitor CRE is lower than the potential $V_{OLB}$ of the second terminal of the capacitor CRE. That is, when the sum of the products of the first data $w_1^{(k-1)(k)}{}_j$ to $w_m^{(k-1)(k)}{}_j$ and the second data $z_1^{(k-1)}$ to $z_m^{(k-1)}$ is "positive", the potential $V_{OL}$ is lower than the potential $V_{OLB}$. When the number of circuits MP in which the product of the first data and the second data is "−1" is larger than the number of circuits MP in which the product of the first data and the second data is "+1", the potential $V_{OL}$ of the first terminal of the capacitor CRE is higher than the potential $V_{OLB}$ of the second terminal of the capacitor CRE. That is, when the sum of the products of the first data $w_1^{(k-1)(k)}{}_j$ to $w_m^{(k-1)(k)}{}_j$ and the second data $z_1^{(k-1)}$ to $z_m^{(k-1)}$ is "negative", the potential $V_{OL}$ is higher than the potential $V_{OLB}$.

When the number of circuits MP in which the product of the first data and the second data is "+1" is equal to the number of circuits MP in which the product of the first data and the second data is "−1", or when the product of the first data and the second data is "0" in all the circuits MP[1, j] to MP[m, j], the potential $V_{OL}$ of the first terminal of the capacitor CRE is equal to the potential $V_{OLB}$ of the second terminal of the capacitor CRE. That is, when the sum of the products of the first data $w_1^{(k-1)(k)}{}_j$ to $w_m^{(k-1)(k)}{}_j$ and the second data $z_1^{(k-1)}$ to $z_m^{(k-1)}$ is "0", the potential $V_{OL}$ and the potential $V_{OLB}$ are the same potential. Furthermore, when the product of the first data and the second data is "0" in all the circuits, the potential $V_{OL}$ and the potential $V_{OLB}$ remain at the potential $V_{ini}$.

As the absolute value of the sum of the products of the first data $w_1^{(k-1)(k)}{}_j$ to $w_m^{(k-1)(k)}{}_j$ and the second data $z_1^{(k-1)}$ to $z_m^{(k-1)}$ is larger, a potential difference between the potential $V_{OL}$ and the potential $V_{OLB}$ (the absolute value of voltage between the first terminal and the second terminal of a first capacitor) becomes larger.

In the above operation examples, the case where each of the first data $w_1^{(k-1)(k)}{}_j$ to $w_m^{(k-1)(k)}{}_j$ has any of the values "+1", "0", and "−1", for example, is described; however, the operation of the semiconductor device of one embodiment of the present invention is not limited thereto. For example, values possible for the first data $w_1^{(k-1)(k)}{}_j$ to $w_m^{(k-1)(k)}{}_j$ may be multiple values larger than three values, e.g., "+2", "+1", "0", "−1", and "−2", or may be two values, e.g., "+1" and "−1". The amount of current flowing between the circuit MP[1, j] to the circuit MP[m, j] and the wiring OL and/or the wiring OLB depends on the result of the product of the values possible for the first data $w_1^{(k-1)(k)}{}_j$ to $w_m^{(k-1)(k)}{}_j$ held in each of the circuit MP[1, j] to the circuit MP[m, j] and the second data. Specifically, the case where each of the first data $w_1^{(k-1)(k)}{}_j$ to $w_m^{(k-1)(k)}{}_j$ has any one of "+2", "+1", "0", "−1", and "−2" and each of the second data $z_1^{(k-1)}$ to $z_m^{(k-1)}$ has any of the values "+1", "0", and "−1" is considered, for example. Here, when the product of the first data and the second data is "+1" in the circuit MP, electrical continuity is established between the circuit MP and the wiring OL and electrical continuity is not established between the circuit MP and the wiring OLB; thus, current with the current amount $I_{ut}$ flows from the wiring OL to the circuit MP. When the product of the first data and the second data is "+2" in the circuit MP, electrical continuity is established between the circuit MP and the wiring OL and electrical continuity is not established between the circuit MP and the wiring OLB; thus, current with the current amount $2 \times I_{ut}$ flows from the wiring OL to the circuit MP. When the product of the first data and the second data is "−1", electrical continuity is not established between the circuit MP and the wiring OL and electrical continuity is established between the circuit MP and the wiring OLB; thus, current with the current amount $I_{ut}$ flows from the wiring OLB to the circuit MP. When the product of the first data and the second data is "−2", electrical continuity is not established between the circuit MP and the wiring OL and electrical continuity is established between the circuit MP and the wiring OLB; thus, current with the current amount $2 \times I_{ut}$ flows from the wiring OLB to the circuit MP. When the product of the first data and the second data is "0", electrical continuity is not established between the circuit MP and the wiring OL and between the circuit MP and the wiring OLB.

As described above, with the operation example of FIG. 3B, the voltage between the first terminal and the second terminal of the first capacitor can be the potential difference between the potential $V_{OL}$ and the potential $V_{OLB}$ (voltage $|V_{RD}|$) corresponding to the sum of the products of the first data $w_1^{(k-1)(k)}{}_j$ to $w_m^{(k-1)(k)}{}_j$ and the second data $z_1^{(k-1)}$ to $z_m^{(k-1)}$.

After that, as illustrated in the operation example of FIG. 3C, for example, the second terminal of the capacitor CRE is brought into an electrically floating state (the first terminal of the capacitor CRE may also be brought into an electrically floating state), and then the potential of the first terminal of the capacitor CRE is set to the GND potential, so that the potential of the second terminal of the capacitor CRE is set to $V_{RD}$. In the case where the sum of the products of the first data $w_1^{(k-1)(k)}{}_j$ to $w_m^{(k-1)(k)}{}_j$ and the second data $z_1^{(k-1)}$ to $z_m^{(k-1)}$ is "positive", the potential $V_{RD}$ of the second terminal of the capacitor CRE becomes a positive potential. In the case where the sum of the products of the first data $w_1^{(k-1)(k)}{}_j$ to $w_m^{(k-1)(k)}{}_j$ and the second data $z_1^{(k-1)}$ to $z_m^{(k-1)}$ is "negative", the potential $V_{RD}$ of the second terminal of the capacitor CRE becomes a negative potential. In the case where the sum of the products of the first data $w_1^{(k-1)(k)}{}_j$ to $w_m^{(k-1)(k)}{}_j$ and the second data $z_1^{(k-1)}$ to $z_m^{(k-1)}$ is "0", the differential voltage between the first terminal and the second terminal of the capacitor CRE is approximately 0; thus, the potential $V_{RD}$ of the second terminal of the capacitor CRE becomes the GND potential.

Then, the potential of the second terminal of the capacitor CRE is sensed by the circuit AC, so that the output signal $z_j^{(k)}$ based on the voltage $V_{RD}$ can be output. That is, even in the case where the potential $V_{OL}$ of the first terminal of the capacitor CRE and the potential $V_{OLB}$ of the second terminal of the capacitor CRE are both high or in the case where the potential $V_{OL}$ of the first terminal of the capacitor CRE and the potential $V_{OLB}$ of the second terminal of the capacitor CRE are both low, the equivalent differential voltages between the potential $V_{OL}$ and the potential $V_{OLB}$ in those cases enable the differential voltages to be detected by the capacitor CRE, the voltages with the same level to be input to the circuit AC, and the same result to be output as the output signal $z_j^{(k)}$. Consequently, a more accurate product-sum result can be obtained regardless of the levels of the potential $V_{OL}$ and the potential $V_{OLB}$.

Particularly in the case of a hierarchical neural network, an activation function circuit is used as the circuit AC; for example, a circuit that can, in accordance with the kind of activation function, output a digital signal with a value of "0" as the output signal $z_j^{(k)}$ when the product-sum result of the first data and the second data is less than or equal to "0" and can output a "positive" multilevel value as the output signal $z_j^{(k)}$ when the product-sum result of the first data and the second data is "positive" is used. As such a circuit, for example, an analog-digital converter circuit (a sense amplifier, a comparator, or the like) that can sense only a positive voltage is preferably used.

Although the above examples show a usage example in a neural network, one embodiment of the present invention is not limited thereto. For example, a signal from a memory cell to be read is output to the wiring OL and a signal from a reference memory cell is output to the wiring OLB, so that the arithmetic circuit may be utilized for a function of reading information held in the memory cell to be read. That is, the arithmetic circuit may be utilized instead of a DRAM, an SRAM, or a flash memory. For example, multilevel data reading may be performed. For another example, the arithmetic circuit may be utilized as a circuit that performs calculation in a memory circuit, that is, an in-memory computing circuit.

In the case where a "negative" multilevel value is desired to be output as the output signal $z_j^{(k)}$ when the product-sum result of the first data and the second data is "negative", an analog-digital converter circuit that can sense a negative voltage in addition to a positive voltage is used as the circuit AC, for example. Alternatively, in FIG. 3C, the potential of the first terminal of the capacitor CRE may be (VDD/2) instead of being the GND potential. In this manner, the potential of (VDD/2) is input to the circuit AC when the product-sum result of the first data and the second data is "0". In the case where the product-sum result of the first data and the second data is "negative" as well as "positive", a small absolute value results in input of a positive potential to the circuit AC. Consequently, an analog-digital converter circuit (a sense amplifier, a comparator, or the like) that can sense only a positive voltage can be used, for example. When an input voltage is only a positive voltage, the analog-digital converter circuit (a sense amplifier, a comparator, or the like) can be simplified. That is, a negative power supply voltage is not necessary; thus, a power supply circuit can also be simplified. In addition, the range of the input voltage can be wider and thus margin for noise can be wider, which enables accurate processing to be performed.

Figure 4A:
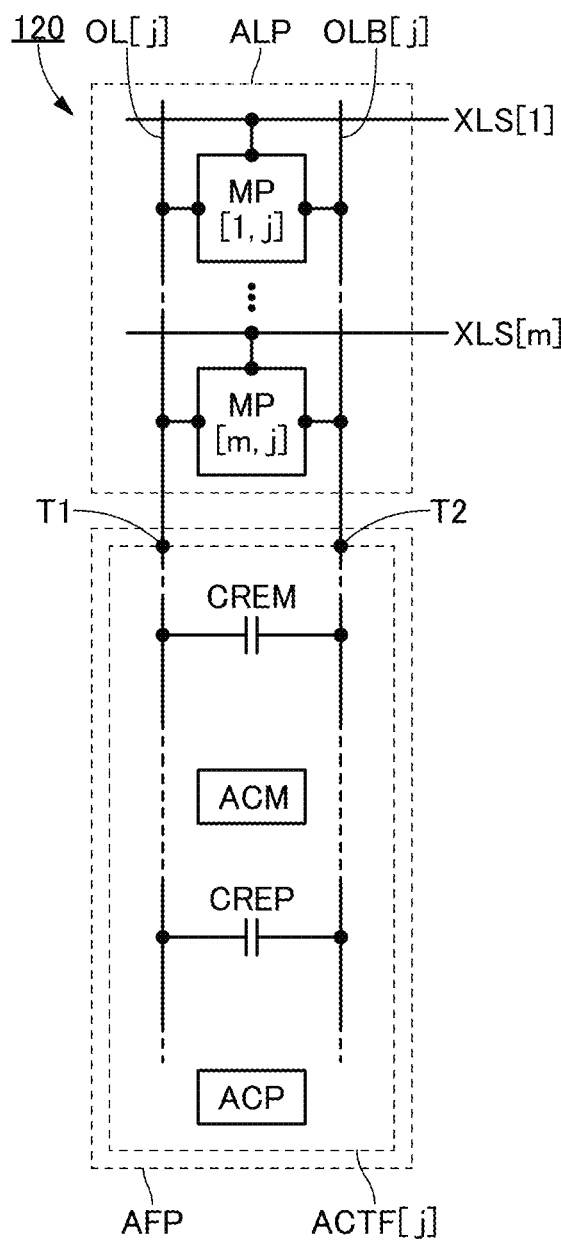
FIG. 4A and FIG. 4B are circuit diagrams illustrating structure examples and operation examples of a semiconductor device.

As another method for outputting a "negative" multilevel value as the output signal $z_j^{(k)}$ when the product-sum result of the first data and the second data is "negative", for example, the arithmetic circuit 110 in FIG. 2A is changed to an arithmetic circuit 120 illustrated in FIG. 4A. That is, even when the result of the product-sum operation is "negative", an increase in the number of capacitors CRE allows an analog-digital converter circuit (a sense amplifier, a comparator, or the like) that can sense only a positive voltage to be used, for example. The arithmetic circuit 120 includes a capacitor CREP, a capacitor CREM, a circuit ACP, and a circuit ACM, for example. A first terminal of the capacitor CREP is electrically connected to the terminal T1, and a second terminal of the capacitor CREP is electrically connected to the terminal T2. A first terminal of the capacitor CREM is electrically connected to the terminal T1, and a second terminal of the capacitor CREM is electrically connected to the terminal T2. Note that, for example, an element or a circuit (e.g., a switch or a transistor) may be connected between the terminal T1 and the first terminal of the capacitor CREP (the capacitor CREM). Similarly, for example, an element or a circuit (e.g., a switch or a transistor) may be connected between the terminal T2 and the second terminal of the capacitor CREP (the capacitor CREM). Like the circuit AC used in the arithmetic circuit 110 in FIG. 2A, the circuit ACP and the circuit ACM can sense a positive voltage and are each an analog-digital converter circuit (a sense amplifier, a comparator, or the like), for example. Note that the circuit ACP and the circuit ACM are each initialized before sensing; the circuit ACP senses the potential of the second terminal of the capacitor CREP, and the circuit ACM senses the potential of the first terminal of the capacitor CREM. That is, the terminal subjected to sensing differs between the capacitor CREP and the capacitor CREM.

As described in the operation examples of FIG. 3A and FIG. 3B, in the arithmetic circuit 120 in FIG. 4A, the potential of the wiring OL can be $V_{OL}$, the potential of the wiring OL can be $V_{OLB}$, and the voltage between the first terminal and the second terminal of the capacitor CREP and the voltage between the first terminal and the second terminal of the capacitor CREP can be $|V_{RE}|$.

Figure 4B:
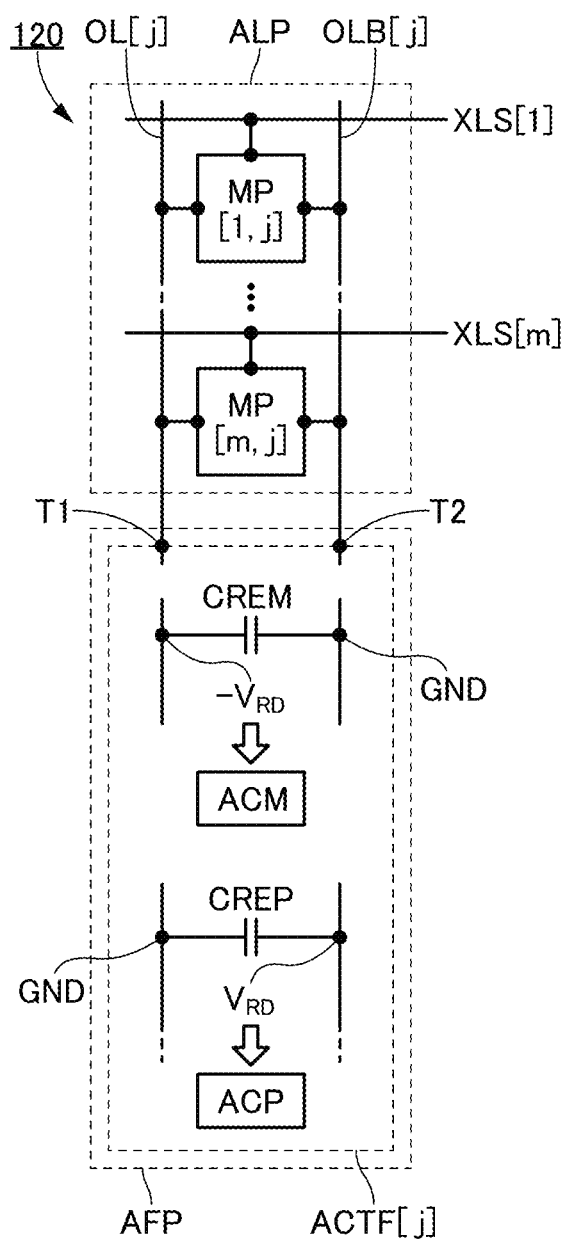

Here, as in an operation example of FIG. 4B, the second terminal of the capacitor CREP and the first terminal of the capacitor CREM are each brought into an electrically floating state (the first terminal of the capacitor CREP and the second terminal of the capacitor CREM may also be brought into an electrically floating state), and then the potentials of the first terminal of the capacitor CREP and the second terminal of the capacitor CREM are each set to the GND potential. Thus, the potential of the second terminal of the capacitor CREP becomes $V_{RD}$, and the potential of the first terminal of the capacitor CREM becomes $-V_{RD}$. In the case where the product-sum result of the first data $w_1^{(k-1)(k)}_j$ to $w_m^{(k-1)(k)}_j$ and the second data $z_1^{(k-1)}$ to $z_m^{(k-1)}$ is "positive", $V_{RD}$ becomes a potential higher than 0. In the case where the product-sum result of the first data $w_1^{(k-1)(k)}_j$ to $w_m^{(k-1)(k)}_j$ and the second data $z_1^{(k-1)}$ to $z_m^{(k-1)}$ is "negative", $V_{RD}$ becomes a potential lower than 0. That is, in the case where the product-sum result of the first data $w_1^{(k-1)(k)}_j$ to $w_m^{(k-1)(k)}_j$ and the second data $z_1^{(k-1)}$ to $z_m^{(k-1)}$ is "positive", the potential $-V_{RD}$ of the first terminal of the capacitor CREM is negative; thus, a potential is not output from the circuit ACM (or 0 is output). In addition, the potential $V_{RD}$ of the second terminal of the capacitor CREP is positive; thus, the circuit ACP performs sensing and a potential corresponding to the potential $V_{RD}$ is output from the circuit ACP. In the case where the product-sum result of the first data $w_1^{(k-1)(k)}_j$ to $w_m^{(k-1)(k)}_j$ and the second data $z_1^{(k-1)}$ to $z_m^{(k-1)}$ is "negative", the potential $V_{RD}$ of the second terminal of the capacitor CREP is negative; thus, a potential is not output from the circuit ACP (or 0 is output). In addition, the potential $-V_{RD}$ of the first terminal of the capacitor CREM is positive; thus, the circuit ACM performs sensing and a potential corresponding to the potential $V_{RD}$ is output from the circuit ACM. In the case where the product-sum result of the first data $w_1^{(k-1)(k)}_j$ to $w_m^{(k-1)(k)}_j$ and the second data $z_1^{(k-1)}$ to $z_m^{(k-1)}$ is "0", the potential of the first terminal of the capacitor CREP is the GND potential; thus, a potential is not output from the circuit ACP (or 0 is output). In addition, the potential of the second terminal of the capacitor CREM is the GND potential; thus, a potential is not output from the circuit ACM (or 0 is output).

Here, the potential output from the circuit ACP is made to correspond to a "positive" multilevel value and the potential output from the circuit ACM is made to correspond to a "negative" multilevel value, whereby a "negative" multilevel value can be output as the output signal $z_j^{(k)}$ when the product-sum result of the first data and the second data is "negative" even with the use of an analog-digital converter circuit (a sense amplifier, a comparator, or the like), for example, that can sense only a positive voltage. Although FIG. 4 illustrates an example in which the circuit ACP and the circuit ACM are included as the circuit AC, one embodiment of the present invention is not limited thereto. The circuit AC may be provided instead of the circuit ACP and the circuit ACM, and the circuit AC may perform sensing twice. That is, the operation of the circuit AC may be divided into two operations and performed by time division. This increases the processing time but reduces the scale of the circuit.

<Structure Example 2 of Arithmetic Circuit>

Figure 5:
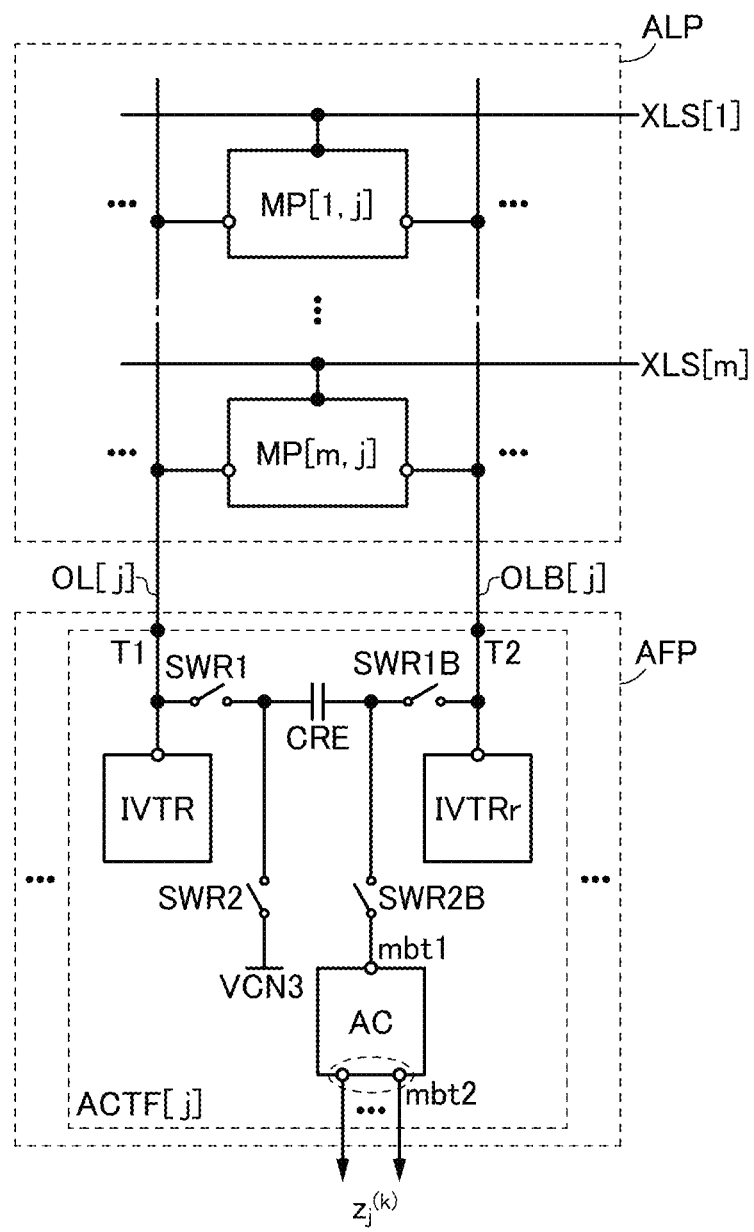
FIG. 5 is a circuit diagram illustrating a structure example of a semiconductor device.

Next, a specific example of a circuit structure of the circuit ACTF[j] will be described. The circuit ACTF[j] can have a circuit structure illustrated in FIG. 5, for example. FIG. 5 illustrates a circuit that generates the signal $z_j^{(k)}$ in accordance with current input from the wiring OL[j] and the wiring OLB[j], for example. Specifically, FIG. 5 illustrates an example of an arithmetic circuit that outputs the output signal $z_j^{(k)}$ expressed by a multilevel value or an analog value. Hence, the circuit ACTF[j] can have a function of an activation function circuit in a neural network, for example. Note that FIG. 5 illustrates electrical connection of the circuit ACTF[j] with peripheral circuits and thus also illustrates the array portion ALP and the circuit AFP.

The circuit ACTF[j] illustrated in FIG. 5 includes a switch SWR1, a switch SWR1B, a switch SWR2, a switch SWR2B, a circuit IVTR, a circuit IVTRr, the capacitor CRE, and the circuit AC, for example.

As each of the switch SWR1, the switch SWR1B, the switch SWR2, and the switch SWR2B, an analog switch or an electrical switch such as a transistor can be used, for example. In the case where a transistor is used as at least one of the switch SWR1, the switch SWR1B, the switch SWR2, and the switch SWR2B, for example, the transistor can be a transistor that can be used as the transistor CRET. Besides an electrical switch, a mechanical switch may be used.

The circuit IVTR is electrically connected to the terminal T1 and a first terminal of the switch SWR1. A second terminal of the switch SWR1 is electrically connected to the first terminal of the capacitor CRE and a first terminal of the switch SWR2. A second terminal of the switch SWR2 is electrically connected to a wiring VCN3. The circuit IVTRr is electrically connected to the terminal T2 and a first terminal of the switch SWR1B. A second terminal of the switch SWR1B is electrically connected to the second terminal of the capacitor CRE and a first terminal of the switch SWR2B. A second terminal of the switch SWR2B is electrically connected to a terminal mbt1 of the circuit AC.

The wiring VCN3 functions as a wiring for supplying a constant voltage. The constant voltage can be a ground potential GND or a low-level potential, for example. Alternatively, VDD (a high-level potential) can be used, for example.

The circuit AC includes the terminal mbt1 and a terminal mbt2. As described above, the circuit AC can be an analog-digital converter circuit, for example. The circuit AC illustrated in FIG. 5 has a function of sensing a potential supplied to the terminal mbt1 and outputting the output signal $z_j^{(k)}$ corresponding to the potential from the terminal mbt2 as a digital signal. Thus, in the case where the circuit AC is an analog-digital converter circuit that converts the potential into a 1-bit digital signal, for example, the number of terminals mbt2 is 1, and in the case where the circuit AC is an analog-digital converter circuit that converts the potential into a k-bit (k is an integer greater than or equal to 2) digital signal, the number of terminals mbt2 is k. Note that FIG. 5 illustrates a plurality of terminals mbt2. The circuit AC performs analog-digital conversion on the basis of a plurality of predetermined potentials, converts an analog potential (or a multilevel digital value) of the terminal mbt1 into a digital signal, and outputs the digital signal, for example.

Particularly in the case where the circuit ACTF[j] in FIG. 5 is used as a circuit for an activation function of a neuron in a hierarchical neural network and the potential of the terminal mbt1 of the circuit AC is lower than the potential supplied from the wiring VCN3 (the product-sum result of the first data and the second data is negative) in analog-digital conversion, for example, the circuit AC outputs 0 instead of outputting the value as it is, so that the circuit for an activation function can be operated as a circuit that outputs a value of a step function.

The circuit IVTR is a circuit having a function of converting current flowing through the wiring OL[j] into a voltage value (or the amount of charge). The circuit IVTRr is a circuit having a function of converting current flowing through the wiring OLB[j] into a voltage value (or the amount of charge) and can have a structure similar to that of the circuit IVTR. Accordingly, in the circuit ACTF[j] in FIG. 5, the circuit IVTR can convert current flowing through the wiring OL[j] into a voltage value (or the amount of charge) and can supply the voltage value to the first terminal of the switch SWR1, and the circuit IVTRr can convert current flowing through the wiring OLB[j] into a voltage value (or the amount of charge) and can supply the voltage value to the first terminal of the switch SWR1B.

Figure 6A:
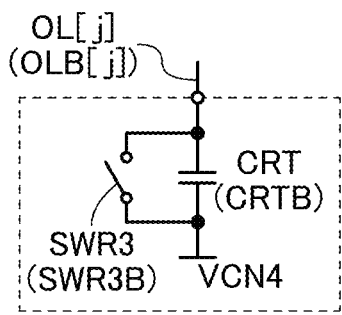
FIG. 6A to FIG. 6C are circuit diagrams illustrating structure examples of a circuit included in a semiconductor device.
Figure 6B:
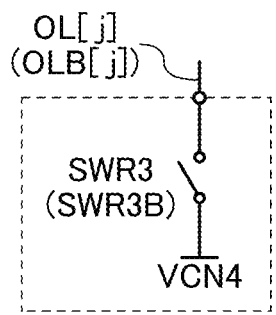
Figure 6C:
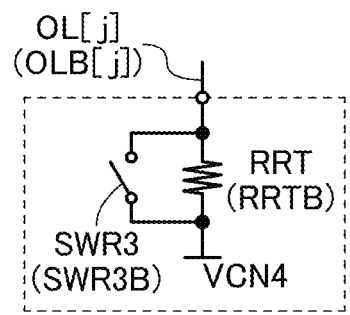

The circuit IVTR (the circuit IVTRr) can have any of circuit structures illustrated in FIG. 6A to FIG. 6C, for example. Note that in order to distinguish the circuit IVTR from the circuit IVTRr, reference numerals of the wiring OLB[j], circuit elements included in the circuit IVTRr, and the like are shown in parentheses in FIG. 6A to FIG. 6C.

The circuit IVTR (the circuit IVTRr) illustrated in FIG. 6A includes a switch SWR3 (a switch SWR3B) and a capacitor CRT (a capacitor CRTB). The wiring OL[j] (the wiring OLB[j]) is electrically connected to a first terminal of the switch SWR3 (the switch SWR3B) and a first terminal of the capacitor CRT (the capacitor CRTB). A second terminal of the switch SWR3 (the switch SWR3B) is electrically connected to a second terminal of the capacitor CRT (the capacitor CRTB) and a wiring VCN4.

As each of the switch SWR3 and the switch SWR3B, for example, a switch that is similar to the switch SWR1, the switch SWR1B, the switch SWR2, and the switch SWR2B described above can be used.

The wiring VCN4 functions as a wiring for supplying a constant voltage, for example. The constant voltage can be, for example, a high-level potential, a ground potential, or a low-level potential. For example, the wiring VCN4 and a wiring VSO described later may be supplied with the same potential. For another example, the wiring VCN4 may be electrically connected to the wiring VSO. That is, the wiring VCN4 and the wiring VSO may be combined into one wiring.

In the circuit IVTR (the circuit IVTRr) illustrated in FIG. 6A, the switch SWR3 (the switch SWR3B) is turned on to establish electrical continuity between the wiring OL[j] (the wiring OLB[j]) and the wiring VCN4, so that the constant voltage of the wiring VCN4 can be supplied to the wiring OL[j] (the wiring OLB[j]). The operation for supplying the constant voltage of the wiring VCN4 to the wiring OL[j] (the wiring OLB[j]) corresponds to initial operation for reading information (current, voltage, or the like) from the circuit MP[1, j] to the circuit MP[m, j] or operation for initializing charge accumulated in the capacitor CRT (the capacitor CRTB). In the circuit IVTR (the circuit IVTRr) illustrated in FIG. 6A, the switch SWR3 (the switch SWR3B) is turned off, whereby current with an amount that flows through the wiring OL[j] (the wiring OLB[j]) can be accumulated as charge in the first terminal of the capacitor CRT. That is, the potential of the first terminal of the capacitor CRT depends on the amount of current flowing through the wiring OL[j] (the wiring OLB[j]).

The amount of current flowing through the wiring OL[j] (the wiring OLB[j]) can be, for example, the total amount of current flowing between the wiring OL[j] (the wiring OLB [j]) and the circuit MP[1, j] to the circuit MP[m, j]. Thus, the current flowing between the wiring OL[j] (the wiring OLB [j]) and each of the circuit MP[1, j] to the circuit MP[m, j] is made to flow only for a predetermined time, so that the charge accumulated in the first terminal of the capacitor CRT depends on the amount of current flowing through the wiring OL[j] (the wiring OLB[j]) and the predetermined time. That is, voltage supplied to the first terminal of the switch SWR1 (the switch SWR1B) from the circuit IVTRr (the circuit IVTRr) depends on the amount of current supplied from each of the circuit MP[1, j] to the circuit MP[m, j] and time.

When the current flowing through the wiring OL[j] (the wiring OLB[j]) is converted into voltage by the parasitic resistance or parasitic capacitance of the wiring OL[j] (the wiring OLB[j]), the circuit IVTR (the circuit IVTRr) can have the circuit structure illustrated in FIG. 6B. That is, the capacitor CRT (the capacitor CRTB) in the circuit IVTR (the circuit IVTRr) in FIG. 6A can be omitted.

The circuit IVTR (the circuit IVTRr) illustrated in FIG. 6C includes the switch SWR3 (the switch SWR3B) and a resistor RRT (a resistor RRTB). The wiring OL[j] (the wiring OLB[j]) is electrically connected to the first terminal of the switch SWR3 (the switch SWR3B) and a first terminal of the resistor RRT (the resistor RRTB). The second terminal of the switch SWR3 (the switch SWR3B) is electrically connected to a second terminal of the resistor RRT (the resistor RRTB) and the wiring VCN4.

In the circuit IVTR (the circuit IVTRr) illustrated in FIG. 6C, the switch SWR3 (the switch SWR3B) is turned on to establish electrical continuity between the wiring OL[j] (the wiring OLB[j]) and the wiring VCN4, so that the constant voltage of the wiring VCN4 can be supplied to the wiring OL[j] (the wiring OLB[j]). The operation for supplying the constant voltage of the wiring VCN4 to the wiring OL[j] (the wiring OLB[j]) corresponds to initial operation for reading information (current, voltage, or the like) from the circuit MP[1, j] to the circuit MP[m, j]. In the circuit IVTR (the circuit IVTRr) illustrated in FIG. 6C, the switch SWR3 (the switch SWR3B) is turned off, whereby current with an amount that flows through the wiring OL[j] (the wiring OLB[j]) flows to the wiring VCN4 through the resistor RRT (the resistor RRTB) and not through the switch SWR3 (the switch SWR3B). In that case, voltage corresponding to a resistance value of the resistor RRT (the resistor RRTB) and the amount of current is generated between the first terminal and the second terminal of the resistor RRT (the resistor RRTB). That is, the potential of the first terminal of the capacitor CRT depends on the amount of current flowing through the wiring OL[j] (the wiring OLB[j]) and the resistance value of the resistor RRT (the resistor RRTB). Note that the switch SWR3 (the switch SWR3B) is not necessarily provided.

Next, an example of a circuit structure that can be used for the circuit ACTF[j] in FIG. 2, which is different from the circuit ACTF[j] in FIG. 5, will be described.

Figure 7A:
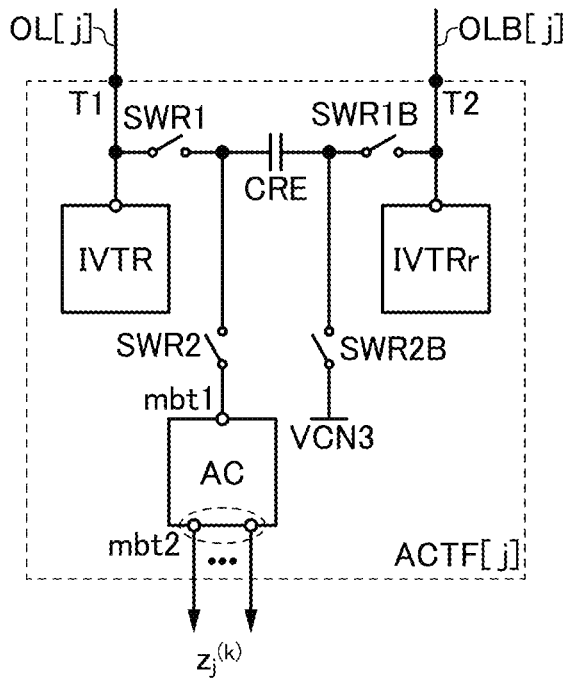
FIG. 7A to FIG. 7C are circuit diagrams illustrating structure examples of a circuit included in a semiconductor device.

The circuit ACTF[j] illustrated in FIG. 7A is a structure example in which the circuit structure of the circuit ACTF[j] in FIG. 5 is changed. Specifically, the circuit ACTF[j] in FIG. 7A is different from the circuit ACTF[j] in FIG. 5 in that the terminal mbt1 of the circuit AC is electrically connected to the second terminal of the switch SWR2, and the wiring VCN3 is electrically connected to the second terminal of the switch SWR2B.

Figure 7B:
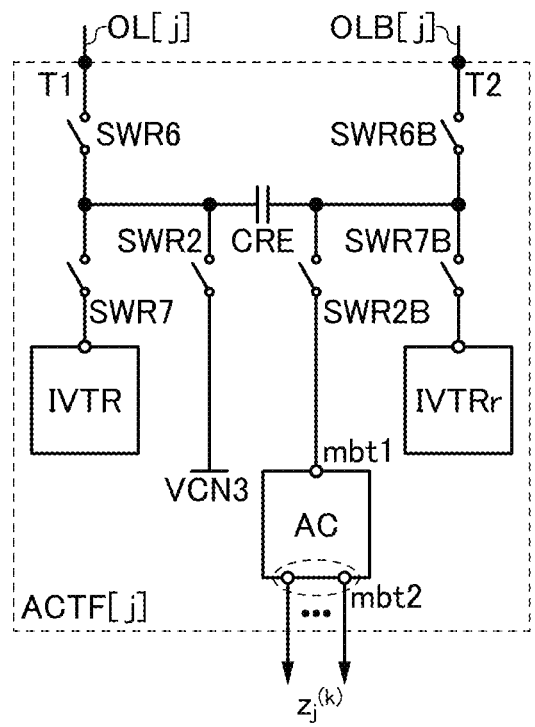

The circuit ACTF[j] in FIG. 2 can have a circuit structure of the circuit ACTF[j] illustrated in FIG. 7B, for example. The circuit ACTF[j] in FIG. 7B includes the switch SWR2, the switch SWR2B, a switch SWR6, a switch SWR6B, a switch SWR7, a switch SWR7B, the capacitor CRE, the circuit IVTR, the circuit IVTRr, and the circuit AC.

A first terminal of the switch SWR6 is electrically connected to the terminal T1, and a second terminal of the switch SWR6 is electrically connected to a first terminal of the switch SWR7, the first terminal of the switch SWR2, and the first terminal of the capacitor CRE. A second terminal of the switch SWR7 is electrically connected to the circuit IVTR, and the second terminal of the switch SWR2 is electrically connected to the wiring VCN3. A first terminal of the switch SWR6B is electrically connected to the terminal T2, and a second terminal of the switch SWR6B is electrically connected to a first terminal of the switch SWR7B, the first terminal of the switch SWR2B, and the second terminal of the capacitor CRE. A second terminal of the switch SWR7B is electrically connected to the circuit IVTRr, and the second terminal of the switch SWR2B is electrically connected to the circuit AC.

As each of the switch SWR6, the switch SWR6B, the switch SWR7, and the switch SWR7B, for example, a switch that is similar to the switch SWR1, the switch SWR1B, the switch SWR2, and the switch SWR2B described above can be used.

For the circuit AC, the circuit IVTR, and the circuit IVTRr, refer to the description of the circuit AC, the circuit IVTR, and the circuit IVTRr included in the circuit ACTF[j] in FIG. 5.

Figure 7C:
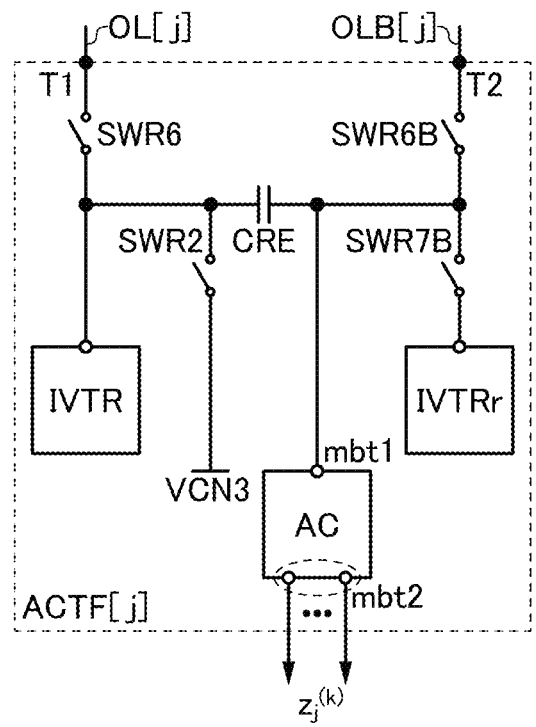

The circuit ACTF[j] in FIG. 2A can have a circuit structure of the circuit ACTF[j] illustrated in FIG. 7C, for example. The circuit ACTF[j] in FIG. 7C is different from the circuit ACTF[j] in FIG. 7B in that the switch SWR7 and the switch SWR2B are not provided. That is, in the circuit ACTF[j] in FIG. 7C, the second terminal of the switch SWR6 is electrically connected to the circuit IVTR, and the terminal mbt1 of the circuit AC is electrically connected to the second terminal of the capacitor CRE, the second terminal of the switch SWR6B, and the first terminal of the switch SWR7B.

With the use of any one of the circuits ACTF[j] in FIG. 7A to FIG. 7C as the circuit ACTF[j] in FIG. 2, the signal $z_j^{(k)}$ can be output as the product-sum result of the first data and the second data, as in the circuit ACTF[j] in FIG. 5.

<Operation Example 2 of Arithmetic Circuit>

Figure 8:
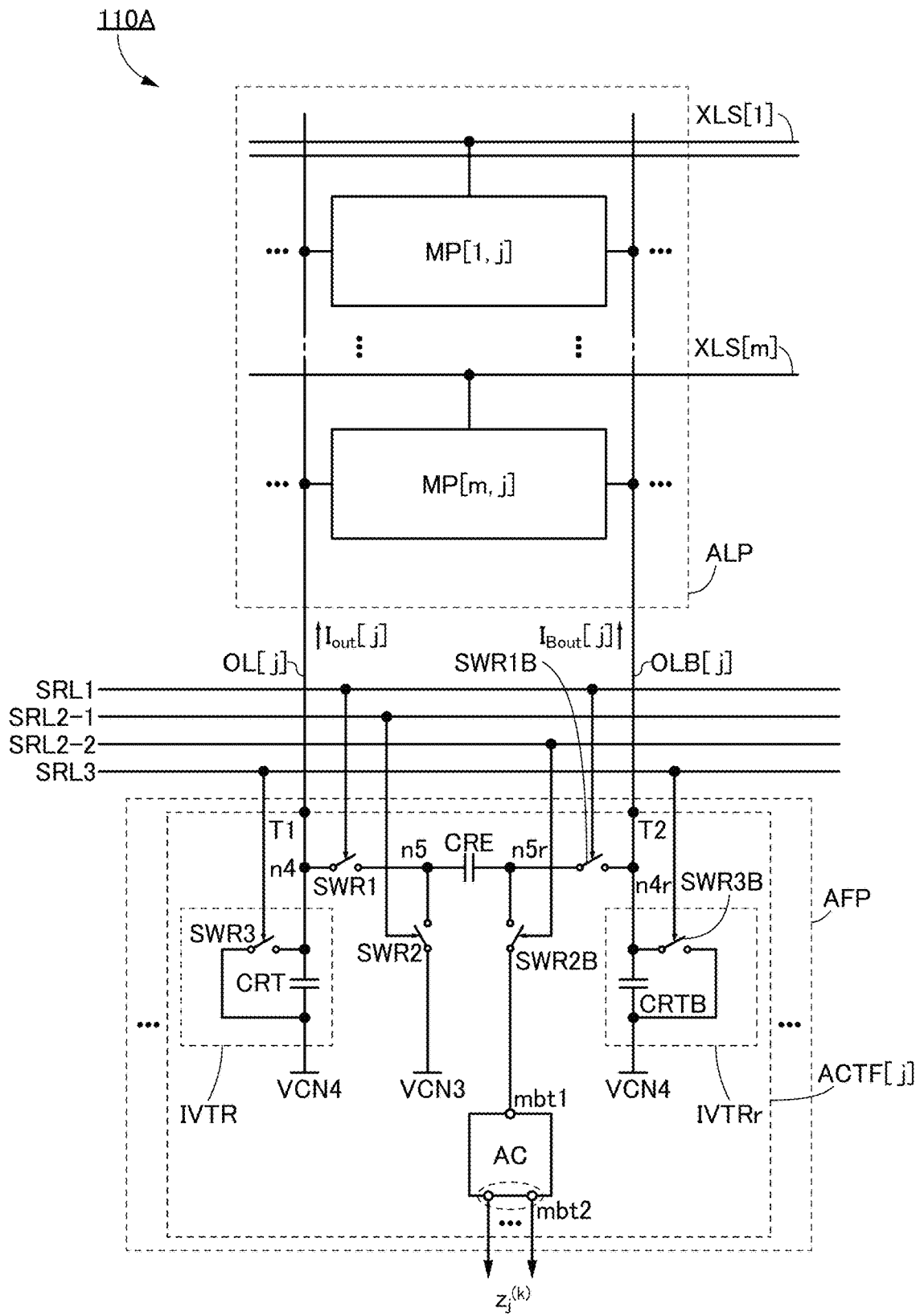
FIG. 8 is a circuit diagram illustrating a structure example of a semiconductor device.

Next, an operation example of the circuit ACTF[j] in FIG. 5 will be described. Note that in the description of this operation example, an arithmetic circuit 110A illustrated in FIG. 8 is used as an example. The arithmetic circuit 110A includes the circuit IVTR (the circuit IVTRr) in FIG. 6A as the circuit IVTR and the circuit IVTRr included in the circuit ACTF[j] illustrated in FIG. 5.

FIG. 8 illustrates a wiring SRL1, a wiring SRL2-1, a wiring SRL2-2, and a wiring SRL3 as wirings for switching an on state and an off state of the switch SWR1, the switch SWR2, the switch SWR3, the switch SWR1B, the switch SWR2B, and the switch SWR3B included in the circuit ACTF[J], for example. Specifically, the wiring SRL1 is electrically connected to a control terminal of the switch SWR1 and a control terminal of the switch SWR1B, the wiring SRL2-1 is electrically connected to a control terminal of the switch SWR2, the wiring SRL2-2 is electrically connected to a control terminal of the switch SWR2B, and the wiring SRL3 is electrically connected to a control terminal of the switch SWR3 and a control terminal of the switch SWR3B. Note that for example, some of the switch SWR1, the switch SWR2, the switch SWR3, the switch SWR1B, the switch SWR2B, and the switch SWR3B can be omitted depending on the case or circumstances. That is, for example, a circuit structure may be employed in which some of the switch SWR1, the switch SWR2, the switch SWR1B, and the switch SWR2B are always in an on state. For another example, when another switch is used, a circuit structure may be employed in which one of the switch SWR3 and the switch SWR3B is always in an off state. For another example, part of the connection structure of the switch SWR1, the switch SWR2, the switch SWR3, the switch SWR1B, the switch SWR2B, and the switch SWR3B can be changed. Note that for example, some of the wiring SRL1, the wiring SRL2-1, the wiring SRL2-2, and the wiring SRL3 can be omitted depending on the case or circumstances. For example, the wiring SRL2-1 and the wiring SRL2-2 may be combined into one wiring. For another example, when the on/off state differs between the switch SWR1 and the switch SWR2 (the switch SWR2B), the wiring SRL1 and the wiring SRL2-1 (the wiring SRL2-2) may be combined into one wiring. Thus, the switch SWR1 and the switch SWR2 (the switch SWR2B) can be alternately turned on and off with one wiring.

FIG. 8 illustrates a node n4 as an electrical connection point of the first terminal of the switch SWR1, the first terminal of the capacitor CRT, and the first terminal of the switch SWR3, and illustrates a node n4r as an electrical connection point of the first terminal of the switch SWR1B, the first terminal of the capacitor CRTB, and the first terminal of the switch SWR3B. In addition, a node n5 is illustrated as an electrical connection point of the second terminal of the switch SWR1, the first terminal of the capacitor CRE, and the first terminal of the switch SWR2, and a node n5r is illustrated as an electrical connection point of the second terminal of the switch SWR1B, the second terminal of the capacitor CRE, and the first terminal of the switch SWR2B.

Figure 9:
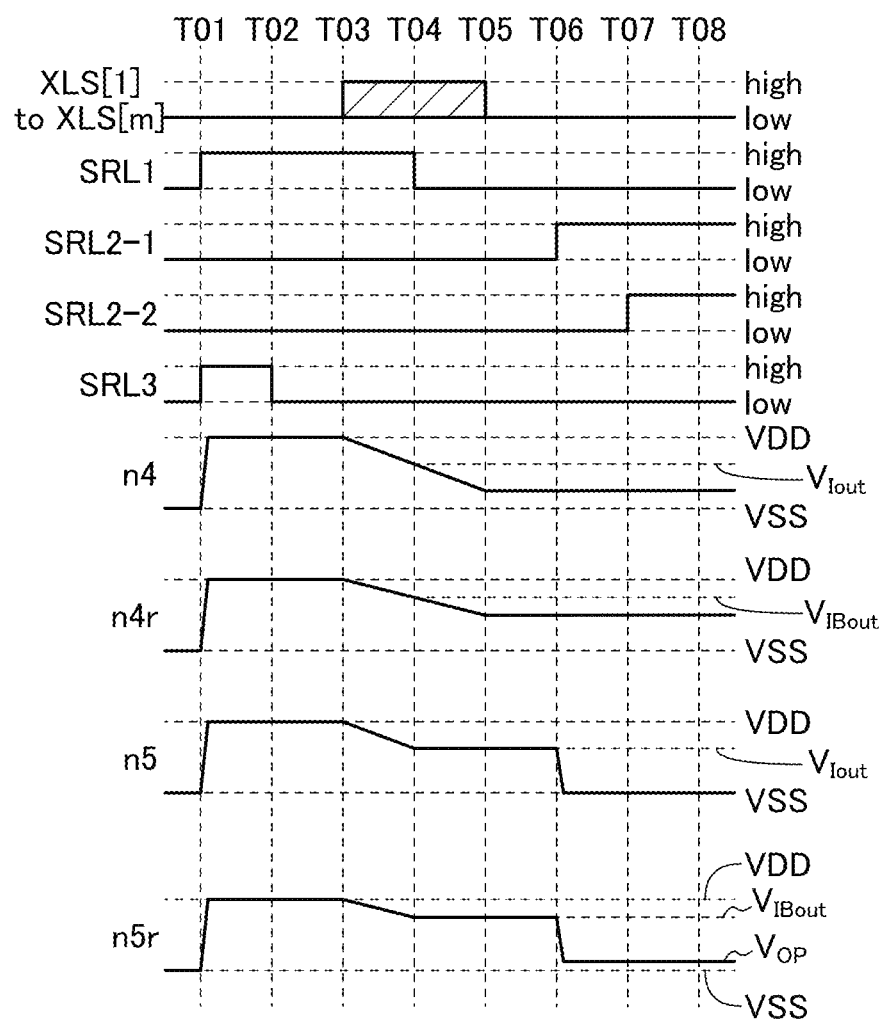
FIG. 9 is a timing chart showing an operation example of a semiconductor device.

FIG. 9 is a timing chart showing the operation example of the circuit ACTF[j] in the arithmetic circuit 110A in FIG. 8, and the timing chart shows potential changes of the wiring XLS[1] to the wiring XLS[m], the wiring SRL1, the wiring SRL2-1, the wiring SRL2-2, the wiring SRL3, the node n4, the node n4r, the node n5, and the node n5r during the period from Time T01 to Time T08 and around the period. Note that in FIG. 9, "high" indicates a high-level potential and "low" indicates a low-level potential.

Note that in this operation example, each of the switch SWR1, the switch SWR2, the switch SWR1B, and the switch SWR2B is turned on when a high-level potential is input to the control terminal, and is turned off when a low-level potential is input to the control terminal.

The timing chart in FIG. 9 shows the wiring XLS[1] to the wiring XLS[m] collectively. The timing chart in FIG. 9 shows a period during which the second data is input to the wiring XLS[1] to the wiring XLS[m] with hatching.

Note that in this operation example, current flows from the wiring OL[j] to the circuit MP, and current flows from the wiring OLB[j] to the circuit MP. Thus, a wiring (e.g., a wiring VE and a wiring VEr described in Embodiment 2) for supplying VSS (a low-level potential) is electrically connected to the circuit MP (which is not illustrated in FIG. 8), and the constant voltage supplied from the wiring VCN4 is VDD (a high-level potential). The amount of current flowing from the wiring OL[j] to the circuit MP and the amount of current flowing from the wiring OLB[j] to the circuit MP depend on the first data held in the circuit MP and the second data input from the wiring XLS. The amount of current flowing from the wiring OL[j] to the circuit MP and/or the amount of current flowing from the wiring OLB[j] to the circuit MP may be 0. The constant voltage supplied from the wiring VCN3 is VSS.

Before Time T01, the weight coefficients $w_1^{(k-1)(k)}$ to $w_m^{(k-1)(k)}$ are held as the first data in the circuit MP[1, j] to the circuit MP[m, j].

In addition, before Time T01, a low-level potential is input to the wiring XLS[1] to the wiring XLS[m], and a low-level potential is input to the wiring SRL1, the wiring SRL2-1, the wiring SRL2-2, and the wiring SRL3. The potentials of the node n4, the node n4r, the node n5, and the node n5r are each VSS.

From Time T01 to Time T02, a high-level potential is input to the wiring SRL1 and the wiring SRL3. The high-level potential input to the wiring SRL1 brings the switch SWR1 and the switch SWR1B into an on state, and the high-level potential input to the wiring SRL3 brings the switch SWR3 and the switch SWR3B into an on state.

From Time T01 to Time T02, a low-level potential is input to the wiring SRL2-1 and the wiring SRL2-2. The low-level potential input to the wiring SRL2-1 and the wiring SRL2-2 brings the switch SWR2 and the switch SWR2B into an off state.

Accordingly, electrical continuity is established between the wiring VCN4 and the wiring OL[j] and between the wiring VCN4 and the first terminal of the capacitor CRE. In addition, electrical continuity is established between the wiring VCN4 and the wiring OLB[j], between the wiring VCN4 and the second terminal of the capacitor CRE, and between the wiring VCN4 and the terminal mbt1. Furthermore, electrical continuity is not established between the wiring VCN3 and the first terminal of the capacitor CRE. Thus, the potentials of the node n4, the node n4r, the node n5, and the node n5r each become VDD.

From Time T02 to Time T03, a low-level potential is input to the wiring SRL3. The low-level potential input to the wiring SRL3 brings the switch SWR3 and the switch SWR3B into an off state. Thus, electrical continuity is not established between the wiring VCN4 and the wiring OL[j] and between the wiring VCN4 and the wiring OLB[j], so that the node n4, the node n5, the node n4r, and the node n5r are brought into a floating state.

From Time T03 to Time T04, the signals $z_1^{(k-1)}$ to $z_m^{(k-1)}$ of the neurons are supplied as the second data to the circuit MP[1, j] to the circuit MP[m, j] in the array portion ALP.

Thus, in the circuit MP[i, j], current flows between a circuit MC and one of the wiring OL[j] and the wiring OLB[j] and current flows between a circuit MCr and the other of the wiring OL[j] and the wiring OLB[j] in accordance with the weight coefficient $w_i^{(k-1)(k)}$ and the signal $z_1^{(k-1)}$ of the neuron. Here, the total amount of current flowing between the wiring OL[j] and each of the circuit MP[1,1] to the circuit MP[m, j] is denoted by $I_{out}[j]$, and the total amount of current flowing between the wiring OLB[j] and each of the circuit MP[1, j] to the circuit MP[m, j] is denoted by $I_{Bout}[j]$.

At this time, the potentials of the node n4 and the node n5 decrease due to current flowing through the wiring OL[j], and the potentials of the node n4r and the node n5r decrease due to current flowing through the wiring OLB[j].

Note that in this operation example, $I_{out}[j]$ is larger than $I_{Bout}[j]$. Thus, from Time T03 to Time T04, the decrease in the potentials of the node n4 and the node n5 is larger than the decrease in the potentials of the node n4r and the node n5r. At Time T04 in the timing chart in FIG. 9, the potentials of the node n4 and the node n5 decrease to $V_{Iout}$, and the potentials of the node n4r and the node n5r decrease to $V_{IBout}$.

At Time T04, a low-level potential is input to the wiring SRL1. The low-level potential input to the wiring SRL1 brings the switch SWR1 and the switch SWR1B into an off state. Thus, electrical continuity is not established between the first terminal of the capacitor CRE and the wiring OL[j] and between the second terminal of the capacitor CRE and the wiring OLB[j]. Accordingly, the potential of the first terminal of the capacitor CRE (the node n5) stops decreasing, and the potential of the second terminal of the capacitor CRE (the node n5r) stops decreasing. In addition, voltage between the first terminal of the capacitor CRE (the node n5) and the second terminal of the capacitor CRE (the node n5r) is held. Note that the potentials of the node n4 and the node n4r continuously decrease since before Time T04.

From Time T05 to Time T06, a low-level potential is input to each of the wiring XLS[1] to the wiring XLS[m]. Thus, the supply of the signals $z_1^{(k-1)}$ to $z_m^{(k-1)}$ of the neurons corresponding to the second data to the circuit MP[1, j] to the circuit MP[m, j] in the array portion ALP is stopped. As a result, current stops flowing from the wiring OL[j] to the circuit MP, and current stops flowing from the wiring OLB[j] to the circuit MP. Accordingly, the potentials of the node n4 and the node n4r stop decreasing.

From Time T06 to Time T07, a high-level potential is input to the wiring SRL2-1. The high-level potential input to the wiring SRL2-1 brings the switch SWR2 into an on state. Thus, electrical continuity is established between the first terminal of the capacitor CRE and the wiring VCN3, so that the potential of the first terminal of the capacitor CRE (the node n5) becomes VSS.

Since the second terminal of the capacitor CRE (the node n5r) is in a floating state, a change of the potential of the first terminal of the capacitor CRE (the node n5) from $V_{Iout}$ to VSS changes the potential of the second terminal of the capacitor CRE (the node n5r) due to capacitive coupling. Note that the amount of change in potential due to capacitive coupling depends on a capacitive coupling coefficient; however, for simple description in this specification and the like, the potential of the second terminal of the capacitor CRE changes to $V_{IBout}$ ($V_{Iout}$–VSS) (denoted as $V_{OP}$ in the timing chart in FIG. 9) when the potential of the first terminal of the capacitor CRE changes from $V_{Iout}$ to VSS. That is, the change in the potential corresponds to the case where a capacitive coupling coefficient that depends on the capacitor CRE and peripheral circuit elements is 1.

From Time T07 to Time T08, a high-level potential is input to the wiring SRL2-2. The high-level potential input to the wiring SRL2-2 brings the switch SWR2B into an on state. Thus, electrical continuity is established between the second terminal of the capacitor CRE (the node n5r) and the terminal mbt1.

At this time, the potential $V_{OP}$ of the second terminal of the capacitor CRE (the node n5r) is input to the terminal mbt1 of the circuit AC.

Thus, the circuit AC outputs a signal with the value $z_j^{(k)}$ as a digital signal corresponding to the potential $V_{OP}$ input to the terminal mbt1.

The value $z_j^{(k)}$ is output on the basis of a potential difference between the potential $V_{Iout}$ corresponding to the amount of current flowing through the wiring OL[j] and the potential $V_{IBout}$ corresponding to the amount of current flowing through the wiring OLB[j]. That is, the potential $V_{Iout}$ and the potential $V_{IBout}$ are determined by $I_{out}$[j], $I_{Bout}$[j], and the time during which the switch SWR1 and the switch SWR2 are in an on state (the time from Time T03 to Time T04). $I_{out}$[j] and $I_{Bout}$[j] are current corresponding to the result of the product-sum operation of the first data $w_1^{(k-1)(k)}_j$ to $w_m^{(k-1)(k)}_j$, which are the first data held in the circuit MP[1, j] to the circuit MP[m, j], and the signals with the values $z_1^{(k-1)}$ to $z_m^{(k-1)}$, which are the second data input to the circuit MP[1, j] to the circuit MP[m, j], i.e., current corresponding to $u_j^{(k)}$ in Formula (1.2). Meanwhile, the potential $V_{Iout}$ and the potential $V_{IBout}$ change with the time during which the switch SWR1 and the switch SWR2 are in an on state (the time from Time T03 to Time T04); thus, the time is preferably set as appropriate in accordance with the circuit AC.

In this operation example, the current amounts $I_{out}$[j] and $I_{Bout}$[j] are converted into the potentials and a potential difference therebetween is input to the circuit AC, whereby the value $z_j^{(k)}$ is output. That is, when the circuit AC is an activation function circuit in a hierarchical neural network, the value $z_j^{(k)}$ output as a digital signal can be a potential corresponding to $z_j^{(k)}$ in Formula (1.4).

From Time T07 to Time T08, strictly, at the stage in which the switch SWR2B is turned on, the potential input to the terminal mbt1 might change from $V_{OP}$ in consideration of the influence of parasitic resistance, parasitic capacitance, or the like. In that case, the circuit AC is preferably designed to correct the potential input to the terminal mbt1 appropriately in consideration of the resistance of a wiring between the second terminal of the capacitor CRE and the terminal mbt1.

In the above operation example, the case where $I_{out}$[j] is larger than $I_{Bout}$[j] is described. By contrast, when $I_{Bout}$[j] is larger than $I_{out}$[j], the potential $V_{IBout}$ of the node n5r is lower than the potential $V_{Iout}$ of the node n5 at Time T04. Thus, when the switch SWR2 is turned on from Time T06 to Time T07, the potential of the node n5r becomes lower than VSS due to capacitive coupling of the capacitor CRE. Then, from Time T07 to Time T08, a potential lower than VSS is input to the terminal mbt1. At this time, the circuit AC may be configured to output a digital signal corresponding to 0 as the output signal $z_j^{(k)}$ to the terminal mbt2, for example. This corresponds to the case where the activation function $f(u_j^{(k)})$ in a hierarchical neural network functions as a ramp function or the like that outputs 0 when $u_j^{(k)}$ is negative.

<Structure Example 3 of Arithmetic Circuit>

Note that one embodiment of the present invention is not limited to the circuit structure of the circuit ACTF[j] in FIG. 5 included in the arithmetic circuit. For example, the circuit structure of the circuit ACTF[j] in FIG. 5 included in the semiconductor device (the arithmetic circuit) of one embodiment of the present invention can be changed to that of the circuit ACTF[j] in FIG. 10. The circuit ACTF[j] in FIG. 10 includes the switch SWR1, the switch SWR1B, the switch SWR2, the switch SWR2B, the switch SWR3, the switch SWR3B, a switch SWR4, a switch SWR4B, a load LE, a load LEB, an operational amplifier OP, an operational amplifier OPB, and the circuit AC. Note that description of the portions overlapping with the description of the circuit ACTF[j] illustrated in FIG. 5 is omitted.

As each of the switch SWR3, the switch SWR3B, the switch SWR4, and the switch SWR4B, for example, a switch that is similar to the switch SWR1, the switch SWR1B, the switch SWR2, and the switch SWR2B can be used.

The first terminal of the switch SWR3 is electrically connected to the terminal T1, a first terminal of the switch SWR4, and a first terminal of the load LE. The second terminal of the switch SWR3 is electrically connected to the wiring VCN4. A non-inverting input terminal of the operational amplifier OP is electrically connected to a wiring Vref1L, an inverting input terminal of the operational amplifier OP is electrically connected to a second terminal of the switch SWR4, and an output terminal of the operational amplifier OP is electrically connected to a second terminal of the load LE and the first terminal of the switch SWR1.

The first terminal of the switch SWR3B is electrically connected to the terminal T2, a first terminal of the switch SWR4B, and a first terminal of the load LEB. The first terminal of the switch SWR3B is electrically connected to the wiring VCN4. A non-inverting input terminal of the operational amplifier OPB is electrically connected to a wiring Vref2L, an inverting input terminal of the operational amplifier OPB is electrically connected to a second terminal of the switch SWR4B, and an output terminal of the operational amplifier OPB is electrically connected to a second terminal of the load LEB and the first terminal of the switch SWR1B.

Note that the wiring Vref1L and the wiring Vref2L function as wirings that supply voltages equal to or different from each other. Thus, the wiring Vref1L and the wiring Vref2L can be combined into one wiring in some cases.

Figure 10:
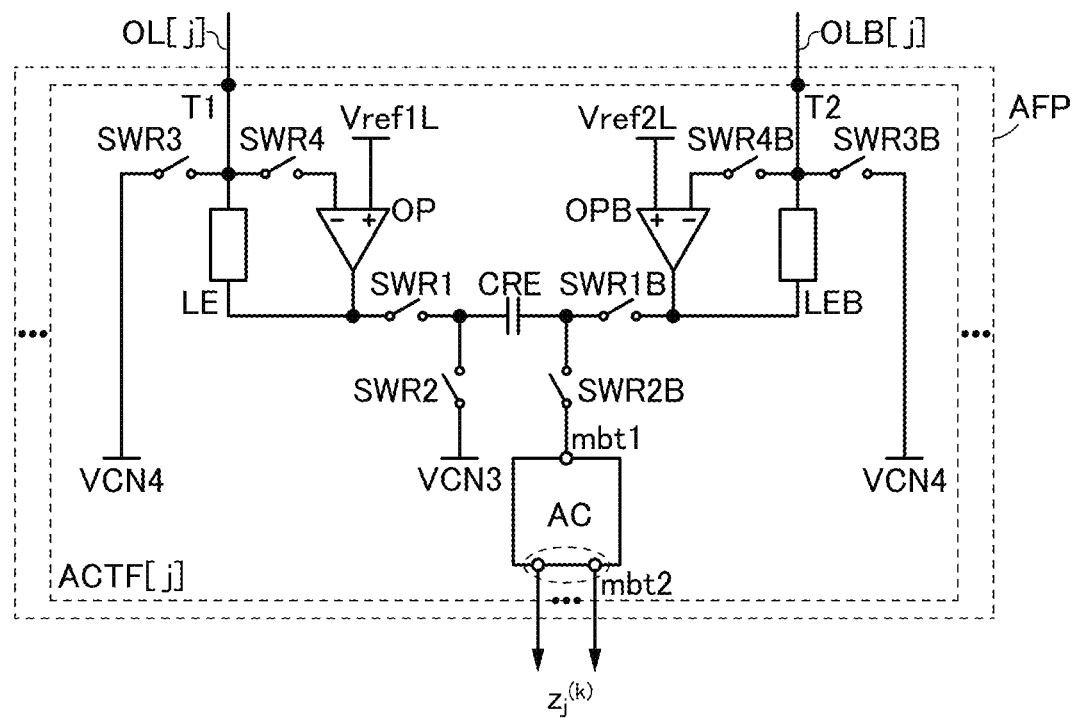
FIG. 10 is a circuit diagram illustrating a structure example of a circuit included in a semiconductor device.

The switch SWR3 (the switch SWR3B) is turned on and the switch SWR4 (the switch SWR4B) is turned off, whereby the circuit ACTF[j] in FIG. 10 can perform initial operation for supplying a constant voltage of the wiring VCN4 to the wiring OL[j] (the wiring OLB[j]), as in FIG. 10.

The load LE and the load LEB of the circuit ACTF[j] in FIG. 10 can each be a resistor or a capacitor, for example. In particular, when a capacitor is used as each of the load LE and the load LEB, a combination of the operational amplifier OP and the load LE and a combination of the operational amplifier OPB and the load LEB each function as an integrator circuit. That is, the switch SWR3 and the switch SWR3B are turned off and the switch SWR4 and the switch SWR4B are turned on, whereby charge is accumulated in each of the capacitors (the load LE and the load LEB) in accordance with the amount of current flowing through the wiring OL[j] or the wiring OLB[j]. In other words, the currents flowing from the wirings OL[j] and OLB[j] are converted into voltages by the integrator circuits, and the voltages are output from output terminals of the operational amplifier OP and the operational amplifier OPB.

With the use of capacitors as the load LE and the load LEB, the circuit ACTF[j] in FIG. 10 can convert the amount of charge flowing through the wiring OL[j] into a voltage value, supply the voltage value to the first terminal of the switch SWR1, convert the amount of charge flowing through the wiring OLB[j] into a voltage value, and supply the voltage value to the first terminal of the switch SWR1B.

Figure 11A:
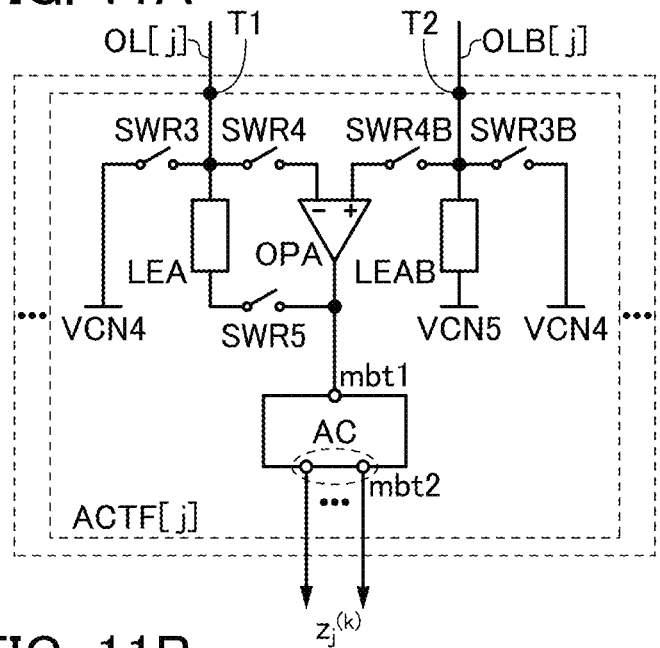
FIG. 11A and FIG. 11B are circuit diagrams illustrating structure examples of a circuit included in a semiconductor device.

The circuit structure of the circuit ACTF[j] in FIG. 5 can be changed to that of the circuit ACTF[1] in FIG. 11A. The circuit ACTF[1] in FIG. 11A includes the switch SWR3, the switch SWR3B, the switch SWR4, the switch SWR4B, a switch SWR5, a load LEA, a load LEAB, an operational amplifier OPA, and the circuit AC.

As each of the switch SWR3, the switch SWR3B, the switch SWR4, the switch SWR4B, and the switch SWR5, for example, a switch that is similar to the switch SWR1, the switch SWR1B, the switch SWR2, and the switch SWR2B can be used.

The first terminal of the switch SWR3 is electrically connected to the terminal T1, the first terminal of the switch SWR4, and a first terminal of the load LEA. The second terminal of the switch SWR3 is electrically connected to the wiring VCN4. The inverting input terminal of the operational amplifier OP is electrically connected to the second terminal of the switch SWR4. A second terminal of the load LEA is electrically connected to a first terminal of the switch SWR5.

The first terminal of the switch SWR3B is electrically connected to the terminal T2, the first terminal of the switch SWR4B, and a first terminal of the load LEAB. The second terminal of the switch SWR3B is electrically connected to the wiring VCN4. The non-inverting input terminal of the operational amplifier OP is electrically connected to the second terminal of the switch SWR4B. A second terminal of the load LEAB is electrically connected to a wiring VCN5. The output terminal of the operational amplifier OP is electrically connected to a second terminal of the switch SWR5 and the terminal mbt1 of the circuit AC.

The wiring VCN5 functions as a wiring for supplying a constant voltage. The constant voltage can be a ground potential or a low-level potential, for example.

The switch SWR3 (the switch SWR3B) is turned on, the switch SWR4 (the switch SWR4B) is turned off, and the switch SWR5 is turned off, whereby the circuit ACTF[j] in FIG. 11A can perform initial operation for supplying the constant voltage of the wiring VCN4 to the wiring OL[j] (the wiring OLB[j]), as in FIG. 10.

The load LEA and the load LEAB of the circuit ACTF[j] in FIG. 11A can each be a resistor or a capacitor, for example. In the case where a subtractor circuit is formed using the operational amplifier OPA, a resistor can be used as each of the load LEA and the load LEAB. With the use of resistors as the load LEA and the load LEAB, voltage corresponding to a difference between current flowing between the first terminal and the second terminal of the load LEA and current flowing between the first terminal and the second terminal of the load LEAB can be output from the output terminal of the operational amplifier OPA. Thus, the switch SWR3 and the switch SWR3B are turned off, the switch SWR4 and the switch SWR4B are turned on, and the switch SWR5 is turned on, whereby voltage corresponding to a difference between the currents flowing through the wiring OL[j] and the wiring OLB[j] can be output from the output terminal of the operational amplifier OPA.

The voltage output from the output terminal of the operational amplifier OPA is input to the input terminal of the circuit AC. Thus, the analog voltage output from the output terminal of the operational amplifier OPA can be converted into a digital signal by the circuit AC. The digital signal can be output as an arithmetic value $z_j^{(k)}$ of a signal of a neuron from the terminal mbt2 of the circuit AC.

Figure 11B:
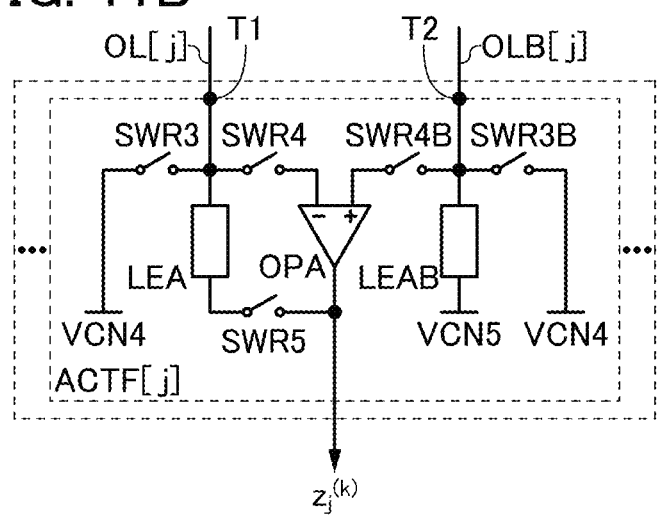

The circuit structure of the circuit ACTF[j] in FIG. 11A may be changed to that of the circuit ACTF[j] in FIG. 11B. The circuit ACTF[j] in FIG. 11B has a structure in which the circuit AC is not provided in the circuit ACTF[j] in FIG. 11A; thus, the analog voltage output from the output terminal of the operational amplifier OPA can be the arithmetic value $z_j^{(k)}$ of the signal of the neuron.

Note that this embodiment can be combined with any of the other embodiments in this specification as appropriate.

Embodiment 2

In this embodiment, peripheral circuit structures of the arithmetic circuit 110, the arithmetic circuit 110A, and the arithmetic circuit 120 described in the above embodiment and operation examples of these arithmetic circuits will be described.

<Structure Example 1 of Arithmetic Circuit>

Figure 12:
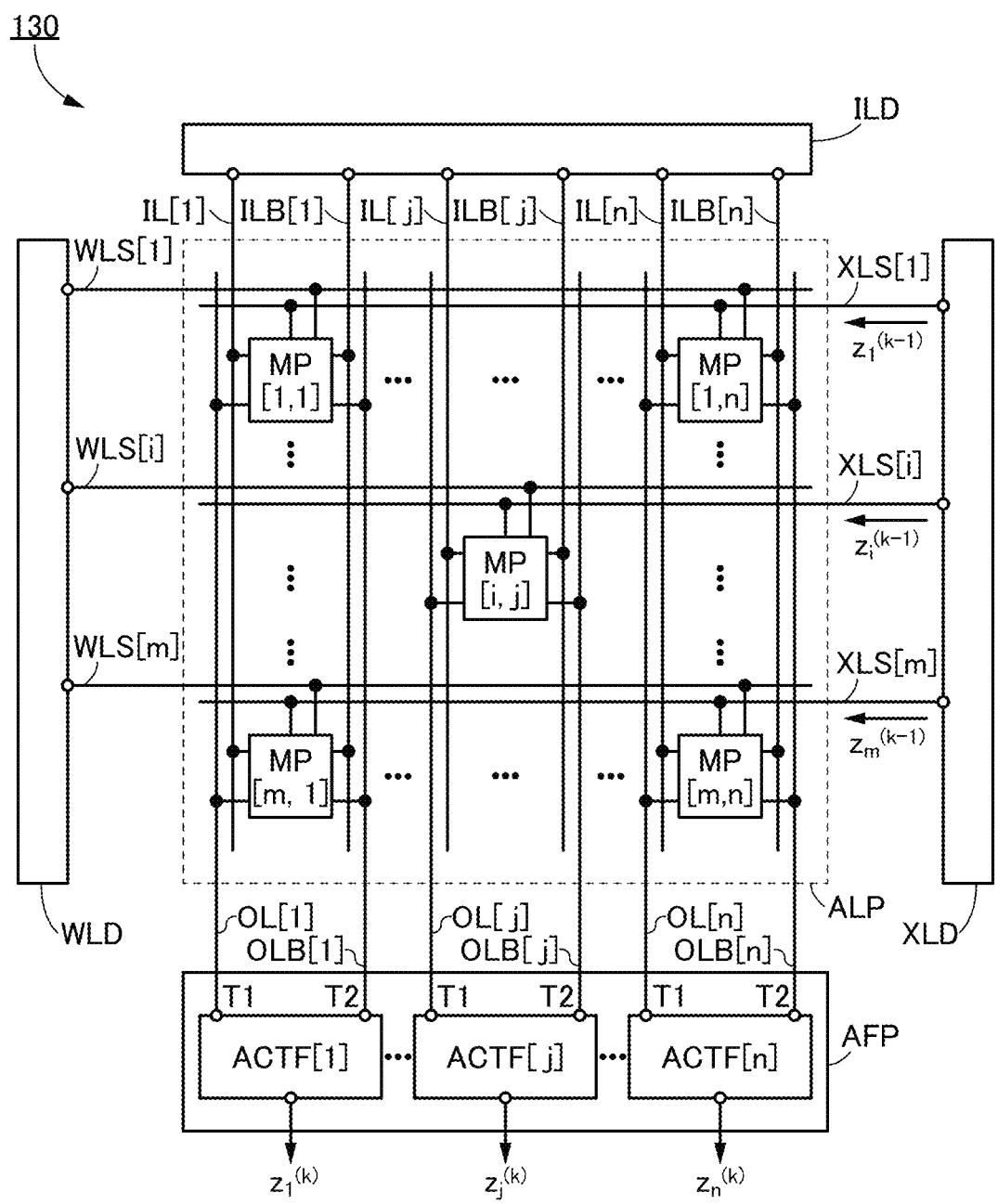
FIG. 12 is a circuit diagram illustrating a structure example of a semiconductor device.

An arithmetic circuit 130 illustrated in FIG. 12 is a semiconductor device including the array portion ALP, a circuit ILD, a circuit WLD, a circuit XLD, and the circuit AFP, for example. The arithmetic circuit 130 is a circuit that processes the signals $z_1^{(k-1)}$ to $z_m^{(k-1)}$ input to the neuron $N_1^{(k)}$ to the neuron $N_n^{(k)}$ in the k-th layer in FIG. 1A and FIG. 1B and generates signals $z_j^{(k)}$ to $z_n^{(k)}$ respectively output from the neuron $N_1^{(k)}$ to the neuron $N_n^{(k)}$.

Note that the whole or part of the arithmetic circuit 130 may be used for applications other than a neural network and AI. For example, in the case where product-sum operation processing or matrix operation processing is performed in calculation for graphics, calculation for scientific calculation, or the like, the processing may be performed using the whole or part of the arithmetic circuit 130. In other words, the whole or part of the arithmetic circuit 130 may be used for not only calculation for AI but also general calculation. For example, the whole or part of the arithmetic circuit 130 may be used for applications such as a memory device.

The circuit ILD is electrically connected to a wiring IL[1] to a wiring IL[n] and a wiring ILB[1] to a wiring ILB[n], for example. The circuit WLD is electrically connected to a wiring WLS [1] to a wiring WLS[m], for example. The circuit XLD is electrically connected to a wiring XLS[1] to a wiring XLS[m], for example. The circuit AFP is electrically connected to a wiring OL[1] to a wiring OL[n] and a wiring OLB[1] to a wiring OLB[n], for example.

<<Array portion ALP>>

The array portion ALP includes m×n circuits MP, for example. The circuits MP are arranged in a matrix of m rows and n columns in the array portion ALP, for example. Note that in FIG. 12, the circuit MP positioned in the i-th row and the j-th column (here, i is an integer greater than or equal to 1 and less than or equal to m, and j is an integer greater than or equal to 1 and less than or equal to n) is denoted by a circuit MP[i, j]. Note that FIG. 12 illustrates only the circuit MP[1, 1], the circuit MP[m, 1], the circuit MP[i, j], the circuit MP[1, n], and the circuit MP[m, n].

The circuit MP[i, j] is electrically connected to the wiring IL[j], the wiring ILB[j], the wiring WLS[i], the wiring XLS[i], the wiring OL[j], and the wiring OLB[j], for example.

The circuit MP[i, j] has a function similar to that of the circuit MP[1, j] to the circuit MP[m, j] described in the above embodiment, for example. Furthermore, the circuit MP[i, j] has a function of obtaining the weight coefficients (the first data) to be held in the circuit MP[i, j] from the wiring IL[j] and the wiring ILB[j]. Note that although FIG. 12 illustrates an example of the case where the wiring IL[j] and the wiring ILB[j] are provided, one embodiment of the present invention is not limited thereto. Only one of the wiring IL[j] and the wiring ILB[j] may be provided.

The circuit MP[1, 1] to the circuit MP[m, n] will be specifically described later.

<<Circuit XLD>>

The circuit XLD in FIG. 12 has a function of supplying, to the circuit MP[1, 1] to the circuit MP[m, n], $z_1^{(k-1)}$ to $z_m^{(k-1)}$ (sometimes referred to as the first data or the second data, here, referred to as the second data) that are arithmetic values output from the neuron $N_1^{(k-1)}$ to the neuron $N_m^{(k)}$, through the wiring XLS[1] to the wiring XLS[m], for example. Specifically, the circuit XLD supplies, to the circuit MP[i, 1] to the circuit MP[i, n], information (e.g., a potential or a current value) corresponding to the second data $z_i^{(k-1)}$ output from the neuron $N_i^{(k-1)}$, through the wiring XLS[i]. Although an example of the case where the wiring XLS[i] is provided is described, one embodiment of the present invention is not limited thereto. For example, in the arithmetic circuit 130 in FIG. 12, the wiring XLS[i] may be a plurality of wirings.

<<Circuit WLD>>

The circuit WLD in FIG. 12 has a function of selecting the circuit MP to which information (e.g., a potential, a resistance value, or a current value) corresponding to a weight coefficient (sometimes referred to as the first data or the second data; here, the first data) input from the circuit ILD is to be written, for example. In the case where information (e.g., a potential, a resistance value, or a current value) is written to the circuit MP[i, 1] to the circuit MP[i, n] positioned in the i-th row of the array portion ALP, for example, the circuit WLD supplies, to the wiring WLS[i], a signal for bringing writing switching elements included in the circuit MP[i, 1] to the circuit MP[i, n] into an on state or an off state, and supplies, to the other wirings WLS, a potential for bringing writing switching elements included in the circuits MP in rows other than the i-th row into an off state, for example. Although an example of the case where the wiring WLS[i] is provided is described, one embodiment of the present invention is not limited thereto. For example, in addition to the wiring WLS[i], a wiring transmitting an inverted signal of a signal input to the wiring WLS[i] may be additionally provided. That is, the wiring WLS[i] may be replaced with a plurality of wirings. The circuit WLD may be provided as a different circuit from the circuit XLD; however, one embodiment of the present invention is not limited thereto. For example, the circuit WLD and the circuit XLD may be combined into one circuit.

<<Circuit AFP>>

The circuit AFP in FIG. 12 includes a circuit ACTF[1] to a circuit ACTF[n], for example. The circuit ACTF[j] described in the above embodiment can be used as the circuit ACTF[1] to the circuit ACTF[n], for example. Thus, the circuit ACTF[1] to the circuit ACTF[n] can generate, for example, signals corresponding to information (e.g., potentials or current values) input from the wiring OL[j] and the wiring OLB[j]. For example, information input from the wiring OL[j] and information input from the wiring OLB[j] (e.g., potentials or current values) are compared and a signal based on the comparison result is generated. The signal corresponds to the signal $z_j^{(k)}$ output from the neuron $N_j^{(k)}$. That is, the circuit ACTF[1] to the circuit ACTF[n] function as circuits that perform arithmetic operation of an activation function of the above-described neural network, for example.

<<Circuit MP>>

Here, structure examples of the circuit MP[i, j] that can be used in the arithmetic circuit 130 will be described.

Figure 13A:
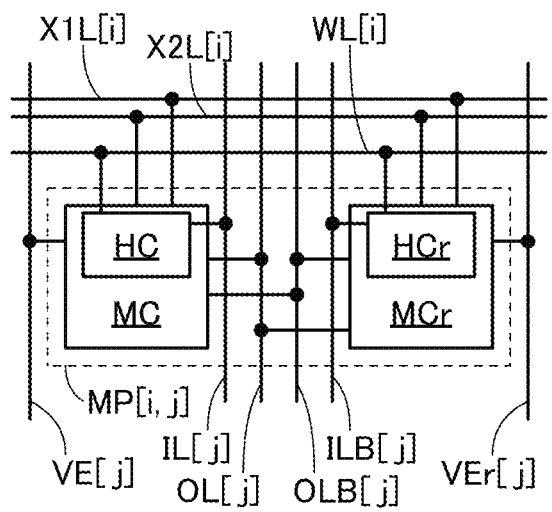
FIG. 13A to FIG. 13D are circuit diagrams illustrating structure examples of a circuit included in a semiconductor device.

FIG. 13A illustrates a structure example of the circuit MP[i, j] that can be used in the arithmetic circuit 130, and the circuit MP[i, j] includes the circuit MC and the circuit MCr, for example. The circuit MC and the circuit MCr are circuits that calculate the product of the first data and the second data in the circuit MP. The circuit MC can have a structure similar to that of the circuit MCr or a structure different from that of the circuit MCr. Thus, "r" is added to the reference numeral to differentiate the circuit MCr from the circuit MC. In addition, "r" is added to the reference numerals of circuit elements included in the circuit MCr and described below.

The circuit MC includes a holding portion HC and the circuit MCr includes a holding portion HCr, for example. The holding portion HC and the holding portion HCr each have a function of holding information (e.g., a potential, a resistance value, or a current value). Note that the first data $w_i^{(k-1)}{}_j^{(k)}$ set in the circuit MP[i, j] is determined in accordance with information (e.g., a potential, a resistance value, or a current value) held in the holding portion HC and the holding portion HCr. Therefore, the holding portion HC and the holding portion HCr are electrically connected to the wiring OL[j] and the wiring OLB[j] that supply information (e.g., a potential, a resistance value, or a current value) corresponding to the first data $w_i^{(k-1)}{}_j^{(k)}$.

In FIG. 13A, the circuit MP[i, j] is electrically connected to a wiring VE[j] and a wiring VEr[j]. The wiring VE[j] and the wiring VEr[j] each function as a wiring for supplying a constant voltage. For example, current flows from the wiring OL to the wiring VE[j] through the circuit MC. Furthermore, for example, current flows from the wiring OLB to the wiring VEr[j] through the circuit MCr.

A wiring WL[i] illustrated in FIG. 13A corresponds to the wiring WLS[i] in FIG. 12. The wiring WL[i] is electrically connected to each of the holding portion HC and the holding portion HCr. To write information (e.g., a potential, a resistance value, or a current value) corresponding to the first data $w_i^{(k-1)}{}_j^{(k)}$ to the holding portion HC and the holding portion HCr included in the circuit MP[i, j], a predetermined potential is supplied to the wiring WL[i] so that electrical continuity is established between the wiring OL[j] and the holding portion HC and electrical continuity is established between the wiring OLB[j] and the holding portion HCr. Then, the potential or the like corresponding to the first data $w_i^{(k-1)}{}_j^{(k)}$ is supplied to each of the wirings IL[j] and ILB[j], whereby the potential or the like can be input to each of the holding portion HC and the holding portion HCr. After that, a predetermined potential is supplied to the wiring WL[i], so that electrical continuity is not established between the wiring IL[j] and the holding portion HC and electrical continuity is not established between the wiring ILB[j] and the holding portion HCr. Thus, the current or the like corresponding to the first data $w_i^{(k-1)}{}_j^{(k)}$ is held in each of the holding portion HC and the holding portion HCr.

The case where the first data $w_i^{(k-1)}{}_j^{(k)}$ has any one of three values "−1", "0", and "1" is considered, for example. In the case where the first data $w_i^{(k-1)}{}_j^{(k)}$ is "1", for example, a predetermined potential is held in the holding portion HC so that current corresponding to "1" flows from the wiring IL[j] to the wiring VE[j] through the circuit MC, and a potential $V_0$ is held in the holding portion HCr so that current does not flow from the wiring ILB[j] to the wiring VEr[j] through the circuit MCr. In the case where the first data $w_i^{(k-1)}{}_j^{(k)}$ is "−1", for example, the potential $V_0$ is held in the holding portion HC so that current does not flow from the wiring IL[j] to the wiring VE[j] through the circuit MC, and a predetermined potential is held in the holding portion HCr so that current corresponding to "−1" flows from the wiring ILB[j] to the wiring VEr[j] through the circuit MCr. In the case where the first data $w_i^{(k-1)}{}_j^{(k)}$ is "0", for example, the potential $V_0$ is held in the holding portion HC so that current does not flow from the wiring IL[j] to the wiring VE[j] through the circuit MC, and the potential $V_0$ is held in the holding portion HCr so that current does not flow from the wiring ILB[j] to the wiring VEr[j] through the circuit MCr. Note that the potential $V_0$ can be a potential supplied from the wiring VCN in the following description of FIG. 14A.

As another example, the case where the first data $w_i^{(k-1)}{}_j^{(k)}$ is an analog value, specifically, a "negative analog value", "0", or a "positive analog value" is considered. In the case where the first data $w_i^{(k-1)}{}_j^{(k)}$ is a "positive analog value", for example, a predetermined potential is held in the holding portion HC so that an analog current corresponding to the "positive analog value" flows from the wiring IL[j] to the wiring VE[j] through the circuit MC, and the potential $V_0$ is held in the holding portion HCr so that current does not flow from the wiring ILB[j] to the wiring VEr[j] through the circuit MCr. In the case where the first data $w_i^{(k-1)}{}_j^{(k)}$ is a "negative analog value", for example, the potential $V_0$ is held in the holding portion HC so that current does not flow from the wiring IL[j] to the wiring VE[j] through the circuit MC, and a predetermined potential is held in the holding portion HCr so that an analog current corresponding to the "negative analog value" flows from the wiring ILB[j] to the wiring VEr[j] through the circuit MCr. In the case where the first data $w_i^{(k-1)}{}_j^{(k)}$ is "0", for example, the potential $V_0$ is held in the holding portion HC so that current does not flow from the wiring IL[j] to the wiring VE[j] through the circuit MC, and the potential $V_0$ is held in the holding portion HCr so that current does not flow from the wiring ILB[j] to the wiring VEr[j] through the circuit MCr. Note that as in the above example, the potential $V_0$ can be a potential supplied from the wiring VCN in the following description of FIG. 14A.

In addition, for example, the circuit MC has a function of outputting current, voltage, or the like corresponding to information (e.g., a potential, a resistance value, or a current value) held in the holding portion HC to one of the wiring OL[j] and the wiring OLB[j], and the circuit MCr has a function of outputting current, voltage, or the like corresponding to information (e.g., a potential, a resistance value, or a current value) held in the holding portion HCr to the other of the wiring OL[j] and the wiring OLB[j]. For example, in the case where a first potential is held in the holding portion HC, the circuit MC supplies current having a first current value from the wiring OL[j] or the wiring OLB[j] to the wiring VE, and in the case where a second potential is held in the holding portion HC, the circuit MC supplies current having a second current value from the wiring OL[j] or the wiring OLB[j] to the wiring VE. Similarly, in the case where the first potential is held in the holding portion HCr, the circuit MCr supplies current having the first current value from the wiring OL[j] or the wiring OLB[j] to the wiring VEr, and in the case where the second potential is held in the holding portion HCr, the circuit MCr supplies current having the second current value from the wiring OL[j] or the wiring OLB[j] to the wiring VE. Note that the levels of the first current value and the second current value are each determined in accordance with the value of the first data $w_i^{(k-1)}{}_j^{(k)}$. For example, the first current value may be larger than or smaller than the second current value. In addition, for example, one of the first current value and the second current value may be zero current; that is, the current value may be 0. Moreover, the direction in which current flows may be different between current having the first current value and current having the second current value.

In particular, in the case where the first data $w_i^{(k-1)}{}_j^{(k)}$ has any one of three values "−1", "0", and "1", the circuit MC and the circuit MCr are preferably configured such that one of the first current value and the second current value is 0. Note that in the case where the first data $w_i^{(k-1)}{}_j^{(k)}$ is an analog value, e.g., a "negative analog value", "0", or a "positive analog value", the first current value or the second current value can be an analog value, for example.

In the case where current flowing from the wiring OL[j] or the wiring OLB[j] (from the wiring IL[j]) to the wiring VE[j] through the circuit MC and current flowing from the wiring OL[j] or the wiring OLB[j] (from the wiring ILB[j]) to the wiring VEr[j] through the circuit MCr are equal to each other, a potential held in the circuit MC and a potential held in the circuit MCr are not equal to each other in some cases because variation in the transistor characteristics due to the manufacturing process of the transistors or the like might be generated. In the semiconductor device of one embodiment of the present invention, the amount of current flowing from the wiring OL[j] or the wiring OLB[j] (from the wiring IL[j]) to the wiring VE[j] through the circuit MC can sometimes be almost equal to the amount of current flowing from the wiring OL[j] or the wiring OLB[j] (from the wiring ILB[j]) to the wiring VEr[j] through the circuit MCr, even when variation in the transistor characteristics is generated.

Note that in this specification and the like, current, voltage, or the like corresponding to information (e.g., a potential, a resistance value, or a current value) held in the holding portion HC and the holding portion HCr may be a positive current, voltage, or the like, may be a negative current, voltage, or the like, may be zero current, zero voltage, or the like; alternatively, a positive one, a negative one, and 0 may be mixed.

The wiring X1L[i] and a wiring X2L[i] illustrated in FIG. 13A correspond to the wiring XLS[i] in FIG. 12. Note that, for example, the second data $z_i^{(k-1)}$ input to the circuit MP[i, j] is determined in accordance with the potentials, current, or the like of the wiring X1L[i] and the wiring X2L[i]. Thus, potentials corresponding to the second data $z_i^{(k-1)}$ are input to the circuit MC and the circuit MCr through the wiring X1L[i] and the wiring X2L[i], for example.

The circuit MC and the circuit MCr output current, potentials, or the like corresponding to the product of the first data $w_{i\ j}^{(k-1)(k)}$ and the second data $z_i^{(k-1)}$ to the wiring OL[j] and the wiring OLB[j] in accordance with the potentials, current, or the like input to the wiring X1L[i] and the wiring X2L[i], for example. As a specific example, the destinations of the current output from the circuit MC and the circuit MCr are determined in accordance with the potentials of the wiring X1L[i] and the wiring X2L[i]. For example, the circuit MC and the circuit MCr have a circuit structure in which current output from the circuit MC flows to one of the wiring OL[j] and the wiring OLB[j], and current output from the circuit MCr flows to the other of the wiring OL[j] and the wiring OLB[j]. That is, the currents output from the circuit MC and the circuit MCr flow to not the same wiring but different wirings. Note that for example, the currents from the circuit MC and the circuit MCr flow to neither the wiring OL[j] nor the wiring OLB[j] in some cases.

The case where the second data $z_i^{(k-1)}$ has any one of three values "−1", "0", and "1" is considered, for example. In the case where the second data $z_i^{(k-1)}$ is "1", for example, the circuit MP establishes electrical continuity between the circuit MC and the wiring OL[j] and establishes electrical continuity between the circuit MCr and the wiring OLB[j]. In the case where the second data $z_i^{(k-1)}$ is "−1", for example, the circuit MP establishes electrical continuity between the circuit MC and the wiring OLB[j] and establishes electrical continuity between the circuit MCr and the wiring OL[j]. In the case where the second data $z_i^{(k-1)}$ is "0", for example, the circuit MP does not establish electrical continuity between the circuit MC and the wiring OL[j] and between the circuit MC and the wiring OLB[j] and does not establish electrical continuity between the circuit MCr and the wiring OL[j] and between the circuit MC and the wiring OLB[j] so that currents output from the circuits MC and MCr flow to neither the wiring OL[j] nor the wiring OLB[j].

An example in which the above-described operations are combined is shown. In the case where the first data $w_{i\ j}^{(k-1)(k)}$ is "1", current flows from the wiring OL[j] or the wiring OLB[j] to the wiring VE[j] through the circuit MC in some cases, and current does not flow from the wiring OL[j] or the wiring OLB[j] to the wiring VEr[j] through the circuit MCr. In the case where the first data $w_{i\ j}^{(k-1)(k)}$ is "−1", current does not flow from the wiring OL[j] or the wiring OLB[j] to the wiring VE[j] through the circuit MC, and current flows from the wiring OL[j] or the wiring OLB[j] to the wiring VEr[j] through the circuit MCr in some cases. In the case where the second data $z_i^{(k-1)}$ is "1", electrical continuity is established between the circuit MC and the wiring OL[j] and between the circuit MCr and the wiring OLB[j]. In the case where the second data $z_i^{(k-1)}$ is "−1", electrical continuity is established between the circuit MC and the wiring OLB[j] and between the circuit MCr and the wiring OL[j]. From the above, in the case where the product of the first data $w_{i\ j}^{(k-1)(k)}$ and the second data $z_i^{(k-1)}$ is a positive value, current flows from the wiring OL[j] to the wiring VE[j] through the circuit MCr or current flows from the wiring OL[j] to the wiring VEr[j] through the circuit MCr. In the case where the product of the first data $w_{i\ j}^{(k-1)(k)}$ and the second data $z_i^{(k-1)}$ is a negative value, current flows from the wiring OL[j] to the wiring VEr[j] through the circuit MCr or current flows from the wiring OLB[j] to the wiring VE[j] through the circuit MC. In the case where the product of the first data $w_{i\ j}^{(k-1)(k)}$ and the second data $z_i^{(k-1)}$ is a value of 0, current does not flow from the wiring OL[j] or the wiring OLB[j] to the wiring VE[j] and current does not flow from the wiring OL[j] or the wiring OLB[j] to the wiring VEr[j].

A specific example of the above-described example is as follows: in the case where the first data $w_{i\ j}^{(k-1)(k)}$ is "1" and the second data $z_i^{(k-1)}$ is "1", current I1[i, j] having the first current value flows from the circuit MC to the wiring OL[j] and current I2[i, j] having the second current value flows from the circuit MCr to the wiring OLB[j], for example. In that case, for example, the second current value can be 0, that is, current does not flow from the circuit MCr to the wiring OLB[j]. In the case where the first data $w_{i\ j}^{(k-1)(k)}$ is "−1" and the second data $z_i^{(k-1)}$ is "1", the current I1[i, j] having the second current value flows from the circuit MC to the wiring OL[j] and the current I2[i, j] having the first current value flows from the circuit MCr to the wiring OLB[j], for example. In that case, for example, the second current value can be 0, that is, current does not flow from the circuit MC to the wiring OL[j]. In the case where the first data $w_{i\ j}^{(k-1)(k)}$ is "0" and the second data $z_i^{(k-1)}$ is "1", the current I1[i, j] having the second current value flows from the circuit MC to the wiring OL[j] and the current I2[i, j] having the second current value flows from the circuit MCr to the wiring OLB[j]. In that case, for example, the second current value can be 0, that is, current does not flow from the circuit MC to the wiring OL[j] and current does not flow from the circuit MCr to the wiring OLB[j].

In the case where the first data $w_{i\ j}^{(k-1)(k)}$ is "1" and the second data $z_i^{(k-1)}$ is "−1", the current I1[i, j] having the first current value flows from the circuit MC to the wiring OLB[j] and the current I2[i, j] having the second current value flows from the circuit MCr to the wiring OL[j]. In that case, for example, the second current value can be 0, that is, current does not flow from the circuit MCr to the wiring OL[j]. In the case where the first data $w_1^{(k-1)(k)}{}_j$ is "−1" and the second data $z_i^{(k-1)}$ is "−1", the current I1[i, j] having the second current value flows from the circuit MC to the wiring OLB[j] and the current I2[i, j] having the first current value flows from the circuit MCr to the wiring OL[j]. In that case, for example, the second current value can be 0, that is, current does not flow from the circuit MC to the wiring OLB[j]. In the case where the first data $w_{i\ j}^{(k-1)(k)}$ is "0" and the second data $z_i^{(k-1)}$ is "−1", the current I1[i, j] having the second current value flows from the circuit MC to the wiring OLB[j] and the current I2[i, j] having the second current value flows from the circuit MCr to the wiring OL[j]. In that case, for example, the second current value can be 0, that is, current does not flow from the circuit MC to the wiring OLB[j] and current does not flow from the circuit MCr to the wiring OL[j].

In the case where the second data $z_i^{(k-1)}$ is "0", electrical continuity is not established between the circuit MC and the wiring OL[j] and between the circuit MC and the wiring OLB[j], for example. Similarly, electrical continuity is not established between the circuit MCr and the wiring OL[j] and between the circuit MCr and the wiring OLB[j]. Therefore, regardless of the value of the first data $w_1^{(k-1)(k)}{}_j$ current is not output from the circuit MC and the circuit MCr to the wiring OL[j] and the wiring OLB[j].

As described above, in the case where the product value of the first data $w_{i\ j}^{(k-1)(k)}$ and the second data $z_i^{(k-1)}$ is a positive value, for example, current flows from the circuit MC or the circuit MCr to the wiring OL[j]. Here, in the case where the first data $w_{i\ j}^{(k-1)(k)}$ is a positive value, current flows from the circuit MC to the wiring OL[j], and in the case where the first data $w_i^{(k-1)}{}_j^{(k)}$ is a negative value, current flows from the circuit MCr to the wiring OL[j]. By contrast, in the case where the product value of the first data $w_1^{(k-1)}{}_j^{(k)}$ and the second data $z_i^{(k-1)}$ is a negative value, current flows from the circuit MC or the circuit MCr to the wiring OLB[j]. Here, in the case where the first data $w_1^{(k-1)}{}_j^{(k)}$ is a positive value, current flows from the circuit MC to the wiring OLB[j], and in the case where the first data $w_i^{(k-1)}{}_j^{(k)}$ is a negative value, current flows from the circuit MCr to the wiring OLB[j]. Accordingly, the total amount of current output from a plurality of circuits MC or a plurality of circuits MCr connected to the wiring OL[j] flows to the wiring OL[j]. That is, current having a value which is the sum of positive values flows through the wiring OL[j]. By contrast, the total amount of current output from a plurality of circuits MC or a plurality of circuits MCr connected to the wiring OLB[j] flows to the wiring OLB[j]. That is, current having a value which is the sum of negative values flows through the wiring OLB[j]. As a result of the above-described operation, the total value of the current flowing through the wiring OL[j], that is, the sum total of positive values, and the total value of the current flowing through the wiring OLB[j], that is, the sum total of negative values, are utilized, so that product-sum operation processing can be performed. For example, in the case where the total value of the current flowing through the wiring OL[j] is larger than the total value of the current flowing through the wiring OLB[j], it can be determined that the product-sum operation result has a positive value. In the case where the total value of the current flowing through the wiring OL[j] is smaller than the total value of the current flowing through the wiring OLB[j], it can be determined that the product-sum operation result has a negative value. In the case where the total value of the current flowing through the wiring OL[j] is almost equal to the total value of the current flowing through the wiring OLB[j], it can be determined that the product-sum operation result has a value of 0. Note that in the case where a function of an activation function is considered to be also fulfilled, a value of 0 may be output when it is determined that the product-sum operation result has a negative value. That is, it may be determined that the product-sum operation result has a value of 0 not only when the total value of the current flowing through the wiring OL[j] is almost equal to the total value of the current flowing through the wiring OLB[j] but also when the total value of the current flowing through the wiring OL[j] is smaller than the total value of the current flowing through the wiring OLB[j].

Note that even in the case where the second data $z_i^{(k-1)}$ has any two values among "−1", "0", and "1", for example, two values "−1" and "1" or two values "0" and "1", operation can be performed in a similar manner. Similarly, even in the case where the first data $w_i^{(k-1)}{}_j^{(k)}$ has any two values among "−1", "0", and "1", for example, two values "−1" and "1" or two values "0" and "1", operation can be performed in a similar manner.

Note that the first data $w_i^{(k-1)}{}_j^{(k)}$ may be an analog value or a multi-bit (multilevel) digital value. As a specific example, "−1" can be replaced with a "negative analog value", and "1" can be replaced with a "positive analog value". In this case, the amount of current flowing from the circuit MC or the circuit MCr is, for example, an analog value corresponding to the absolute value of the value of the first data $w_i^{(k-1)}{}_j^{(k)}$.

Next, a modification example of the circuit MP[i, j] in FIG. 13A is described. Note that in the modification example of the circuit MP[i, j], differences from the circuit MP[i, j] in FIG. 13A are mainly described and the description of portions common to the circuit MP[i, j] in FIG. 13A is sometimes omitted.

Figure 13B:
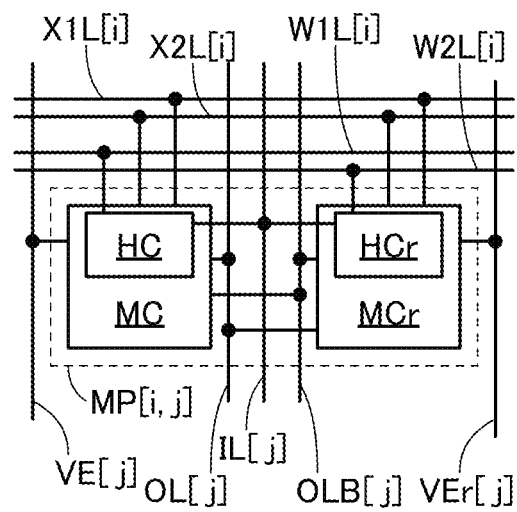

The circuit MP[i, j] illustrated in FIG. 13B has a structure in which a wiring IL[i] and a wiring ILB[i] in the circuit MP[i, j] in FIG. 13A are combined into the wiring IL[j].

Wirings W1L[i] and W2L[i] illustrated in FIG. 13B correspond to the wiring WLS[i] in FIG. 12. The wiring W1L[i] is electrically connected to the holding portion HC, and the wiring W2L[i] is electrically connected to the holding portion HCr.

In addition, the wiring IL[j] is electrically connected to the holding portion HC and the holding portion HCr.

In the case where the holding portion HC and the holding portion HCr of the circuit MP[i, j] in FIG. 13B hold different pieces of information (e.g., voltage, a resistance value, or current), operations for holding the information in the holding portion HC and the holding portion HCr are preferably performed not concurrently but sequentially. The case is considered where the first data $w_i^{(k-1)}{}_j^{(k)}$ of the circuit MP[i, j] can be expressed when the holding portion HC holds first information and the holding portion HCr holds second information, for example. First, a predetermined potential is supplied to the wiring W1L[i] and the wiring W2L[i] so that electrical continuity is established between the holding portion HC and the wiring IL[j] and electrical continuity is not established between the holding portion HCr and the wiring IL[j]. Then, current, voltage, or the like corresponding to the first information is supplied to the wiring IL[j], whereby the first information can be supplied to the holding portion HC. After that, a predetermined potential is supplied to the wiring W1L[i] and the wiring W2L[i] so that electrical continuity is not established between the holding portion HC and the wiring IL[j] and electrical continuity is established between the holding portion HCr and the wiring IL[j]. Then, current, voltage, or the like corresponding to the second information is supplied to the wiring IL[j], whereby the second information can be supplied to the holding portion HCr. Thus, the circuit MP[i, j] can set $w_i^{(k-1)}{}_j^{(k)}$ as the first data.

In the case where the holding portion HC and the holding portion HCr hold substantially the same information (e.g., voltage, a resistance value, or current) (in the case where the first data $w_i^{(k-1)}{}_j^{(k)}$ of the circuit MP[i, j] is set when the holding portion HC and the holding portion HCr hold substantially the same information), a predetermined potential is supplied to the wiring W1L[i] and the wiring W2L[i] so that electrical continuity is established between the holding portion HC and the wiring IL[j] and electrical continuity is established between the holding portion HCr and the wiring IL[j], and then current, voltage, or the like corresponding to the information is supplied from the wiring IL[j] to the holding portion HC and the holding portion HCr.

When a potential corresponding to the first data $w_i^{(k-1)}{}_j^{(k)}$ is held in the holding portion HC and the holding portion HCr and a potential corresponding to the second data $z_i^{(k-1)}$ is supplied to the wiring X1L[i] and the wiring X2L[i], the circuit MP[i, j] in FIG. 13B can output, to the wiring OL[j] and the wiring OLB[j], current corresponding to the product of the first data $w_1^{(k-1)}{}_j^{(k)}$ and the second data $z_i^{(k-1)}$, like the circuit MP[i, j] in FIG. 13A.

Figure 13C:
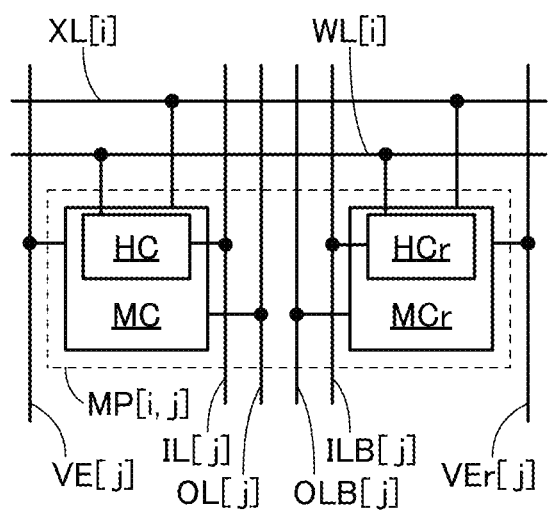

The circuit MP[i, j] illustrated in FIG. 13C is a modification example of the circuit MP[i, j] in FIG. 13A. The circuit MP[i, j] in FIG. 13C includes the circuit MC and the circuit MCr like the circuit MP[i, j] in FIG. 13A. Note that the circuit MP[i, j] in FIG. 13C and the circuit MP[i, j] in FIG. 13A are different from each other in the electrical connection structure of wirings.

Specifically, the circuit MP[i, j] in FIG. 13C is different from the circuit MP[i, j] in FIG. 13A in that the wiring OL[j] and the circuit MCr are not electrically connected to each other and the wiring OLB[j] and the circuit MC are not electrically connected to each other. Thus, the circuit MP[i, j] in FIG. 13C has a structure in which the wiring X1L[i] and the wiring X2L[i] in the circuit MP[i, j] in FIG. 13A are replaced with the wiring XL[i]. Note that the wiring XL[i] corresponds to the wiring XLS[i] in FIG. 12 and is electrically connected to the circuit MC and the circuit MCr.

Since the wiring OL[j] and the circuit MCr are not electrically connected to each other and the wiring OLB[j] and the circuit MC are not electrically connected to each other in the circuit MP[i, j] in FIG. 13C, the second data (a value of a signal of a neuron) input to the circuit MP sometimes differs between the circuit MP[i, j] in FIG. 13A and that in FIG. 13C. For example, the second data (a value of a signal of a neuron) can be "+1" when a high-level potential is applied to the wiring XL, and the second data (a value of a signal of a neuron) can be "0" when a low-level potential is applied to the wiring XL.

Figure 13D:
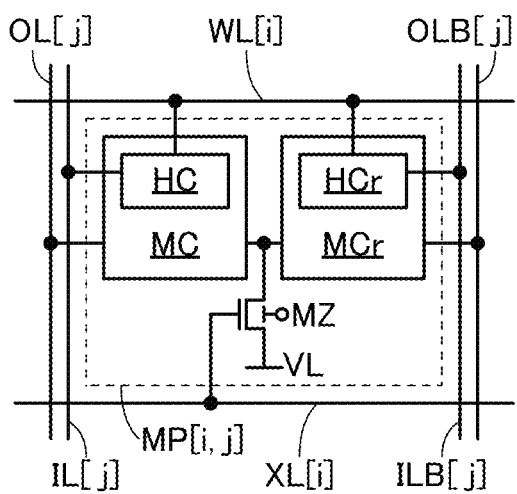

As in FIG. 13A, the circuit MP[i,j] illustrated in FIG. 13D is a circuit that can output current corresponding to the product of the first data $w_i^{(k-1)}{}_j^{(k)}$ and the second data $z_i^{(k-1)}$ to the wiring OL[j] and the wiring OLB[j]. Note that the circuit MP[i, j] in FIG. 13D can be used in the arithmetic circuit 130 in FIG. 12, for example.

The circuit MP[i, j] in FIG. 13D includes a transistor MZ in addition to the circuit MC and the circuit MCr.

A first terminal of the transistor MZ is electrically connected to a first terminal of the circuit MC and a first terminal of the circuit MCr. A second terminal of the transistor MZ is electrically connected to a wiring VL. A gate of the transistor MZ is electrically connected to the wiring XL[i].

The wiring VL functions as a wiring for supplying a constant voltage, for example, like the wiring VE[j] and the wiring VEr[j] illustrated in FIG. 13A to FIG. 13C. The constant voltage is preferably determined in accordance with the structure of the circuit MP[i, j], the arithmetic circuit 130, or the like. The constant voltage can be, for example, a high-level potential VDD, a low-level potential VSS, a ground potential, or the like.

The wiring WL[i] illustrated in FIG. 13D corresponds to the wiring WLS[i] in the arithmetic circuit 130 in FIG. 12. The wiring WL[i] is electrically connected to the holding portion HC and the holding portion HCr.

The wiring OL[j] is electrically connected to a second terminal of the circuit MC. The wiring OLB[j] is electrically connected to a second terminal of the circuit MCr.

The wiring IL[j] is electrically connected to the holding portion HC and the wiring ILB[j] is electrically connected to the holding portion HCr.

For the operation of the case where a potential corresponding to the first data is held in each of the holding portion HC and the holding portion HCr of the circuit MP[i, j] in FIG. 13D, refer to the description of the operation for holding a potential corresponding to the first data in the circuit MP[i, j] in FIG. 13A.

In the circuit MP[i, j] in FIG. 13D, the circuit MC has a function of supplying current corresponding to the potential held in the holding portion HC between the first terminal and the second terminal of the circuit MC while the constant voltage supplied from the wiring VL is supplied to the first terminal of the circuit MC. The circuit MCr has a function of supplying current corresponding to the potential held in the holding portion HCr between the first terminal and the second terminal of the circuit MCr while the constant voltage supplied from the wiring VL is supplied to the first terminal of the circuit MC. That is, by holding a potential corresponding to the first data $w_i^{(k-1)}{}_j^{(k)}$ in each of the holding portion HC and the holding portion HCr of the circuit MP[i, j], the amount of current flowing between the first terminal and the second terminal of the circuit MC and the amount of current flowing between the first terminal and the second terminal of the circuit MCr can be determined. Note that in the case where the constant voltage supplied from the wiring VL is not supplied to the first terminal of the circuit MC (the circuit MCr), the circuit MC (the circuit MCr) does not necessarily supply current between the first terminal and the second terminal of the circuit MC (the circuit MCr), for example.

In the case where a potential corresponding to the first data $w_i^{(k-1)}{}_j^{(k)}$ of "1" is held in each of the holding portion HC and the holding portion HCr, for example, the circuit MC supplies predetermined current between the first terminal and the second terminal of the circuit MC when the constant voltage supplied from the wiring VL is supplied to the circuit MC. Thus, current flows between the circuit MC and the wiring OL. Note that at this time, the circuit MCr does not supply current between the first terminal and the second terminal of the circuit MCr. Thus, current does not flow between the circuit MCr and the wiring OLB. Moreover, in the case where a potential corresponding to the first data $w_i^{(k-1)}{}_j^{(k)}$ of "−1" is held in each of the holding portion HC and the holding portion HCr, for example, the circuit MCr supplies predetermined current between the first terminal and the second terminal of the circuit MCr when the constant voltage supplied from the wiring VL is supplied to the circuit MC. Thus, current flows between the circuit MCr and the wiring OLB. Note that at this time, the circuit MC does not supply current between the first terminal and the second terminal of the circuit MC. Thus, current does not flow between the circuit MC and the wiring OL. In the case where a potential corresponding to the first data $w_i^{(k-1)}{}_j^{(k)}$ of "0" is held in each of the holding portion HC and the holding portion HCr, for example, the circuit MC does not supply current between the first terminal and the second terminal of the circuit MC and the circuit MCr does not supply current between the first terminal and the second terminal of the circuit MCr regardless of whether the constant voltage from the wiring VL is supplied to the circuit MC and the circuit MCr. That is, current does not flow between the circuit MC and the wiring OL and current does not flow between the circuit MCr and the wiring OLB.

Note that for a specific example of the potential corresponding to the first data $w_i^{(k-1)}{}_j^{(k)}$ that is held in the holding portion HC and the holding portion HCr in the circuit MP[i, j] in FIG. 13D, refer to the description of the circuit MP[i, j] in FIG. 10A. In the circuit MP[i, j] in FIG. 13D, the holding portion HC and the holding portion HCr may have a function of holding not a potential but information such as current or a resistance value, and the circuit MC and the circuit MCr may have a function of supplying current corresponding to the information, as in the circuit MP[i, j] in FIG. 10A.

The wiring XL[i] illustrated in FIG. 13D corresponds to the wiring XLS[i] in the arithmetic circuit 130 in FIG. 12. Note that, for example, the second data $z_i^{(k-1)}$ input to the circuit MP[i, j] is determined in accordance with the potential, current, or the like of the wiring XL[i]. Thus, the potential corresponding to the second data $z_i^{(k-1)}$ is input to the gate of the transistor MZ through the wiring XL[i], for example.

The case where the second data $z_i^{(k-1)}$ has one of two values "0" and "1" is considered, for example. In the case where the second data $z_i^{(k-1)}$ is "1", for example, a high-level potential is supplied to the wiring XL[i]. At this time, the transistor MZ is turned on; thus, the circuit MP establishes electrical continuity between the wiring VL and the first terminal of the circuit MC and establishes electrical continuity between the wiring VL and the first terminal of the circuit MCr. That is, in the case where the second data $z_i^{(k-1)}$ is "1", the constant voltage from the wiring VL is supplied to the circuit MC and the circuit MCr. Moreover, in the case where the second data $z_i^{(k-1)}$ is "0", for example, a low-level potential is supplied to the wiring XL[i]. At this time, the circuit MP does not establish electrical continuity between the circuit MC and the wiring OLB[j] and does not establish electrical continuity between the circuit MCr and the wiring OL[j]. That is, in the case where the second data $z_i^{(k-1)}$ is "0", the constant voltage from the wiring VL is not supplied to the circuit MC and the circuit MCr.

Here, in the case where the first data $w_i^{(k-1)}{}_j^{(k)}$ is "1" and the second data $z_i^{(k-1)}$ is "1", for example, the result is that current flows between the circuit MC and the wiring OL and current does not flow between the circuit MCr and the wiring OLB. In the case where the first data $w_i^{(k-1)}{}_j^{(k)}$ is "−1" and the second data $z_i^{(k-1)}$ is "1", for example, the result is that current does not flow between the circuit MC and the wiring OL and current flows between the circuit MCr and the wiring OLB. In the case where the first data $w_1^{(k-1)}{}_j^{(k)}$ is "0" and the second data $z_i^{(k-1)}$ is "1", for example, the result is that current does not flow between the circuit MC and the wiring OL and between the circuit MCr and the wiring OLB. In the case where the second data $z_i^{(k-1)}$ is "0", for example, the result is that current does not flow between the circuit MC and the wiring OL and between the circuit MCr and the wiring OLB even when the first data $w_i^{(k-1)}{}_j^{(k)}$ is any one of "−1", "0", and "1".

That is, like the circuit MP[i, j] in FIG. 13C, the circuit MP[i, j] in FIG. 13D can perform, for example, arithmetic operation of the case where the first data $w_1^{(k-1)}{}_j^{(k)}$ has any one of three values "−1", "0", and "1" and the second data $z_i^{(k-1)}$ has two values "0" and "1". In addition, even in the case where the first data $w_i^{(k-1)}{}_j^{(k)}$ has any two values among "−1", "0", and "1", for example, two values "−1" and "1" or two values "0" and "1", the circuit MP[i, j] in FIG. 13D can perform operation like the circuit MP[i, j] in FIG. 13C. Note that the first data $w_1^{(k-1)}{}_j^{(k)}$ may be an analog value or a multi-bit (multilevel) digital value. As a specific example, "−1" may be replaced with a "negative analog value", and "1" may be replaced with a "positive analog value". In this case, the amount of current flowing from the circuit MC or the circuit MCr is, for example, an analog value corresponding to the absolute value of the value of the first data $w_1^{(k-1)}{}_j^{(k)}$.

<<Circuit ILD>>

The circuit ILD has a function of inputting, to the circuit MP[1, 1] to the circuit MP[m, n], information (e.g., a potential, a resistance value, or a current value) corresponding to first data $w_1^{(k-1)}{}_1^{(k)}$ to $w_m^{(k-1)}{}_n^{(k)}$ that are weight coefficients, through the wiring IL[1] to the wiring IL[n] and the wiring ILB[1] to the wiring ILB[n], for example. As a specific example, the circuit ILD supplies, to the circuit MP[i,j], information (e.g., a potential, a resistance value, or a current value) corresponding to the first data $w_i^{(k-1)}{}_j^{(k)}$ that is a weight coefficient, through the wiring IL[j] and the wiring ILB[j].

Figure 14A:
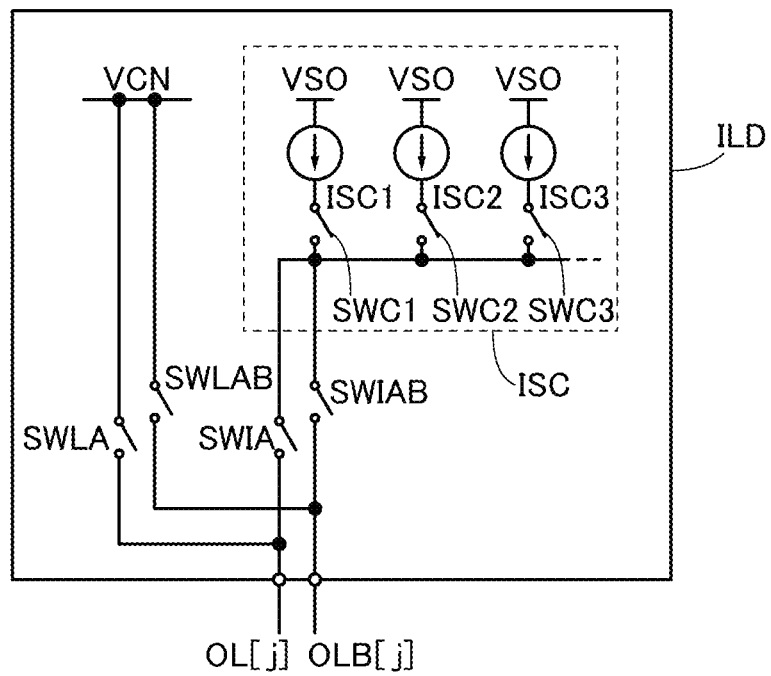
FIG. 14A to FIG. 14C are circuit diagrams illustrating structure examples of a circuit included in a semiconductor device.

FIG. 14A illustrates a circuit structure example of the circuit ILD that can be used for the arithmetic circuit 130. Note that FIG. 14A also illustrates the wiring OL[j] and the wiring OLB[j] in order to describe electrical connection between the circuit ILD and the array portion ALP. The circuit ILD includes a current source circuit ISC, a switch SWIA, a switch SWIAB, a switch SWLA, and a switch SWLAB. The wiring OL[j] is electrically connected to a first terminal of the switch SWIA and a first terminal of the switch SWLA. The wiring OLB[j] is electrically connected to a first terminal of the switch SWIAB and a first terminal of the switch SWLAB. The current source circuit ISC is electrically connected to a second terminal of the switch SWIA and a second terminal of the switch SWIAB. The wiring VCN is electrically connected to a second terminal of the switch SWLA and a second terminal of the switch SWLAB.

The current source circuit ISC includes one or a plurality of constant current sources; for example, a constant current source circuit ISC1, a constant current source circuit ISC2, and a constant current source circuit ISC3 are included as the plurality of constant current sources in FIG. 14A. In addition, the current source circuit ISC includes a plurality of switches for selecting the plurality of constant current sources; for example, a switch SWC1, a switch SWC2, and a switch SWC3 are included as the plurality of switches in FIG. 14A. Note that in the case where the current source circuit ISC includes only one constant current source, the current source circuit ISC does not necessarily include the switch. In addition, in the case where the constant current source circuit ISC1, the constant current source circuit ISC2, and the constant current source circuit ISC3 each have a function of controlling whether to output current, the switch SWC1, the switch SWC2, and the switch SWC3 are not necessarily provided.

It is preferable that currents, which flow through the wiring OL[j] and the wiring OLB[j], for holding the first data (a weight coefficient) in any one of the circuit MP[1, j] to the circuit MP[m, j] be generated in the same current source circuit ISC as illustrated in FIG. 14A. In the case where currents supplied to the wiring OL[j] and the wiring OLB[j] are generated in different current source circuits, variation in the transistor characteristics due to the manufacturing process of the transistors or the like might be generated; thus, a difference in the performance may arise with the different current source circuits. On the other hand, in the case where the same current source circuit is used, the same amount of current can be supplied to the wiring OL[j] and the wiring OLB[j], leading to higher arithmetic operation accuracy.

Note that as each of the switch SWIA, the switch SWIAB, the switch SWLA, the switch SWLAB, the switch SWC1, the switch SWC2, and the switch SWC3 described in FIG. 14A, a switch that is similar to the switch SWR1, the switch SWR1B, the switch SWR2, and the switch SWR2B described above can be used, for example.

Figure 14B:
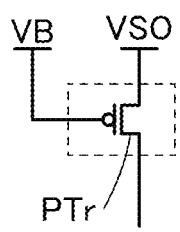
Figure 14C:
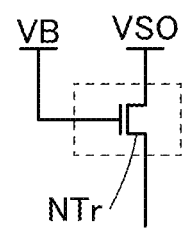

FIG. 14B and FIG. 14C illustrate specific structure examples of the constant current source circuit ISC1 to the constant current source circuit ISC3. The constant current source circuit ISC1 (the constant current source circuit ISC2 or the constant current source circuit ISC3) illustrated in FIG. 14B includes a transistor PTr that is a p-channel transistor. A first terminal of the transistor PTr is electrically connected to the wiring VSO, a second terminal of the transistor PTr is electrically connected to the second terminal of the switch SWC1 (the switch SWC2 or the switch SWC3), and a gate of the transistor PTr is electrically connected to a wiring VB. The constant current source circuit ISC1 (the constant current source circuit ISC2 or the constant current source circuit ISC3) illustrated in FIG. 14C includes a transistor NTr that is an n-channel transistor. A first terminal of the transistor NTr is electrically connected to the wiring VSO, a second terminal of the transistor NTr is electrically connected to the second terminal of the switch SWC1 (the switch SWC2 or the switch SWC3), and a gate of the transistor NTr is electrically connected to the wiring VB. In the constant current source circuit ISC1 (the constant current source circuit ISC2 or the constant current source circuit ISC3) in each of FIG. 14B and FIG. 14C, the wiring VB functions as a wiring for inputting bias voltage to the gate of the transistor. Note that a pulse signal may be supplied to the wiring VB. This makes it possible to control whether to output current from the constant current source circuit. In that case, the switch SWC1, the switch SWC2, and the switch SWC3 are not necessarily provided. Alternatively, an analog voltage may be supplied to the wiring VB. This makes it possible to supply an analog current from the constant current source circuit.

The wiring VSO functions as a wiring for supplying a constant voltage to each of the constant current source circuit ISC1 to the constant current source circuit ISC3. For example, in the case where current flows from the circuit ILD (the wiring VSO) to the wiring OL or the wiring OLB, the constant voltage is preferably a potential higher than a ground potential (e.g., VDD), and it is further preferable to use the constant current source circuit ISC1 (the constant current source circuit ISC2 or the constant current source circuit ISC3) illustrated in FIG. 14B. Alternatively, for example, in the case where current flows from the wiring OL or the wiring OLB to the circuit ILD (the wiring VSO), the constant voltage is preferably a ground potential, a negative potential, a potential higher than a ground potential and lower than the high-level potential, or the like, and it is further preferable to use the constant current source circuit ISC1 (the constant current source circuit ISC2 or the constant current source circuit ISC3) illustrated in FIG. 14C. Note that in this specification and the like, current flowing from the circuit ILD to the wiring OL or the wiring OLB is referred to as a positive current in some cases. Thus, current flowing from the wiring OL or the wiring OLB to the circuit ILD is referred to as a negative current in some cases.

When current flowing from the constant current source circuit ISC1 has $I_{ut}$, current flowing from the constant current source circuit ISC2 preferably has $2I_{ut}$ and current flowing from the constant current source circuit ISC3 preferably has $4I_{ut}$, for example. That is, in the case where the current source circuit ISC includes P constant current sources (P is an integer greater than or equal to 1), current flowing from the p-th constant current source (p is an integer greater than or equal to 1 and less than or equal to P) preferably has $2^{(p-1)} \times I_{ut}$. That is, the amount of current flowing from the current source circuit ISC can be changed by switching the on state and the off state of each of the switches SWC1 to SWC3 and the like.

For example, the number of constant current sources in the current source circuit ISC is set to three (P=3). In the case where current with $I_{ut}$ is to be supplied to the wiring OL[j], the switch SWC1 is turned on and the switch SWC2 and the switch SWC3 are turned off while the switch SWIA is in an on state and the switch SWIAB is in an off state. In addition, in the case where current with $5I_{ut}$ is to be supplied to the wiring OL[j], the switch SWC1 and the switch SWC3 are turned on and the switch SWC2 is turned off That is, the amount of current output from the current source circuit ISC can be any one of eight values ("0", "$I_{ut}$", "$2I_{ut}$", "$3I_{ut}$", "$4I_{ut}$", "$5I_{ut}$", "$6I_{ut}$", and "$7I_{ut}$"). Note that in the case where current with larger than eight values is to be output, the number of constant current sources is set to four or more. Similarly, by turning off the switch SWIA and turning on the switch SWIAB, current with the amount having any one of the eight values can be supplied to the wiring OLB[j]. Note that in the case where the current source circuit ISC does not output current, the switch SWIA and the switch SWIAB may be turned off without turning off the switch SWC1 to the switch SWC3 of the current source circuit ISC. A plurality of constant current sources provided in this manner enable a circuit that can generate current with the multilevel current amount to be easily obtained. Note that only one current source circuit may be provided so that a current value output in an analog manner is changed in the operation.

The wiring VCN functions as a wiring for supplying a constant voltage to the wiring OL[j] and/or the wiring OLB[j]. In the case where current (positive current) flows from the circuit ILD to the wiring OL or the wiring OLB, for example, a constant voltage supplied from the wiring VCN is preferably a low-level potential (e.g., VSS). In the case where current (negative current) flows from the wiring OL or the wiring OLB to the circuit ILD, for example, a constant potential supplied from the wiring VCN is preferably a high-level potential. Note that in the case where a capacitor C1 is electrically connected to a source terminal of a transistor M1 or the like and the source terminal is connected to a power source line or the like as illustrated in FIG. 20A to FIG. 20C, FIG. 21A, FIG. 21B, and the like that will be described later, a constant voltage supplied from the wiring VCN is preferably a low-level potential (e.g., VSS) when a positive current flows from the circuit ILD to the wiring OL or the wiring OLB. That is, when a constant voltage is supplied from the wiring VCN, a potential difference between ends of the capacitor C1 is desirably close to 0. In other words, a potential that does not allow the circuit MC to output current, e.g., a potential almost equal to the potential supplied from the wiring VE, is desirably supplied to the wiring VCN.

Here, the first data (weight coefficient) input to the circuit MP is described.

When positive first data is to be input to the circuit MP, current corresponding to the first data is input to the wiring OL[j] and a constant potential supplied from the wiring VCN is input to the wiring OLB[j]. For example, electrical continuity is established between the current source circuit ISC and the wiring OL[j], electrical continuity is not established between the current source circuit ISC and the wiring OLB[j], electrical continuity is not established between the wiring VCN and the wiring OL[j], and electrical continuity is established between the wiring VCN and the wiring OLB[j]. That is, the switch SWIA and the switch SWLAB are turned on, and the switch SWIAB and the switch SWLA are each turned off. Accordingly, electrical continuity is established between the current source circuit ISC and the wiring OL[j], so that current can flow from the current source circuit ISC to the circuit MP through the wiring OL[j]. When the number of constant current sources in the current source circuit ISC is P, the current has any one of $2^P-1$ values (zero current is not included). Since the positive weight coefficient input to the circuit MP is determined in accordance with the current, the weight coefficient can have any one of $2^P-1$ values. In addition, electrical continuity is established between the wiring VCN and the wiring OLB[j], so that a constant voltage is input from the wiring VCN to the wiring OLB[j].

When negative first data is to be input to the circuit MP, current corresponding to the first data is input to the wiring OLB[j] and a constant potential supplied from the wiring VCN is input to the wiring OL[j]. For example, electrical continuity is not established between the current source circuit ISC and the wiring OL[j], electrical continuity is established between the current source circuit ISC and the wiring OLB[j], electrical continuity is established between the wiring VCN and the wiring OL[j], and electrical continuity is not established between the wiring VCN and the wiring OLB[j]. That is, the switch SWIAB and the switch SWLA are turned on, and the switch SWIA and the switch SWLAB are each turned off. Accordingly, electrical continuity is established between the current source circuit ISC and the wiring OLB[j], so that current can flow from the current source circuit ISC to the circuit MP through the wiring OLB[j]. When the number of constant current sources in the current source circuit ISC is P, the current has any one of $2^P-1$ values (zero current is not included). Since the negative weight coefficient input to the circuit MP is determined in accordance with the current, the weight coefficient can have any one of $2^P-1$ values. In addition, electrical continuity is established between the wiring VCN and the wiring OL[j], so that a constant voltage is input from the wiring VCN to the wiring OL[j].

When the first data of 0 is to be input to the circuit MP, a constant potential supplied from the wiring VCN is input to each of the wiring OL[j] and the wiring OLB[j]. For example, electrical continuity is not established between the current source circuit ISC and the wiring OL[j], electrical continuity is not established between the current source circuit ISC and the wiring OLB[j], electrical continuity is established between the wiring VCN and the wiring OL[j], and electrical continuity is established between the wiring VCN and the wiring OLB[j]. That is, the switch SWLA and the switch SWLAB are turned on, and the switch SWIA and the switch SWIAB are each turned off. Accordingly, electrical continuity is established between the wiring VCN and the wiring OL[j], and electrical continuity is established between the wiring VCN and the wiring OLB[j], so that a constant voltage is input from the wiring VCN to the wiring OL[j] and the wiring OLB[j].

That is, when the number of constant current sources in the current source circuit ISC is P, the number of weight coefficients (the sum of a positive weight coefficient, a negative weight coefficient, and a weight coefficient of 0) that can be input to the circuit MP is $2^{P+1}-1$.

Note that the circuit ILD includes the current source circuit ISC in the above description; however, one embodiment of the present invention is not limited thereto. For example, a voltage source circuit may be provided instead of the current source circuit ISC. For another example, at least one current source circuit ISC as a circuit for the wiring OL[j] and at least one current source circuit ISC as a circuit for the wiring OLB[j] may be separately provided. For another example, as illustrated in FIG. 14A, at least one current source circuit ISC may be provided for a set of wirings of the wiring OL[j] and the wiring OLB[j]. The circuit ILD may be provided as a different circuit from the circuit AFP; however, one embodiment of the present invention is not limited thereto. For example, the circuit ILD and the circuit AFP may be combined into one circuit.

<Operation Example of Arithmetic Circuit>

Next, an operation example of the arithmetic circuit 130 in FIG. 12 is described. Note that in the description of this operation example, an arithmetic circuit 130A illustrated in FIG. 15 is used as an example.

Figure 15:
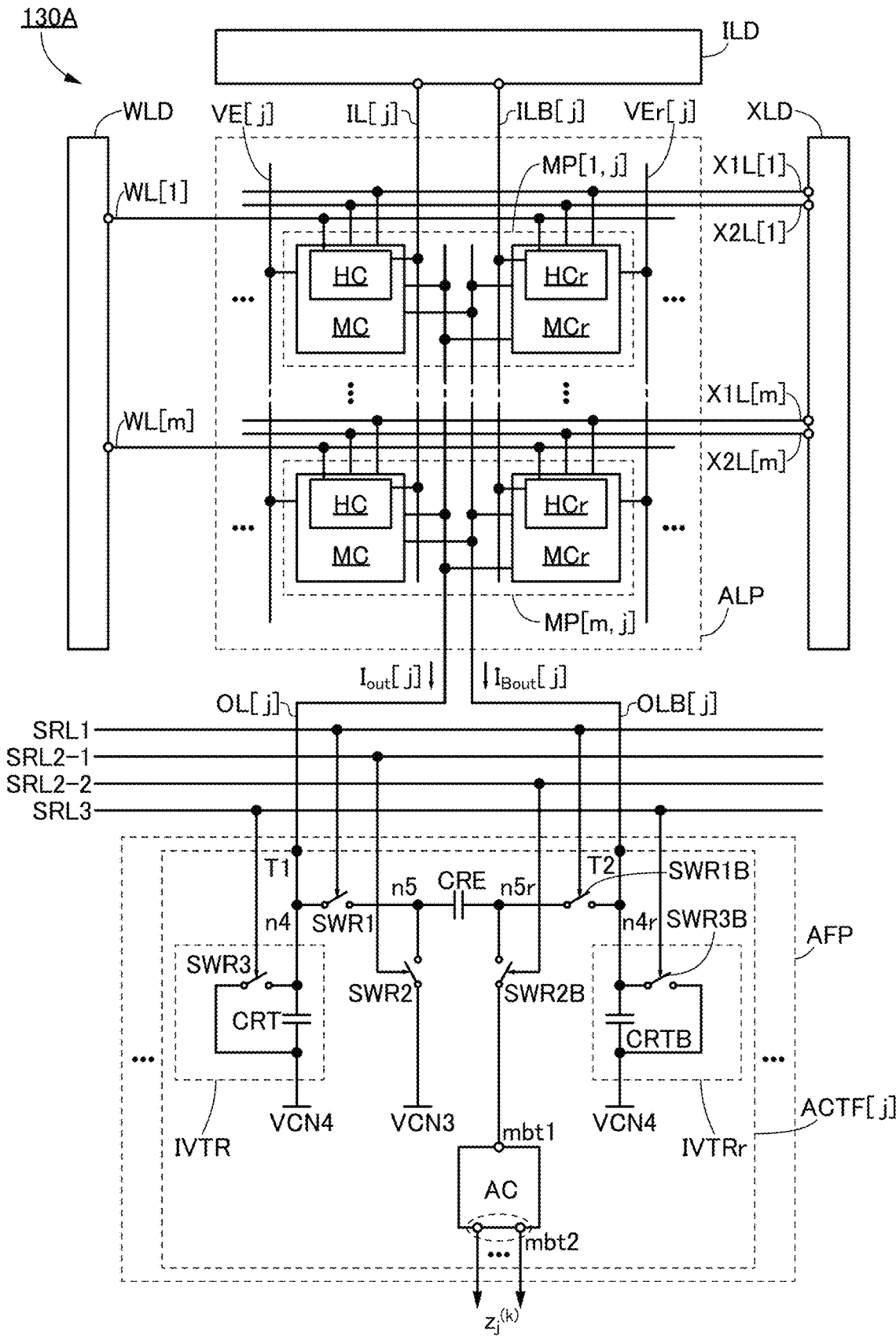
FIG. 15 is a circuit diagram illustrating a structure example of a semiconductor device.

FIG. 15 is a diagram illustrating the arithmetic circuit 130A in which the circuit ACTF[j] illustrated in FIG. 8 is used in the arithmetic circuit 130 in FIG. 12 and a circuit positioned in the j-th column of the arithmetic circuit 130 in FIG. 12 is focused on. Thus, the arithmetic circuit 130A in FIG. 15 corresponds to a circuit that performs product-sum operation of the weight coefficients $w_1^{(k-1)(k)}_j$ to $w_m^{(k-1)(k)}_j$ (sometimes referred to as the first data or the second data; here, referred to as the first data) and the signals $z_1^{(k-1)}$ to $z_m^{(k-1)}$ (sometimes referred to as the first data or the second data; here, referred to as the second data) input from the neuron $N_1^{(k-1)}$ to the neuron $N_m^{(k-1)}$ to the neuron $N_1^{(k)}$ in the neural network 100 illustrated in FIG. 1A and arithmetic operation of an activation function using the result of the product-sum operation.

The circuit MP in FIG. 13A is used as the circuit MP included in the array portion ALP of the arithmetic circuit 130A in FIG. 15, a wiring WL[1] to a wiring WL[m] are illustrated as the wiring WLS[1] to the wiring WLS[m], and a wiring X1L[1] to a wiring X1L[m] and a wiring X2L[1] to a wiring X2L[m] are illustrated as the wiring XLS[1] to the wiring XLS[m]. The circuit IVTR (the circuit IVTRr) illustrated in FIG. 6A is used as the circuit IVTR and the circuit IVTRr included in the circuit ACTF[j] of the arithmetic circuit 130A in FIG. 15.

First, in the arithmetic circuit 130A, the first data $w_1^{(k-1)(k)}_j$ to $w_m^{(k-1)(k)}_j$ are set in the circuit MP[1, j] to the circuit MP[m, j]. The first data $w_i^{(k-1)(k)}_j$ is set in the following manner: a predetermined potential is input to the wiring WLS [1] to the wiring WLS [m] sequentially by the circuit WLD to select the circuit MP[1, j] to the circuit MP[m, j] sequentially, and a potential, current, or the like corresponding to the first data is supplied from the circuit ILD through the wiring OL[j] and the wiring OLB[j] to the holding portion HC and the holding portion HCr of the circuit MC and the circuit MCr that are included in each of the selected circuits MP. After the supply of the potential, the current, or the like, the circuit WLD makes the circuit MP[1, j] to the circuit MP[m, j] unselected, so that the potential, the current, or the like corresponding to the first data $w_1^{(k-1)(k)}_j$ to $w_m^{(k-1)(k)}_j$ can be held in the holding portion HC of the circuit MC and the holding portion HCr of the circuit MCr that are included in each of the circuit MP[1, j] to the circuit MP[m, j]. For example, in the case where any of the first data $w_1^{(k-1)(k)}_j$ to $w_m^{(k-1)(k)}_j$ has a positive value, a value corresponding to the positive value is input to the holding portion HC and a value corresponding to 0 is input to the holding portion HCr. By contrast, in the case where any of the first data $w_1^{(k-1)(k)}_j$ to $w_m^{(k-1)(k)}_j$ has a negative value, a value corresponding to 0 is input to the holding portion HC and a value corresponding to the absolute value of the negative value is input to the holding portion HCr. In the case where any of the first data $w_1^{(k-1)(k)}_j$ to $w_m^{(k-1)(k)}_j$ has a value of 0, a value corresponding to 0 is input to the holding portion HC and a value corresponding to the absolute value of a value of 0 is input to the holding portion HCr.

Next, the second data $z_1^{(k-1)}$ to $z_m^{(k-1)}$ are supplied to the wiring X1L[1] to the wiring X1L[m] and the wiring X2L[1] to the wiring X2L[m] by the circuit XLD. As a specific example, the second data $z_i^{(k-1)}$ is supplied to the wiring X1L[i] and the wiring X2L[i].

The electrical continuity between the circuit MC and the circuit MCr included in each of the circuit MP[1, j] to the circuit MP[m, j] and the wiring OL[j] and the wiring OLB[j] is determined in accordance with the second data $z_1^{(k-1)}$ to $z_m^{(k-1)}$ respectively input to the circuit MP[1, j] to the circuit MP[m, j]. As a specific example, in accordance with the second data $z_i^{(k-1)}$, the circuit MP[i, j] has any one of a mode where "electrical continuity is established between the circuit MC and the wiring OL[j] and electrical continuity is established between the circuit MCr and the wiring OLB[j]", a mode where "electrical continuity is established between the circuit MC and the wiring OLB[j] and electrical continuity is established between the circuit MCr and the wiring OL[j]", and a mode where "electrical continuity is not established between the circuit MC and the circuit MCr and each of the wirings OL[j] and OLB[j]". For example, in the case where the second data $z_1^{(k-1)}$ has a positive value, a value with which electrical continuity can be established between the circuit MC and the wiring OL[j] and electrical continuity can be established between the circuit MCr and the wiring OLB[j] is input to the wiring X1L[1]. Then, a value with which electrical continuity cannot be established between the circuit MC and the wiring OLB[j] and electrical continuity cannot be established between the circuit MCr and the wiring OL[j] is input to the wiring X2L[1]. In the case where the second data $z_1^{(k-1)}$ has a negative value, a value with which electrical continuity can be established between the circuit MC and the wiring OLB[j] and electrical continuity can be established between the circuit MCr and the wiring OL[j] is input to the wiring X1L[1]. Then, a value with which electrical continuity cannot be established between the circuit MC and the wiring OL[j] and electrical continuity cannot be established between the circuit MCr and the wiring OLB[j] is input to the wiring X2L[1]. In the case where the second data $z_1^{(k-1)}$ has a value of 0, a value with which electrical continuity cannot be established between the circuit MC and the wiring OLB[j] and electrical continuity cannot be established between the circuit MCr and the wiring OL[j] is input to the wiring X1L[1]. Then, a value with which electrical continuity cannot be established between the circuit MC and the wiring OL[j] and electrical continuity cannot be established between the circuit MCr and the wiring OLB[j] is input to the wiring X2L[1].

Electrical continuity between the circuit MC and the circuit MCr that are included in the circuit MP[i, j] and the wiring OL[j] and the wiring OLB[j] is determined in accordance with the second data $z_i^{(k-1)}$ input to the circuit MP[i, j], whereby current is input and output between the circuit MC and the circuit MCr and the wiring OL[j] and the wiring OLB[j]. Furthermore, the amount of current is determined in accordance with the first data $w_i^{(k-1)}{}_j^{(k)}$ and/or the second data $z_i^{(k-1)}$ set in the circuit MP[i, j].

For example, in the circuit MP[i, j], current flowing from the wiring OL[j] to the circuit MC or the circuit MCr is I[i, j], and current flowing from the wiring OLB[j] to the circuit MC or the circuit MCr is IB[i, j]. When current flowing from the circuit ACTF[j] to the wiring OL[j] is $I_{out}[j]$ and current flowing from the wiring OLB[j] to the circuit ACTF[j] is $I_{Bout}[j]$, $I_{out}[j]$ and $I_{Bout}[j]$ can be expressed by the following formulae.

[Formula 5]

$$I_{out}[j] = \sum_{i=1}^{m} I[i, j] \quad (1.5)$$

$$I_{Bout}[j] = \sum_{i=1}^{m} I_B[i, j] \quad (1.6)$$

In the circuit MP[i, j], I(+1) flows between the circuit MC and one of the wiring OL[j] and the wiring OLB[j] and I(−1) flows between the circuit MCr and the other of the wiring OL[j] and the wiring OLB[j] in the case where the first data $w_i^{(k-1)}{}_j^{(k)}$ is "+1", I(−1) flows between the circuit MC and the one of the wiring OL[j] and the wiring OLB[j] and I(+1) flows between the circuit MCr and the other of the wiring OL[j] and the wiring OLB[j] in the case where the first data $w_i^{(k-1)}{}_j^{(k)}$ is "−1", and I(−1) flows between the circuit MC and the one of the wiring OL[j] and the wiring OLB[j] and I(−1) flows between the circuit MCr and the other of the wiring OL[j] and the wiring OLB[j] in the case where the first data $w_1^{(k-1)}{}_j^{(k)}$ is "0", for example.

Furthermore, the circuit MP[i, j] has a structure in which "electrical continuity is established between the circuit MC and the wiring OL[j], electrical continuity is established between the circuit MCr and the wiring OLB[j], electrical continuity is not established between the circuit MC and the wiring OLB[j], and electrical continuity is not established between the circuit MCr and the wiring OL[j]" when the second data $z_i^{(k-1)}$ is "+1"; the circuit MP[i, j] has a structure in which "electrical continuity is established between the circuit MC and the wiring OLB[j], electrical continuity is established between the circuit MCr and the wiring OL[j], electrical continuity is not established between the circuit MC and the wiring OL[j], and electrical continuity is not established between the circuit MCr and the wiring OLB[j]" when the second data $z_i^{(k-1)}$ is "−1"; and the circuit MP[i, j] has a structure in which "electrical continuity is not established between the circuit MC and the wiring OL[j] and between the circuit MC and OLB[j], and electrical continuity is not established between the circuit MCr and the wiring OL[j] and between the circuit MCr and OLB[j]" when the second data $z_i^{(k-1)}$ is "0".

In this case, in the circuit MP[i, j], the current I[i, j] flowing from the wiring OL[j] to the circuit MC or the circuit MCr and the current IB[i, j] flowing from the wiring OLB[j] to the circuit MC or the circuit MCr are as shown in the following table. Note that depending on the case, the circuit MP[i, j] may be configured such that the amount of current I(−1) is 0. Note that the current I[i, j] may be current flowing from the circuit MC or the circuit MCr to the wiring OL[j]. Similarly, the current IB[i, j] may be current flowing from the circuit MC or the circuit MCr to the wiring OLB[j].

TABLE 1

| $W_i^{(k-1)}{}_j^{(k)}$ | $z_i^{(k-1)}$ | I[i, j] | $I_B$[i, j] |
|---|---|---|---|
| 0 | +1 | I(−1) | I(−1) |
| +1 | +1 | I(+1) | I(−1) |
| −1 | +1 | I(−1) | I(+1) |
| 0 | −1 | I(−1) | I(−1) |
| +1 | −1 | I(−1) | I(+1) |
| −1 | −1 | I(+1) | I(−1) |
| 0 | 0 | 0 | 0 |
| +1 | 0 | 0 | 0 |
| −1 | 0 | 0 | 0 |

The circuit ACTF[j] generates voltages corresponding to $I_{out}[j]$ and $I_{Bout}[j]$ flowing through the wiring OL[j] and the wiring OLB[j], for example. After that, the signal $z_j^{(k)}$ to be transmitted from the neuron $N_j^{(k)}$ to the neuron in the (k+1)-th layer is output on the basis of the difference between the voltage corresponding to $I_{out}[j]$ and the voltage corresponding to $I_{Bout}[j]$.

Note that for the operation of the circuit ACTF[j], refer to the description of the operation example of the arithmetic circuit 110A in FIG. 8 in Embodiment 1.

<Structure Example 2 of Arithmetic Circuit>

The arithmetic circuit 130A illustrated in FIG. 15 has a structure in which the circuit AC outputs the signal $z_j^{(k)}$ with a positive value when $I_{out}[j]$ is larger than $I_{Bout}[j]$ (when $u_j^{(k)}$ is positive) and the circuit AC outputs the output signal $z_j^{(k)}$ of 0 as a digital signal when $I_{Bout}[j]$ is larger than $I_{out}[j]$ (when $u_j^{(k)}$ is negative); however, one embodiment of the present invention is not limited thereto. For example, the arithmetic circuit 130A may have a structure in which the circuit AC outputs the output signal $z_j^{(k)}$ with a negative value when $I_{Bout}[j]$ is larger than $I_{out}[j]$ (when $u_j^{(k)}$ is negative).

Figure 16:
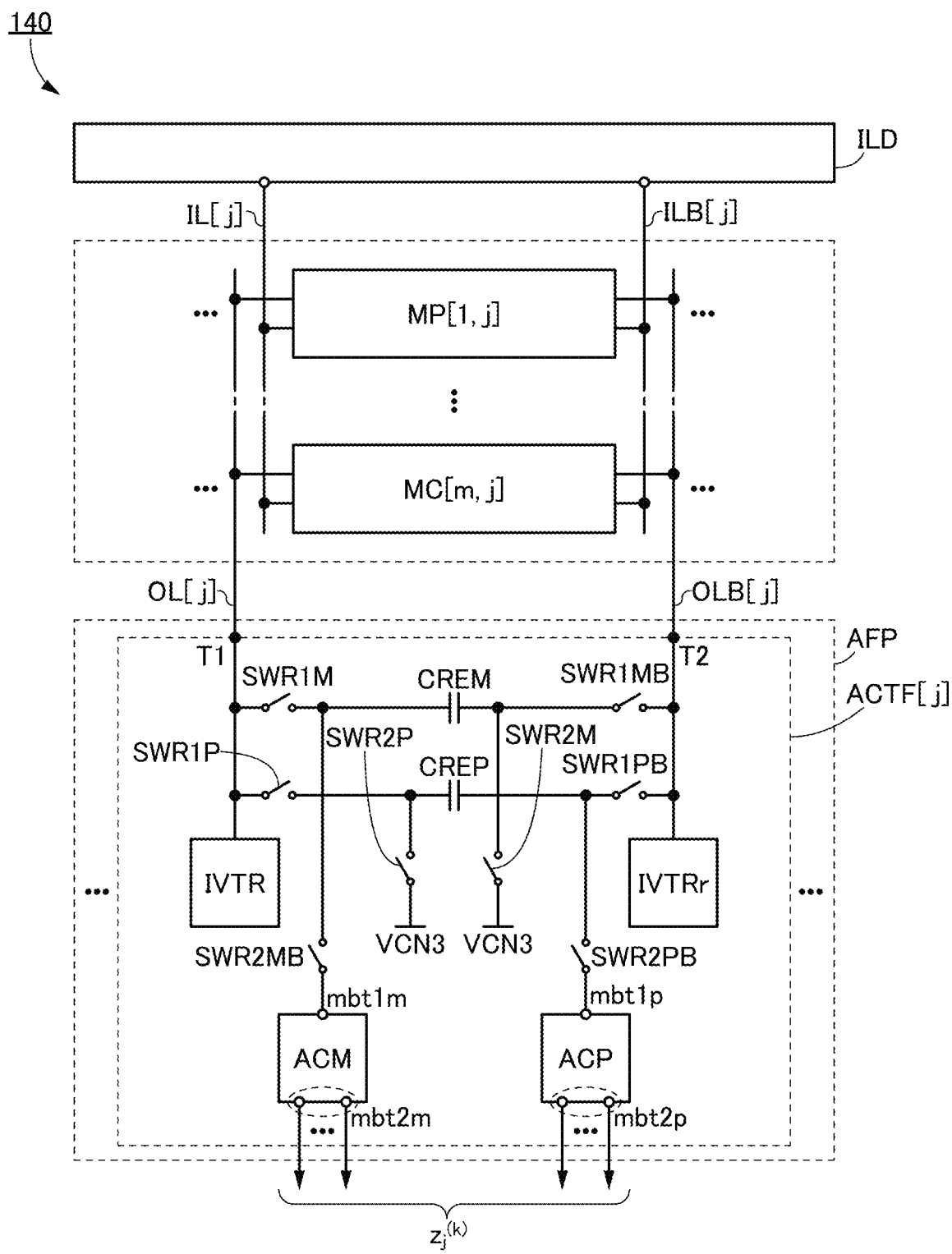
FIG. 16 is a circuit diagram illustrating a structure example of a semiconductor device.

FIG. 16 illustrates an example of such an arithmetic circuit. In an arithmetic circuit 140 illustrated in FIG. 16, the structure of the circuit ACTF[j] included in the circuit AFP of the arithmetic circuit 130A in FIG. 15 is changed. The circuit structure of the arithmetic circuit 140 is an example of the arithmetic circuit 120 illustrated in FIG. 4A. The circuit ACTF[j] includes a switch SWR1M, a switch SWR1MB, a switch SWR1P, a switch SWR1PB, a switch SWR2M, a switch SWR2MB, a switch SWR2P, a switch SWR2PB, the capacitor CREM, the capacitor CREP, the circuit ACM, the circuit ACP, the circuit IVTR, and the circuit IVTRr. The circuit ACP includes a terminal mbt1p and a terminal mbt2p, and the circuit ACM includes a terminal mbt1m and a terminal mbt2m.

Note that the switch SWR1P, the switch SWR2P, the switch SWR1PB, the switch SWR2PB, the capacitor CREP, and the circuit ACP included in the circuit ACTF[j] of the arithmetic circuit 140 respectively correspond to the switch SWR1, the switch SWR2, the switch SWR1B, the switch SWR2B, the capacitor CRE, and the circuit AC included in the circuit ACTF[j] in FIG. 15. The terminal mbt1p and the terminal mbt2p included in the circuit ACP in FIG. 16 respectively correspond to the terminal mbt1 and the terminal mbt2 included in the circuit AC in FIG. 15. Thus, for the connection structures, functions, and the like of the switch SWR1P, the switch SWR2P, the switch SWR1PB, the switch SWR2PB, the capacitor CREP, and the circuit ACP, refer to the description of the circuit ACTF[j] illustrated in FIG. 15.

A first terminal of the switch SWR1M is electrically connected to the circuit IVTR, the terminal T1, and a first terminal of the switch SWR1P. A second terminal of the switch SWR1M is electrically connected to the first terminal of the capacitor CREM and a first terminal of the switch SWR2 MB. A second terminal of the switch SWR2 MB is electrically connected to the terminal mbt1m of the circuit ACM. A first terminal of the switch SWR1 MB is electrically connected to the circuit IVTRr, the terminal T2, and a first terminal of the switch SWR1PB. A second terminal of the switch SWR1 MB is electrically connected to the second terminal of the capacitor CREM and a first terminal of the switch SWR2M. A second terminal of the switch SWR2M is electrically connected to the wiring VCN3.

The circuit ACM can have a circuit structure similar to that of the circuit ACP, that is, the circuit AC in FIG. 15, for example. The circuit ACP may have a structure in which a signal with a value of 0 is output as a digital signal from the terminal mbt2p when a potential lower than a predetermined potential (e.g., a GND potential) is input to the terminal mbt1p, for example. Similarly, the circuit ACM may have a structure in which a signal with a value of 0 is output as a digital signal from the terminal mbt2m when a potential lower than a predetermined potential (e.g., a GND potential) is input to the terminal mbt1m, for example.

As each of the switch SWR1M, the switch SWR2M, the switch SWR1 MB, and the switch SWR2 MB, for example, a switch that is similar to the switch SWR1, the switch SWR1B, the switch SWR2, and the switch SWR2B described above can be used. Here, the switch SWR1M, the switch SWR2M, the switch SWR1 MB, the switch SWR2 MB, the switch SWR1P, the switch SWR2P, the switch SWR1PB, and the switch SWR2PB are each turned on when a high-level potential is input to a control terminal and turned off when a low-level potential is input to the control terminal.

It is preferable that the control terminals of the switch SWR1M, the switch SWR1P, the switch SWR1 MB, and the switch SWR1PB be electrically connected to the same wiring. That is, the switch SWR1M, the switch SWR1P, the switch SWR1 MB, and the switch SWR1PB are preferably operated to be turned on or off at the same time.

It is preferable that the control terminals of the switch SWR2M and the switch SWR2P be electrically connected to the same wiring. That is, the switch SWR2M and the switch SWR2P are preferably operated to be turned on or off at the same time.

It is preferable that the control terminals of the switch SWR2 MB and the switch SWR2PB be electrically connected to the same wiring. That is, the switch SWR2 MB and the switch SWR2PB are preferably operated to be turned on or off at the same time.

Here, the case where the circuit ACTF[j] in the arithmetic circuit 140 in FIG. 16 reads out $I_{out}[j]$ flowing from the wiring OL[j] and $I_{Bout}[j]$ flowing from the wiring OLB[j] is considered. Note that the control terminals of the switch SWR1M, the switch SWR1P, the switch SWR1 MB, and the switch SWR1PB are each electrically connected to the wiring SRL1, the control terminals of the switch SWR2M and the switch SWR2P are each electrically connected to the wiring SRL2-1, and the control terminals of the switch SWR2 MB and the switch SWR2PB are each electrically connected to the wiring SRL2-2.

When the current $I_{out}[j]$ is higher than $I_{Bout}[j]$, as in the above-described operation example, the potential $V_{Iout}$ of the first terminal of the capacitor CREP is lower than the potential $V_{IBout}$ of the second terminal of the capacitor CREP at Time T04. Then, from Time T04 to Time T05, voltage between the first terminal and the second terminal of the capacitor CREP is held, and from Time T06 to Time T07, the potential of the second terminal of the capacitor CREP becomes a potential higher than the GND potential due to capacitive coupling of the capacitor CREP. After Time T07, the potential is input to the terminal mbt1p of the circuit ACP, and a digital signal corresponding to the potential is output from the terminal mbt2p of the circuit ACP.

Meanwhile, the potential $V_{Iout}$ of the first terminal of the capacitor CREM is lower than the potential $V_{IBout}$ of the second terminal of the capacitor CREM at Time T04. Then, from Time T04 to Time T05, voltage between the first terminal and the second terminal of the capacitor CREM is held, and from Time T06 to Time T07, the potential of the first terminal of the capacitor CREM becomes a potential lower than the GND potential due to capacitive coupling of the capacitor CREM. After Time T07, the potential is input to the terminal mbt1m of the circuit ACM, and a digital signal with a value of 0 is output from the terminal mbt2m of the circuit ACM.

That is, when the current $I_{out}[j]$ is higher than $I_{Bout}[j]$, a digital signal z corresponding to the potential of the terminal mbt1p is output from the terminal mbt2p of the circuit ACP and the GND potential is output from the terminal mbt2m of the circuit ACM. A pair of digital signals can be the output signal $z_i^{(k)}$ with a positive value output from the circuit ACTF[j].

When the current $I_{out}[j]$ is lower than $I_{Bout}[j]$, as in the above-described operation example, the potential $V_{Iout}$ of the first terminal of the capacitor CREP is higher than the potential $V_{IBout}$ of the second terminal of the capacitor CREP at Time T04. Then, from Time T04 to Time T05, the voltage between the first terminal and the second terminal of the capacitor CREP is held, and from Time T06 to Time T07, the potential of the second terminal of the capacitor CREP becomes a potential lower than the GND potential due to capacitive coupling of the capacitor CREP. After Time T07, the potential is input to the terminal mbt1p of the circuit ACP, and a digital signal with a value of 0 is output from the terminal mbt2p of the circuit ACP.

Meanwhile, the potential $V_{Iout}$ of the first terminal of the capacitor CREM is higher than the potential $V_{IBout}$ of the second terminal of the capacitor CREM at Time T04. Then, from Time T04 to Time T05, the voltage between the first terminal and the second terminal of the capacitor CREM is held, and from Time T06 to Time T07, the potential of the first terminal of the capacitor CREM becomes a potential higher than the GND potential due to capacitive coupling of the capacitor CREM. After Time T07, the potential is input to the terminal mbt1m of the circuit ACM, and a digital signal corresponding to the potential is output from the terminal mbt2m of the circuit ACM.

That is, when the current $I_{out}[j]$ is lower than $I_{Bout}[j]$, the GND potential is output from the terminal mbt2p of the circuit ACP and the digital signal corresponding to the potential of the terminal mbt1p is output from the terminal mbt2m of the circuit ACM. A pair of digital signals can be the output signal $z_1"$ with a negative value output from the circuit ACTF[j].

<Structure Example 3 of Arithmetic Circuit>

Note that in the arithmetic circuit 130 illustrated in FIG. 12, the wiring IL[j], the wiring ILB[j], the wiring OL[j], and the wiring OL[j] are electrically connected to the circuit MP[i, j]; however, one embodiment of the present invention is not limited thereto. For example, the arithmetic circuit 130 can have a structure in which the wiring IL[j] and the wiring OL[j] are combined into the wiring OL[j] and the wiring ILB[j] and the wiring OLB[j] are combined into the wiring OLB[j].

Figure 17:
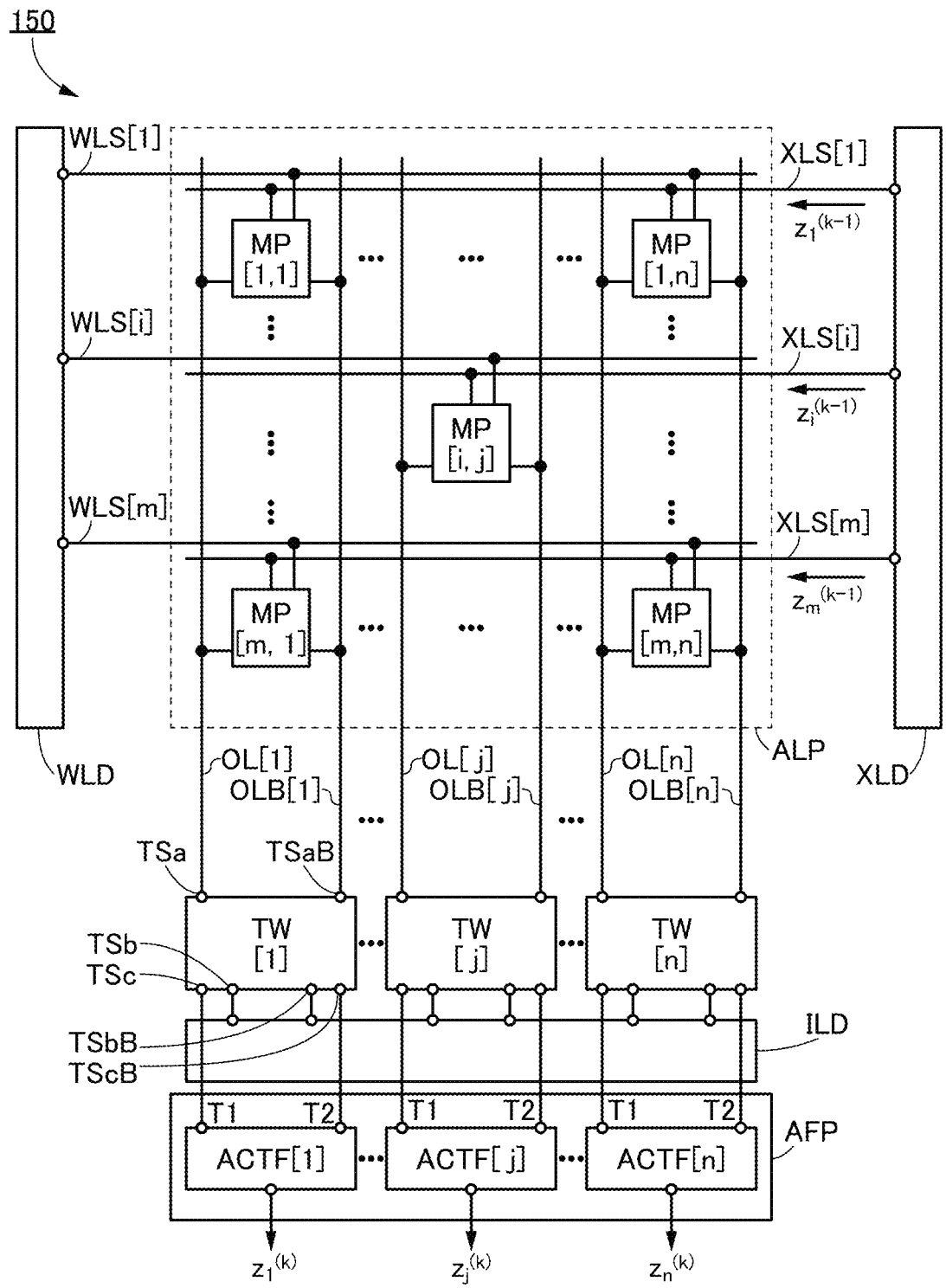
FIG. 17 is a circuit diagram illustrating a structure example of a semiconductor device.

FIG. 17 illustrates a structure example of such an arithmetic circuit. An arithmetic circuit 150 illustrated in FIG. 17 has a structure in which the wiring IL[j] and the wiring OL[j] are combined into the wiring OL[j] and the wiring ILB[j] and the wiring OLB[j] are combined into the wiring OLB[j] in the arithmetic circuit 130.

The arithmetic circuit 150 includes a switching circuit TW[1] to a switching circuit TW[n]. The switching circuits TW[1] to TW[n] each include a terminal TSa, a terminal TSaB, a terminal TSb, a terminal TSbB, a terminal TSc, and a terminal TScB. The terminal TSa is electrically connected to the wiring OL[j], the terminal TSbB is electrically connected to the circuit ILD, and the terminal TSc is electrically connected to the circuit ACTF[i]. The terminal TSaB is electrically connected to the wiring OLB[j], the terminal TSbB is electrically connected to the circuit ILD, and the terminal TScB is electrically connected to the circuit ACTF [j].

The switching circuit TW[j] has a function of establishing electrical continuity between the terminal TSa and one of the terminal TSb and the terminal TSc, and breaking electrical continuity between the terminal TSb and the other of the terminal TSb and the terminal TSc. In addition, the switching circuit TW[j] has a function of establishing electrical continuity between the terminal TSaB and one of the terminal TSbB and the terminal TScB, and breaking electrical continuity between the terminal TSaB and the other of the terminal TSbB and the terminal TScB.

That is, in the case where information (e.g., a potential, a resistance value, or a current value) corresponding to the first data $w_1^{(k-1)}{}_1^{(k)}$ to $w_m^{(k-1)}{}_n^{(k)}$ that are weight coefficients is to be input to any one of the circuit MP[1, j] to the circuit MP[m, j], electrical continuity is established between the terminal TSa and the terminal TSb and electrical continuity is established between the terminal TSaB and the terminal TSbB in the switching circuit TW[j], whereby information (e.g., a potential, a resistance value, or a current value) corresponding to the first data $w_1^{(k-1)}{}_1^{(k)}$ to $w_m^{(k-1)}{}_n^{(k)}$ can be supplied from the circuit ILD to the wiring OL[j] and the wiring OLB[j].

In addition, in the case where the circuit ACTF[j] is to obtain the result of the sum of the products (Formula (1.2)) of the weight coefficients and the values of the signals of neurons calculated by the circuit MP[1, j] to the circuit MP[m, j], electrical continuity is established between the terminal TSa and the terminal TSc and electrical continuity is established between the terminal TSaB and the terminal TScB in the switching circuit TW[j], whereby information (e.g., a potential or a current value) corresponding to the product-sum result can be supplied from the wiring OL[j] and the wiring OLB[j] to the circuit ACTF[j]. The value of the activation function is calculated from the input product-sum result in the circuit ACTF[j], whereby the signal $z_j^{(k)}$ can be obtained as the output signal of the neuron, for example.

Figure 18A:
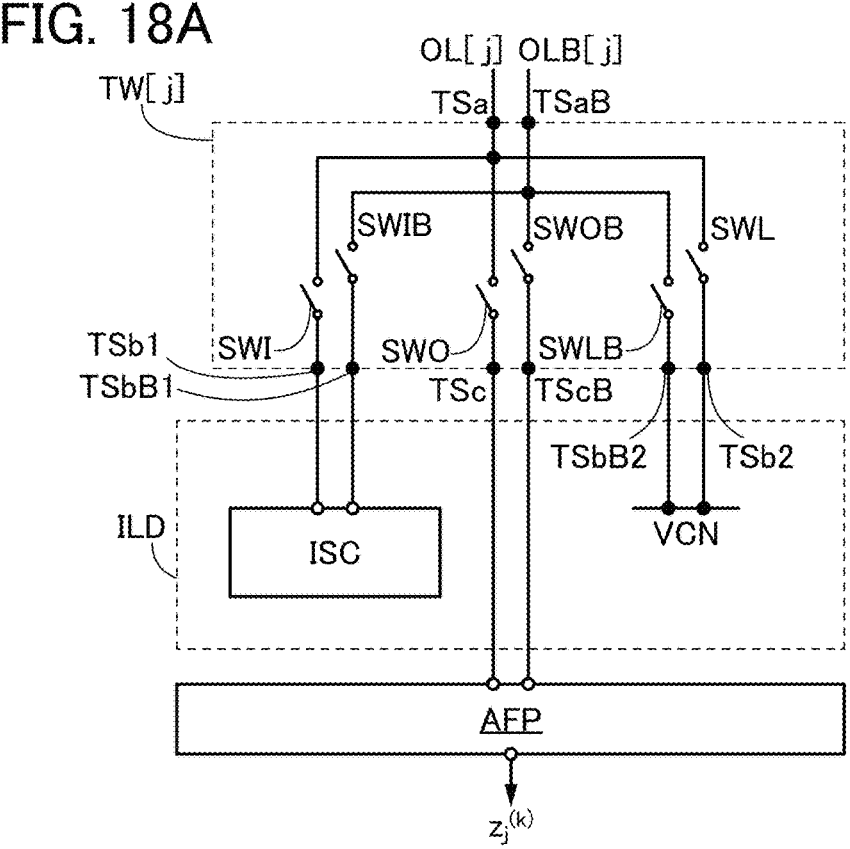
FIG. 18A and FIG. 18B are circuit diagrams illustrating structure examples of a circuit included in a semiconductor device.

Next, the switching circuit TW[j] and the circuit ILD that are included in the arithmetic circuit 150 are described. FIG. 18A illustrates structure examples of the switching circuit TW[j] and the circuit ILD that can be used in the arithmetic circuit 150. Note that FIG. 18A illustrates the wiring OL[j], the wiring OLB[j], and the circuit AFP to show an electrical connection structure of the switching circuit TW[j] and the circuit ILD.

The switching circuit TW[j] includes a switch SWI, a switch SWIB, a switch SWO, a switch SWOB, a switch SWL, and a switch SWLB, for example.

The circuit ILD includes the current source circuit ISC, for example. Note that the structure of the current source circuit ISC can be similar to the structure of the current source circuit ISC of the circuit ILD in FIG. 14A. Thus, for the current source circuit ISC in FIG. 18A, refer to the description of the circuit ISC included in the circuit ILD in FIG. 14A.

Note that as each of the switch SWI, the switch SWIB, the switch SWO, the switch SWOB, the switch SWL, and the switch SWLB described in FIG. 18A, a switch that is similar to the switch SWR1, the switch SWR1B, the switch SWR2, and the switch SWR2B described above can be used, for example.

In an example of the switching circuit TW[j], the terminal TSa is electrically connected to a first terminal of the switch SWI, a first terminal of the switch SWO, and a first terminal of the switch SWL. The terminal TSaB is electrically connected to a first terminal of the switch SWIB, a first terminal of the switch SWOB, and a first terminal of the switch SWLB. A second terminal of the switch SWI is electrically connected to a terminal TSb1. A second terminal of the switch SWIB is electrically connected to a terminal TSbB1. A second terminal of the switch SWO is electrically connected to the terminal TSc. A second terminal of the switch SWOB is electrically connected to the terminal TScB. A second terminal of the switch SWL is electrically connected to a terminal TSb2. A second terminal of the switch SWLB is electrically connected to a terminal TSbB2.

The terminal TSb1 and the terminal TSb2 illustrated in FIG. 18A correspond to the terminal TSb illustrated in FIG. 17. In addition, the terminal TSbB1 and the terminal TSbB2 illustrated in FIG. 18A correspond to the terminal TSbB illustrated in FIG. 17.

The wiring VCN functions as a wiring for supplying a constant voltage to the wiring OL[j] and/or the wiring OLB[j], like the wiring VCN of the circuit ILD in FIG. 14A. Thus, for the wiring VCN in FIG. 18A, refer to the description of the wiring VCN in FIG. 14A.

By switching the on state and the off state of each of the switch SWI, the switch SWIB, the switch SWO, the switch SWOB, the switch SWL, and the switch SWLB, the switching circuit TW[j] can change a circuit that establishes electrical continuity with the wiring OL[j] and the wiring OLB[j].

When a positive weight coefficient is to be input to the circuit MP, for example, current corresponding to the weight coefficient is input to the wiring OL[j] and a constant potential supplied from the wiring VCN is input to the wiring OLB[j]. For example, electrical continuity is established between the current source circuit ISC and the wiring OL[j], electrical continuity is not established between the current source circuit ISC and the wiring OLB[j], electrical continuity is not established between the circuit AFP and the wiring OL[j], electrical continuity is not established between the circuit AFP and the wiring OLB[j], electrical continuity is not established between the wiring VCN and the wiring OL[j], and electrical continuity is established between the wiring VCN and the wiring OLB[j]. That is, in the switching circuit TW[j], the switch SWI and the switch SWLB are turned on, and the switch SWIB, the switch SWO, the switch SWOB, and the switch SWL are each turned off. Accordingly, electrical continuity is established between the current source circuit ISC and the wiring OL[j], so that current can flow from the current source circuit ISC to the circuit MP through the wiring OL[j]. In addition, electrical continuity is established between the wiring VCN and the wiring OLB[j], so that a constant voltage is input from the wiring VCN to the wiring OLB[j].

When a negative weight coefficient is to be input to the circuit MP, for example, current corresponding to the weight coefficient is input to the wiring OLB[j] and a constant potential supplied from the wiring VCN is input to the wiring OL[j]. For example, electrical continuity is not established between the current source circuit ISC and the wiring OL[j], electrical continuity is established between the current source circuit ISC and the wiring OLB[j], electrical continuity is not established between the circuit AFP and the wiring OL[j], electrical continuity is not established between the circuit AFP and the wiring OLB[j], electrical continuity is established between the wiring VCN and the wiring OL[j], and electrical continuity is not established between the wiring VCN and the wiring OLB[j]. That is, in the switching circuit TW[j], the switch SWIB and the switch SWL are turned on, and the switch SWI, the switch SWO, the switch SWOB, and the switch SWLB are each turned off. Accordingly, electrical continuity is established between the current source circuit ISC and the wiring OLB[j], so that current can flow from the current source circuit ISC to the circuit MP through the wiring OLB[j]. In addition, electrical continuity is established between the wiring VCN and the wiring OL[j], so that a constant voltage is input from the wiring VCN to the wiring OL[j].

When a weight coefficient of 0 is to be input to the circuit MP, for example, a constant potential supplied from the wiring VCN is input to each of the wiring OL[j] and the wiring OLB[j]. For example, electrical continuity is not established between the current source circuit ISC and the wiring OL[j], electrical continuity is not established between the current source circuit ISC and the wiring OLB[j], electrical continuity is not established between the circuit AFP and the wiring OL[j], electrical continuity is not established between the circuit AFP and the wiring OLB[j], electrical continuity is established between the wiring VCN and the wiring OL[j], and electrical continuity is established between the wiring VCN and the wiring OLB[j]. That is, in the switching circuit TW[j], the switch SWL and the switch SWLB are turned on, and the switch SWI, the switch SWIB, the switch SWO, and the switch SWOB are each turned off. Accordingly, electrical continuity is established between the wiring VCN and the wiring OL[j], and electrical continuity is established between the wiring VCN and the wiring OLB[j], so that a constant voltage is input from the wiring VCN to the wiring OL[j] and the wiring OLB[j].

When information (e.g., a potential or current) is supplied from the circuit MP[i,j] to the circuit AFP, for example, electrical continuity is not established between the current source circuit ISC and the wiring OL[j], electrical continuity is not established between the current source circuit ISC and the wiring OLB[j], electrical continuity is established between the circuit AFP and the wiring OL[j], electrical continuity is established between the circuit AFP and the wiring OLB[j], electrical continuity is not established between the wiring VCN and the wiring OL[j], and electrical continuity is not established between the wiring VCN and the wiring OLB[j]. That is, in the switching circuit TW[j], the switch SWO and the switch SWOB are turned on, and the switch SWI, the switch SWIB, the switch SWL, and the switch SWLB are each turned off. Accordingly, electrical continuity is established between the circuit AFP and the circuit MP[i, j], so that information (e.g., a potential or current) can be supplied from the circuit MP[i, j] to the circuit AFP.

Figure 18B:
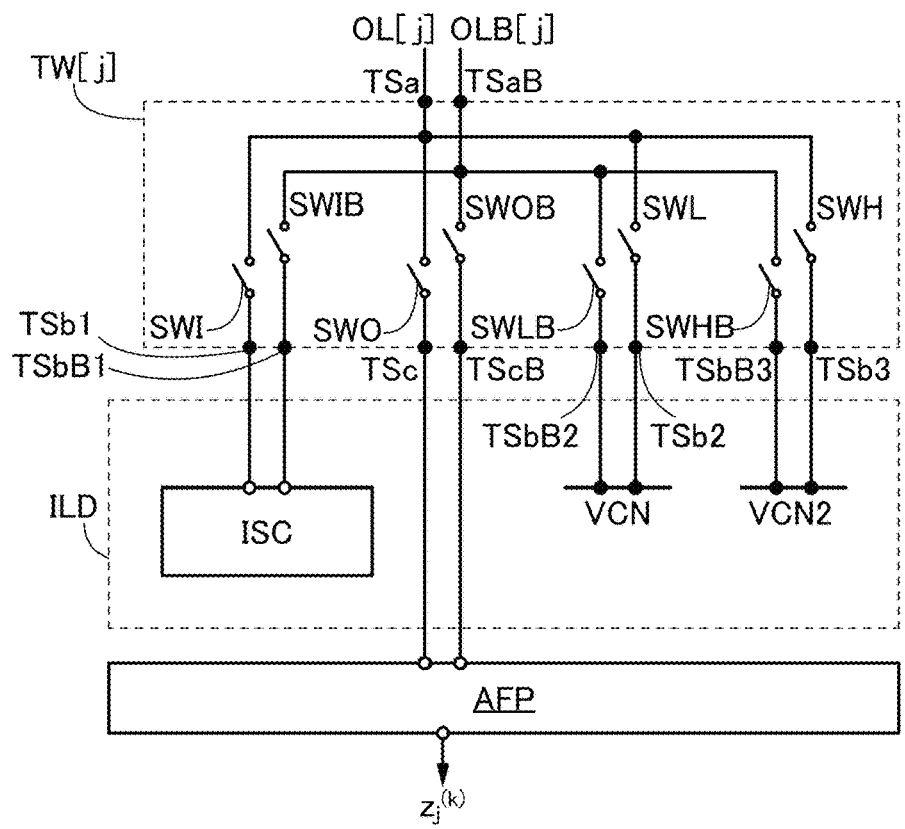

Note that the circuit structures of the switching circuit TW[j] and the circuit ILD that can be used in the arithmetic circuit 150 of one embodiment of the present invention are not limited to those illustrated in FIG. 18A. The circuit structures of the switching circuit TW[j] and the circuit ILD can be changed depending on circumstances. For example, a switch SWH and a switch SWHB may be added to the switching circuit TW[j] illustrated in FIG. 18A, and a wiring VCN2 may be provided in the circuit ILD. FIG. 18B illustrates an example of such a structure.

In FIG. 18B, a first terminal of the switch SWH is electrically connected to the wiring OL[j], and a second terminal of the switch SWH is electrically connected to the wiring VCN2. A first terminal of the switch SWHB is electrically connected to the wiring OLB[j], and a second terminal of the switch SWHB is electrically connected to the wiring VCN2.

The wiring VCN2 functions as a wiring for supplying a constant voltage to the wiring OL[j] and/or the wiring OLB[j]. In the case where current (positive current) flows from the circuit ILD to the wiring OL or the wiring OLB through the switching circuit TW[j], for example, a constant voltage supplied from the wiring VCN2 is preferably a high-level potential (e.g., VDD). In the case where current (negative current) flows from the wiring OL or the wiring OLB to the circuit ILD through the switching circuit TW[j], for example, a constant potential supplied from the wiring VCN2 is preferably a ground potential or a low-level potential (e.g., VSS). It is particularly preferable that the voltage be supplied from the wiring VCN4 described with reference to FIG. 6A and FIG. 6C.

In the circuit structure in FIG. 18B, the switch SWI, the switch SWIB, the switch SWO, the switch SWOB, the switch SWL, and the switch SWLB are turned off and the switch SWH and the switch SWHB are turned on, whereby voltage supplied from the wiring VCN2 can be input to each of the wiring OL[j] and the wiring OLB[J]. Here, for example, when the voltage supplied from the wiring VCN2 is similar to the voltage from the wiring VCN4 described with reference to FIG. 6A to FIG. 6C, the switch SWH and the switch SWHB are turned on instead of turning on the switch SWR3 and the switch SWR3B from Time T01 to Time T02 in the operation example of the timing chart in FIG. 9, whereby voltage similar to that from the wiring VCN4 can be supplied to the wiring OL[j] and the wiring OLB[j]. That is, the arithmetic circuit 140 having the circuit structure in FIG. 18B enables the switch SWR3 (the switch SWR3B) in the circuit IVTR (the circuit IVTRr) illustrated in FIG. 6A to FIG. 6C to be omitted.

Here, structure examples of the circuit MP[i, j] that can be used in the arithmetic circuit 150 will be described.

Figure 19A:
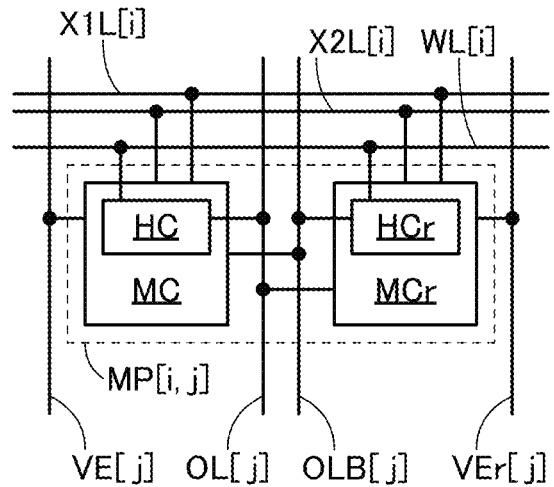
FIG. 19A to FIG. 19E are circuit diagrams illustrating structure examples of a circuit included in a semiconductor device.

FIG. 19A illustrates a structure example of the circuit MP[i, j] that can be used for the arithmetic circuit 150. Specifically, the circuit MP[i, j] in FIG. 19A is a circuit in which the structure of the circuit MP[i, j] in FIG. 13A is changed, and has a structure in which the wiring IL[j] and the wiring OL[j] are combined into one wiring and the wiring ILB[j] and the wiring OLB[j] are combined into one wiring in the circuit MP[i, j] in FIG. 13A. Thus, for the circuit MP[i, j] in FIG. 19A, refer to the description of the circuit MP[i, j] in FIG. 13A.

Next, a modification example of the circuit MP[i, j] in FIG. 19A is described. Note that in the modification example of the circuit MP[i, j], differences from the circuit MP[i, j] in FIG. 19A are mainly described and the description of portions common to the circuit MP[i, j] in FIG. 19A is sometimes omitted.

Figure 19B:
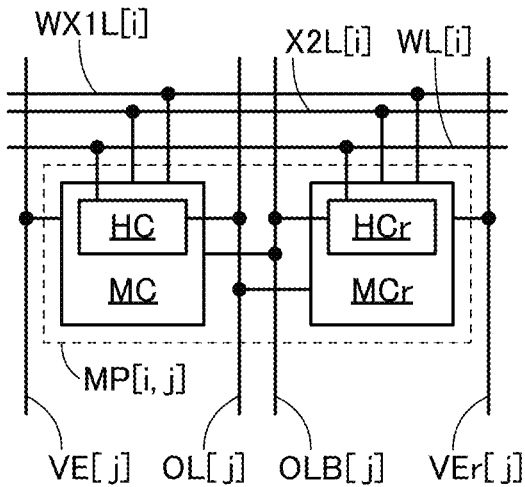

The circuit MP[i, j] illustrated in FIG. 19B has a structure in which the wiring X1L[i] in the circuit MP[i, j] in FIG. 19A is replaced with a wiring WX1L[i]. That is, in the circuit MP[i, j] in FIG. 19B, the wiring WX1L[i] and the wiring WL[i] each function as a wiring for supplying a predetermined potential to switch electrical continuity and discontinuity between the wiring OL[j] and the holding portion HC and to switch electrical continuity and discontinuity between the wiring OLB[j] and the holding portion HCr. In addition, in the circuit MP[i, j] in FIG. 19B, the wiring WX1L[i] and the wiring X2L[i] each function as a wiring for supplying current, voltage, or the like corresponding to the second data $z_i^{(k-1)}$ to be input to the circuit MP[i, j]. Note that a specific circuit structure of FIG. 19B will be described in Embodiment 3.

Figure 19C:
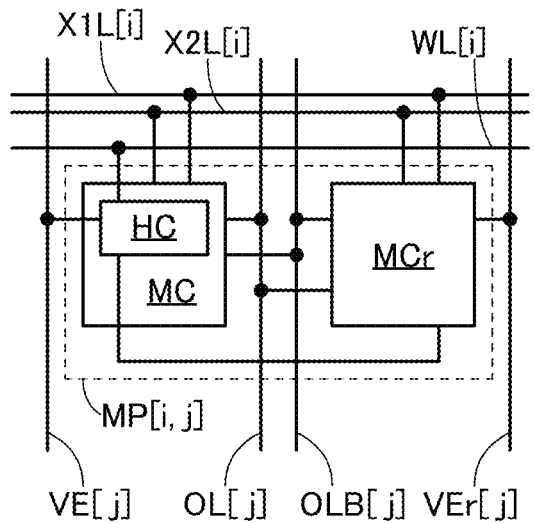

Next, a modification example of the circuit MP[i, j] in FIG. 19A, which is different from that in FIG. 19B, is described. The circuit MP[i, j] illustrated in FIG. 19C is a modification example of the circuit MP[i, j] in FIG. 19A. The circuit MP[i, j] in FIG. 19C includes the circuit MC and the circuit MCr like the circuit MP[i, j] in FIG. 19A. Note that the circuit MP[i, j] in FIG. 19C is different from the circuit MP[i, j] in FIG. 19A in that the holding portion HCr is not included in the circuit MCr.

Since the circuit MCr does not include the holding portion HCr, an arithmetic circuit using the circuit MP[i,j] in FIG. 19C does not necessarily include a wiring for supplying a potential to be held in the holding portion HCr. In addition, the circuit MCr is not necessarily electrically connected to the wiring WL[i].

In the circuit MP[i, j] in FIG. 19C, the holding portion HC included in the circuit MC is electrically connected to the circuit MCr. That is, the circuit MP[i, j] in FIG. 19C is configured such that the circuit MCr and the circuit MC share the holding portion HC. An inverted signal of a signal held in the holding portion HC can be supplied from the holding portion HC to the circuit MCr, for example. Accordingly, the circuit MC and the circuit MCr can perform different operations. Alternatively, it is also possible that the circuit MC and the circuit MCr have different internal circuit structures so that the circuit MC and the circuit MCr output different amounts of current in accordance with the same signal held in the holding portion HC. Here, when a potential corresponding to the first data $w_i^{(k-1)}{}_j^{(k)}$ is held in the holding portion HC and a potential corresponding to the second data $z_i^{(k-1)}$ is supplied to the wiring X1L[i] and the wiring X2L[i], the circuit MP[i, j] can output, to the wiring OL[j] and the wiring OLB[j], current corresponding to the product of the first data $w_i^{(k-1)}{}_j^{(k)}$ and the second data $z_i^{(k-1)}$. Note that a specific circuit structure of FIG. 19C will be described in Embodiment 3.

Figure 19D:
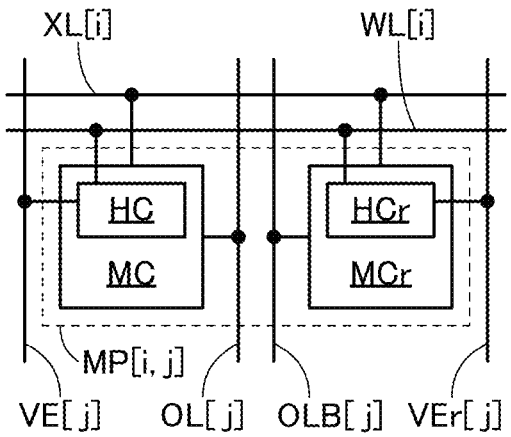

The circuit MP[i, j] illustrated in FIG. 19D is a modification example of the circuit MP[i, j] in FIG. 19A and is also a modification example of the circuit MP[i,j] in FIG. 13C. Specifically, the circuit MP[i, j] in FIG. 19D has a structure in which the wiring IL[j] and the wiring OL[j] are combined into one wiring OL[j] and the wiring ILB[j] and the wiring OLB[j] are combined into one wiring OLB[j] in FIG. 13C. Thus, for the circuit MP[i,j] in FIG. 19D, refer to the description of the circuit MP[i, j] in FIG. 13C.

Figure 19E:
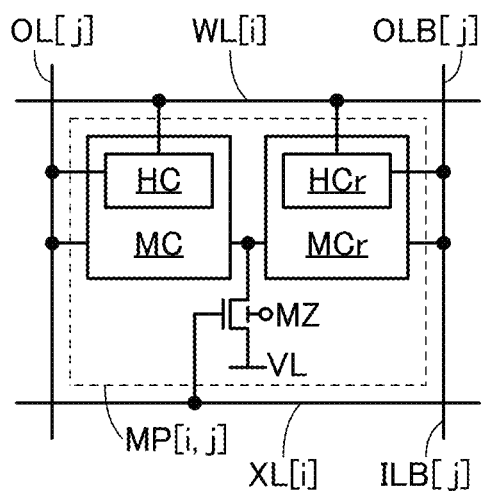

The circuit MP[i, j] illustrated in FIG. 19E is a modification example of the circuit MP[i, j] in FIG. 19A and is also a modification example of the circuit MP[i, j] in FIG. 13D. Specifically, the circuit MP[i, j] in FIG. 19D has a structure in which the wiring IL[j] and the wiring ILB[j] in FIG. 13D are not provided. Thus, for the circuit MP[i, j] in FIG. 19D, refer to the description of the circuit MP[i, j] in FIG. 13D.

Note that this embodiment can be combined with any of the other embodiments in this specification as appropriate.

Embodiment 3

This embodiment describes specific structure examples of the circuit MP described in Embodiment 1 and Embodiment 2.

Note that in Embodiment 1 and Embodiment 2, [1, 1], [i, j], [m, n], or the like which indicates a position in the array portion ALP is added to the reference numeral of the circuit MP; however, in this embodiment, the addition of [1, 1], [i, j], [m, n], or the like to the reference numeral of the circuit MP is omitted unless otherwise specified.

<Structure Example 1>

Figure 20A:
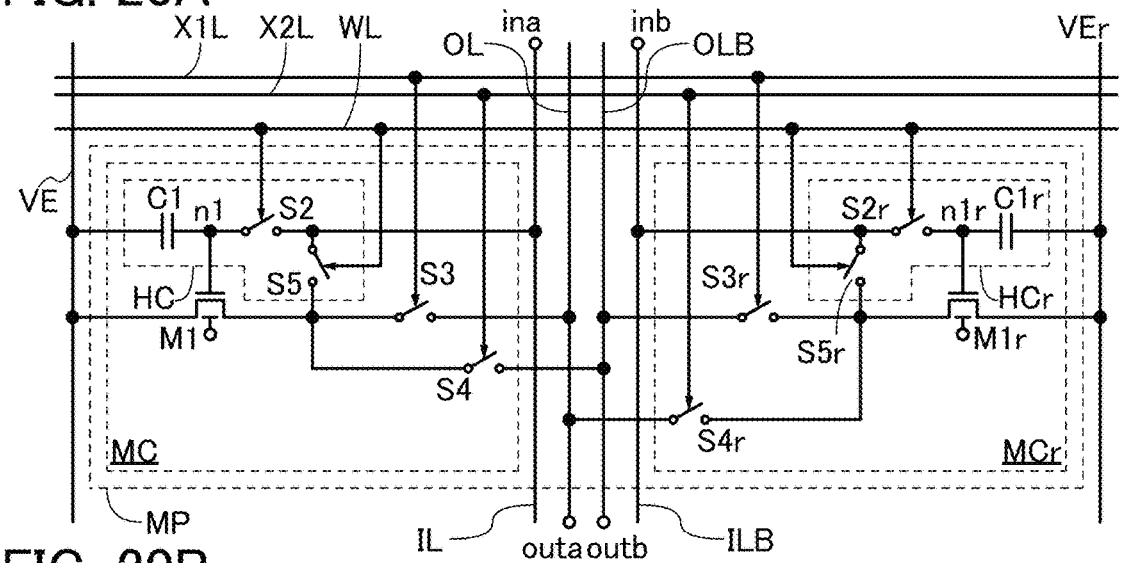
FIG. 20A to FIG. 20C are circuit diagrams illustrating structure examples of a circuit included in a semiconductor device.

First, an example of a circuit structure that can be used for the circuit MP in FIG. 13A is described. The circuit MP illustrated in FIG. 20A is an example of the structure of the circuit MP in FIG. 13A, and the circuit MC included in the circuit MP in FIG. 20A includes a transistor M1, a switch S2 to a switch S5, and a capacitor C1, for example. Note that the holding portion HC includes the switch S2, the switch S5, and the capacitor C1, for example.

Note that the switch S2 to the switch S5 may each be an electrical switch or a mechanical switch. The electrical switch may be a transistor, for example. That is, the switch S2 to the switch S5 may each be a transistor similar to the transistor M1. It is particularly preferable to use, as the switch S2, an OS transistor with an extremely low off-state current to hold a potential in a first terminal of the capacitor C1 for a long time. The OS transistor will be described in detail in Embodiment 5.

In the circuit MP in FIG. 20A, the circuit MCr has substantially the same circuit structure as the circuit MC. Thus, "r" is added to the reference numerals of the circuit elements and the like included in the circuit MCr to differentiate them from the circuit elements and the like included in the circuit MC.

Figure 20B:
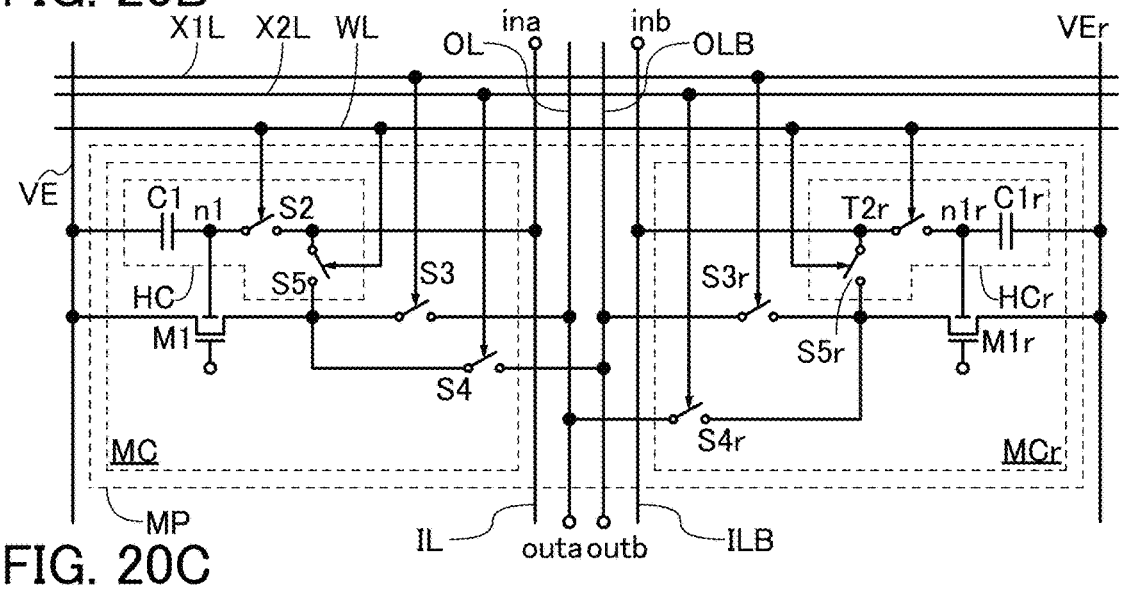

The transistor M1 illustrated in FIG. 20A is an n-channel transistor having a multi-gate structure including gates over and under a channel, and the transistor M1 includes a first gate and a second gate. Note that in this specification and the like, for convenience, the first gate is referred to as a gate (referred to as a front gate in some cases) and the second gate is referred to as a back gate so that they are distinguished from each other, for example; however, the first gate and the second gate can be interchanged with each other. Therefore, in this specification and the like, the term "gate" can be replaced with the term "back gate". Similarly, the term "back gate" can be replaced with the term "gate". As a specific example, a connection structure in which "a gate is electrically connected to a first wiring and a back gate is electrically connected to a second wiring" can be replaced with a connection structure in which "a back gate is electrically connected to a first wiring and a gate is electrically connected to a second wiring". For example, as illustrated in FIG. 20B, a structure may be employed in which the back gate of the transistor M1 is electrically connected to the first terminal of the capacitor C1 and a first terminal of the switch S2.

The semiconductor device of one embodiment of the present invention does not depend on the connection structure of a back gate of a transistor. In the transistor M1 illustrated in FIG. 20A, the back gate is illustrated and the connection structure of the back gate is not illustrated; however, a portion to which the back gate is electrically connected can be determined at the design stage. For example, in a transistor including a back gate, a gate and the back gate may be electrically connected to each other to increase the on-state current of the transistor. In other words, the gate and the back gate of the transistor M1 may be electrically connected to each other, for example. Alternatively, for example, in a transistor including a back gate, a wiring electrically connected to an external circuit or the like may be provided and a potential may be supplied to the back gate of the transistor by the external circuit or the like to change the threshold voltage of the transistor or to reduce the off-state current of the transistor. Note that the same applies to a transistor described in other parts of the specification and a transistor illustrated in other drawings, not only to that in FIG. 20A.

Figure 20C:
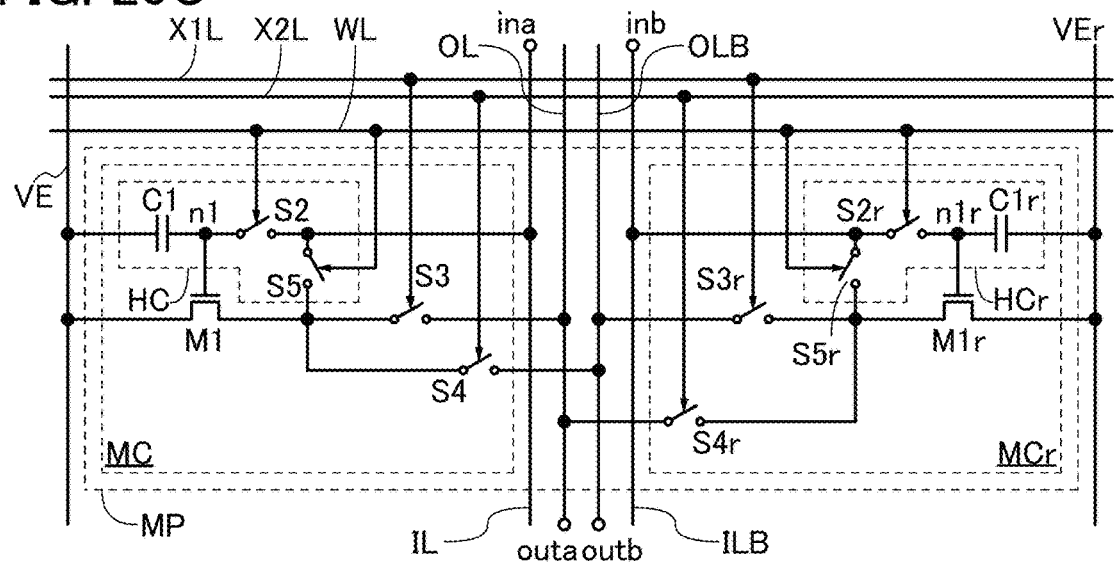

The semiconductor device of one embodiment of the present invention does not depend on the structure of a transistor included in the semiconductor device. For example, the transistor M1 illustrated in FIG. 20A may be a transistor having a structure not including a back gate, that is, a single-gate structure as illustrated in FIG. 20C. It is also possible that some transistors have a structure including a back gate and the other transistors have a structure not including a back gate. Note that the same applies to a transistor described in other parts of the specification and a transistor illustrated in other drawings, not only to that in the circuit diagram illustrated in FIG. 20A.

In this specification and the like, transistors with a variety of structures can be used as a transistor. Thus, there is no limitation on the type of transistors used. Examples of the transistor include a transistor including single crystal silicon and a transistor including a non-single-crystal semiconductor film typified by amorphous silicon, polycrystalline silicon, microcrystalline (also referred to as microcrystal, nanocrystal, or semi-amorphous) silicon, or the like. Alternatively, a thin film transistor (TFT) including a thin film of any of these semiconductors can be used, for example. The use of the TFT has various advantages. For example, since the TFT can be manufactured at a lower temperature than the case of using single crystal silicon, manufacturing costs can be reduced or a larger manufacturing apparatus can be used. Since a larger manufacturing apparatus can be used, TFTs can be manufactured over a large substrate. This enables a large number of display devices to be manufactured at a time, resulting in low cost manufacturing. Alternatively, a low manufacturing temperature allows the use of a low heat-resistance substrate. Thus, transistors can be manufactured over a light-transmitting substrate. Alternatively, transmission of light in a display element can be controlled using the transistor over a light-transmitting substrate. Alternatively, some of the films included in the transistor can transmit light because the transistor is thin. Accordingly, the aperture ratio can be improved.

For example, a transistor including a compound semiconductor (e.g., SiGe or GaAs) or an oxide semiconductor (e.g., Zn—O, In—Ga—Zn—O, In—Zn—O, In—Sn—O (ITO), Sn—O, Ti—O, Al—Zn—Sn—O (AZTO), or In—Sn—Zn—O) can be used. Alternatively, a thin film transistor including a thin film of such a compound semiconductor or oxide semiconductor can be used, for example. Accordingly, manufacturing temperature can be lowered and, for example, such a transistor can be manufactured at room temperature. As a result, the transistor can be formed directly on a substrate having low heat resistance, such as a plastic substrate or a film substrate. Note that such a compound semiconductor or oxide semiconductor can be used not only for a channel portion of the transistor but also for other applications. For example, such a compound semiconductor or oxide semiconductor can be used for a wiring, a resistor, a pixel electrode, or a light-transmitting electrode. Since such components can be deposited or formed at the same time as the transistor, the cost can be reduced.

As another example, a transistor formed by an inkjet method or a printing method can be used. The transistor can be manufactured at room temperature, manufactured at a low vacuum degree, or manufactured over a large substrate. Accordingly, the transistor can be manufactured without using a mask (reticle), so that the layout of the transistor can be easily changed. Alternatively, since the transistor can be manufactured without using a resist, the material cost is reduced, and the number of steps can be reduced. Alternatively, since a film can be formed only where needed, a material is not wasted as compared with a manufacturing method by which etching is performed after the film is formed over the entire surface; thus, the transistor can be manufactured at low cost.

As another example, a transistor containing an organic semiconductor or a carbon nanotube can be used. Thus, a transistor can be formed over a bendable substrate. A device using a transistor containing an organic semiconductor or a carbon nanotube can be highly resistant to impact.

Note that a transistor with any of a variety of other structures can also be used. For example, a MOS transistor, a junction transistor, a bipolar transistor, or the like can be used as the transistor. By using a MOS transistor as the transistor, the size of the transistor can be reduced. Thus, a large number of transistors can be mounted. By using a bipolar transistor as the transistor, a large amount of current can flow therethrough. Thus, a circuit can operate at high speed. Note that a MOS transistor and a bipolar transistor may be formed over one substrate. Thus, a reduction in power consumption, a reduction in size, high-speed operation, and the like can be achieved.

As another example, it is possible to use a transistor having a structure in which gate electrodes are placed over and under an active layer. With the structure in which the gate electrodes are placed over and under the active layer, a circuit structure is such that a plurality of transistors are connected in parallel. Thus, a channel formation region is increased, so that the amount of current can be increased. Alternatively, with the structure in which the gate electrodes are placed over and under the active layer, a depletion layer can be easily formed, so that subthreshold swing can be improved.

As another example, it is possible to use a transistor having a structure in which a gate electrode is placed over an active layer, a structure in which a gate electrode is placed under an active layer, a staggered structure, an inverted staggered structure, a structure in which a channel region is divided into a plurality of regions, a structure in which active layers are connected in parallel, a structure in which active layers are connected in series, or the like. Alternatively, a transistor can have a variety of structures such as a planar type, a FIN-type, a TRI-GATE type, a top-gate type, a bottom-gate type, and a double-gate type (with gates placed over and under a channel).

As another example, it is possible to use a transistor having a structure in which a source electrode or a drain electrode overlaps with an active layer (or part thereof). Employing the structure in which the source electrode or the drain electrode overlaps with the active layer (or part thereof) can prevent unstable operation due to charge accumulation in part of the active layer.

As another example, it is possible to use a transistor having a structure in which an LDD region is provided. By providing the LDD region, it is possible to achieve a reduction in off-state current or an increase in withstand voltage (an improvement in reliability) of the transistor. Alternatively, by providing the LDD region, in the case of operation in a saturation region, the voltage-current characteristics in which the drain current does not change much even if the drain-source voltage changes can be obtained.

In this specification and the like, a transistor can be formed using a variety of substrates, for example. The type of the substrate is not limited to a certain type. Examples of the substrate include a semiconductor substrate (e.g., a single crystal substrate or a silicon substrate), an SOI substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, and a base material film. Examples of the glass substrate include barium borosilicate glass, alumino-borosilicate glass, and soda lime glass. As examples of the flexible substrate, the attachment film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as acrylic. Other examples include polypropylene, polyester, polyvinyl fluoride, and polyvinyl chloride. Other examples include polyamide, polyimide, aramid, an epoxy resin, an inorganic vapor deposition film, and paper. In particular, the use of a semiconductor substrate, a single crystal substrate, an SOI substrate, or the like enables the manufacture of small-sized transistors with a small variation in characteristics, size, shape, or the like and with high current capability. When a circuit is formed with such transistors, lower power consumption of the circuit or higher integration of the circuit can be achieved.

Alternatively, a flexible substrate may be used as the substrate, and the transistor may be directly formed over the flexible substrate. Alternatively, a separation layer may be provided between the substrate and the transistor. After part or the whole of a semiconductor device is completed over the separation layer, the separation layer can be used for separation from the substrate and transfer to another substrate. In that case, the transistor can be transferred to even a substrate having low heat resistance or a flexible substrate. As the separation layer, a stacked-layer structure of inorganic films of a tungsten film and a silicon oxide film, or a structure in which an organic resin film of polyimide or the like is formed over a substrate can be used, for example.

In other words, the transistor may be formed using one substrate and then transferred to another substrate; thus, the transistor may be positioned over another substrate. Examples of the substrate to which the transistor is transferred include, in addition to the above-described substrates over which the transistor can be formed, a paper substrate, a cellophane substrate, an aramid film substrate, a polyimide film substrate, a stone substrate, a wood substrate, a cloth substrate (including a natural fiber (silk, cotton, or hemp), a synthetic fiber (nylon, polyurethane, or polyester), a regenerated fiber (acetate, cupro, rayon, or regenerated polyester), or the like), a leather substrate, and a rubber substrate. When such a substrate is used, forming a transistor with excellent characteristics, forming a transistor with low power consumption, manufacturing a device with high durability, providing high heat resistance, reducing weight, or reducing thickness can be achieved.

Note that all the circuits necessary to achieve a predetermined function can be formed over one substrate (e.g., a glass substrate, a plastic substrate, a single crystal substrate, or an SOI substrate). In this manner, the cost can be reduced by a reduction in the number of components or the reliability can be improved by a reduction in the number of connection points to circuit components.

Note that a structure is possible in which not all the circuits necessary to achieve a predetermined function are formed over one substrate. That is, it is possible to form part of the circuits necessary to achieve the predetermined function over a given substrate and form the other part of the circuits necessary to achieve the predetermined function over another substrate. For example, part of the circuits necessary to achieve the predetermined function can be formed over a glass substrate, and the other part of the circuits necessary to achieve the predetermined function can be formed over a single crystal substrate (or an SOI substrate). The single crystal substrate where the other part of the circuits necessary to achieve the predetermined function (also referred to as an IC chip) can be connected to the glass substrate by COG (Chip On Glass), and the IC chip can be placed over the glass substrate. Alternatively, the IC chip can be connected to the glass substrate by TAB (Tape Automated Bonding), COF (Chip On Film), or SMT (Surface Mount Technology), or using a printed circuit board, for example. When part of the circuits is formed over the same substrate as a pixel portion in this manner, the cost can be reduced by a reduction in the number of components or the reliability can be improved by a reduction in the number of connection points to circuit components. In particular, a circuit in a portion where the driving voltage is high, a circuit in a portion where the driving frequency is high, or the like consumes much power in many cases. In view of this, such a circuit is formed over a substrate (e.g., a single crystal substrate) different from a substrate where a pixel portion is formed, whereby an IC chip is formed. The use of this IC chip can prevent the increase in power consumption.

In the circuit MP in FIG. 20A, a first terminal of the transistor M1 is electrically connected to the wiring VE. A second terminal of the transistor M1 is electrically connected to a first terminal of the switch S3, a first terminal of the switch S4, and a first terminal of the switch S5. A gate of the transistor M1 is electrically connected to the first terminal of the capacitor C1 and a first terminal of the switch S2. A second terminal of the capacitor C1 is electrically connected to the wiring VE. A second terminal of the switch S2 is electrically connected to a second terminal of the switch S5 and the wiring IL. A control terminal of the switch S2 is electrically connected to the wiring WL. A second terminal of the switch S3 is electrically connected to the wiring OL, and a control terminal of the switch S3 is electrically connected to the wiring X1L. A second terminal of the switch S4 is electrically connected to the wiring OLB, and a control terminal of the switch S4 is electrically connected to the wiring X2L.

The connection structure of the circuit MCr different from that of the circuit MC is described. A second terminal of a switch S3r is electrically connected to not the wiring OL but the wiring OLB, and a second terminal of a switch S4r is electrically connected to not the wiring OLB but the wiring OL. A first terminal of a transistor M1r and a first terminal of a capacitor C1r are electrically connected to the wiring VEr.

Figure 21A:
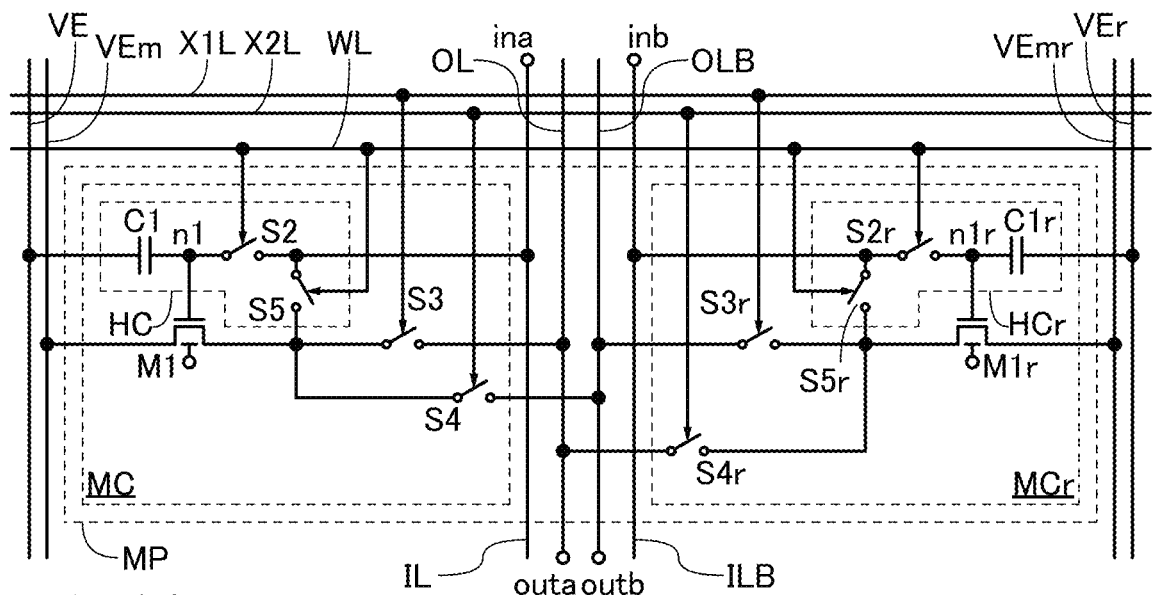
FIG. 21A and FIG. 21B are circuit diagrams illustrating structure examples of a circuit included in a semiconductor device.
Figure 21B:
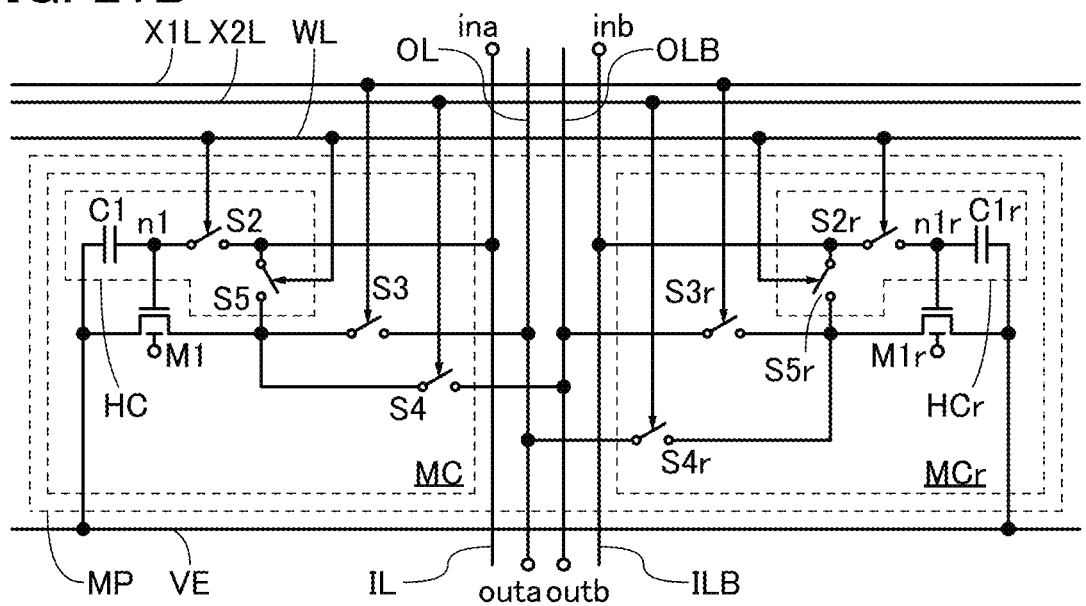

Note that the structure of the circuit MP in FIG. 20A may be changed to a structure of the circuit MP in FIG. 21A. Specifically, the first terminal of the transistor M1 may be electrically connected to not the wiring VE but another wiring VEm, and the first terminal of the transistor M1r may be electrically connected to not the wiring VEr but another wiring VEmr. Note that the first terminal of the transistor M1 may be electrically connected to not the wiring VE but another wiring VEm, and/or the first terminal of the transistor M1r may be electrically connected to not the wiring VEr but another wiring VEmr, not only in the circuit MP in FIG. 20A but also in circuit diagrams in other drawings.

Note that in the holding portion HC illustrated in FIG. 20A, an electrical connection point of the gate of the transistor M1, the first terminal of the capacitor C1, and the first terminal of the switch S2 is a node n1.

As described in Embodiment 1, the holding portion HC has a function of holding a potential corresponding to the first data, for example. The potential is held in the holding portion HC included in the circuit MC in FIG. 20A in the following manner: when the switch S2 and the switch S5 are turned on, the potential is input from the wiring IL to be written to the capacitor C1, and then the switch S2 is turned off. Thus, the potential of the node n1 can be held as the potential corresponding to the first data. At this time, current is input from the wiring OL and a potential having a level corresponding to the amount of current can be held in the capacitor C1. Thus, the influence of variations in current characteristics of the transistor M1 can be reduced.

As the transistor M1, a transistor with a low off-state current is preferably used in order to hold the potential of the node n1 for a long time. As the transistor with a low off-state current, an OS transistor can be used, for example. Alternatively, a transistor including a back gate may be used as the transistor M1, and an off-state current may be reduced by applying a low-level potential to the back gate to shift the threshold voltage to the positive side.

In order to simply describe current input to or output from the circuit MP in an operation example described below, one end of the wiring IL illustrated in FIG. 20A is referred to as a node ina, one end of the wiring OL is referred to as a node outa, one end of the wiring ILB is referred to as a node inb, and one end of the wiring OLB is referred to as a node outb.

The wiring VE functions as a wiring for supplying a constant voltage, for example. In the case where the switch S3, the switch S3r, the switch S4, or the switch S4r is an n-channel transistor, and/or in the case where a potential supplied from the wiring VSO is a high-level potential in FIG. 14A to FIG. 14C, the constant voltage can be a low-level potential VSS, a ground potential, or a low-level potential other than those, for example. In addition, the wiring VEm, the wiring VEr, and the wiring VEmr each function as a voltage line for supplying a constant voltage like the wiring VE, and the constant voltage can be a low-level potential VSS, a low-level potential other than VSS, a ground potential, or the like. Alternatively, the constant voltage may be a high-level potential VDD. In that case, the constant voltage supplied from the wiring VCN4 electrically connected to the circuit ACTF[1] to the circuit ACTF[n] is preferably a potential higher than the potential VDD supplied from the wiring VE and the wiring VEr when any of the circuits in FIG. 6A to FIG. 6C is used as the circuit IVTR (the circuit IVTRr) in the arithmetic circuit 110.

The constant voltages supplied from the wiring VE, the wiring VEm, the wiring VEr, and the wiring VEmr may be different from each other, or some or all of them may be the same. In the case where the voltages supplied from the wirings are the same, the wirings can be selected and combined into one wiring. For example, in the case where the constant voltages supplied from the wiring VE, the wiring VEm, the wiring VEr, and the wiring VEmr are almost equal to each other, the wiring VEm, the wiring VEr, and the wiring VEmr can be combined with the wiring VE, as in the circuit MP in FIG. 21B. Alternatively, for example, in the case where the constant voltages supplied from the wiring VE and the wiring VEr are almost equal to each other, the wiring VE and the wiring VEr can be combined into one wiring. Also in FIG. 21A, for example, the wiring VE and the wiring VEr may be combined into one wiring and the wiring VEm and the wiring VEmr may be combined into one wiring. Alternatively, for example, the wiring VE and the wiring VEmr may be combined into one wiring and the wiring VEm and the wiring VEr may be combined into one wiring (not illustrated).

Figure 22A:
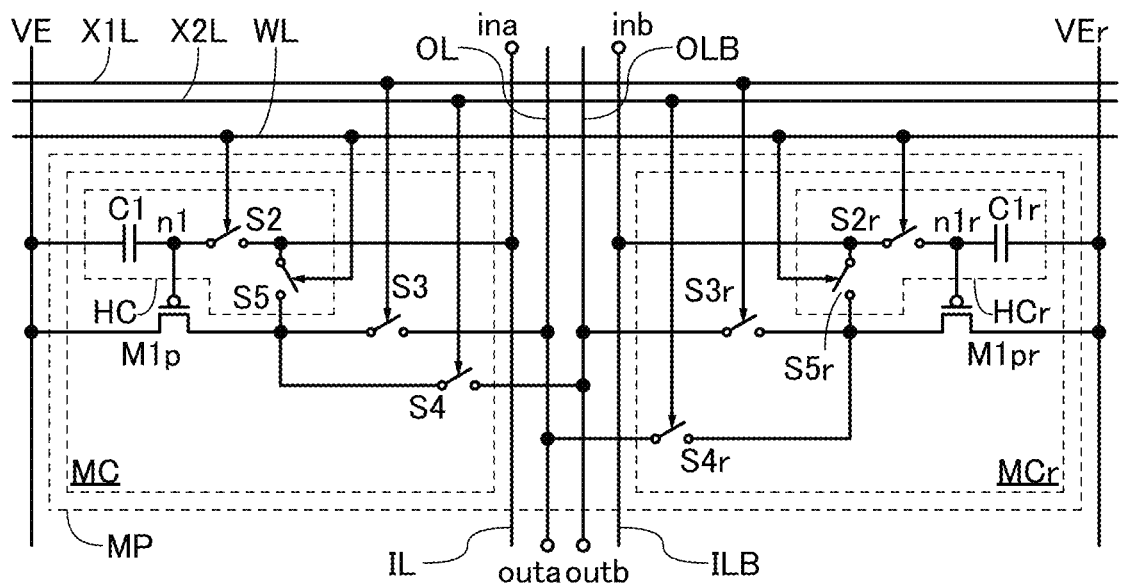
FIG. 22A and FIG. 22B are circuit diagrams illustrating structure examples of a circuit included in a semiconductor device.

The structure of the circuit MP in FIG. 20A can be changed depending on the situation. As illustrated in FIG. 22A, the transistor M1 and the transistor M1r of the circuit MP in FIG. 20A may be replaced with a transistor M1p and a transistor M1pr, which are p-channel transistors, for example. In that case, the constant voltage supplied from the wiring VE and the wiring VEr is preferably a high-level potential VDD. In the case where any of the circuits in FIG. 6A to FIG. 6C is used as the circuit IVTR and the circuit IVTRr included in the circuit ACTF[1] to the circuit ACTF[n] in the arithmetic circuit 110, in addition to the above case, the constant voltage supplied from the wiring VCN4 is preferably a ground potential or VSS. When the potential of the wiring is changed as described above, the direction in which current flows is also changed.

Figure 22B:
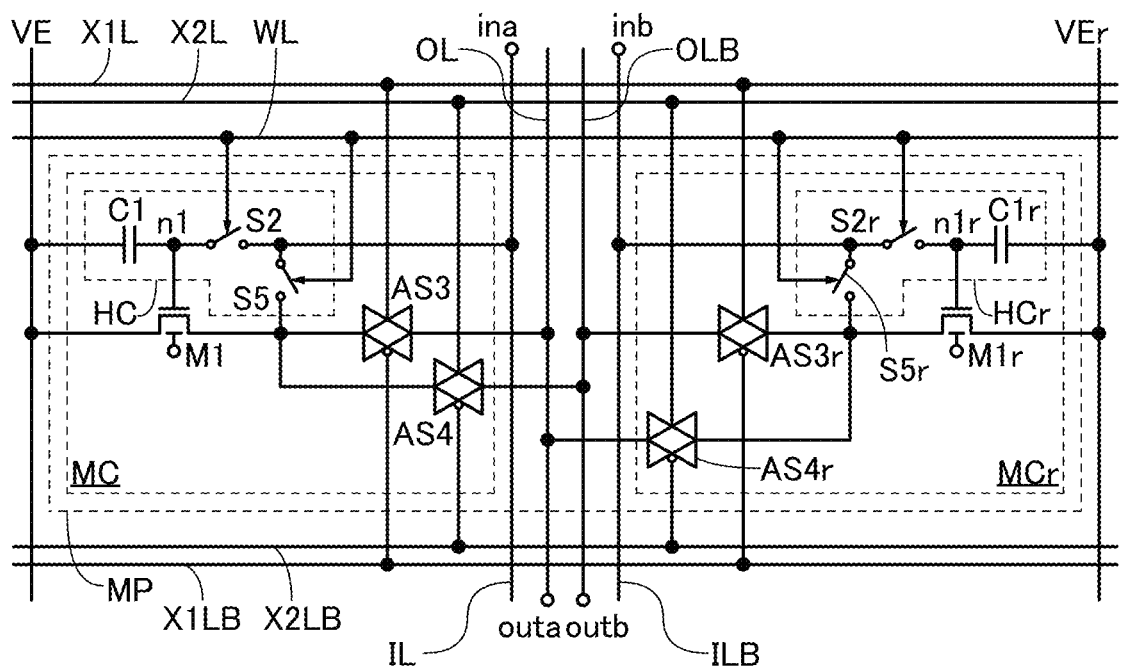

Alternatively, as illustrated in FIG. 22B, the switch S3, the switch S3r, the switch S4, and the switch S4r of the circuit MP in FIG. 20A may be replaced with an analog switch AS3, an analog switch AS4, an analog switch AS3r, and an analog switch AS4r, for example. Note that FIG. 22B also illustrates a wiring X1LB and a wiring X2LB for driving the analog switch AS3, the analog switch AS4, the analog switch AS3r, and the analog switch AS4r. The wiring X1LB is electrically connected to the analog switch AS3 and the analog switch AS3r, and the wiring X2LB is electrically connected to the analog switch AS4 and the analog switch AS4r. An inverted signal of a signal input to the wiring X1L is input to the wiring X1LB, and an inverted signal of a signal input to the wiring X2L is input to the wiring X2LB. The wiring X1L and the wiring X2L may be combined into one wiring, and the wirings X1LB and X2LB may be combined into one wiring (not illustrated). Note that for example, a CMOS structure in which an n-channel transistor and a p-channel transistor are used may be employed for the analog switch AS3, the analog switch AS4, the analog switch AS3r, and the analog switch AS4r.

In the case where transistors are used as the switch S3, the switch S3r, the switch S4, and the switch S4r illustrated in FIG. 20A to FIG. 20C, FIG. 21A, FIG. 21B, and FIG. 22A, the sizes, e.g., the channel lengths and the channel widths of the transistors are preferably equal to each other. Such a circuit structure might enable efficient layout. In addition, there is a possibility that currents flowing through the switch S3, the switch S3r, the switch S4, and the switch S4r can be equal to each other. Similarly, the sizes of the transistor M1 and the transistor M1r illustrated in FIG. 20A to FIG. 20C, FIG. 21A, and FIG. 21B are preferably equal to each other. Similarly, in the case where transistors are used as the switch S2 and the switch S2r illustrated in FIG. 20A to FIG. 20C, FIG. 21A, and FIG. 21B, the sizes of the transistors are preferably equal to each other.

<<Operation Example 1>>

Next, the operation example of the circuit MP illustrated in FIG. 20A is described. Each of FIG. 23A to FIG. 23C, FIG. 24A to FIG. 24C, and FIG. 25A to FIG. 25C is a timing chart showing an operation example of the circuit MP, and shows changes in the potentials of the wiring WL, the wiring X1L, the wiring X2L, the node n1, and the node n1r. Note that "high" shown in each of FIG. 23A to FIG. 23C, FIG. 24A to FIG. 24C, and FIG. 25A to FIG. 25C represents a high-level potential, and "low" represents a low-level potential. In this operation example, the amount of current input from the node ina to the wiring IL (or from the wiring IL to the node ina) is set to $I_{IL}$, and the amount of current input from the node inb to the wiring ILB (or from the wiring ILB to the node inb) is set to $I_{ILB}$. In addition, the amount of current output from the wiring OL to the node outa (or from the node outa to the wiring OL) is set to $I_{OL}$, and the amount of current output from the wiring OLB to the node outb (or from the node outb to the wiring OLB) is set to $I_{OLB}$. In the timing charts shown in FIG. 23A to FIG. 23C, FIG. 24A to FIG. 24C, and FIG. 25A to FIG. 25C, the amounts of change in the amounts of current $I_{IL}$, $I_{ILB}$, $I_{OL}$, and $I_{OLB}$ are also shown.

In this operation example, the constant voltages supplied from the wiring VE, the wiring VEm, the wiring VEr, and the wiring VEmr are each VSS (a low-level potential). In this case, in FIG. 14A, a high-level potential is supplied to the wiring VSO and current flows from the wiring VSO to the wiring VE or the wiring VEr through the wiring OL. Similarly, current flows from the wiring VSO to the wiring VE or the wiring VEr through the wiring OLB. Note that in the circuit structure illustrated in FIG. 14A, a potential supplied from the wiring VCN is VSS. When electrical continuity is established between the wiring VCN and the second terminal of the transistor M1, VSS is supplied to the second terminal of the transistor M1. The potential of the gate of the transistor M1 also becomes VSS at this time, and accordingly the transistor M1 is turned off, which will be described in detail later. Similarly, the potentials of a second terminal and a gate of the transistor M1r become VSS when electrical continuity is established between the wiring VCN and the second terminal of the transistor M1r, and accordingly the transistor M1r is turned off.

In this operation example, the circuit IVTR (the circuit IVTRr) included in the circuit ACTF is the circuit IVTR (the circuit IVTRr) illustrated in FIG. 6A. In the circuit IVTR (the circuit IVTRr) illustrated in FIG. 6A, a potential supplied from the wiring VCN4 is VDD.

In the circuit MP illustrated in FIG. 20A, the transistor M1 has a diode-connected structure when the switch S2 and the switch S5 are in an on state. Thus, when current flows from the wiring OL to the circuit MC, the potentials of the second terminal of the transistor M1 and the gate of the transistor M1 become almost equal to each other. The potentials are determined in accordance with the amount of current flowing from the wiring OL to the circuit MC, the potential (here, VSS) of the first terminal of the transistor M1, and the like. Here, when the potential of the gate of the transistor M1 is held in the capacitor C1 and then the switch S2 is turned off, the transistor M1 functions as a current source that supplies current corresponding to the potential of the gate of the transistor M1. Thus, the influence of variations in current characteristics of the transistor M1 can be reduced.

When current with an amount $I_1$ flows from the wiring OL to the wiring VE through the circuit MC while the switch S2 and the switch S5 are in an on state, the potential of the gate of the transistor M1 (the node n1) is $V_1$, for example. Here, the switch S2 is turned off, so that $V_1$ is held in the holding portion HC. Accordingly, the transistor M1 can make $I_1$, which is current corresponding to the potential VSS of the first terminal of the transistor M1 and the potential $V_1$ of the gate of the transistor M1, flow between a source and a drain of the transistor M1. In this specification and the like, such an operation is expressed as "the transistor M1 is set (programmed) such that the amount of current flowing between the source and the drain of the transistor M1 is $I_1$".

In this operation example, the amount of current flowing from the wiring OL to the circuit MC has three values of 0, $I_1$, and $I_2$. Thus, the amount of current set in the transistor M1 has the three values of 0, $I_1$, and $I_2$. For example, when the potential of the gate of the transistor M1 held in the holding portion HC is VSS, the potentials of the first terminal and the second terminal of the transistor M1 are each VSS, and thus the transistor M1 is turned off when the threshold voltage of the transistor M1 is higher than 0. In this case, current does not flow between the source and the drain of the transistor M1, which can be regarded that the amount of current flowing between the source and the drain of the transistor M1 is set to 0. As another example, when the potential of the gate of the transistor M1 held in the holding portion HC is $V_1$ and the threshold voltage of the transistor M1 is lower than $V_1$–VSS, the transistor M1 is turned on. Here, the amount of current flowing through the transistor M1 is $I_1$. Thus, when the potential of the gate of the transistor M1 is $V_1$, it can be regarded that the amount of current flowing between the source and the drain of the transistor M1 is set to $I_1$. As another example, when the potential of the gate of the transistor M1 held in the holding portion HC is $V_2$ and the threshold voltage of the transistor M1 is lower than $V_2$–VSS, the transistor M1 is turned on. Here, the amount of current flowing through the transistor M1 is $I_2$. Thus, when the potential of the gate of the transistor M1 is $V_2$, it can be regarded that the amount of current flowing between the source and the drain of the transistor M1 is set to $I_2$.

Note that the current amount $I_1$ is larger than 0 and smaller than $I_2$. In addition, the potential $V_1$ is higher than VSS and lower than $V_2$. Moreover, the threshold voltage of the transistor M1 is higher than 0 and lower than $V_1$–VSS. Furthermore, $I_1$ can be replaced with $I_{ut}$ generated by the constant current source circuit ISC1 in the description of FIG. 14A, for example, and $I_2$ can be replaced with $2I_{ut}$ generated by the constant current source circuit ISC2 in the description of FIG. 14A, for example.

Before the description of the operation example, the first data (e.g., a weight coefficient here) held in the circuit MP is defined as follows. When VSS is held at the node n1 of the holding portion HC and VSS is held at the node n1r of the holding portion HCr, the circuit MP holds "0" as the first data (a weight coefficient). When $V_1$ is held at the node n1 of the holding portion HC and VSS is held at the node n1r of the holding portion HCr, the circuit MP holds "+1" as the first data (a weight coefficient). When $V_2$ is held at the node n1 of the holding portion HC and VSS is held at the node n1r of the holding portion HCr, the circuit MP holds "+2" as the first data (a weight coefficient). When VSS is held at the node n1 of the holding portion HC and $V_1$ is held at the node n1r of the holding portion HCr, the circuit MP holds "−1" as the first data (a weight coefficient). When VSS is held at the node n1 of the holding portion HC and $V_2$ is held at the node n1r of the holding portion HCr, the circuit MP holds "−2" as the first data (a weight coefficient).

In addition, the second data (e.g., a value of a signal of a neuron (an arithmetic value) here) input to the circuit MP is defined as follows, for example. When a high-level potential is applied to the wiring X1L and a low-level potential is applied to the wiring X2L, "+1" is input to the circuit MP as the second data (a value of a signal of a neuron). When a low-level potential is applied to the wiring X1L and a high-level potential is applied to the wiring X2L, "−1" is input to the circuit MP as the second data (a value of a signal of a neuron). When a low-level potential is applied to the wiring X1L and a low-level potential is applied to the wiring X2L, "0" is input to the circuit MP as the second data (a value of a signal of a neuron). Note that the high-level potential is VDD or a potential higher than VDD by 10% or more or 20% or more.

In this specification and the like, unless otherwise specified, the transistor M1 and the transistor M1r in an on state may operate in a saturation region in the end. In other words, the gate voltage, the source voltage, and the drain voltage of each of the above transistors may be appropriately biased to voltages in the range where the transistor operates in a saturation region. However, one embodiment of the present invention is not limited thereto. The transistor M1 and the transistor M1r may operate in a linear region so that the amplitude value of voltage to be supplied is decreased. Note that in the case where the first data (a weight coefficient) is an analog value, for example, the transistor M1 and the transistor M1r may operate in a linear region in some cases and may operate in a saturation region in other cases depending on the magnitude of the first data (a weight coefficient).

In this specification and the like, the switch S2, the switch S2r, the switch S3, the switch S3r, the switch S4, the switch S4r, the switch S5, and the switch S5r are turned on when a high-level potential is input to their control terminals and are turned off when a low-level potential is input to their control terminals, unless otherwise specified.

Hereinafter, operation examples of the circuit MP are described for each combination of values that the first data (e.g., a weight coefficient below) and the second data (e.g., a value of a signal of a neuron (an arithmetic value) below) can have.

[Condition 1]

First, for example, the case is considered where the first data (a weight coefficient) is "0" and the second data (a value of a signal of a neuron (an arithmetic value)) input to the circuit MP is "+1". FIG. 23A is a timing chart for the circuit MP in this case.

From Time T11 to Time T12, an initial potential is held in the holding portion HC and the holding portion HCr. In FIG. 23A, a potential higher than the potential VSS is held at the node n1 and the node n1r as the initial potential, for example.

In addition, a low-level potential is applied to the wiring WL, the wiring X1L, and the wiring X2L. Thus, the low-level potential is input to each of the control terminals of the switch S2, the switch S2r, the switch S3, the switch S3r, the switch S4, the switch S4r, the switch S5, and the switch S5r, so that the switch S2, the switch S2r, the switch S3, the switch S3r, the switch S4, the switch S4r, the switch S5, and the switch S5r are each turned off.

From Time T12 to Time T13, a high-level potential is applied to the wiring WL. Thus, a high-level potential is input to each of the control terminals of the switch S2, the switch S2r, the switch S5, and the switch S5r, so that the switch S2, the switch S2r, the switch S5, and the switch S5r are each turned on.

Although not shown in FIG. 23A, an initialization potential $V_{ini}$ is applied to each of the wiring IL and the wiring ILB. Since the switch S2, the switch S2r, the switch S5, and the switch S5r are each in an on state, the potentials of the node n1 of the holding portion HC and the node n1r of the holding portion HCr each become $V_{ini}$. That is, from Time T12 to Time T13, the potentials of the node n1 of the holding portion HC and the node n1r of the holding portion HCr are each initialized.

Note that the initialization potential $V_{ini}$ is preferably a ground potential, for example. Alternatively, the initialization potential $V_{ini}$ may be VSS, a potential higher than a ground potential, or a potential lower than a ground potential. The initialization potentials $V_{ini}$ supplied to the wiring IL and the wiring ILB may be potentials different from each other. Note that the initialization potentials $V_{ini}$ are not necessarily input to the wiring IL and the wiring ILB. Note that the period from Time T12 to Time T13 is not necessarily provided. In addition, initialization is not necessarily performed from Time T12 to Time T13. Note that FIG. 14A does not illustrate a wiring supplying the initialization potential $V_{ini}$ and a switch establishing electrical continuity between the wiring and each of the wiring IL and the wiring ILB in the circuit ILD; however, in this operation example, the circuit ILD illustrated in FIG. 14A has a function of supplying the initialization potential $V_{ini}$ to the wiring IL and the wiring ILB.

From Time T13 to Time T14, the potential VSS is input from the wiring IL to the circuit MC and the potential VSS is input from the wiring ILB to the circuit MCr. This is performed by turning on the switch SWLA and the switch SWLAB and turning off the switch SWIA and the switch SWIAB in FIG. 14A and by turning off the switch SWR3 (the switch SWR3B) in FIG. 6A. Thus, the potential of the node n1 of the holding portion HC becomes VSS and the potential of the node n1r of the holding portion HCr becomes VSS. Accordingly, the transistor M1 in the circuit MC is set such that current with the amount of 0 is supplied, and thus current does not flow from the wiring OL to the wiring VE through the circuit MC. In addition, the transistor M1r in the circuit MCr is set such that the amount of current is 0, and thus current does not flow from the wiring OLB to the wiring VEr through the circuit MCr. In other words, from Time T13 to Time T14, the transistor M1 and the transistor M1r are in an off state, and thus electrical continuity is not established between the wiring OL and the wiring VE and electrical continuity is not established between the wiring OLB and the wiring VEr.

From Time T14 to Time T15, a low-level potential is applied to the wiring WL and the wiring X1L. Thus, a low-level potential is input to each of the control terminals of the switch S2, the switch S2r, the switch S5, and the switch S5r, so that the switch S2, the switch S2r, the switch S5, and the switch S5r are each turned off. When the switch S2 and the switch S2r are turned off, the potential VSS of the node n1 of the holding portion HC is held and the potential VSS of the node n1r of the holding portion HCr is held. In addition, when the switch S5 is turned off, current does not flow from the wiring IL to the wiring VE through the circuit MC. Similarly, when the switch S5r is turned off, current does not flow from the wiring ILB to the wiring VEr through the circuit MCr. Note that from Time T14 to Time T15, the switch SWR3 and the switch SWR3B illustrated in FIG. 6A may be turned on to initialize the potentials of the wiring OL and the wiring OLB. By initializing the potentials of the wiring OL and the wiring OLB, the potentials of the wiring OL and the wiring OLB can be changed after Time T15 by current output from the circuit MP.

By the operation from Time T11 to Time T15, "0" is set as the first data (a weight coefficient) of the circuit MP. Moreover, after the first data (a weight coefficient) is set in the circuit MP, the switch SWIA, the switch SWIAB, the switch SWLA, and the switch SWLAB in FIG. 14A may be turned off. Note that after the weight coefficient is set in the circuit MP, the switch SWR3 and the switch SWR3B illustrated in FIG. 6A may be turned on to initialize the potentials of the wiring OL and the wiring OLB. After the potentials of the wiring OL and the wiring OLB are initialized, the switch SWR3 and the switch SWR3B may be turned off.

After Time T15, as "+1" that is a signal of a neuron (an arithmetic value) input to the circuit MP, a high-level potential and a low-level potential are input to the wiring X1L and the wiring X2L, respectively. In that case, the high-level potential is input to each of the control terminals of the switch S3 and the switch S3r, and the low-level potential is input to each of the control terminals of the switch S4 and the switch S4r. Thus, the switch S3 and the switch S3r are each turned on, and the switch S4 and the switch S4r are each turned off. That is, by this operation, electrical continuity is established between the circuit MC and the wiring OL and between the circuit MCr and the wiring OLB, and electrical continuity is not established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Since the transistor M1 is in an off state (is set such that the amount of current is 0), current does not flow between the wiring VE and each of the wiring OL and the wiring OLB in the circuit MC. Similarly, since the transistor M1r is in an off state (is set such that the amount of current is 0), current does not flow between the wiring VEr and each of the wirings OL and OLB in the circuit MCr. Thus, the current $I_{OL}$ output from the node outa of the wiring OL and the current $I_{OLB}$ output from the node outb of the wiring OLB do not change before and after Time T15. Consequently, the current $I_{OL}$ does not flow between the circuit AFP and the wiring OL, and the current $I_{OLB}$ does not flow between the circuit AFP and the wiring OLB.

Since the first data (a weight coefficient) is "0" and the second data (a value of a signal of a neuron (an arithmetic value)) input to the circuit MP is "+1" in this condition, the product of the first data (a weight coefficient) and the second data (a value of a signal of a neuron) obtained using Formula (1.1) is "0". The result that the product of the first data (a weight coefficient) and the second data (a value of a signal of a neuron) is "0" corresponds to the case where each of the current $I_{OL}$ and the current $I_{OLB}$ does not change after Time T15 in the operation of the circuit MP. The result that the product of the first data (a weight coefficient) and the second data (a value of a signal of a neuron) is "0" is output as the signal $z_j^{(k)}$ from the circuit AFP in FIG. 15.

Note that processing of a plurality of product-sum operations may be performed in such a manner that only the second data (a value of a signal of a neuron, an arithmetic value, or the like) is changed while the first data (e.g., a weight coefficient) once input is not updated. In this case, the update of the first data (a weight coefficient) is unnecessary, so that power consumption can be reduced. For less frequent update of the first data (a weight coefficient), the first data (a weight coefficient) needs to be held for a long time. In this case, the use of an OS transistor with a low off-state current enables the first data (a weight coefficient) to be held for a long time, for example.

[Condition 2]

Next, for example, the case is considered where the first data (a weight coefficient) is "+1" and the second data (a value of a signal of a neuron (an arithmetic value)) input to the circuit MP is "+1". FIG. 23B is a timing chart for the circuit MP in this case.

Since operation from Time T11 to Time T13 is similar to the operation from Time T11 to Time T13 in Condition 1, the description of the operation from Time T11 to Time T13 in Condition 1 is referred to.

From Time T13 to Time T14, the current with the amount $I_1$ is input from the wiring IL to the circuit MC and the potential VSS is input from the wiring ILB to the circuit MCr. This is performed by turning on the switch SWIA and the switch SWLAB and turning off the switch SWIAB and the switch SWLA in FIG. 14. Thus, the potential of the node n1 of the holding portion HC becomes Viand the potential of the node n1r of the holding portion HCr becomes VSS. Accordingly, the transistor M1 in the circuit MC is set such that the current with the amount $I_1$ is supplied, and thus the current with the amount $I_1$ is supplied from the wiring IL to the wiring VE through the circuit MC. In addition, the transistor M1r in the circuit MCr is set such that the current with the amount of 0 is supplied, and thus current does not flow from the wiring ILB to the wiring VEr through the circuit MCr.

From Time T14 to Time T15, a low-level potential is applied to the wiring WL. Thus, a low-level potential is input to each of the control terminals of the switch S2, the switch S2r, the switch S5, and the switch S5r, so that the switch S2, the switch S2r, the switch S5, and the switch S5r are each turned off. When the switch S2 and the switch S2r are turned off, the potential V of the node n1 of the holding portion HC is held and the potential VSS of the node n1r of the holding portion HCr is held. In addition, when the switch S5 is turned off, current does not flow from the wiring OL to the wiring VE through the circuit MC. Similarly, when the switch S5r is turned off, current does not flow from the wiring OLB to the wiring VEr through the circuit MCr. Note that from Time T14 to Time T15, the switch SWR3 and the switch SWR3B illustrated in FIG. 6A may be turned on to initialize the potentials of the wiring OL and the wiring OLB. By initializing the potentials of the wiring OL and the wiring OLB, the potentials of the wiring OL and the wiring OLB can be changed after Time T15 by current output from the circuit MP.

By the operation from Time T11 to Time T15, "+1" is set as the first data (a weight coefficient) of the circuit MP. Moreover, after the first data (a weight coefficient) is set in the circuit MP, the switch SWIA, the switch SWIAB, the switch SWLA, and the switch SWLAB in FIG. 14A may be turned off. Note that after the first data (a weight coefficient) is set in the circuit MP, the switch SWR3 and the switch SWR3B may be turned on to initialize the potentials of the wiring OL and the wiring OLB. After the potentials of the wiring OL and the wiring OLB are initialized, the switch SWR3 and the switch SWR3B may be turned off.

After Time T15, as "+1" that is the second data (a value of a signal of a neuron (an arithmetic value)) input to the circuit MP, a high-level potential and a low-level potential are input to the wiring X1L and the wiring X2L, respectively. In that case, the high-level potential is input to each of the control terminals of the switch S3 and the switch S3r, and the low-level potential is input to each of the control terminals of the switch S4 and the switch S4r. Thus, the switch S3 and the switch S3r are each turned on, and the switch S4 and the switch S4r are each turned off. That is, by this operation, electrical continuity is established between the circuit MC and the wiring OL and between the circuit MCr and the wiring OLB, and electrical continuity is not established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Since the switch S3 is in an on state and the transistor M1 is in an on state (is set such that current with the amount $I_1$ is supplied) in the circuit MC, current flows between the wiring OL and the wiring VE. In addition, since the switch S4 is in an off state in the circuit MC, current does not flow between the wiring OLB and the wiring VE. Meanwhile, since the switch S3r is in an on state and the transistor M1r is in an off state (is set such that current with the amount of 0 is supplied) in the circuit MCr, current does not flow between the wiring OLB and the wiring VEr. Furthermore, since the switch S4r is in an off state in the circuit MCr, current does not flow between the wiring OL and the wiring VEr. As described above, the current $I_{OL}$ output from the node outa of the wiring OL increases by $I_1$ after Time T15, and the current $I_{OLB}$ output from the node outb of the wiring OLB does not change before and after Time T15. Thus, the current $I_{OL}$ having the current amount of $I_1$ flows between the circuit AFP and the wiring OL, and the current $I_{OLB}$ does not flow between the circuit AFP and the wiring OLB.

Since the first data (a weight coefficient) is "+1" and the second data (a value of a signal of a neuron) input to the circuit MP is "+1" in this condition, the product of the first data (a weight coefficient) and the second data (a value of a signal of a neuron) obtained using Formula (1.1) is "+1". The result that the product of the first data (a weight coefficient) and the second data (a value of a signal of a neuron) is "+1" corresponds to the case where the current $I_{OL}$ increases by $I_1$ and the current $I_{OLB}$ does not change after Time T15 in the operation of the circuit MP. The result that the product of the first data (a weight coefficient) and the second data (a value of a signal of a neuron) is "+1" is output as the signal $z_j^{(k)}$ from the circuit AFP in FIG. 15.

When the current flowing from the wiring OL to the circuit MC is set to not $I_1$ but $I_2$ from Time T13 to Time T14 in this condition, $V_2$ can be held in the holding portion HC, for example. Accordingly, "+2" is set as the first data (a weight coefficient) of the circuit MP. When the first data (a weight coefficient) is "+2" and the signal of a neuron input to the circuit MP is "+1", the product of the first data (a weight coefficient) and the second data (a value of the signal of a neuron) obtained using Formula (1.1) is "+2". The result that the product of the first data (a weight coefficient) and the second data (a value of the signal of a neuron) is "+2" corresponds to the case where the current $I_{OL}$ increases by $I_2$ and the current $I_{OLB}$ does not change after Time T15 in the operation of the circuit MP. By holding VSS in the holding portion HCr of the circuit MCr and setting a current amount other than $I_1$ in the circuit MC in the above manner, a positive value other than "+1" can be set as the first data (a weight coefficient) of the circuit MP.

[Condition 3]

Next, for example, the case is considered where the first data (a weight coefficient) w is "−1" and the second data (a value of a signal of a neuron (an arithmetic value)) input to the circuit MP is "+1". FIG. 23C is a timing chart for the circuit MP in this case.

Since operation from Time T11 to Time T13 is similar to the operation from Time T11 to Time T13 in Condition 1, the description of the operation from Time T11 to Time T13 in Condition 1 is referred to.

From Time T13 to Time T14, the potential VSS is input from the wiring IL to the circuit MC and the current with the amount $I_1$ is input from the wiring ILB to the circuit MCr. This is performed by turning on the switch SWIAB and the switch SWLA and turning off the switch SWIA and the switch SWLAB in FIG. 14. Thus, the potential of the node n1 of the holding portion HC becomes VSS and the potential of the node n1r of the holding portion HCr becomes $V_1$. Accordingly, the transistor M1 in the circuit MCr is set such that the amount of current is 0, and thus current does not flow from the wiring IL to the wiring VE through the circuit MC. In addition, the transistor M1r in the circuit MCr is set such that the current with the amount $I_1$ is supplied, and thus the current with the amount $I_1$ is supplied from the wiring ILB to the wiring VEr through the circuit MCr.

From Time T14 to Time T15, a low-level potential is applied to the wiring WL. Accordingly, a low-level potential is input to each of the control terminals of the switch S2, the switch S2r, the switch S5, and the switch S5r, so that the switch S2, the switch S2r, the switch S5, and the switch S5r are each turned off. When the switch S2 and the switch S2r are turned off, the potential VSS of the node n1 of the holding portion HC is held and the potential $V_1$ of the node n1r of the holding portion HCr is held. In addition, when the switch S5 is turned off, current does not flow from the wiring OL to the wiring VE through the circuit MC. Similarly, when the switch S5r is turned off, current does not flow from the wiring OLB to the wiring VEr through the circuit MCr. Note that from Time T14 to Time T15, the switch SWR3 and the switch SWR3B illustrated in FIG. 6A may be turned on to initialize the potentials of the wiring OL and the wiring OLB. By initializing the potentials of the wiring OL and the wiring OLB, the potentials of the wiring OL and the wiring OLB can be changed after Time T15 by current output from the circuit MP.

By the operation from Time T11 to Time T15, "−1" is set as the first data (a weight coefficient) of the circuit MP. Moreover, after the first data (a weight coefficient) is set in the circuit MP, the switch SWIA, the switch SWIAB, the switch SWLA, and the switch SWLAB in FIG. 14 may be turned off. Note that after the first data (a weight coefficient) is set in the circuit MP, the switch SWR3 and the switch SWR3B may be turned on to initialize the potentials of the wiring OL and the wiring OLB. After the potentials of the wiring OL and the wiring OLB are initialized, the switch SWR3 and the switch SWR3B may be turned off.

After Time T15, as "+1" that is the second data (a signal of a neuron (an arithmetic value)) input to the circuit MP, a high-level potential and a low-level potential are input to the wiring X1L and the wiring X2L, respectively. In that case, the high-level potential is input to each of the control terminals of the switch S3 and the switch S3r, and the low-level potential is input to each of the control terminals of the switch S4 and the switch S4r. Thus, the switch S3 and the switch S3r are each turned on, and the switch S4 and the switch S4r are each turned off. That is, by this operation, electrical continuity is established between the circuit MC and the wiring OL and between the circuit MCr and the wiring OLB, and electrical continuity is not established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Note that since the switch S3 is in an on state and the transistor M1 is in an off state (is set such that current with the amount of 0 is supplied) in the circuit MC, current does not flow between the wiring OL and the wiring VE. In addition, since the switch S4 is in an off state in the circuit MC, current does not flow between the wiring OLB and the wiring VE. Meanwhile, since the switch S3r is in an on state and the transistor M1r is in an on state (is set such that current with the amount $I_1$ is supplied) in the circuit MCr, current flows between the wiring OLB and the wiring VEr. Furthermore, since the switch S4r is in an off state in the circuit MCr, current does not flow between the wiring OL and the wiring VEr. As described above, the current $I_{OL}$ output from the node outa of the wiring OL does not change before and after Time T15, and the current $I_{OLB}$ output from the node outb of the wiring OLB increases by $I_1$ after Time T15. Thus, the current $I_{OL}$ does not flow between the circuit AFP and the wiring OL, and the current $I_{OLB}$ having the current amount of $I_1$ flows between the circuit AFP and the wiring OLB.

Since the first data (a weight coefficient) is "−1" and the second data (a value of a signal of a neuron (an arithmetic value)) input to the circuit MP is "+1" in this condition, the product of the first data (a weight coefficient) and the second data (a value of a signal of a neuron) obtained using Formula (1.1) is "−1". The result that the product of the first data (a weight coefficient) and the second data (a value of a signal of a neuron) is "−1" corresponds to the case where the current $I_{OL}$ does not change and the current $I_{OLB}$ increases by $I_1$ after Time T15 in the operation of the circuit MP. The result that the product of the first data (a weight coefficient) and the second data (a value of a signal of a neuron) is "−1" is output as the signal $z_j^{(k)}$ from the circuit AFP in FIG. 15.

When the current flowing from the wiring OLB to the circuit MCr is set to not $I_1$ but $I_2$ from Time T13 to Time T14 in this condition, $V_2$ can be held in the holding portion HCr, for example. Accordingly, "−2" is set as the first data (a weight coefficient) of the circuit MP. When the first data (a weight coefficient) is set to "−2" and the second data (a value of a signal of a neuron) input to the circuit MP is set to "+1", the product of the first data (a weight coefficient) and the second data (a value of a signal of a neuron) obtained using Formula (1.1) is "−2". The result that the product of the first data (a weight coefficient) and the second data (a value of a signal of a neuron) is "−2" corresponds to the case where the current $I_{OL}$ does not change and the current $I_{OLB}$ increases by $I_2$ after Time T15 in the operation of the circuit MP. By holding VSS in the holding portion HC of the circuit MC and setting a current amount other than $I_1$ in the circuit MCr in the above manner, a positive value other than "+1" can be set as the weight coefficient of the circuit MP.

[Condition 4]

Figures 24A, 24B, 24C:
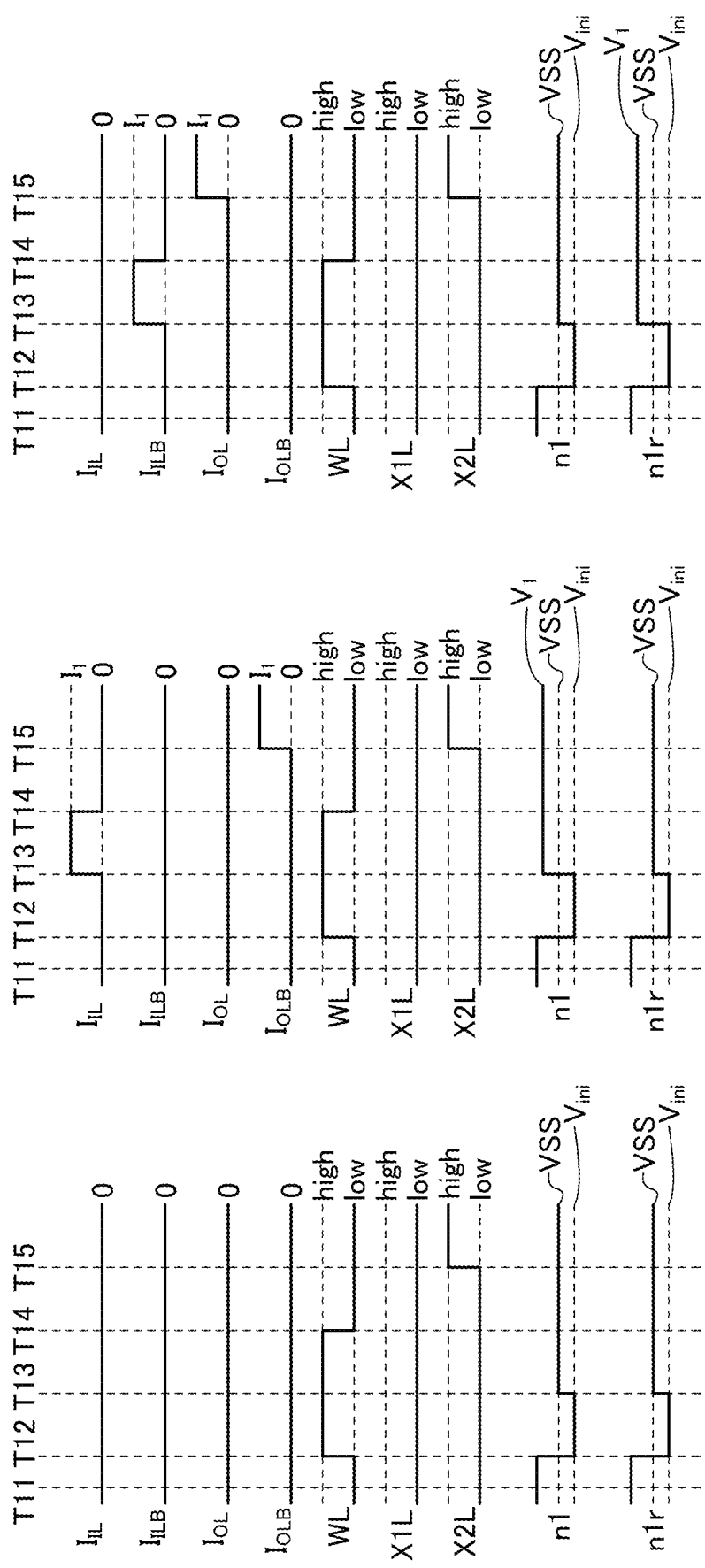
FIG. 24A to FIG. 24C are timing charts showing operation examples of a semiconductor device.

In this condition, for example, the operation of the circuit MP in the case where the first data (a weight coefficient) is "0" and the second data (a value of a signal of a neuron (an arithmetic value)) input to the circuit MP is "−1" is considered. FIG. 24A is a timing chart for the circuit MP in this case.

Since operation from Time T11 to Time T15 is similar to the operation from Time T11 to Time T15 in Condition 1, the description of the operation from Time T11 to Time T15 in Condition 1 is referred to.

After Time T15, as "−1" that is the second data (a value of a signal of a neuron (an arithmetic value)) input to the circuit MP, a low-level potential and a high-level potential are input to the wiring X1L and the wiring X2L, respectively. In that case, the low-level potential is input to each of the control terminals of the switch S3 and the switch S3r, and the high-level potential is input to each of the control terminals of the switch S4 and the switch S4r. Thus, the switch S3 and the switch S3r are each turned off, and the switch S4 and the switch S4r are each turned on. That is, by this operation, electrical continuity is not established between the circuit MC and the wiring OL and between the circuit MCr and the wiring OLB, and electrical continuity is established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Note that the transistor M1 is in an off state (is set such that the current amount is 0), current does not flow between the wiring VE and each of the wiring OL and the wiring OLB in the circuit MC. In other words, the current $I_{OL}$ output from the node outa of the wiring OL and the current $I_{OLB}$ output from the node outb of the wiring OLB do not change before and after Time T15. Similarly, the transistor M1r is in an off state (is set such that the current amount is 0), current does not flow between the wiring VEr and each of the wiring OL and the wiring OLB in the circuit MCr. In other words, the current $I_{OL}$ output from the node outa of the wiring OL and the current $I_{OLB}$ output from the node outb of the wiring OLB do not change before and after Time T15. Thus, the current $I_{OL}$ does not flow between the circuit AFP and the wiring OL, and the current $I_{OLB}$ does not flow between the circuit AFP and the wiring OLB.

Since the first data (a weight coefficient) is "0" and the second data (a value of a signal of a neuron (an arithmetic value)) input to the circuit MP is "−1" in this condition, the product of the first data (a weight coefficient) and the second data (a value of a signal of a neuron) obtained using Formula (1.1) is "0". The result that the product of the first data (a weight coefficient) and the second data (a value of a signal of a neuron) is "0" corresponds to the case where the current $I_{OL}$ and the current $I_{OLB}$ do not change after Time T15 in the operation of the circuit MP, which agrees with the result of the circuit operation in Condition 1. The result that the product of the first data (a weight coefficient) and the second data (a value of a signal of a neuron) is "0" is output as the signal $z_j^{(k)}$ from the circuit AFP in FIG. 15, as in Condition 1.

[Condition 5]

In this condition, for example, the operation of the circuit MP in the case where the first data (a weight coefficient) is "+1" and the second data (a value of a signal of a neuron (an arithmetic value)) input to the circuit MP is "−1" is considered. FIG. 24B is a timing chart for the circuit MP in this case.

Since operation from Time T11 to Time T15 is similar to the operation from Time T11 to Time T15 in Condition 2, the description of the operation from Time T11 to Time T15 in Condition 2 is referred to.

After Time T15, as "−1" that is the second data (a value of a signal of a neuron (an arithmetic value)) input to the circuit MP, a low-level potential and a high-level potential are input to the wiring X1L and the wiring X2L, respectively. In that case, the low-level potential is input to each of the control terminals of the switch S3 and the switch S3r, and the high-level potential is input to each of the control terminals of the switch S4 and the switch S4r. Thus, the switch S3 and the switch S3r are each turned off, and the switch S4 and the switch S4r are each turned on. That is, by this operation, electrical continuity is not established between the circuit MC and the wiring OL and between the circuit MCr and the wiring OLB, and electrical continuity is established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Since the switch S3 is in an off state in the circuit MC, current does not flow between the wiring OL and the wiring VE. In addition, since the switch S4 is in an on state and the transistor M1 is in an on state (is set such that current with the amount $I_1$ is supplied) in the circuit MC, current flows between the wiring OLB and the wiring VE. Meanwhile, since the switch S3r is in an off state in the circuit MCr, current does not flow between the wiring OLB and the wiring VEr. In addition, since the switch S4r is in an on state and the transistor M1 is in an off state (is set such that current with the amount of 0 is supplied) in the circuit MCr, current does not flow between the wiring OL and the wiring VEr. As described above, the current $I_{OL}$ output from the node outa of the wiring OL does not change before and after Time T15, and the current $I_{OLB}$ output from the node outb of the wiring OLB increases by $I_1$ after Time T15. Thus, the current $I_{OL}$ does not flow between the circuit AFP and the wiring OL, and the current $I_{OLB}$ having the current amount of $I_1$ flows between the circuit AFP and the wiring OLB.

Since the first data (a weight coefficient) is "+1" and the second data (a value of a signal of a neuron (an arithmetic value)) input to the circuit MP is "−1" in this condition, the product of the first data (a weight coefficient) and the second data (a value of a signal of a neuron) obtained using Formula (1.1) is "−1". The result that the product of the first data (a weight coefficient) and the second data (a value of a signal of a neuron) is "−1" corresponds to the case where the current $I_{OL}$ does not change and the current $I_{OLB}$ increases by $I_1$ after Time T15 in the operation of the circuit MP, which agrees with the result of the circuit operation in Condition 3. The result that the product of the first data (a weight coefficient) and the second data (a value of a signal of a neuron) is "−1" is output as the signal $z_j^{(k)}$ from the circuit AFP in FIG. 15, as in Condition 3.

Note that as described in Condition 2, from Time T13 to Time T14 in this condition, the current flowing from the wiring OL to the circuit MC may be set to not $I_1$ but $I_2$ to hold $V_2$ in the holding portion HC, for example. Accordingly, "+2" is set as the first data (a weight coefficient) of the circuit MP. When the first data (a weight coefficient) is "+2" and the signal of a neuron input to the circuit MP is "−1", the product of the first data (a weight coefficient) and the second data (a value of the signal of a neuron) obtained using Formula (1.1) is "−2". The result that the product of the first data (a weight coefficient) and the second data (a value of the signal of a neuron) is "−2" corresponds to the case where the current $I_{OL}$ does not change and the current $I_{OLB}$ increases by $I_2$ after Time T15 in the operation of the circuit MP. By holding VSS in the holding portion HCr of the circuit MCr and setting a current amount other than $I_1$ in the circuit MC in the above manner, a positive value other than "+1" can be set as the weight coefficient of the circuit MP.

[Condition 6]

In this condition, for example, the operation of the circuit MP in the case where the first data (a weight coefficient) is "−1" and the second data (a value of a signal of a neuron (an arithmetic value)) input to the circuit MP is "−1" is considered. FIG. 24C is a timing chart for the circuit MP in this case.

Since operation from Time T11 to Time T15 is similar to the operation from Time T11 to Time T15 in Condition 3, the description of the operation from Time T11 to Time T15 in Condition 3 is referred to.

After Time T15, as "−1" that is the second data (a value of a signal of a neuron (an arithmetic value)) input to the circuit MP, a low-level potential and a high-level potential are input to the wiring X1L and the wiring X2L, respectively. In that case, the low-level potential is input to each of the control terminals of the switch S3 and the switch S3r, and the high-level potential is input to each of the control terminals of the switch S4 and the switch S4r. Thus, the switch S3 and the switch S3r are each turned off, and the switch S4 and the switch S4r are each turned on. That is, by this operation, electrical continuity is not established between the circuit MC and the wiring OL and between the circuit MCr and the wiring OLB, and electrical continuity is established between the circuit MC and the wiring OLB and between the circuit MCr and the wiring OL. Accordingly, electrical continuity is established between the circuit MC and the circuit AFP, and electrical continuity is established between the circuit MCr and the circuit AFP.

Since the switch S3 is in an off state in the circuit MC, current does not flow between the wiring OL and the wiring VE. In addition, since the switch S4 is in an on state and the transistor M1 is in an off state (is set such that current with the amount of 0 is supplied) in the circuit MC, current does not flow between the wiring OLB and the wiring VE. Meanwhile, since the switch S3r is in an off state in the circuit MCr, current does not flow between the wiring OLB and the wiring VEr. In addition, since the switch S4r is in an on state and the transistor M1 is in an on state (is set such that current with the amount $I_1$ is supplied) in the circuit MCr, current flows between the wiring OL and the wiring VEr. As described above, the current $I_{OL}$ output from the node outa of the wiring OL increases by $I_1$ after Time T15 and the current $I_{OLB}$ output from the node outb of the wiring OLB does not change before and after Time T15. Thus, the current $I_{OL}$ having the current amount of $I_1$ flows between the circuit AFP and the wiring OL, and the current $I_{OLB}$ does not flow between the circuit AFP and the wiring OLB.

Since the first data (a weight coefficient) is "−1" and the second data (a value of a signal of a neuron (an arithmetic value)) input to the circuit MP is "−1" in this condition, the product of the first data (a weight coefficient) and the second data (a value of a signal of a neuron) obtained using Formula (1.1) is "+1". The result that the product of the first data (a weight coefficient) and the second data (a value of a signal of a neuron) is "+1" corresponds to the case where the current $I_{OL}$ changes and the current $I_{OLB}$ does not change after Time T16 in the operation of the circuit MP, which agrees with the result of the circuit operation in Condition 2. The result that the product of the first data (a weight coefficient) and the first data (a value of a signal of a neuron) is "+1" is output as the signal $z_j^{(k)}$ from the circuit AFP in FIG. 15, as in Condition 2.

Note that as described in Condition 3, from Time T13 to Time T14 in this condition, the current flowing from the wiring OLB to the circuit MCr may be set to not $I_1$ but $I_2$ to hold $V_2$ in the holding portion HC, for example. Accordingly, "−2" is set as the first data (a weight coefficient) of the circuit MP. When the first data (a weight coefficient) is "−2" and the second data (a value of a signal of a neuron) input to the circuit MP is "−1", the product of the first data (a weight coefficient) and the second data (a value of a signal of a neuron) obtained using Formula (1.1) is "+2". The result that the product of the first data (a weight coefficient) and the second data (a value of a signal of a neuron) is "+2" corresponds to the case where the current $I_{OL}$ does not change and the current $I_{OLB}$ increases by $I_2$ after Time T15 in the operation of the circuit MP. By holding VSS in the holding portion HC of the circuit MC and setting a current amount other than $I_1$ in the circuit MCr in the above manner, a positive value other than "+1" can be set as the weight coefficient of the circuit MP.

[Condition 7]

In this condition, for example, the operation of the circuit MP is considered using Condition 7 where the first data (a weight coefficient) is "0" and the second data (a value of a signal of a neuron (an arithmetic value)) input to the circuit MP is "0". FIG. 25A is a timing chart for the circuit MP in this case.

Since operation from Time T11 to Time T15 is similar to the operation from Time T11 to Time T15 in Condition 1, the description of the operation from Time T11 to Time T15 in Condition 1 is referred to.

After Time T15, as "0" that is the second data (a value of a signal of a neuron (an arithmetic value)) input to the circuit MP, a low-level potential is input to the wiring X1L and a low-level potential is input to the wiring X2L. In that case, the low-level potential is input to each of the control terminals of the switch S3, the switch S3r, the switch S4, and the switch S4r. Thus, the switch S3, the switch S3r, the switch S4, and the switch S4r are each turned off. That is, by this operation, electrical continuity is not established between the circuit MC and the wiring OL, between the circuit MCr and the wiring OLB, between the circuit MC and the wiring OLB, and between the circuit MCr and the wiring OL. Accordingly, electrical continuity is not established between the circuit MC and the circuit AFP, and electrical continuity is not established between the circuit MCr and the circuit AFP.

Thus, in the circuit MC, current does not flow between the wiring OL and one of the wiring VE and the wiring VEr regardless of the set amount of current flowing through the transistor M1. Similarly, in the circuit MCr, current does not flow between the wiring OLB and the other of the wiring VE and the wiring VEr regardless of the set amount of current flowing through the transistor Mir. In other words, the current $I_{OL}$ output from the node outa of the wiring OL and the current $I_{OLB}$ output from the node outb of the wiring OLB do not change before and after Time T15. Accordingly, the current $I_{OL}$ does not flow between the circuit AFP and the wiring OL, and the current $I_{OLB}$ does not flow between the circuit AFP and the wiring OLB.

Since the first data (a weight coefficient) is "0" and the second data (a value of a signal of a neuron (an arithmetic value)) input to the circuit MP is "0" in this condition, the product of the first data (a weight coefficient) and the second data (a value of a signal of a neuron) obtained using Formula (1.1) is "0". The result that the product of the first data (a weight coefficient) and the second data (a value of a signal of a neuron) is "0" corresponds to the case where the current $I_{OL}$ and the current $I_{OLB}$ do not change after Time T15 in the operation of the circuit MP, which agrees with the results of the circuit operations in Condition 1 and Condition 4. The result that the product of the first data (a weight coefficient) and the second data (a value of a signal of a neuron) is "0" is output as the signal $z_j^{(k)}$ from the circuit AFP in FIG. 15, as in Condition 1 and Condition 4.

[Condition 8]

In this condition, for example, the operation of the circuit MP is considered using Condition 8 where the first data (a weight coefficient) is "+1" and the second data (a value of a signal of a neuron (an arithmetic value)) input to the circuit MP is "0". FIG. 25B is a timing chart for the circuit MP in this case.

Since operation from Time T11 to Time T15 is similar to the operation from Time T11 to Time T15 in Condition 2, the description of the operation from Time T11 to Time T15 in Condition 2 is referred to.

After Time T15, as "0" that is the second data (a value of a signal of a neuron (an arithmetic value)) input to the circuit MP, a low-level potential is input to the wiring X1L and a low-level potential is input to the wiring X2L. In that case, the low-level potential is input to each of the control terminals of the switch S3, the switch S3r, the switch S4, and the switch S4r. Thus, the switch S3, the switch S3r, the switch S4, and the switch S4r are each turned off. That is, by this operation, electrical continuity is not established between the circuit MC and the wiring OL, between the circuit MCr and the wiring OLB, between the circuit MC and the wiring OLB, and between the circuit MCr and the wiring OL regardless of the set amount of current flowing through each of the transistor M1 and the transistor Mir, as in Condition 7. Accordingly, electrical continuity is not established between the circuit MC and the circuit AFP, and electrical continuity is not established between the circuit MCr and the circuit AFP. Thus, current does not flow between the wiring OL and one of the wiring VE and the wiring VEr and current does not flow between the wiring OLB and the other of the wiring VE and the wiring VEr; hence, the current $I_{OL}$ output from the node outa of the wiring OL and the current $I_{OLB}$ output from the node outb of the wiring OLB do not change before and after Time T15. Consequently, the current $I_{OL}$ does not flow between the circuit AFP and the wiring OL, and the current $I_{OLB}$ does not flow between the circuit AFP and the wiring OLB.

Since the first data (a weight coefficient) is "+1" and the second data (a signal of a neuron (an arithmetic value)) input to the circuit MP is "0" in this condition, the product of the first data (a weight coefficient) and the second data (a value of a signal of a neuron) obtained using Formula (1.1) is "0". The result that the product of the first data (a weight coefficient) and the second data (a value of a signal of a neuron) is "0" corresponds to the case where the current $I_{OL}$ and the current $I_{OLB}$ do not change after Time T15 in the operation of the circuit MP, which agrees with the results of the circuit operations in Condition 1, Condition 4, and Condition 7. The result that the product of the first data (a weight coefficient) and the second data (a value of a signal of a neuron) is "0" is output as the signal $z_1$" from the circuit AFP in FIG. 15, as in Condition 1, Condition 4, and Condition 7.

[Condition 9]

In this condition, for example, the operation of the circuit MP is considered using Condition 9 where the first data (a weight coefficient) is "−1" and the second data (a value of a signal of a neuron (an arithmetic value)) input to the circuit MP is "0". FIG. 25C is a timing chart for the circuit MP in this case.

Since operation from Time T11 to Time T15 is similar to the operation from Time T11 to Time T15 in Condition 3, the description of the operation from Time T11 to Time T15 in Condition 3 is referred to.

After Time T15, as "0" that is the second data (a value of a signal of a neuron (an arithmetic value)) input to the circuit MP, a low-level potential is input to the wiring X1L and a low-level potential is input to the wiring X2L. In that case, the low-level potential is input to each of the control terminals of the switch S3, the switch S3r, the switch S4, and the switch S4r. Thus, the switch S3, the switch S3r, the switch S4, and the switch S4r are each turned off That is, by this operation, electrical continuity is not established between the circuit MC and the wiring OL, between the circuit MCr and the wiring OLB, between the circuit MC and the wiring OLB, and between the circuit MCr and the wiring OL regardless of the set amount of current flowing through each of the transistor M1 and the transistor Mir, as in Condition 7. Accordingly, electrical continuity is not established between the circuit MC and the circuit AFP, and electrical continuity is not established between the circuit MCr and the circuit AFP. Thus, current does not flow between the wiring OL and one of the wiring VE and the wiring VEr and current does not flow between the wiring OLB and the other of the wiring VE and the wiring VEr; hence, the current $I_{OL}$ output from the node outa of the wiring OL and the current $I_{OLB}$ output from the node outb of the wiring OLB do not change before and after Time T15. Consequently, the current $I_{OL}$ does not flow between the circuit AFP and the wiring OL, and the current $I_{OLB}$ does not flow between the circuit AFP and the wiring OLB.

Since the first data (a weight coefficient) is "−1" and the second data (a value of a signal of a neuron (an arithmetic value)) input to the circuit MP is "0" in this condition, the product of the first data (a weight coefficient) and the second data (a value of a signal of a neuron) obtained using Formula (1.1) is "0". The result that the product of the first data (a weight coefficient) and the second data (a value of a signal of a neuron) is "0" corresponds to the case where the current $I_{OL}$ and the current $I_{OLB}$ do not change after Time T15 in the operation of the circuit MP, which agrees with the results of the circuit operations in Condition 1, Condition 4, Condition 7, and Condition 8. The result that the product of the first data (a weight coefficient) and the second data (a value of a signal of a neuron) is "0" is output as the signal $z_j^{(k)}$ from the circuit AFP in FIG. 15, as in Condition 1, Condition 4, Condition 7, and Condition 8.

The results of the operation examples under Condition 1 to Condition 9 described above are listed in the following table. Note that in the following table, a high-level potential is denoted by high and a low-level potential is denoted by low.

TABLE 2

| Condition coefficient | Weight | n1 | n1r | Signal | X1L | X2L | Weight coefficient × signal | Amount of change in $I_{OL}$ | Amount of change in $I_{OLB}$ |
|---|---|---|---|---|---|---|---|---|---|
| Condition 1 | 0 | VSS | VSS | +1 | high | low | 0 | 0 | 0 |
| Condition 2 | +1 | $V_1$ | VSS | +1 | high | low | +1 | $I_1$ | 0 |
| Condition 3 | −1 | VSS | $V_1$ | +1 | high | low | −1 | 0 | $I_1$ |
| Condition 4 | 0 | VSS | VSS | −1 | low | high | 0 | 0 | 0 |
| Condition 5 | +1 | $V_1$ | VSS | −1 | low | high | −1 | 0 | $I_1$ |
| Condition 6 | −1 | VSS | $V_1$ | −1 | low | high | +1 | $I_1$ | 0 |
| Condition 7 | 0 | VSS | VSS | 0 | low | low | 0 | 0 | 0 |
| Condition 8 | +1 | $V_1$ | VSS | 0 | low | low | 0 | 0 | 0 |
| Condition 9 | −1 | VSS | $V_1$ | 0 | low | low | 0 | 0 | 0 |

Here, the case where one circuit MC and one circuit MCr are connected to the wiring OL and the wiring OLB is illustrated as an example. In the case where a plurality of circuits MC and a plurality of circuits MCr are connected to the wiring OL and the wiring OLB as illustrated in FIG. 2 to FIG. 5, FIG. 8, FIG. 12, FIG. 15 to FIG. 17, and the like, currents output from the circuits MC and the circuits MCr are added in accordance with Kirchhoff's current law. Consequently, sum operation is performed. In other words, the product operation is performed in the circuits MC and the circuits MCr and the sum operation is performed by adding the currents from the plurality of circuits MC and the plurality of circuits MCr. As a result of the above, product-sum operation processing is performed.

In the operation of the circuit MP, when calculation using the first data (a weight coefficient) having only two values "+1" and "−1" and the second data (a value of a signal of a neuron) having only two values "+1" and "−1" is performed, the circuit MP can perform operation similar to that of an exclusive NOR circuit (coincidence circuit).

In the operation of the circuit MP, when calculation using the first data (a weight coefficient) having only two values "+1" and "0" and the second data (a value of a signal of a neuron) having only two values "+1" and "0" is performed, the circuit MP can perform operation similar to that of a logical product circuit In this operation example, a potential held in the holding portion HC and the holding portion HCr included in the circuit MC and the circuit MCr of the circuit MP represents a multilevel value of VSS, $V_1$, or $V_2$, for example; however, a potential representing a binary value or an analog value may be held in the holding portion HC and the holding portion HCr. For example, in the case where the first data (a weight coefficient) is a "positive analog value", a high-level analog potential is held at the node n1 of the holding portion HC and a low-level potential is held at the node n1r of the holding portion HCr. In the case where the first data (a weight coefficient) is a "negative analog value", a low-level potential is held at the node n1 of the holding portion HC and a high-level analog potential is held at the node n1r of the holding portion HCr, for example. The amount of the current $I_{OL}$ and the current $I_{OLB}$ becomes an amount corresponding to the analog potential. A potential representing an analog value may also be held in the holding portion HC and the holding portion HCr in other circuits MP described in this specification and the like without limitation to the operation example of the circuit MP in FIG. 19A.

<<Operation Example 2>>

When the circuit IVTR (the circuit IVTRr) in FIG. 6A is used as the circuit IVTR and the circuit IVTRr in the circuit ACTF[j] included in the circuit AFC or when the circuit ACTF[j] including the capacitors CRT and CRTB instead of the load LE and the load LEB in FIG. 10 is used as the circuit ACTF[j] included in the circuit AFC, the amount of current input from the wiring OL to one of the circuit MC and the circuit MCr and the amount of current input from the wiring OLB to the other of the circuit MC and the circuit MCr depend on the input time of the second data (a value of a signal of a neuron) to the circuit MP; thus, the potentials input to the first terminals of the switch SWR1 and the switch SWR1B also depend on the amounts of current. Here, the second data (a value of a signal of a neuron) is defined by the input time, so that the second data (a value of a signal of a neuron) can be input to the circuit MP as information of a multilevel value or an analog value. Accordingly, the product-sum operation of the first data and the second data that is a multilevel value or an analog value can be performed.

Timing charts in FIG. 26A to FIG. 26C each show an operation example after Time T15 in the timing chart in FIG. 23B (Condition 2). Note that the timing charts in FIG. 26A to FIG. 26C do not show the potentials of the node n1 and the node n1r but show the amount of charge $Q_{OL}$ accumulated in the first terminal of the capacitor CRT and the amount of charge $Q_{OLB}$ accumulated in the first terminal of the capacitor CRTB.

FIG. 26A shows an operation example of the arithmetic circuit 110 in the case where the input time of the second data (a value of a signal of a neuron) to the circuit MP is $t_{ut}$. In FIG. 26A, the period from Time T15 to Time T16 is the input time $t_{ut}$. In the period from Time T15 to Time T16, the second data (a value of a signal of a neuron) is input; thus, current with the amount $I_1$ flows from the wiring OL to the circuit MC. Also in this period, charge with the amount $I_1 \times t_{ut}$ is accumulated in the first terminal of the capacitor CRT. Note that in the timing chart in FIG. 26A, $I_1 \times t_{ut}$ is denoted as $Q_1$.

FIG. 26B shows an operation example of the arithmetic circuit 110 in the case where the input time of the second data (a value of a signal of a neuron) to the circuit MP is $2t_{ut}$. In FIG. 26B, the period from Time T15 to Time T16 is the input time $2t_{ut}$. As in the timing chart in FIG. 26A, in the period from Time T15 to Time T16 in the operation example shown in FIG. 26B, charge with the amount $I_1 \times 2t_{ut} = 2Q_1$ is accumulated in the first terminal of the capacitor CRT.

According to FIG. 26A and FIG. 26B, the amount of charge accumulated in the first terminal of the capacitor CRT depends on the input time of the second data (a value of a signal of a neuron). That is, the potential input to the first terminal of the switch SWR1 can be determined by the input time of the second data (a value of a signal of a neuron). Here, the absolute value of the second data (a value of a signal of a neuron) is defined by the input time; for example, the input time is set to $t_{ut}$ when the absolute value of the second data (a value of a signal of a neuron) is "1" and the input time is set to $2t_{ut}$ when the absolute value of the second data (a value of a signal of a neuron) is "2", so that the product-sum operation with the multilevel second data (a value of a signal of a neuron) can be performed.

A high-level potential is input to the wiring X1L and a low-level potential is input to the wiring X2L as the positive second data (a value of a signal of a neuron) in FIG. 26A and FIG. 26B; however, a low-level potential may be input to the wiring X1L and a high-level potential may be input to the wiring X2L as the negative second data (a value of a signal of a neuron). For example, in the operation example of FIG. 26B, when a low-level potential is input to the wiring X1L and a high-level potential is input to the wiring X2L, current does not flow from the wiring OL to the circuit MC and the circuit MCr but flows from the wiring OL to the circuit MCr and from the wiring OLB to the circuit MC; thus, $Q_{OL}$ becomes 0 and $Q_{OLB}$ becomes $2Q_1$. Alternatively, a low-level potential may be input to the wiring X1L and a low-level potential may be input to the wiring X2L as the second data (a value of a signal of a neuron) of 0. In that case, current does not flow from the wiring OL to the circuit MC and the circuit MCr and current does not flow from the wiring OLB to the circuit MC and the circuit MCr regardless of the input time of the second data (a value of a signal of a neuron); thus, $Q_{OL}$ becomes 0 and $Q_{OLB}$ becomes 0.

Although FIG. 26A and FIG. 26B show the case where "+1" is held as the first data (a weight coefficient) in the circuit MP, the operation similar to that in FIG. 26A and FIG. 26B may be performed when "−1" is held as the first data (a weight coefficient) in the circuit MP. Alternatively, the operation may be performed when "+2", "0", "−2", or the like is held as the first data (a weight coefficient). For example, in the case where "+2" is defined as the first data (a weight coefficient) by setting current flowing from the circuit MC to the wiring VE to $2I_1$ and setting the amount of current flowing from the circuit MCr to the wiring VEr to 0, the input time of the second data (a value of a signal of a neuron) is set to $2t_{ut}$ as in FIG. 26B, so that $Q_{OL}$ becomes $2I_1 \times 2t_{ut} = 4Q_1$ and $Q_{OLB}$ becomes 0. That is, the product of the multilevel first data and the multilevel second data can be calculated.

Although the product of the multilevel first data and the multilevel second data is described above, the product of the analog or multilevel first data and the analog or multilevel second data may be used. For example, in the case where the analog first data is used, current flowing from the circuit MC to the wiring VE or current flowing from the circuit MCr to the wiring VEr is not a discrete current value but a continuous current value (sometimes referred to as an analog current). For example, in the case where the analog second data is used, the input time of the second data is not discrete input time but continuous input time.

The method for inputting the second data (a value of a signal of a neuron) to the circuit MP is not limited to the operation examples in FIG. 26A and FIG. 26B. For example, as shown in FIG. 26C, the input of the second data (a value of a signal of a neuron) may be divided into a plurality of steps and separately performed between Time T15 and Time T16, between Time T16 and Time T17, and between Time T17 and Time T18. Specifically, in FIG. 26C, the input time from Time T15 to Time T16 is $t_{ut}$, the input time from Time T16 to Time T17 is $2t_{ut}$, and the input time from Time T17 to Time T18 is $4t_{ut}$, which are respectively referred to as a first subperiod, a second subperiod, and a third subperiod in this specification and the like.

In the operation example in FIG. 26C, a high-level potential is input to the wiring X1L and a low-level potential is input to the wiring X2L as an input of the second data (a value of a signal of a neuron) to the circuit MP in the first subperiod and the third subperiod. The current $I_1$ flows from the wiring OL to the circuit MC from Time T15 to Time T16 and from Time T17 to Time T18; thus, $Q_{OL}$ becomes $I_1 \times t_{ut} + I_1 \times 4t_{ut} = 5Q_1$ and $Q_{OLB}$ becomes 0.

As described above, when the first to third subperiods are selected as the input time of the second data (a value of a signal of a neuron) to the circuit MP as appropriate, the total input time can be any of 0, $t_{ut}$, $2t_{ut}$, $3t_{ut}$, $4t_{ut}$, $5t_{ut}$, $6t_{ut}$, and $7t_{ut}$. The operation example in the three subperiods of the first to third subperiods is described in FIG. 26C; however, the number of subperiods may be increased depending on circumstances.

A high-level potential is input to the wiring X1L and a low-level potential is input to the wiring X2L as the positive second data (a value of a signal of a neuron) in FIG. 26C; however, a low-level potential may be input to the wiring X1L and a high-level potential may be input to the wiring X2L as the negative second data (a value of a signal of a neuron). Alternatively, a low-level potential may be input to the wiring X1L and a low-level potential may be input to the wiring X2L as the second data (a value of a signal of a neuron) of 0.

Although FIG. 26C shows the case where "+1" is held as the first data (a weight coefficient) in the circuit MP, the operation similar to that in FIG. 26C may be performed when "−2", "−1", "0", "+2", or the like is held as the first data (a weight coefficient) in the circuit MP. Alternatively, the operation similar to that in FIG. 26C may be performed when an analog value or the like is held as the first data (a weight coefficient).

Note that this structure example can be combined with any of the other structure examples and the like described in this specification as appropriate.

<Structure Example 2>

Next, examples of a circuit structure that can be used for the circuit MP illustrated in FIG. 19B and is different from the circuit structures of FIG. 20A to FIG. 20C, FIG. 21A, and FIG. 21B will be described.

Figure 27A:
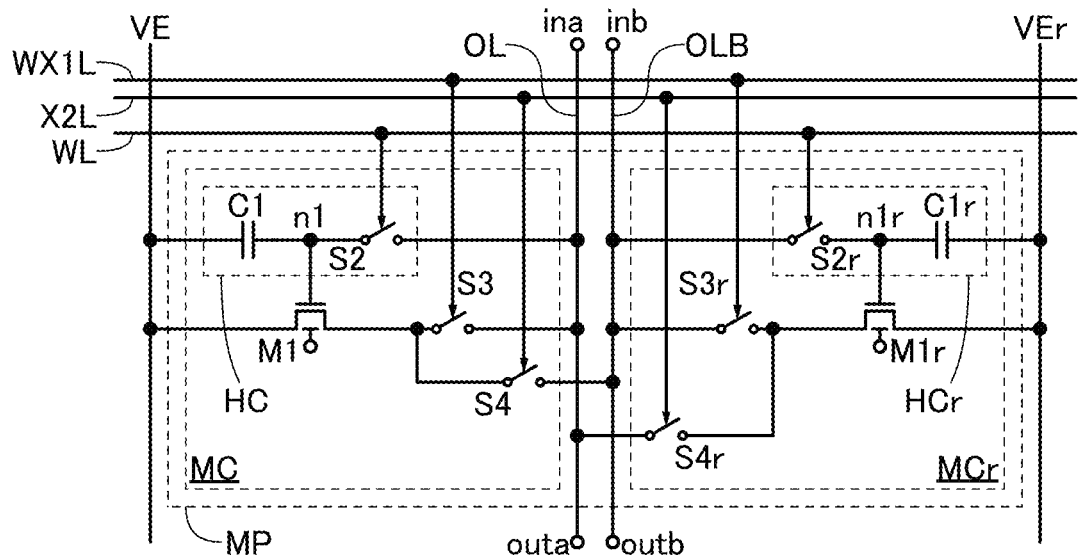
FIG. 27A and FIG. 27B are circuit diagrams illustrating structure examples of a circuit included in a semiconductor device.

The circuit MP illustrated in FIG. 27A shows a structure example of the circuit MP in FIG. 19B, and differs from the circuit MP in FIG. 20A in that the wiring IL is combined with the wiring OL, the wiring ILB is combined with the wiring OLB, and the switch S5 and the switch S5r are not provided. Thus, the second terminal of the switch S2 is electrically connected to the wiring OL and the second terminal of the switch S2r is electrically connected to the wiring OLB.

When a high-level potential is input to the wiring WX1L and the wiring X2L in the circuit MP in FIG. 27A, the transistor M1 can have a diode-connected structure. That is, in the circuit MP in FIG. 27A, the writing operation of the first data is performed by inputting a high-level potential to the wiring WX1L and the wiring X2L, supplying current with the amount corresponding to the first data from the wiring OL to the circuit MC, and supplying current with the amount corresponding to the first data from the wiring OLB to the circuit MCr. Thus, the circuit MP in FIG. 27A can perform arithmetic operation in substantially the same manner as the circuit MP in FIG. 20A.

In addition, another example of a circuit structure that can be used for the circuit MP illustrated in FIG. 19B and is different from that in FIG. 27A is described. The circuit MP illustrated in FIG. 27B shows a structure example of the circuit MP in FIG. 19B, and is different from the circuit MP in FIG. 27A in that the second terminal of the switch S2 is electrically connected to not the wiring OL but the second terminal of the transistor M1, the first terminal of the switch S3, and the first terminal of the switch S4, and that the second terminal of the switch S2r is electrically connected to not the wiring OLB but the second terminal of the transistor M1r, a first terminal of the switch S3r, and a first terminal of the switch S4r.

Figure 27B:
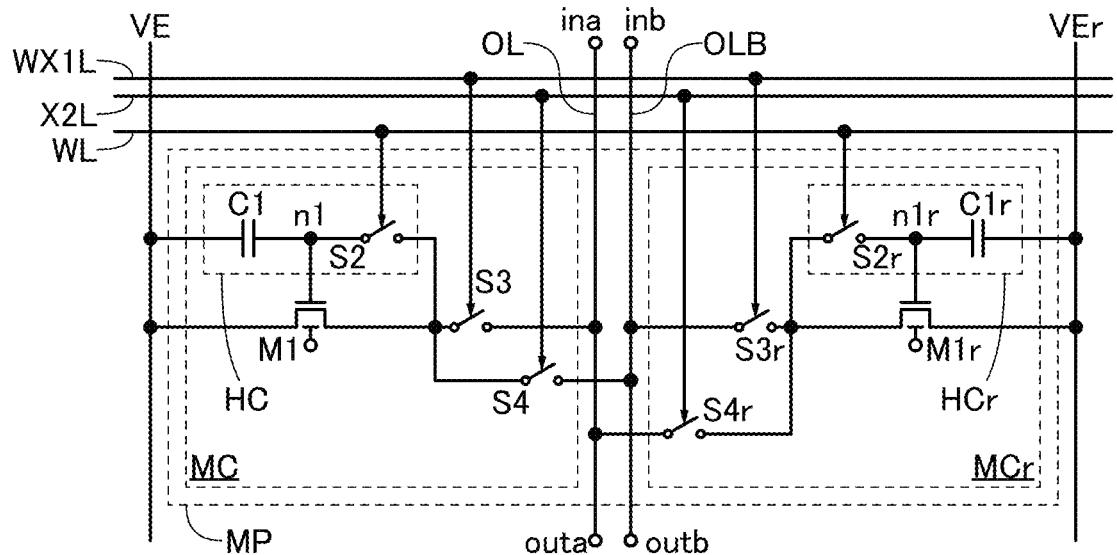

The circuit MP in FIG. 27B can operate in substantially the same manner as the circuit MP in FIG. 27A.

<Structure Example 3>

Next, examples of a circuit structure that can be used for the circuit MP illustrated in FIG. 19E will be described.

Figure 28A:
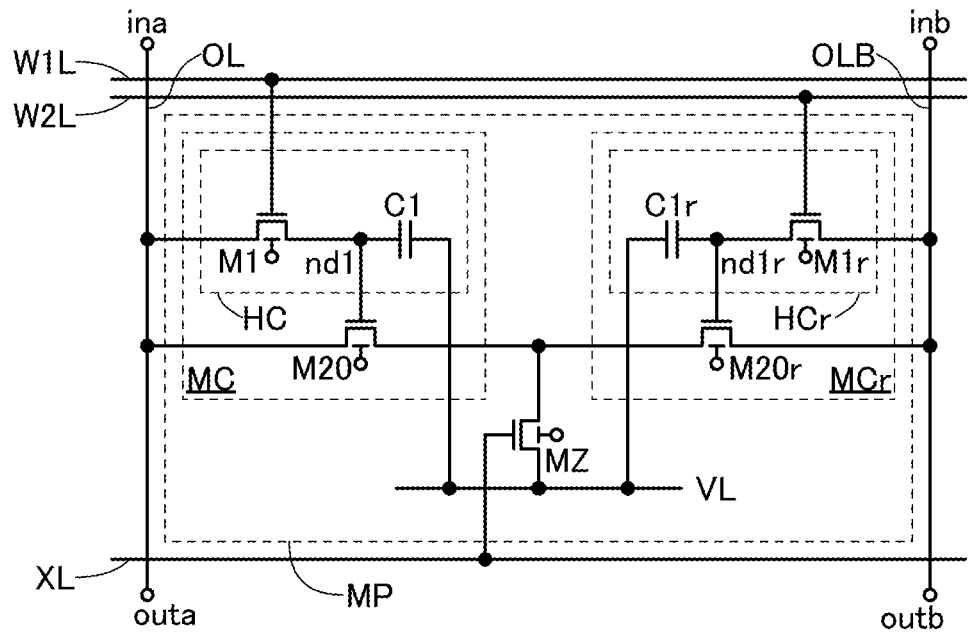
FIG. 28A and FIG. 28B are circuit diagrams illustrating structure examples of a circuit included in a semiconductor device.

The circuit MP illustrated in FIG. 28A shows a structure example of the circuit MP in FIG. 19E that can be used for the arithmetic circuit 150 in FIG. 17, for example. The circuit MP in FIG. 28A includes the circuit MC, the circuit MCr, and the transistor MZ, the circuit MC includes the holding portion HC and a transistor M20, and the circuit MCr includes the holding portion HCr and a transistor M20r. Note that the holding portion HC includes the transistor M1 and the capacitor C1, and the holding portion HCr includes the transistor M1r and the capacitor C1r.

The circuit MCr of the circuit MP in FIG. 28A has substantially the same circuit structure as the circuit MC. Thus, "r" is added to the reference numerals of the circuit elements included in the circuit MCr to differentiate them from the circuit elements included in the circuit MC.

Note that in this specification and the like, unless otherwise specified, the transistor MZ in an on state may operate in a linear region in the end. In other words, the gate voltage, the source voltage, and the drain voltage of each of the above transistors may be appropriately biased to voltages in the range where the transistor operates in the linear region.

A first terminal of the transistor M20 is electrically connected to the first terminal of the transistor MZ, a gate of the transistor M20 is electrically connected to the second terminal of the transistor M1 and the first terminal of the capacitor C1, and a second terminal of the transistor M20 is electrically connected to the wiring OL. The second terminal of the capacitor C1 is electrically connected to the wiring VL. The first terminal of the transistor M1 is electrically connected to the wiring OL.

A first terminal of the transistor M20r is electrically connected to the first terminal of the transistor MZ, a gate of the transistor M20r is electrically connected to the second terminal of the transistor M1r and a first terminal of the capacitor C1r, and a second terminal of the transistor M20r is electrically connected to the wiring OLB. A second terminal of the capacitor C1r is electrically connected to the wiring VL. The first terminal of the transistor M1 is electrically connected to the wiring OLB.

The wiring VL functions as a wiring for supplying a constant voltage, for example. The constant voltage can be a low-level potential VSS or a ground potential (GND), for example.

As in the holding portion HC and the holding portion HCr included in the circuit MP illustrated in FIG. 20A or the like, a current amount corresponding to a weight coefficient can be set in the holding portion HC and the holding portion HCr included in the circuit MP in FIG. 28A. Specifically, for example, a predetermined potential is supplied to the wiring XL so that the transistor MZ is turned on, and a predetermined potential is supplied to the wiring WL so that the transistor M1 is turned on in the holding portion HC, whereby current with the amount corresponding to the weight coefficient is supplied from the wiring OL to the first terminal of the capacitor C1 and the second terminal of the transistor M20. At this time, the transistor M20 is diode-connected, and thus the gate-source voltage of the transistor M20 is determined in accordance with the current amount (the amount of current flowing between the source and the drain). On the assumption that the source potential of the transistor M20 is a potential supplied from the wiring VL, the gate potential of the transistor M20 is determined. By turning off the transistor M1 here, the gate potential of the transistor M20 can be held. Similarly, in the holding portion HCr, the current with the amount corresponding to the weight coefficient is supplied from the wiring OLB to the first terminal of the capacitor C1r and the second terminal of the transistor M20r, whereby a potential corresponding to the current amount can be held in the gate of the transistor M20r.

Here, for example, the weight coefficient set in the circuit MP in FIG. 28A is "+1" when the current of $I_{ut}$ is set in the transistor M20 of the holding portion HC and current is set not to flow through the transistor M20r of the holding portion HCr; "−1" when current is set not to flow through the transistor M20 of the holding portion HC and the current of $I_{ut}$ is set in the transistor M20r of the holding portion HCr; and "0" when current is set not to flow through the transistor M20 of the holding portion HC and the transistor M20r of the holding portion HCr.

When current corresponding to a weight coefficient is set in each of the holding portion HC and the holding portion HCr, the gate potentials of the transistor M20 and the transistor M20r are determined. Here, when a potential corresponding to the value of a signal of a neuron is supplied to the wiring XL, for example, current flowing between the circuit MP and the wiring OL and/or the wiring OLB is determined. For example, when a high-level potential is supplied as the second data of "+1" to the wiring XL, the constant voltage supplied from the wiring VL is supplied to the first terminal of the transistor M20 and the first terminal of the transistor M20r. Alternatively, for example, when a low-level potential is supplied as the second data of "0" to the wiring XL, the constant voltage supplied from the wiring VL is not supplied to the first terminal of the transistor M20 and the first terminal of the transistor M20r. That is, current does not flow through the transistor M20 and the transistor M20r.

When current with the amount $I_{ut}$ is set in the transistor M20 and a potential is supplied from the wiring VL to the source of the transistor M20, the current with the amount $I_{ut}$ is supplied between the first terminal and the second terminal of the transistor M20. When current is set not to flow through the transistor M20, current does not flow between the first terminal and the second terminal of the transistor M20 even when a potential is supplied from the wiring VL to the source of the transistor M20. Similarly, when the current with the amount $I_{ut}$ is set in the transistor M20r and a potential is supplied from the wiring VL to the source of the transistor M20r, the current with the amount $I_{ut}$ is supplied between the first terminal and the second terminal of the transistor M20r. When current is set not to flow through the transistor M20r, current does not flow between the first terminal and the second terminal of the transistor M20r even when a potential is supplied from the wiring VL to the source of the transistor M20r.

That is, the summary of the above description is as follows: when the product of a weight coefficient and a value of a signal of a neuron is "+1", the current with the amount $I_{ut}$ is supplied between the circuit MC and the wiring OL and current does not flow between the circuit MCr and the wiring OLB. When the product of a weight coefficient and a value of a signal of a neuron is "−1", the current with the amount $I_{ut}$ is supplied between the circuit MCr and the wiring OLB and current does not flow between the circuit MC and the wiring OL. When the product of a weight coefficient and a value of a signal of a neuron is "0", current does not flow between the circuit MC and the wiring OL and current does not flow between the circuit MCr and the wiring OLB.

As described above, the circuit MP in FIG. 28A can calculate the product of a weight coefficient having three values "+1", "−1", and "0" and a signal of a neuron (an arithmetic value) having two values "+1" and "0". In addition, the circuit MP in FIG. 28A can calculate the product of the first data (a weight coefficient) that is a "positive multilevel value", "0", or a "negative multilevel value" and the second data (a value of a signal of a neuron) having two values "+1" and "0", by changing the current amount set in the transistor M20 and the transistor M20r, for example.

Figure 28B:
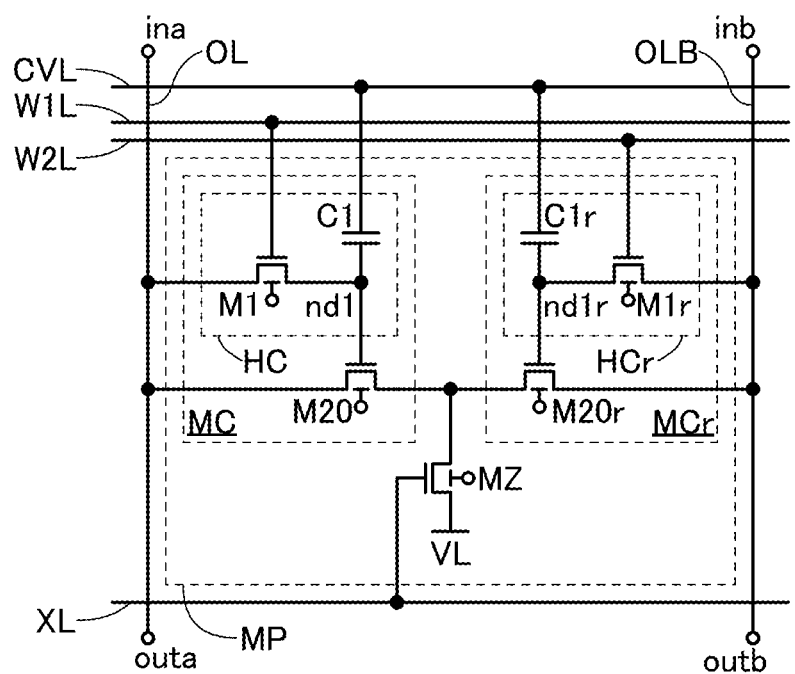

In addition, the circuit MP illustrated in FIG. 28A may be changed to the circuit MP illustrated in FIG. 28B, for example. The circuit MP illustrated in FIG. 28B is different from the circuit MP in FIG. 28A in that the second terminal of the capacitor C1 and the second terminal of the capacitor C1r are electrically connected to not the wiring VL but a wiring CVL.

The wiring CVL functions as a wiring for supplying a constant voltage, for example. The constant voltage can be, for example, a high-level potential, a low-level potential, a ground potential, or the like.

Note that this structure example can be combined with any of the other structure examples and the like described in this specification as appropriate.

Note that this embodiment can be combined with any of the other embodiments in this specification as appropriate.

Embodiment 4

Although the structure examples of the circuit MP included in the arithmetic circuit that can perform arithmetic operation of a hierarchical neural network are described in Structure example 1 of arithmetic circuit to Structure example 3 of arithmetic circuit in Embodiment 2, one embodiment of the present invention is not limited thereto. The circuit AFP, especially the circuit ACTF[j], described in Embodiment 1 can be used as a reading circuit of a memory device. In this embodiment, a structure example of a memory cell that can be used in the circuit MP of the array portion ALP when the circuit AFP is used as a reading circuit of a memory device will be described.

Figure 29A:
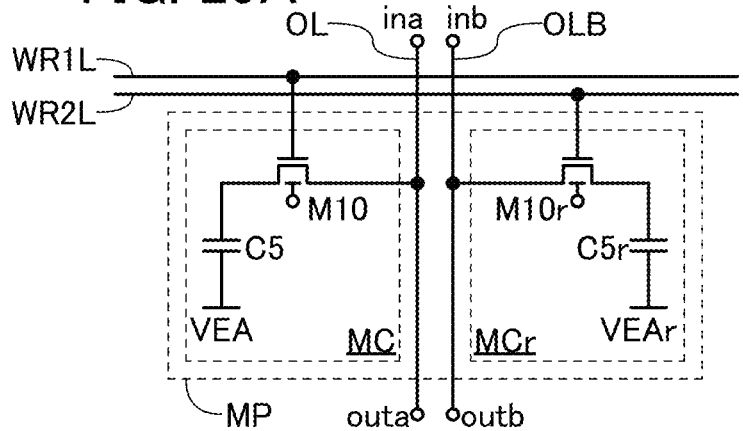
FIG. 29A to FIG. 29C are circuit diagrams illustrating structure examples of a circuit included in a semiconductor device.

The circuit MP illustrated in FIG. 29A is the circuit MP that can be used in the arithmetic circuit 150 in FIG. 17 and includes the circuit MC and the circuit MCr each including a DRAM (Dynamic Random Access Memory). The circuit MC includes a transistor M10 and a capacitor C5.

Note that in the circuit MP in FIG. 29A, the circuit MCr has substantially the same circuit structure as the circuit MC. Thus, "r" is added to the reference numerals of the circuit elements and the like included in the circuit MCr to differentiate them from the circuit elements and the like included in the circuit MC.

An OS transistor is preferably used as the transistor M10, for example. The OS transistor will be described in detail in Embodiment 5. Besides the OS transistor, a Si transistor may be used as the transistor M10. Besides the OS transistor and the Si transistor, for example, a transistor containing a compound semiconductor in an active layer, a transistor containing a carbon nanotube in an active layer, and a transistor containing an organic semiconductor in an active layer may be used as the transistor M10.

A first terminal of the transistor M10 is electrically connected to a first terminal of the capacitor C5, a second terminal of the transistor M10 is electrically connected to the wiring OL, and a gate of the transistor M10 is electrically connected to a wiring WR1L. A second terminal of the capacitor C5 is electrically connected to a wiring VEA.

In the circuit MCr, a second terminal of the transistor M10r is electrically connected to the wiring OLB. A gate of the transistor M10r is electrically connected to a wiring WR2L.

The wiring VEA and a wiring VEAr each function as a wiring for supplying a constant voltage, for example. The constant voltage can be a ground potential, a low-level potential, or the like.

The wiring WR1L functions as a wiring for switching an on state and an off state of the transistor M10, and the wiring WR2L functions as a wiring for supplying a signal for switching the on state and the off state of the transistor M10. Note that the wiring WR1L and the wiring WR2L may be combined into one wiring.

A pair of the wiring W1L and the wiring W2L can correspond to the wiring WLS of the arithmetic circuit 150 in FIG. 17.

Next, reading operation of the circuit MP in FIG. 29A will be described. Here, the reading circuit of the circuit MP is the circuit ACTF[j] illustrated in FIG. 15. In addition, information has been written in the circuit MP in FIG. 29A in advance; for example, the potential $V_0$ has been held in the first terminal of the capacitor C5 in the circuit MC and the potential $V_1$ has been held in a first terminal of a capacitor C5r in the circuit MCr. That is, the potential $V_0$ held in the circuit MC and the potential $V_1$ held in the circuit MCr are potentials corresponding to the information.

The potential $V_0$ can be, for example, a ground potential, a low-level potential (VSS), or the like. The potential $V_1$ can be, for example, a high-level potential (e.g., VDD), a digital potential, an analog potential, or the like. Note that in this description, the potential $V_0$ is a low-level potential (VSS).

In the circuit ACTF[j] in FIG. 15, a high-level potential is input to the wiring SRL1 and the wiring SRL3 to turn on the switch SWR1, the switch SWR1B, the switch SWR3, and the switch SWR3B, and the potential of the wiring VCN4 is precharged to the wiring OL, the wiring OLB, the node n5, and the node n5r. Note that the potential supplied from the wiring VCN4 here can be a low-level potential (VSS). After that, a low-level potential is input to the wiring SRL3 to turn off the switch SWR3 and the switch SWR3B.

Then, a high-level potential is input to each of the wiring WR1L and the wiring WR2L to turn on the transistor M10 and the transistor M10r. Thus, electrical continuity is established between the first terminal of the capacitor C5 and the wiring OL, and the potentials of the wiring OL and the node n5 become potentials corresponding to the potential $V_0$ and the precharged potential of the wiring VCN4. In addition, electrical continuity is established between the first terminal of the capacitor C5r and the wiring OLB, and the potentials of the wiring OLB and the node n5r become potentials corresponding to the potential $V_1$ and the precharged potential of the wiring VCN4.

The potential supplied from the wiring VCN3 is set to a ground potential and the operation from Time T04 to Time T05 in the timing chart in FIG. 9 is performed, so that a difference between the potentials read out from the circuit MC and the circuit MCr can be held in the capacitor CRE. After that, the operation from Time T06 to Time T07 is performed, so that the difference between the potentials is converted into a potential based on the ground potential. Then, the operation after Time T07 is performed to supply the potential to the terminal mbt1 of the circuit AC, so that the potential corresponding to the information held in the circuit MP can be output from the terminal mbt2 of the circuit AC.

Figure 29B:
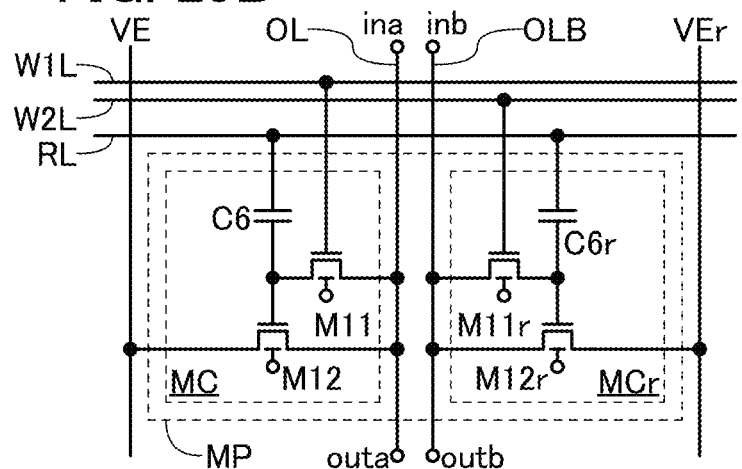

The circuit MP illustrated in FIG. 29B is the circuit MP that can be used in the arithmetic circuit 150 in FIG. 17 and includes the circuit MC and the circuit MCr each having a circuit structure called a NOSRAM (Nonvolatile Oxide Semiconductor Random Access Memory) (registered trademark). The circuit MC includes a transistor M11, a transistor M12, and a capacitor C6.

Note that in the circuit MP in FIG. 29B, the circuit MCr has substantially the same circuit structure as the circuit MC. Thus, "r" is added to the reference numerals of the circuit elements and the like included in the circuit MCr to differentiate them from the circuit elements and the like included in the circuit MC.

As the transistor M11 and the transistor M12, a transistor similar to the above-described transistor M10 can be used. For example, an OS transistor is preferably used as the transistor M11 and the transistor M12. Besides the OS transistor, a Si transistor may be used as the transistor M11 and the transistor M12. A material of a semiconductor layer may differ between the transistor M11 and the transistor M12.

A first terminal of the transistor M11 is electrically connected to a first terminal of the capacitor C6 and a gate of the transistor M12, a second terminal of the transistor M11 is electrically connected to the wiring OL, and a gate of the transistor M11 is electrically connected to the wiring W1L. A second terminal of the capacitor C6 is electrically connected to a wiring RL. A first terminal of the transistor M12 is electrically connected to the wiring OL and a second terminal of the transistor M12 is electrically connected to the wiring VE.

In the circuit MCr, a first terminal of a transistor M11r is electrically connected to the wiring OLB. In addition, a gate of the transistor M11r is electrically connected to the wiring W2L.

The wiring VE and the wiring VEr function as wirings for supplying a constant voltage, for example. The constant voltage can be a ground potential, a low-level potential, or the like. Note that in this description, the constant voltage is a low-level potential.

The wiring W1L functions as a wiring for switching an on state and an off state of the transistor M11, and the wiring W2L functions as a wiring for supplying a signal for switching an on state and an off state of the transistor M11r. Note that the wiring W1L and the wiring W2L may be combined into one wiring.

The wiring RL functions as a wiring for supplying a signal for selecting the circuit MP on which reading is performed.

A set of the wiring W1L, the wiring W2L, and the wiring RL can correspond to the wiring WLS of the arithmetic circuit 150 in FIG. 17. Alternatively, the pair of the wiring W1L and the wiring W2L can correspond to the wiring WLS of the arithmetic circuit 150 in FIG. 17, and the wiring RL can correspond to the wiring XLS of the arithmetic circuit 150 in FIG. 17. Thus, the circuit XLD of the arithmetic circuit 150 in FIG. 17 may function as a read word line driver circuit.

Next, writing operation of the circuit MP in FIG. 29B will be described. First, a high-level potential is input to the wiring RL, for example. Next, a high-level potential is input to each of the wiring W1L and the wiring W2L to turn on the transistor M11 and the transistor M11r. After that, the potentials corresponding to information to be written to the circuit MP are supplied from the wiring OL and the wiring OLB to the circuit MC and the circuit MCr. Here, for example, the potential $V_1$ is written to the circuit MC from the wiring OL, and the potential $V_0$ is written to the circuit MCr from the wiring OLB. That is, the potential $V_1$ held in the circuit MC and the potential $V_0$ held in the circuit MCr are potentials corresponding to the information. After the potentials are written to the circuit MC and the circuit MCr, a low-level potential is input to each of the wiring W1L and the wiring W2L to turn off the transistor M11 and the transistor M11r, so that the first terminal of the capacitor C6 and the first terminal of the capacitor C6r are brought into a floating state. For example, when the potential of the wiring RL is sufficiently lowered (e.g., the potential is lowered to a low-level potential), the potentials of the first terminal of the capacitor C6 and the first terminal of the capacitor C6r are lowered by capacitive coupling. Thus, the transistor M12 and the transistor M12r are turned off.

The potential $V_0$ can be, for example, a ground potential, a low-level potential (VSS), or the like. The potential $V_1$ can be, for example, a high-level potential (e.g., VDD), a digital potential, an analog potential, or the like. Note that in this description, the potential $V_0$ is a low-level potential (VSS).

Next, reading operation of the circuit MP in FIG. 29B will be described. Here, the reading circuit of the circuit MP is the circuit ACTF[j] illustrated in FIG. 15. First, a high-level potential is input to the wiring RL as in the writing operation, and the potentials of the first terminal of the capacitor C6 and the first terminal of the capacitor C6r are increased by capacitive coupling. Thus, the potentials of the first terminal of the capacitor C6 and the first terminal of the capacitor C6r can be reset to the potentials at the time of being written to the circuit MC and the circuit MCr.

Next, in the circuit ACTF[j] in FIG. 15, a high-level potential is input to the wiring SRL1 and the wiring SRL3 to turn on the switch SWR1, the switch SWR1B, the switch SWR3, and the switch SWR3B. Thus, the potentials of the wiring OL, the wiring OLB, the node n5, and the node n5r each become the potential of the wiring VCN4. Note that the potential supplied from the wiring VCN4 here can be a high-level potential (VDD). After that, a low-level potential is input to the wiring SRL3 to turn off the switch SWR3 and the switch SWR3B, so that the wiring OL and the wiring OLB are brought into a floating state. Then, a high-level potential is input to the wiring RL, and the high-level potential is applied to each of the gates of the transistor M12 and the transistor M12r. In that case, current sometimes flows between the sources and the drains of the transistor M12 and the transistor M12r. The gate of the transistor M12 has $V_1$ and the gate of the transistor M12r has $V_0$; thus, the transistor M12 is turned on and the transistor M12r is turned off. That is, current flows between the gate and the source of the transistor M12, and current does not flow between the gate and the source of the transistor M12r. Accordingly, current flows between the source and the drain of the transistor M12, so that the potentials of the wiring OL and the node n5 decrease from VDD. By contrast, current does not flow between the source and the drain of the transistor M12r, so that the potentials of the wiring OLB and the node n5r remain at VDD.

The potential supplied from the wiring VCN3 is set to a ground potential and the operation from Time T04 to Time T05 in the timing chart in FIG. 9 is performed, so that a difference between the potentials read out from the circuit MC and the circuit MCr can be held in the capacitor CRE. After that, the operation from Time T06 to Time T07 is performed, so that the difference between the potentials is converted into a potential based on the ground potential. Then, the operation after Time T07 is performed to supply the potential to the terminal mbt1 of the circuit AC, so that a digital signal corresponding to the information held in the circuit MP can be output from the terminal mbt2 of the circuit AC.

Figure 29C:
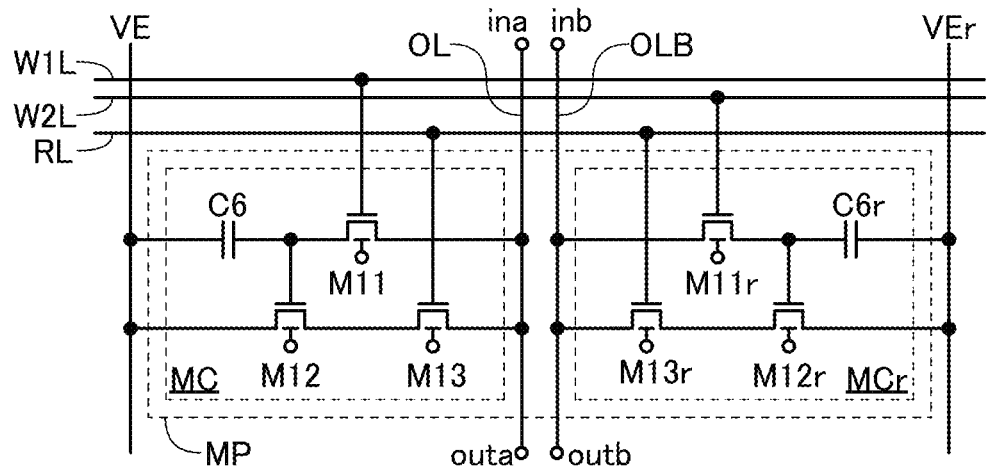

The circuit MP illustrated in FIG. 29C is the circuit MP that can be used in the arithmetic circuit 150 in FIG. 17 and includes the circuit MC and the circuit MCr each having the circuit structure called the NOSRAM (registered trademark) as in FIG. 29B. Note that the circuit MP in FIG. 29C is different from the circuit MP in FIG. 29B in the number of transistors and the connection structure, for example.

In the circuit MP in FIG. 29C, the circuit MC includes the transistor M11, the transistor M12, a transistor M13, and the capacitor C6.

As the transistor M13, a transistor similar to the above-described transistor M10 can be used. For example, an OS transistor is preferably used as the transistor M10.

The first terminal of the transistor M11 is electrically connected to the gate of the transistor M12 and the first terminal of the capacitor C6, the second terminal of the transistor M11 is electrically connected to the wiring OL, and the gate of the transistor M11 is electrically connected to the wiring W1L. The first terminal of the transistor M12 is electrically connected to the wiring VE, and the second terminal of the transistor M12 is electrically connected to a first terminal of the transistor M13. A second terminal of the transistor M13 is electrically connected to the wiring OL, and a gate of the transistor M13 is electrically connected to the wiring RL.

In the circuit MCr, a second terminal of the transistor M11r is electrically connected to the wiring OLB. The gate of the transistor M11r is electrically connected to the wiring W2L.

The wiring VE and the wiring VEr function as the wirings for supplying a constant voltage, for example. The constant voltage can be a ground potential, a low-level potential, or the like. Note that in this description, the constant voltage is a low-level potential.

The wiring W1L functions as the wiring for switching the on state and the off state of the transistor M11, and the wiring W2L functions as the wiring for supplying the signal for switching the on state and the off state of the transistor M11r. Note that the wiring W1L and the wiring W2L may be combined into one wiring.

The wiring RL functions as the wiring for supplying the signal for selecting the circuit MP on which reading is performed.

The set of the wiring W1L, the wiring W2L, and the wiring RL can correspond to the wiring WLS of the arithmetic circuit 150 in FIG. 17. Alternatively, the pair of the wiring W1L and the wiring W2L can correspond to the wiring WLS of the arithmetic circuit 150 in FIG. 17, and the wiring RL can correspond to the wiring XLS of the arithmetic circuit 150 in FIG. 17. Thus, the circuit XLD of the arithmetic circuit 150 in FIG. 17 may function as a read word line driver circuit.

Next, writing operation of the circuit MP in FIG. 29C will be described. First, a high-level potential is input to each of the wiring W1L and the wiring W2L to turn on the transistor M11 and the transistor M11r. In addition, a low-level potential is input to the wiring RL. After that, the potentials corresponding to information to be written to the circuit MP are supplied from the wiring OL and the wiring OLB to the circuit MC and the circuit MCr. Here, for example, the potential $V_1$ is written to the circuit MC from the wiring OL, and the potential $V_0$ is written to the circuit MCr from the wiring OLB. That is, the potential $V_1$ held in the circuit MC and the potential $V_0$ held in the circuit MCr are potentials corresponding to the information. After the potentials are written to the circuit MC and the circuit MCr, a low-level potential is input to each of the wiring W1L and the wiring W2L to turn off the transistor M11 and the transistor M11r, so that the first terminal of the capacitor C6 and the first terminal of the capacitor C6r are brought into a floating state.

The potential $V_0$ can be, for example, a ground potential, a low-level potential (VSS), or the like. The potential $V_1$ can be, for example, a high-level potential (e.g., VDD), a digital potential, an analog potential, or the like. Note that in this description, the potential $V_0$ is a low-level potential (VSS).

Next, reading operation of the circuit MP in FIG. 29C will be described. Here, the reading circuit of the circuit MP is the circuit ACTF[j] illustrated in FIG. 15.

In the circuit ACTF[j] in FIG. 15, a high-level potential is input to the wiring SRL1 and the wiring SRL3 to turn on the switch SWR1, the switch SWR1B, the switch SWR3, and the switch SWR3B. Thus, the potentials of the wiring OL, the wiring OLB, the node n5, and the node n5r each become the potential of the wiring VCN4. Note that the potential supplied from the wiring VCN4 here can be a high-level potential (VDD). After that, a low-level potential is input to the wiring SRL3 to turn off the switch SWR3 and the switch SWR3B, so that the wiring OL and the wiring OLB are brought into a floating state. Then, a high-level potential is input to the wiring RL, and the high-level potential is applied to each of the gates of the transistor M13 and a transistor M13r. In that case, current sometimes flows between the sources and the drains of the transistor M13 and the transistor M13r in accordance with the gate-source voltage of the transistor M13 and the transistor M13r. The gate of the transistor M12 has V i and the gate of the transistor M12r has $V_0$; thus, the transistor M12 is turned on and the transistor M12r is turned off. That is, current flows between the gate and the source of the transistor M12, and current does not flow between the gate and the source of the transistor M12r. Accordingly, current flows between the source and the drain of the transistor M12, so that the potentials of the wiring OL and the node n5 decrease from VDD. By contrast, current does not flow between the source and the drain of the transistor M12r, so that the potentials of the wiring OLB and the node n5r remain at VDD.

The potential supplied from the wiring VCN3 is set to a ground potential and the operation from Time T04 to Time T05 in the timing chart in FIG. 9 is performed, so that a difference between the potentials read out from the circuit MC and the circuit MCr can be held in the capacitor CRE. After that, the operation from Time T06 to Time T07 is performed, so that the difference between the potentials is converted into a potential based on the ground potential. Then, the operation after Time T07 is performed to supply the potential to the terminal mbt1 of the circuit AC, so that a digital signal corresponding to the information held in the circuit MP can be output from the terminal mbt2 of the circuit AC.

Figure 30A:
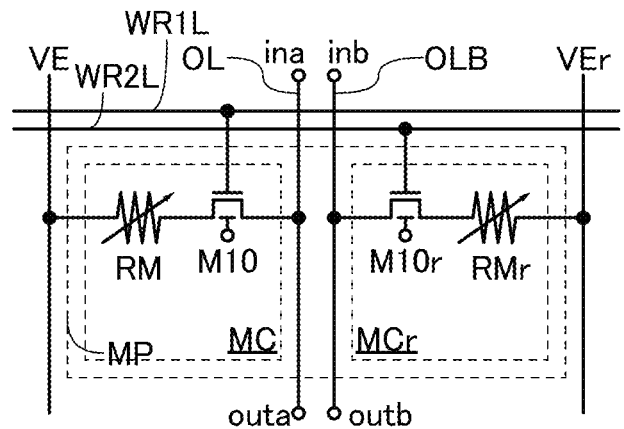
FIG. 30A to FIG. 30C are circuit diagrams illustrating structure examples of a circuit included in a semiconductor device.

The circuit MP illustrated in FIG. 30A is the circuit MP that can be used in the arithmetic circuit 150 in FIG. 17 and includes the circuit MC and the circuit MCr each including a ReRAM (Resistive Random Access Memory). The circuit MC includes the transistor M10 and a variable resistor RM.

Note that in the circuit MP in FIG. 30A, the circuit MCr has substantially the same circuit structure as the circuit MC. Thus, "r" is added to the reference numerals of the circuit elements and the like included in the circuit MCr to differentiate them from the circuit elements and the like included in the circuit MC.

The transistor M10 can have a structure similar to that of the transistor M10 included in the circuit MP described with reference to FIG. 29A, for example.

The first terminal of the transistor M10 is electrically connected to a first terminal of a variable resistor RM, the second terminal of the transistor M10 is electrically connected to the wiring OL, and the gate of the transistor M10 is electrically connected to the wiring WR1L. A second terminal of the variable resistor RM is electrically connected to the wiring VE.

In the circuit MCr, a first terminal of the transistor M10r is electrically connected to the wiring OLB. In addition, the gate of the transistor M10r is electrically connected to the wiring WR2L.

The wiring VE and the wiring VEr function as the wirings for supplying a constant voltage, for example. The constant voltage can be a ground potential, a low-level potential, or the like. Note that in this description, the constant voltage is a low-level potential.

The wiring WR1L functions as the wiring for switching the on state and the off state of the transistor M11, and the wiring WR2L functions as the wiring for supplying the signal for switching the on state and the off state of the transistor M11r. Note that the wiring WR1L and the wiring WR2L may be combined into one wiring.

A pair of the wiring WR1L and the wiring WR2L can correspond to the wiring WLS of the arithmetic circuit 150 in FIG. 17. Alternatively, the pair of the wiring WR1L and the wiring WR2L may correspond to the wiring XLS of the arithmetic circuit 150 in FIG. 17. Thus, the circuit XLD of the arithmetic circuit 150 in FIG. 17 may function as a read word line driver circuit.

The variable resistor RM is a circuit element in which a resistance value between its first terminal and second terminal is determined by voltage applied between the first terminal and the second terminal. Thus, a high-level potential is input to the wiring WR1L to turn on the transistor M10 and a potential for writing is input to the wiring OL, whereby the circuit MC can change the resistance value of the variable resistor RM. Accordingly, the circuit MC can hold information corresponding to the potential for writing. Data is read out from the circuit MC in the following manner: a high-level potential is input to the wiring WR1L to turn on the transistor M10, a potential for reading is input to the wiring OL, and the amount of current flowing from the wiring OL to the wiring VE is measured. The circuit MCr can perform writing and reading of information in a manner similar to that of the circuit MC.

Here, the case where the circuit ACTF[j] illustrated in FIG. 15 is used for reading operation of the circuit MP in FIG. 30A is described. Information has been written in the circuit MP in FIG. 30A in advance; for example, the resistance value of the variable resistor RM in the circuit MC is $R_1$ and the resistance value of a variable resistor RMr in the circuit MCr is $R_0$. That is, the resistance value $R_1$ of the variable resistor RM in the circuit MC and the resistance value $R_0$ of the variable resistor RMr in the circuit MCr are potentials corresponding to the information.

Note that the resistance value $R_1$ is lower than the resistance value $R_0$. The values possible for the resistance values $R_1$ and $R_0$ can be a binary digital value, an analog value, or the like.

The wiring OL and the wiring OLB are precharged to the potential of the wiring VCN4 in advance, and then the transistor M10 and the transistor M10r are turned on, for example, so that the information held in the circuit MP in FIG. 30A can be read out with the amount of current flowing from the wiring OL to the wiring VE through the circuit MC and the amount of current flowing from the wiring OLB to the wiring VEr through the circuit MCr. For example, the current with the amount corresponding to the resistance value $R_1$ flows from the wiring OL to the wiring VE through the circuit MC, and the current with the amount corresponding to the resistance value $R_0$ flows from the wiring OLB to the wiring VEr through the circuit MCr. The current with the amount corresponding to the resistance value $R_1$ is converted into voltage by the circuit IVTR, and the current with the amount corresponding to the resistance value $R_0$ is converted into voltage by the circuit IVTRr.

Thus, the potential supplied from the wiring VCN3 is set to a ground potential and the operation from Time T04 to Time T05 in the timing chart in FIG. 9 is performed, so that a difference between the potentials corresponding to current read out from the circuit MC and the circuit MCr can be held in the capacitor CRE. After that, the operation from Time T06 to Time T07 is performed, so that the difference between the potentials is converted into a potential based on the ground potential. Then, the operation after Time T07 is performed to supply the potential to the terminal mbt1 of the circuit AC, so that the potential corresponding to the information held in the circuit MP can be output from the terminal mbt2 of the circuit AC.

Figure 30B:
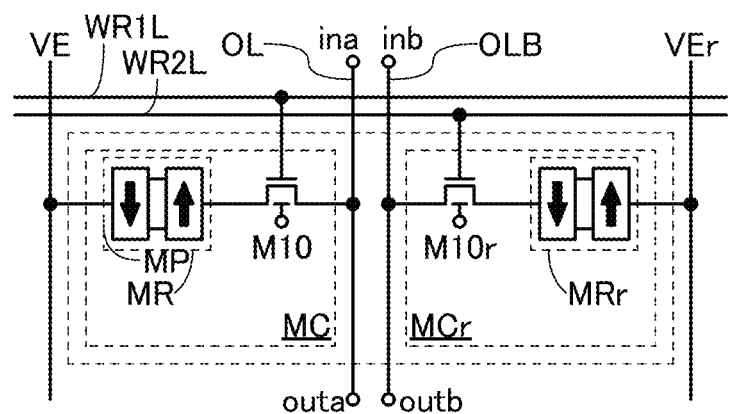
Figure 30C:
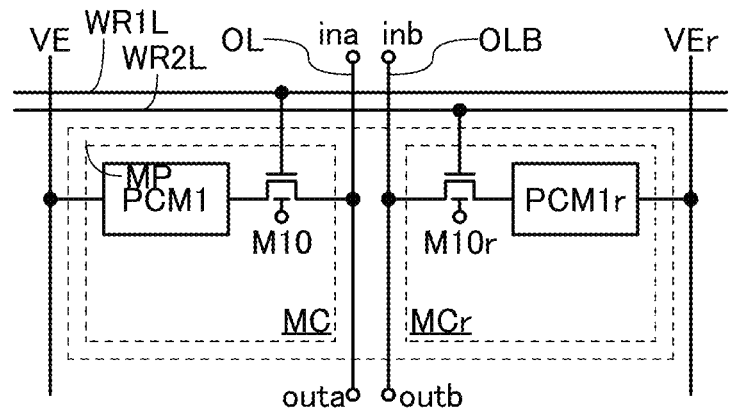

Note that an example of the structure of the circuit MP in FIG. 30A including the variable resistor is described as an example of the memory cell that can be used in the circuit MP of the array portion ALP when the circuit AFP is used as the reading circuit of a memory device; however, the circuit MP may include a different circuit element instead of the variable resistor. For example, the memory cell that can be used in the circuit MP may have a circuit structure including an MTJ (magnetic tunnel junction) element MR and an MTJ element MRr instead of the variable resistors RM and RMr in the circuit MP in FIG. 30A, as in the circuit MP illustrated in FIG. 30B. Instead of a variable resistor and an MTJ element, for example, a resistor containing a phase-change material that is used for a phase-change memory (PCM) or the like may be used (in this specification and the like, such a resistor is referred to as a phase-change memory for convenience). The circuit MP illustrated in FIG. 30C has a circuit structure in which the variable resistor RM and the variable resistor RMr of the circuit MP in FIG. 30A are replaced with a phase-change memory PCM1 and a phase-change memory PCM1r.

As an example of the memory cell that can be used in the circuit MP of the array portion ALP when the circuit AFP is used as the reading circuit of the memory device, a circuit structure including an SRAM (Static Random Access Memory) may be employed. For example, the circuit MP illustrated in FIG. 31A has a structure including the circuit MC and the circuit MCr each including an SRAM.

Figure 31A:
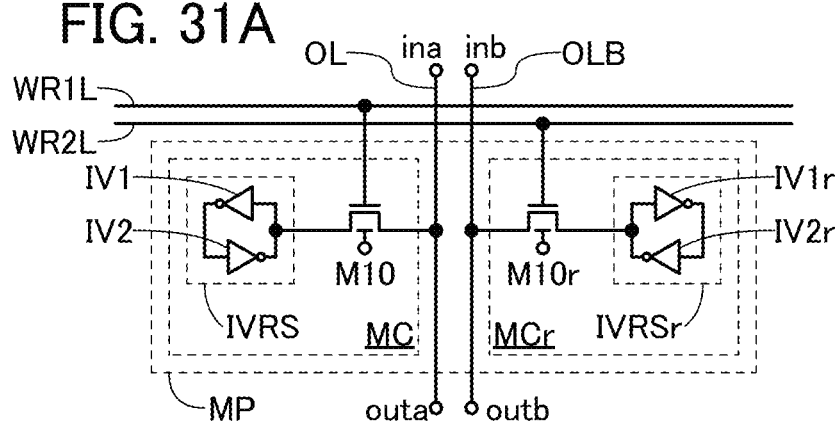
FIG. 31A to FIG. 31C are circuit diagrams illustrating structure examples of a circuit included in a semiconductor device.

In the circuit MP in FIG. 31A, the circuit MC includes the transistor M10 and an inverter loop circuit IVRS.

Note that in the circuit MP in FIG. 31A, the circuit MCr has substantially the same circuit structure as the circuit MC. Thus, "r" is added to the reference numerals of the circuit elements and the like included in the circuit MCr to differentiate them from the circuit elements and the like included in the circuit MC.

The transistor M10 can have a structure similar to that of the transistor M10 included in the circuit MP described with reference to FIG. 29A, for example.

The circuit MC in FIG. 31A can hold information with the inverter loop circuit IVRS.

The inverter loop circuit IVRS includes an inverter circuit IV1 and an inverter circuit IV2, for example. The inverter circuit IV1 and the inverter circuit IV2 each have a function of outputting, from its output terminal, an inverted signal of an input signal that is input to an input terminal. The input terminal of the inverter circuit IV1 is electrically connected to the output terminal of the inverter circuit IV2, and the output terminal of the inverter circuit IV2 is electrically connected to the input terminal of the inverter circuit IV1. The inverter loop circuit IVRSr includes an inverter circuit IV1r and an inverter circuit IV2r, for example. The inverter circuit IV1r and the inverter circuit IV2r each have a function of outputting, from its output terminal, an inverted signal of an input signal that is input to an input terminal, like the inverter circuit IV1 and the inverter circuit IV2. The input terminal of the inverter circuit IV1r is electrically connected to the output terminal of the inverter circuit IV2r, and the output terminal of the inverter circuit IV2r is electrically connected to the input terminal of the inverter circuit IV1r.

Note that the inverter loop circuit IVRS can be configured as a CMOS (Complementary MOS) circuit, for example. The inverter loop circuit IVRS may be configured using, instead of a CMOS circuit, a single-polarity circuit including only n-channel transistors or p-channel transistors.

Alternatively, the inverter circuit IV1 and the inverter circuit IV2 can each be a NAND circuit, a NOR circuit, an XOR circuit, or a circuit in which these are combined, for example. Specifically, in the case where the inverter circuit is replaced with a NAND circuit, a high-level potential is input to one of two input terminals of the NAND circuit as a fixed potential, so that the NAND circuit can function as an inverter circuit. In the case where the inverter circuit is replaced with a NOR circuit, a low-level potential is input to one of two input terminals of the NOR circuit as a fixed potential, so that the NOR circuit can function as an inverter circuit. In the case where the inverter circuit is replaced with an XOR circuit, a high-level potential is input to one of two input terminals of the XOR circuit as a fixed potential, so that the XOR circuit can function as an inverter circuit. As described above, an inverter circuit described in this specification and the like can be replaced with a logic circuit such as a NAND circuit, a NOR circuit, an XOR circuit, or a circuit in which these are combined. Thus, in this specification and the like, the term "inverter circuit" can be referred to as a "logic circuit".

The first terminal of the transistor M10 is electrically connected to the input terminal of the inverter circuit IV1 and the output terminal of the inverter circuit IV2 in the inverter loop circuit IVRS, the second terminal of the transistor M10 is electrically connected to the wiring OL, and the gate of the transistor M10 is electrically connected to the wiring WR1L.

The second terminal of the transistor M10r is electrically connected to the wiring OLB, and the gate of the transistor M10r is electrically connected to the wiring WR2L.

The wiring WR1L functions as the wiring for switching the on state and the off state of the transistor M10, and the wiring WR2L functions as the wiring for supplying the signal for switching an on state and an off state of the transistor M10r. Note that the wiring WR1L and the wiring WR2L may be combined into one wiring.

The pair of the wiring WR1L and the wiring WR2L can correspond to the wiring WLS of the arithmetic circuit 150 in FIG. 17.

In the circuit MP in FIG. 31A, the circuit MC can hold one of a high-level potential and a low-level potential with the inverter loop circuit IVRS and the circuit MCr can hold one of a high-level potential and a low-level potential with the inverter loop circuit IVRSr. That is, the transistor M10 and the transistor M10r are turned on to input the potential for writing to each of the wiring OL and the wiring OLB, whereby the circuit MP can write information corresponding to the potentials to the circuit MC and the circuit MCr. Note that the potentials for writing to the circuit MC and the circuit MCr may be the same or different from each other. After the information corresponding to the potentials is written to the circuits MC and MCr, the transistor M10 and the transistor M10r are turned off.

Here, the case where the circuit ACTF[j] illustrated in FIG. 15 is used for reading operation of the circuit MP in FIG. 31A is described. Information has been written in the circuit MP in FIG. 31A in advance; for example, a low-level potential has been held in the circuit MC and a high-level potential has been held in the circuit MCr. That is, the low-level potential held in the circuit MC and the high-level potential held in the circuit MC are potentials corresponding to the information.

The circuit MP in FIG. 31A can output the potentials held in the circuit MC and the circuit MCr to the wiring OL and the wiring OLB when the transistor M10 and the transistor M10r are turned on. That is, in the circuit ACTF[j] illustrated in FIG. 15, the circuit IVTR and the circuit IVTRr need not convert current into voltage; thus, the switch SWR3 and the switch SWR3B are always in an off state. After the switch SWR2 and the switch SWR2B are turned off and the transistor M10 and the transistor M10r are turned on, the switch SWR1 and the switch SWR1B are turned on, whereby a potential difference between the high-level potential and the low-level potential can be held in the capacitor CRE.

The potential supplied from the wiring VCN3 is set to a ground potential and the operation from Time T06 to Time T07 in the timing chart in FIG. 9 is performed, so that the potential difference is converted into a potential based on the ground potential. Then, the operation after Time T07 is performed to supply the potential to the terminal mbt1 of the circuit AC, so that the potential corresponding to the information held in the circuit MP can be output from the terminal mbt2 of the circuit AC.

One embodiment of the present invention is not limited to a memory device (sometimes referred to as an arithmetic circuit) including the circuit in FIG. 31A. For example, as in the circuit MP illustrated in FIG. 31B, a circuit NM and a circuit NMr may be provided in the circuit MC and the circuit MCr, respectively, in FIG. 31A. Each of the circuit NM and the circuit NMr is a nonvolatile memory circuit, for example, and can be a circuit including the variable resistor, the MTJ element, the phase-change memory, or the like described with reference to FIG. 30A to FIG. 30C. Even when supply of power supply voltage to the inverter loop circuit IVRS and the inverter loop circuit IVRSr is stopped, for example, the use of the circuit MP in FIG. 31B for a memory device (sometimes referred to as an arithmetic circuit) enables the circuit NM and the circuit NMr to hold the information that has been written to the circuit MC and the circuit MCr.

Figure 31B:
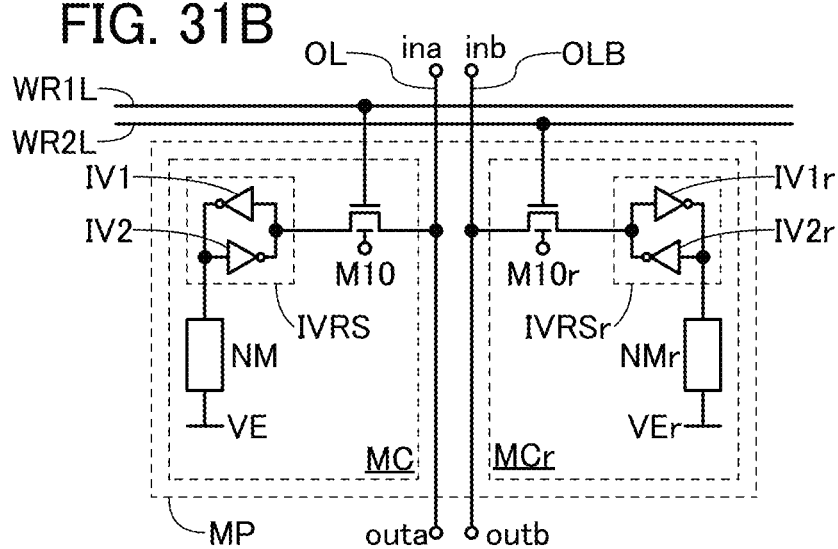
Figure 31C:
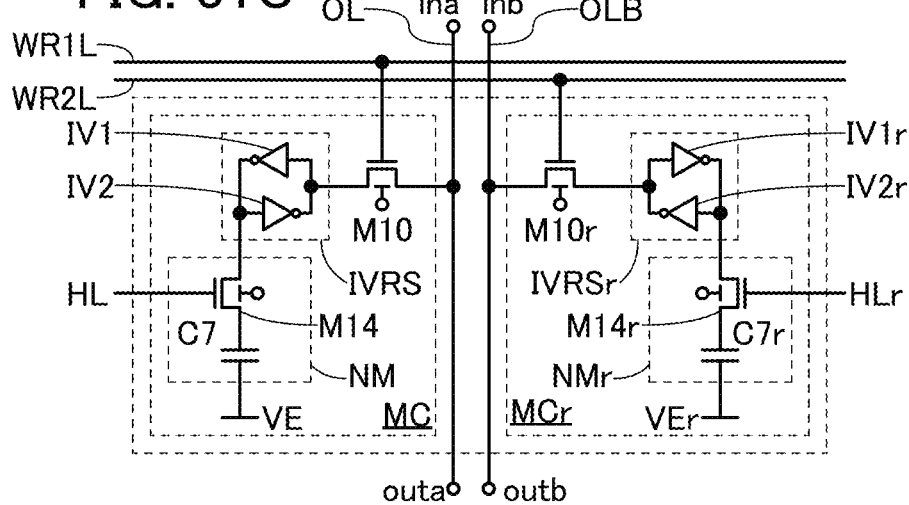

The circuit NM and the circuit NMr included in the circuit MP in FIG. 31B may each have a circuit structure in which a variable resistor, an MTJ element, or a phase-change memory is not provided but a capacitor and a transistor are included. The circuit NM included in the circuit MP in FIG. 31C includes a capacitor C7 and a transistor M14, and the circuit NMr includes a capacitor C7r and a transistor M14r.

The transistor M14 is electrically connected to the inverter loop circuit IVRS, a second terminal of the transistor M14 is electrically connected to a first terminal of the capacitor C7, and a second terminal of the capacitor C7 is electrically connected to the wiring VE. A gate of the transistor M14 is electrically connected to a wiring HL. The transistor M14r is electrically connected to the inverter loop circuit IVRSr, a second terminal of the transistor M14r is electrically connected to a first terminal of the capacitor C7r, and a second terminal of the capacitor C7r is electrically connected to the wiring VEr. A gate of the transistor M14r is electrically connected to a wiring HLr.

The wiring VE and the wiring VEr each function as a wiring for supplying a constant voltage. The constant voltage can be, for example, a high-level potential, a low-level potential, a ground potential, or the like.

The wiring HL and the wiring HLr function as wirings for switching an on state and an off state of the transistor M14 and the transistor M14r, respectively.

When the transistor M14 is turned on, electrical continuity is established between the inverter loop circuit IVRS and the first terminal of the capacitor C7. In that case, the potential held in the inverter loop circuit IVRS can be supplied to the first terminal of the capacitor C7. After that, the transistor M14 is turned off, whereby the potential can be held in the capacitor C7.

An OS transistor is preferably used as the transistor M14, for example. The OS transistor has a feature of an extremely low off-state current; thus, the potential can be held in the capacitor C7 for a long time.

Figure 32A:
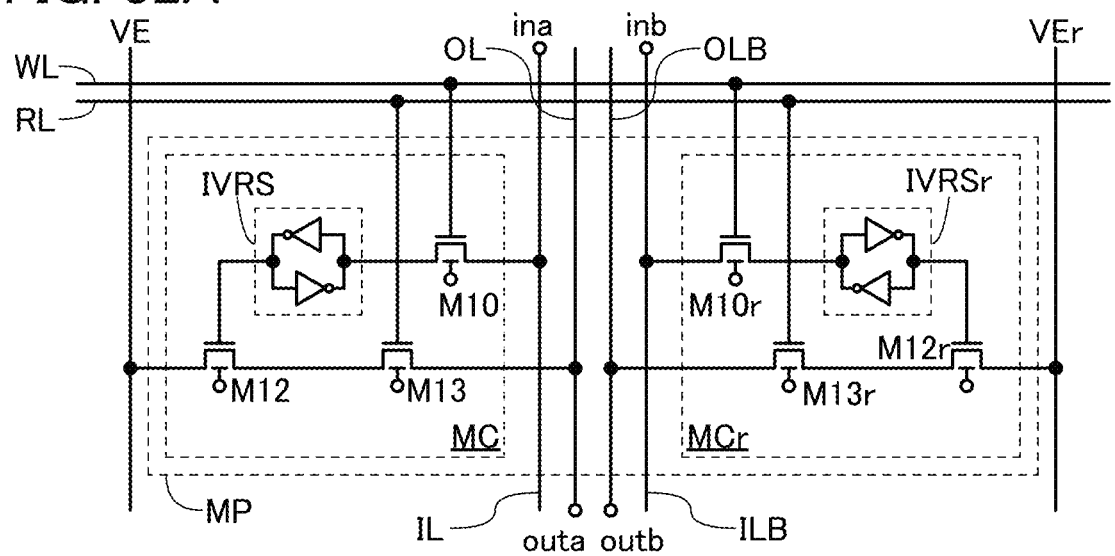
FIG. 32A and FIG. 32B are circuit diagrams illustrating structure examples of a circuit included in a semiconductor device.

The circuit MP illustrated in FIG. 32A is the circuit MP that can be used in the arithmetic circuit 130 in FIG. 12 and includes the circuit MC and the circuit MCr respectively including the inverter loop circuit IVRS and the inverter loop circuit IVRSr, like the circuit MP in FIG. 31A. The circuit MC includes the transistor M10, the transistor M12, and the transistor M13.

Note that in the circuit MP in FIG. 32A, the circuit MCr has substantially the same circuit structure as the circuit MC. Thus, "r" is added to the reference numerals of the circuit elements and the like included in the circuit MCr to differentiate them from the circuit elements and the like included in the circuit MC.

As each of the transistor M10, the transistor M12, and the transistor M13, a transistor that can be used as the transistor M10 included in the circuit MP in FIG. 29A is preferably used, for example. In particular, OS transistors are preferably used as the transistor M10 and the transistor M13. A material of a semiconductor layer may differ between the transistor M10, the transistor M12, and the transistor M13.

The first terminal of the transistor M10 is electrically connected to a first terminal of the inverter loop circuit IVRS, the second terminal of the transistor M10 is electrically connected to the wiring IL, and the gate of the transistor M10 is electrically connected to the wiring WL.

The first terminal of the transistor M12 is electrically connected to the wiring VE, the second terminal of the transistor M12 is electrically connected to the wiring OL, and the gate of the transistor M12 is electrically connected to a second terminal of the inverter loop circuit IVRS. The second terminal of the transistor M13 is electrically connected to the wiring OL, and the gate of the transistor M13 is electrically connected to the wiring RL.

In the circuit MCr, a second terminal of the transistor M13r is electrically connected to the wiring OLB.

The wiring VE and the wiring VEr function as the wirings for supplying a constant voltage, for example. The constant voltage can be a ground potential, a low-level potential, or the like. Note that in this description, the constant voltage is a low-level potential.

The wiring WL functions as a wiring for switching the on state and the off state of the transistor M10.

The wiring RL functions as the wiring for supplying the signal for selecting the circuit MP on which reading is performed.

A pair of the wiring WL and the wiring RL can correspond to the wiring WLS of the arithmetic circuit 130 in FIG. 12. Alternatively, the wiring WL can correspond to the wiring WLS of the arithmetic circuit 130 in FIG. 12, and the wiring RL can correspond to the wiring XLS of the arithmetic circuit 130 in FIG. 12. Thus, the circuit XLD of the arithmetic circuit 130 in FIG. 12 may function as a read word line driver circuit.

The inverter loop circuit IVRS (the inverter loop circuit IVRSr) has a function of outputting an inverted signal of a signal input to the first terminal of the inverter loop circuit IVRS (the inverter loop circuit IVRSr) to the second terminal of the inverter loop circuit IVRS (the inverter loop circuit IVRSr). When the power supply voltage is supplied to the inverter loop circuit IVRS (the inverter loop circuit IVRSr), the circuit MC (the circuit MCr) has a function of holding the potentials of the first terminal and the second terminal of the inverter loop circuit IVRS (the inverter loop circuit IVRSr) with the inverter loop circuit IVRS (the inverter loop circuit IVRSr).

Next, writing operation of the circuit MP in FIG. 32A will be described. First, a high-level potential is input to the wiring WL to turn on the transistor M10 and the transistor M10r. After that, the potentials corresponding to information to be written to the circuit MP are supplied from the wiring IL and the wiring ILB to the circuit MC and the circuit MCr. Here, for example, a low-level potential VSS is written to the circuit MC from the wiring OL, and a high-level potential VDD is written to the circuit MCr from the wiring OLB. That is, VSS held in the circuit MC and VDD held in the circuit MCr are potentials corresponding to the information. After the potentials are written to the circuit MC and the circuit MCr, a low-level potential is input to the wiring WL to turn off the transistor M10 and the transistor M10r, so that the potentials are held in the inverter loop circuit IVRS and the inverter loop circuit IVRSr.

Next, reading operation of the circuit MP in FIG. 32A will be described. Here, the reading circuit of the circuit MP is the circuit ACTF[j] illustrated in FIG. 15. First, a low-level potential is input to the wiring RL to turn off the transistor M13 and the transistor M13r.

Next, in the circuit ACTF[j] in FIG. 15, a high-level potential is input to the wiring SRL1 and the wiring SRL3 to turn on the switch SWR1, the switch SWR1B, the switch SWR3, and the switch SWR3B. Thus, the potentials of the wiring OL, the wiring OLB, the node n5, and the node n5r each become the potential of the wiring VCN4. Note that the potential supplied from the wiring VCN4 here can be a high-level potential (VDD). After that, a low-level potential is input to the wiring SRL3 to turn off the switch SWR3 and the switch SWR3B, so that the wiring OL and the wiring OLB are brought into a floating state. Then, a high-level potential is input to the wiring RL to turn on the transistor M13 and the transistor M13r, so that current sometimes flows between the sources and the drains in accordance with the gate-source voltage of the transistor M12 and the transistor M12r. The gate of the transistor M12 has VDD and the gate of the transistor M12r has VSS; thus, the transistor M12 is turned on and the transistor M12 is turned off. That is, current flows between the gate and the source of the transistor M12, and current does not flow between the gate and the source of the transistor M12r. Accordingly, current flows between the source and the drain of the transistor M12, so that the potentials of the wiring OL and the node n5 decrease from VDD. By contrast, current does not flow between the source and the drain of the transistor M12r, so that the potentials of the wiring OLB and the node n5r remain at VDD.

The potential supplied from the wiring VCN3 is set to a ground potential and the operation from Time T04 to Time T05 in the timing chart in FIG. 9 is performed, so that a difference between the potentials read out from the circuit MC and the circuit MCr can be held in the capacitor CRE. After that, the operation from Time T06 to Time T07 is performed, so that the difference between the potentials is converted into a potential based on the ground potential. Then, the operation after Time T07 is performed to supply the potential to the terminal mbt1 of the circuit AC, so that a digital signal corresponding to the information held in the circuit MP can be output from the terminal mbt2 of the circuit AC.

Figure 32B:
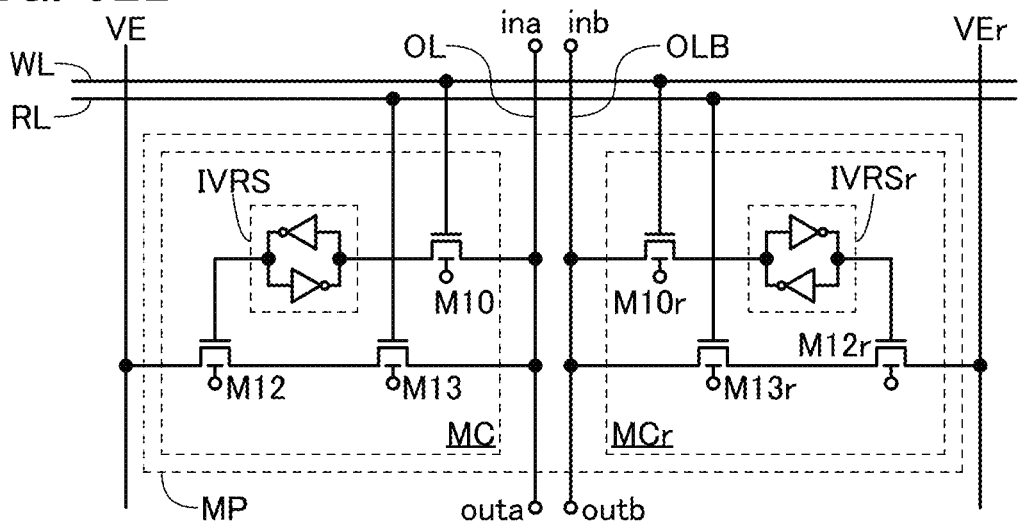

One embodiment of the present invention is not limited to a memory device (sometimes an arithmetic circuit) including the circuit MP in FIG. 32A. For example, the wiring OL illustrated in FIG. 32A may be combined with the wiring IL, and the wiring OLB may be combined with the wiring ILB. The circuit MP illustrated in FIG. 32B has a structure in which the wiring OL and the wiring IL are combined into one wiring OL and the wiring OLB and the wiring ILB are combined into one wiring OLB in the circuit MP in FIG. 32A. The use of the circuit MP in FIG. 32B for a memory device (an arithmetic circuit) can reduce the number of wirings, reducing the circuit area of the memory device (the arithmetic circuit).

Note that FIG. 29A to FIG. 29C, FIG. 30A to FIG. 30C, FIG. 31A to FIG. 31C, FIG. 32A, and FIG. 32B illustrate examples of the circuit MP that can be used for the memory device including the circuit ACTF[j] illustrated in FIG. 15 as the reading circuit; however, one embodiment of the present invention is not limited thereto. The circuit MP in each of FIG. 29A to FIG. 29C, FIG. 30A to FIG. 30C, FIG. 31A to FIG. 31C, FIG. 32A, and FIG. 32B can be used as the circuit MP described in Embodiment 1 and Embodiment 2, and an arithmetic circuit that can perform arithmetic operation of a hierarchical neural network can be formed.

Note that this embodiment can be combined with any of the other embodiments in this specification as appropriate.

Embodiment 5

In this embodiment, structure examples of the arithmetic circuit described in the above embodiment and structure examples of a transistor that can be used in the arithmetic circuit will be described.

<Structure Example of Semiconductor Device>

Figure 33:
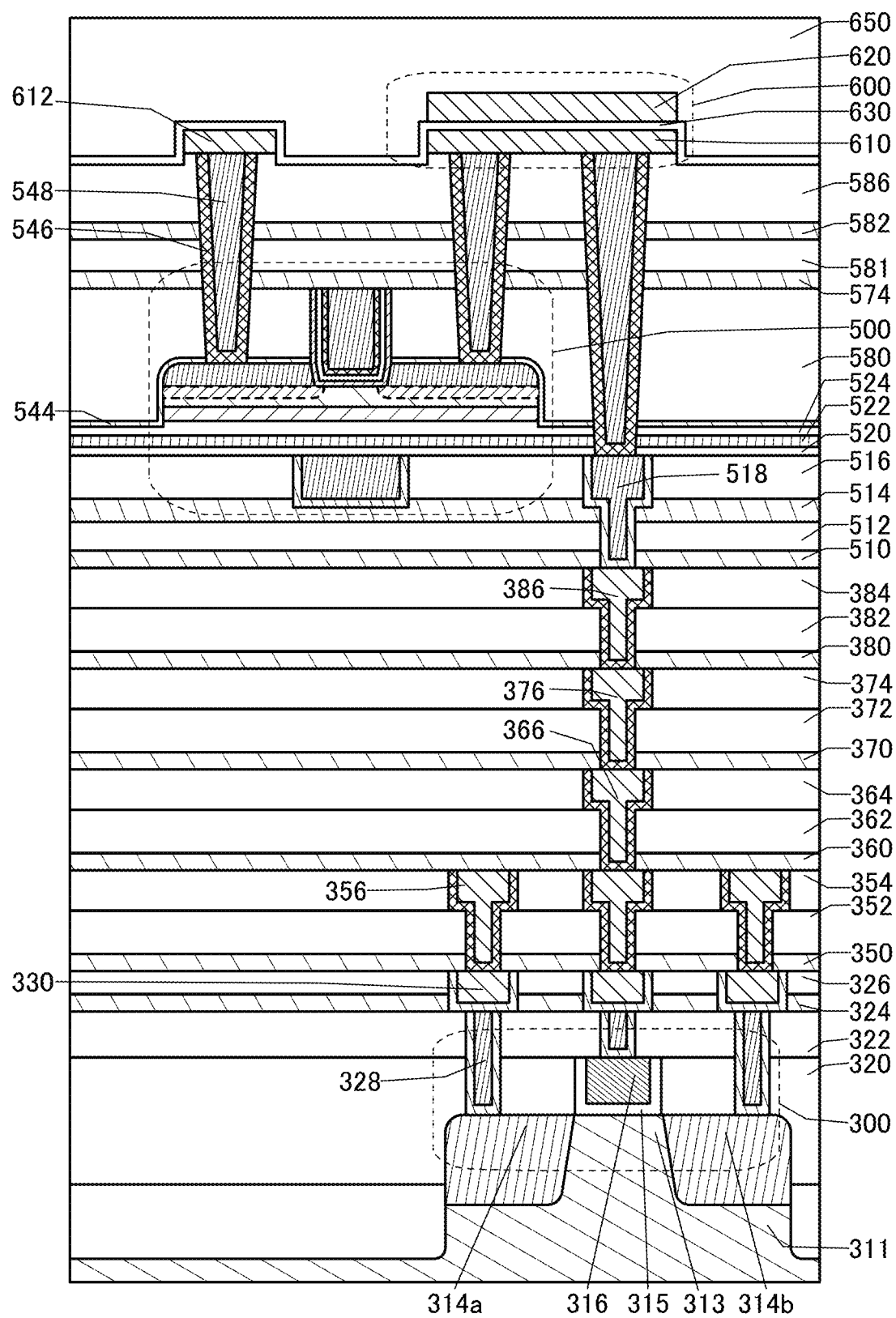
FIG. 33 is a schematic cross-sectional view illustrating a structure example of a semiconductor device.
Figure 35A:
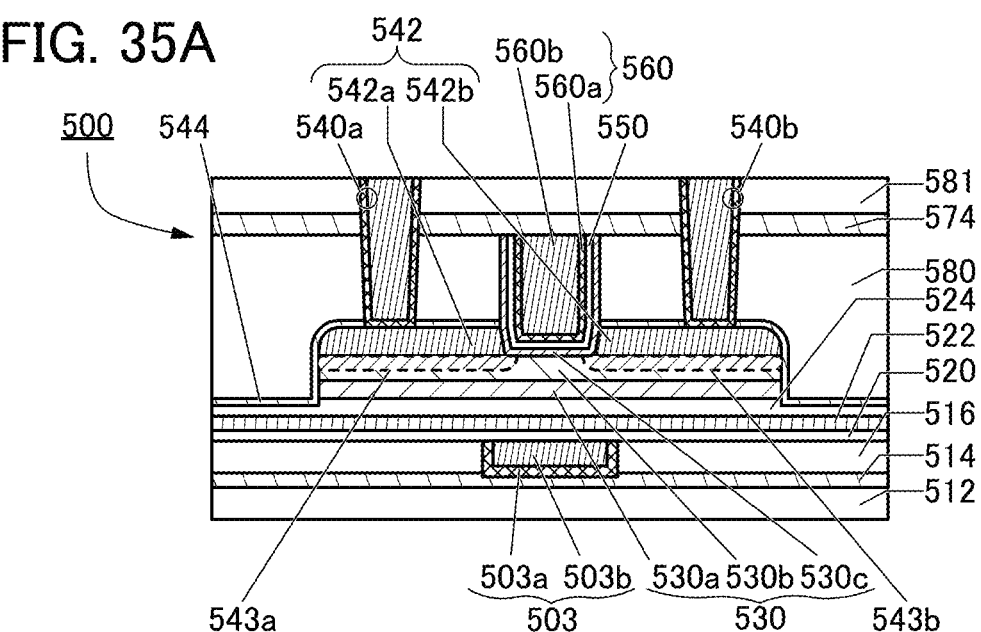
FIG. 35A to FIG. 35C are schematic cross-sectional views illustrating a structure example of a semiconductor device.
Figure 35B:
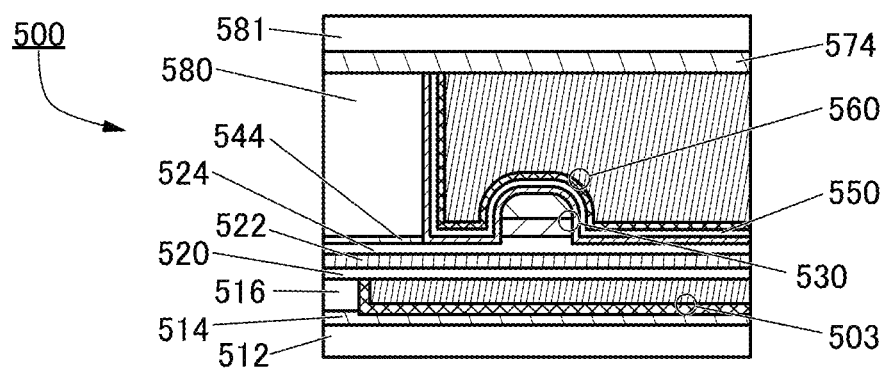
Figure 35C:
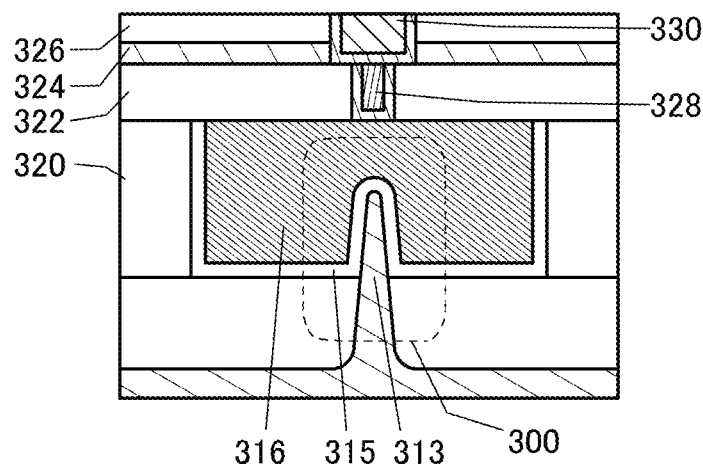

A semiconductor device illustrated in FIG. 33 includes a transistor 300, a transistor 500, and a capacitor 600. FIG. 35A is a cross-sectional view of the transistor 500 in the channel length direction, FIG. 35B is a cross-sectional view of the transistor 500 in the channel width direction, and FIG. 35C is a cross-sectional view of the transistor 300 in the channel width direction.

The transistor 500 is a transistor including a metal oxide in its channel formation region (an OS transistor). The transistor 500 has a low off-state current, and thus enables written data to be held for a long time when used as the switch S2 or the like included in a semiconductor device such as the arithmetic circuit 110, the arithmetic circuit 120, or the arithmetic circuit 140. In other words, the frequency of refresh operation is low or refresh operation is not required; thus, power consumption of the semiconductor device can be reduced.

The semiconductor device described in this embodiment includes the transistor 300, the transistor 500, and the capacitor 600 as illustrated in FIG. 33. The transistor 500 is provided above the transistor 300, and the capacitor 600 is provided above the transistor 300 and the transistor 500. Note that the capacitor 600 can be the capacitor C1, the capacitor C1r, or the like in the circuit MP included in the arithmetic circuit 110, the arithmetic circuit 120, the arithmetic circuit 140, and the like that are described in the above embodiment.

The transistor 300 is provided over a substrate 311 and includes a conductor 316, an insulator 315, a semiconductor region 313 that is part of the substrate 311, and a low-resistance region 314a and a low-resistance region 314b functioning as a source region and a drain region. Note that the transistor 300 can be used as, for example, the transistor M1 and the like of the circuit MP included in the arithmetic circuit 110, the arithmetic circuit 120, the arithmetic circuit 140, and the like that are described in the above embodiment.

A semiconductor substrate (e.g., a single crystal substrate or a silicon substrate) is preferably used as the substrate 311.

In the transistor 300, a top surface and a side surface in the channel width direction of the semiconductor region 313 are covered with the conductor 316 with the insulator 315 therebetween, as illustrated in FIG. 35C. Such a Fin-type transistor 300 can have an increased effective channel width, and thus the transistor 300 can have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b functioning as the source region and the drain region, and the like preferably contain a semiconductor such as a silicon-based semiconductor, further preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with GaAs and GaAlAs, or the like.

The low-resistance region 314a and the low-resistance region 314b contain an element that imparts n-type conductivity, such as arsenic or phosphorus, or an element that imparts p-type conductivity, such as boron, in addition to a semiconductor material used for the semiconductor region 313.

For the conductor 316 functioning as a gate electrode, a semiconductor material such as silicon containing an element that imparts n-type conductivity, such as arsenic or phosphorus, or an element that imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 34:
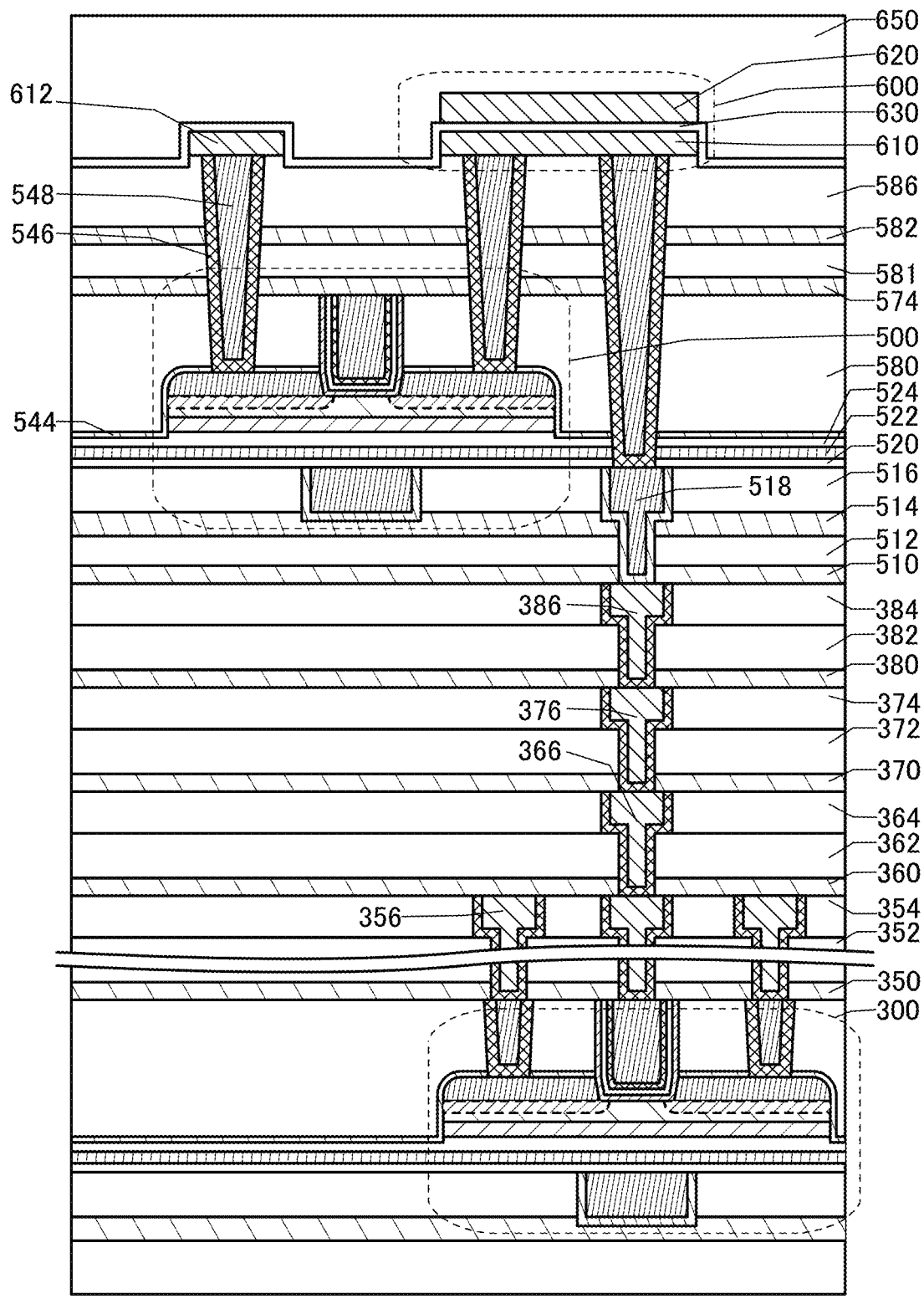
FIG. 34 is a schematic cross-sectional view illustrating a structure example of a semiconductor device.

Note that the transistor 300 illustrated in FIG. 33 is only an example and the structure is not limited thereto; an appropriate transistor can be used in accordance with a circuit structure or a driving method. For example, when a semiconductor device is a single-polarity circuit using only OS transistors, the transistor 300 has a structure similar to that of the transistor 500 using an oxide semiconductor, as illustrated in FIG. 34. Note that the details of the transistor 500 are described later.

An insulator 320, an insulator 322, an insulator 324, and an insulator 326 are provided to be stacked in this order to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, or aluminum nitride can be used, for example.

Note that in this specification, silicon oxynitride refers to a material that has a higher oxygen content than a nitrogen content, and silicon nitride oxide refers to a material that has a higher nitrogen content than an oxygen content. Moreover, in this specification, aluminum oxynitride refers to a material that has a higher oxygen content than a nitrogen content, and aluminum nitride oxide refers to a material that has a higher nitrogen content than an oxygen content.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to improve planarity.

As the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS), for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low dielectric constant is used for the interlayer film, the parasitic capacitance generated between wirings can be reduced.

A conductor 328, a conductor 330, and the like that are connected to the capacitor 600 or the transistor 500 are embedded in the insulator 320, the insulator 322, the insulator 324, and the insulator 326. Note that the conductor 328 and the conductor 330 have a function of a plug or a wiring. A plurality of conductors having a function of a plug or a wiring are collectively denoted by the same reference numeral in some cases. Moreover, in this specification and the like, a wiring and a plug connected to the wiring may be a single component. That is, in some cases, part of a conductor functions as a wiring or part of a conductor functions as a plug.

As a material of each of plugs and wirings (e.g., the conductor 328 and the conductor 330), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 33, an insulator 350, an insulator 352, and an insulator 354 are provided to be stacked in this order. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

For example, like the insulator 324, the insulator 350 is preferably formed using an insulator having a barrier property against hydrogen. The conductor 356 preferably includes a conductor having a barrier property against hydrogen. In particular, the conductor having a barrier property against hydrogen is formed in an opening portion included in the insulator 350 having a barrier property against hydrogen. With this structure, the transistor 300 and the transistor 500 can be separated by the barrier layer, so that diffusion of hydrogen from the transistor 300 into the transistor 500 can be inhibited.

For the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 33, an insulator 360, an insulator 362, and an insulator 364 are provided to be stacked in this order. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

For example, like the insulator 324, the insulator 360 is preferably formed using an insulator having a barrier property against hydrogen. Furthermore, the conductor 366 preferably includes a conductor having a barrier property against hydrogen. In particular, the conductor having a barrier property against hydrogen is formed in an opening portion included in the insulator 360 having a barrier property against hydrogen. With this structure, the transistor 300 and the transistor 500 can be separated by the barrier layer, so that diffusion of hydrogen from the transistor 300 into the transistor 500 can be inhibited.

A wiring layer may be provided over the insulator 364 and the conductor 366. For example, in FIG. 33, an insulator 370, an insulator 372, and an insulator 374 are provided to be stacked in this order. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

For example, like the insulator 324, the insulator 370 is preferably formed using an insulator having a barrier property against hydrogen. Furthermore, the conductor 376 preferably includes a conductor having a barrier property against hydrogen. In particular, the conductor having a barrier property against hydrogen is formed in an opening portion included in the insulator 370 having a barrier property against hydrogen. With this structure, the transistor 300 and the transistor 500 can be separated by the barrier layer, so that diffusion of hydrogen from the transistor 300 into the transistor 500 can be inhibited.

A wiring layer may be provided over the insulator 374 and the conductor 376. For example, in FIG. 33, an insulator 380, an insulator 382, and an insulator 384 are provided to be stacked in this order. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

For example, like the insulator 324, the insulator 380 is preferably formed using an insulator having a barrier property against hydrogen. Furthermore, the conductor 386 preferably includes a conductor having a barrier property against hydrogen. In particular, the conductor having a barrier property against hydrogen is formed in an opening portion included in the insulator 380 having a barrier property against hydrogen. With this structure, the transistor 300 and the transistor 500 can be separated by the barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are provided to be stacked in this order over the insulator 384. A substance with a barrier property against oxygen or hydrogen is preferably used for any of the insulator 510, the insulator 512, the insulator 514, and the insulator 516.

For example, as the insulator 510 and the insulator 514, it is preferable to use a film having a barrier property that prevents diffusion of hydrogen or impurities from the substrate 311, a region where the transistor 300 is provided, or the like into the region where the transistor 500 is provided. Thus, a material similar to that for the insulator 324 can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

For the film having a barrier property against hydrogen used for the insulator 510 and the insulator 514, a metal oxide such as aluminum oxide, hafnium oxide, or tantalum oxide is preferably used, for example.

In particular, aluminum oxide has an excellent blocking effect that prevents transmission of oxygen and impurities such as hydrogen and moisture which would cause a change in the electrical characteristics of the transistor. Accordingly, aluminum oxide can prevent entry of impurities such as hydrogen and moisture into the transistor 500 in and after the manufacturing process of the transistor. In addition, release of oxygen from the oxide included in the transistor 500 can be inhibited. Therefore, aluminum oxide is suitably used for a protective film of the transistor 500.

For the insulator 512 and the insulator 516, a material similar to that for the insulator 320 can be used, for example. Furthermore, when a material with a comparatively low dielectric constant is used for these insulators, parasitic capacitance generated between wirings can be reduced. A silicon oxide film or a silicon oxynitride film can be used for the insulator 512 and the insulator 516, for example.

A conductor 518, a conductor included in the transistor 500 (e.g., a conductor 503), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, a region of the conductor 518 that is in contact with the insulator 510 and the insulator 514 is preferably a conductor having a barrier property against oxygen, hydrogen, and water. With this structure, the transistor 300 and the transistor 500 can be separated by the layer having a barrier property against oxygen, hydrogen, and water; hence, the diffusion of hydrogen from the transistor 300 into the transistor 500 can be inhibited.

The transistor 500 is provided above the insulator 516.

As illustrated in FIG. 35A and FIG. 35B, the transistor 500 includes the conductor 503 positioned to be embedded in the insulator 514 and the insulator 516, an insulator 520 positioned over the insulator 516 and the conductor 503, an insulator 522 positioned over the insulator 520, an insulator 524 positioned over the insulator 522, an oxide 530*a* positioned over the insulator 524, an oxide 530*b* positioned over the oxide 530*a*, a conductor 542*a* and a conductor 542*b* positioned apart from each other over the oxide 530*b*, an insulator 580 that is positioned over the conductor 542*a* and the conductor 542*b* and is provided with an opening formed to overlap with a region between the conductor 542*a* and the conductor 542*b*, an oxide 530*c* positioned on a bottom surface and a side surface of the opening, an insulator 550 positioned on a formation surface of the oxide 530*c*, and a conductor 560 positioned on a formation surface of the insulator 550.

As illustrated in FIG. 35A and FIG. 35B, an insulator 544 is preferably positioned between the insulator 580 and the oxide 530*a*, the oxide 530*b*, the conductor 542*a*, and the conductor 542*b*. In addition, as illustrated in FIG. 35A and FIG. 35B, the conductor 560 preferably includes a conductor 560*a* provided inside the insulator 550 and a conductor 560*b* provided to be embedded inside the conductor 560*a*. As illustrated in FIG. 35A and FIG. 35B, an insulator 574 is preferably positioned over the insulator 580, the conductor 560, and the insulator 550.

Hereinafter, the oxide 530*a*, the oxide 530*b*, and the oxide 530*c* may be collectively referred to as an oxide 530.

The transistor 500 having a structure in which the three layers of the oxide 530*a*, the oxide 530*b*, and the oxide 530*c* are stacked in the region where the channel is formed and its vicinity is illustrated; however, one embodiment of the present invention is not limited thereto. For example, the transistor may have a single-layer structure of the oxide 530*b*, a two-layer structure of the oxide 530*b* and the oxide 530*a*, a two-layer structure of the oxide 530*b* and the oxide 530*c*, or a stacked-layer structure of four or more layers. Furthermore, although the conductor 560 is illustrated to have a stacked-layer structure of two layers in the transistor 500, one embodiment of the present invention is not limited thereto. For example, the conductor 560 may have a single-layer structure or a stacked-layer structure of three or more layers. Moreover, the transistor 500 illustrated in FIG. 33 and FIG. 35A is an example and the structure is not limited thereto; an appropriate transistor is used in accordance with a circuit structure or a driving method.

Here, the conductor 560 functions as a gate electrode of the transistor, and the conductor 542*a* and the conductor 542*b* function as a source electrode and a drain electrode. As described above, the conductor 560 is formed to be embedded in an opening in the insulator 580 and the region sandwiched between the conductor 542*a* and the conductor 542b. The positions of the conductor 560, the conductor 542a, and the conductor 542b are selected in a self-aligned manner with respect to the opening in the insulator 580. That is, in the transistor 500, the gate electrode can be positioned between the source electrode and the drain electrode in a self-aligned manner. Thus, the conductor 560 can be formed without an alignment margin, resulting in a reduction in the area occupied by the transistor 500. Accordingly, miniaturization and high integration of the semiconductor device can be achieved.

Since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the transistor 500 can have increased switching speed and excellent frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied.

The conductor 503 is positioned to overlap with the oxide 530 and the conductor 560. Thus, when potentials are applied to the conductor 560 and the conductor 503, an electric field generated from the conductor 560 and an electric field generated from the conductor 503 are connected and can cover the channel formation region formed in the oxide 530. In this specification and the like, a transistor structure in which a channel formation region is electrically surrounded by electric fields of a first gate electrode and a second gate electrode is referred to as a surrounded channel (S-channel) structure.

The conductor 503 has a structure similar to that of the conductor 518; a conductor 503a is formed in contact with an inner wall of the opening in the insulator 514 and the insulator 516, and a conductor 503b is formed on the inner side. Although the transistor 500 having a structure in which the conductor 503a and the conductor 503b are stacked is illustrated, one embodiment of the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the above impurities are less likely to pass) is preferably used. Alternatively, it is preferable to use a conductive material that has a function of inhibiting diffusion of oxygen (e.g., at least one of an oxygen atom, an oxygen molecule, and the like) (through which the above oxygen is less likely to pass). Note that in this specification, a function of inhibiting diffusion of impurities or oxygen means a function of inhibiting diffusion of any one or all of the above impurities and the above oxygen.

For example, when the conductor 503a has a function of inhibiting diffusion of oxygen, a reduction in conductivity of the conductor 503b due to oxidation can be inhibited.

When the conductor 503 also functions as a wiring, for the conductor 503b, it is preferable to use a conductive material that has high conductivity and contains tungsten, copper, or aluminum as its main component. In that case, the conductor 503a is not necessarily provided. Note that the conductor 503b is illustrated as a single layer but may have a stacked-layer structure, for example, a stack of any of the above conductive materials and titanium or titanium nitride.

The insulator 520, the insulator 522, and the insulator 524 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in the range of 100° C. to 700° C. or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of $V_OH$ is cut occurs, i.e., a reaction of "$V_OH \rightarrow V_O+H$" occurs. Part of hydrogen generated at this time is bonded to oxygen to be $H_2O$, and removed from the oxide 530 or an insulator near the oxide 530 in some cases. Part of hydrogen is diffused into or gettered (also referred to as gettering) by the conductor 542a and the conductor 542b in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator near the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ($O_2/(O_2+Ar)$) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). The heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "$V_O$+O→null". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_O$H.

In the case where the insulator 524 includes an excess-oxygen region, it is preferable that the insulator 522 have a function of inhibiting diffusion of oxygen (e.g., an oxygen atom and an oxygen molecule) (or the insulator 522 be less likely to transmit the above oxygen).

The insulator 522 preferably has a function of inhibiting diffusion of oxygen or impurities, in which case oxygen contained in the oxide 530 is not diffused to the insulator 520 side. Furthermore, the conductor 503 can be inhibited from reacting with oxygen contained in the insulator 524 or the oxide 530.

The insulator 522 is preferably a single layer or stacked layers using an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or $(Ba,Sr)TiO_3$ (BST). As miniaturization and high integration of transistors progress, a problem such as leakage current may arise because of a thinner gate insulating film. When a high-k material is used for the insulator functioning as the gate insulating film, a gate potential at the time when the transistor operates can be reduced while the physical thickness is maintained.

It is particularly preferable to use an insulator containing an oxide of one or both of aluminum and hafnium, which is an insulating material having a function of inhibiting diffusion of impurities, oxygen, and the like (through which the above oxygen is less likely to pass). As the insulator containing an oxide of one or both of aluminum and hafnium, aluminum oxide, hafnium oxide, an oxide containing aluminum and hafnium (hafnium aluminate), or the like is preferably used. In the case where the insulator 522 is formed using such a material, the insulator 522 functions as a layer that inhibits release of oxygen from the oxide 530 and entry of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulator.

It is preferable that the insulator 520 be thermally stable. For example, silicon oxide and silicon oxynitride, which have thermal stability, are suitable. Furthermore, when an insulator that is a high-k material is combined with silicon oxide or silicon oxynitride, the insulator 520 having a stacked-layer structure that has thermal stability and a high dielectric constant can be obtained.

Note that in the transistor 500 in FIG. 35A and FIG. 35B, the insulator 520, the insulator 522, and the insulator 524 are illustrated as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. In particular, the In-M-Zn oxide that can be used as the oxide 530 is preferably a CAAC-OS (C-Axis Aligned Crystalline Oxide Semiconductor) or a CAC-OS (Cloud-Aligned Composite Oxide Semiconductor). Furthermore, an In—Ga oxide, an In—Zn oxide, an In oxide, or the like may be used as the oxide 530.

Furthermore, a metal oxide with a low carrier concentration is preferably used in the transistor 500. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. Examples of impurities in a metal oxide include hydrogen, nitrogen, alkali metal, alkaline earth metal, iron, nickel, and silicon.

In particular, hydrogen contained in a metal oxide reacts with oxygen bonded to a metal atom to be water, and thus forms oxygen vacancies in the metal oxide in some cases. In the case where hydrogen enters an oxygen vacancy in the oxide 530, the oxygen vacancy and the hydrogen are bonded to each other to form $V_O$H in some cases. The $V_O$H serves as a donor and an electron that is a carrier is generated in some cases. In other cases, bonding of part of hydrogen to oxygen bonded to a metal atom generates an electron serving as a carrier. Thus, a transistor using a metal oxide containing a large amount of hydrogen is likely to have normally-on characteristics. Moreover, hydrogen in a metal oxide is easily transferred by stress such as heat or an electric field; thus, a large amount of hydrogen contained in a metal oxide might reduce the reliability of the transistor. In one embodiment of the present invention, $V_O$H in the oxide 530 is preferably reduced as much as possible so that the oxide 530 becomes a highly purified intrinsic or substantially highly purified intrinsic oxide. It is important to remove impurities such as moisture and hydrogen in a metal oxide (sometimes described as dehydration or dehydrogenation treatment) and to fill oxygen vacancies by supplying oxygen to the metal oxide (sometimes described as oxygen adding treatment) to obtain a metal oxide whose $V_OH$ is reduced enough. When a metal oxide in which impurities such as $V_OH$ are sufficiently reduced is used for a channel formation region of a transistor, stable electrical characteristics can be given.

A defect that is an oxygen vacancy into which hydrogen has entered can function as a donor of a metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Consequently, when a metal oxide is used for the oxide 530, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently low concentration of impurities such as hydrogen is used for a channel formation region of a transistor, stable electrical characteristics can be given.

In the case where a metal oxide is used as the oxide 530, the metal oxide is an intrinsic (also referred to as i-type) or substantially intrinsic semiconductor that has a wide band gap, and the carrier concentration of the metal oxide in the channel formation region is preferably lower than $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, yet still further preferably lower than $1\times10^{12}$ cm$^3$. Note that the lower limit of the carrier concentration of the metal oxide in the channel formation region is not particularly limited and can be, for example, $1\times10^{-9}$ cm$^{-3}$.

In the case where a metal oxide is used as the oxide 530, contact between the oxide 530 and each of the conductor 542a and the conductor 542b may diffuse oxygen in the oxide 530 into the conductor 542a and the conductor 542b, resulting in oxidation of the conductor 542a and the conductor 542b. It is highly possible that oxidation of the conductor 542a and the conductor 542b lowers the conductivity of the conductor 542a and the conductor 542b. Note that diffusion of oxygen from the oxide 530 into the conductor 542a and the conductor 542b can be rephrased as absorption of oxygen in the oxide 530 by the conductor 542a and the conductor 542b.

When oxygen in the oxide 530 is diffused into the conductor 542a and the conductor 542b, a layer is sometimes formed between the conductor 542a and the oxide 530b and between the conductor 542b and the oxide 530b. The layer contains a larger amount of oxygen than the conductor 542a and the conductor 542b and thus presumably has an insulating property. In that case, a three-layer structure of the conductor 542a or the conductor 542b, the layer, and the oxide 530b can be regarded as a three-layer structure of a metal, an insulator, and a semiconductor and is sometimes referred to as a MIS (Metal-Insulator-Semiconductor) structure or referred to as a diode-connected structure mainly formed of the MIS structure.

Note that the layer is not necessarily formed between the oxide 530b and each of the conductor 542a and the conductor 542b; for example, the layer may be formed between the oxide 530c and each of the conductor 542a and the conductor 542b, or between the oxide 530b and each of the conductor 542a and the conductor 542b and between the oxide 530c and each of the conductor 542a and the conductor 542b.

The metal oxide functioning as the channel formation region in the oxide 530 has a band gap of preferably 2 eV or more, further preferably 2.5 eV or more. With the use of a metal oxide having such a wide band gap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic proportion of the element M in the constituent elements in the metal oxide used as the oxide 530a is preferably higher than the atomic proportion of the element M in the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. As the oxide 530c, it is possible to use a metal oxide that can be used as the oxide 530a or the oxide 530b.

Specifically, as the oxide 530a, a metal oxide in which an atomic ratio of In to Ga and Zn is In:Ga:Zn=1:3:4 or 1:1:0.5 is used. In addition, as the oxide 530b, a metal oxide in which an atomic ratio of In to Ga and Zn is In:Ga:Zn=4:2:3 or 1:1:1 is used. In addition, as the oxide 530c, a metal oxide in which an atomic ratio of In to Ga and Zn is In:Ga:Zn=1:3:4 or an atomic ratio of Ga to Zn is Ga:Zn=2:1 or Ga:Zn=2:5 is used. Specific examples of the case where the oxide 530c has a stacked-layer structure include a stacked-layer structure of a layer in which an atomic ratio of In to Ga and Zn is In:Ga:Zn=4:2:3 and a layer with In:Ga:Zn=1:3:4; a stacked-layer structure of a layer in which an atomic ratio of Ga to Zn is Ga:Zn=2:1 and a layer in which an atomic ratio of In to Ga and Zn is In:Ga:Zn=4:2:3; a stacked-layer structure of a layer in which an atomic ratio of Ga to Zn is Ga:Zn=2:5 and a layer in which an atomic ratio of In to Ga and Zn is In:Ga:Zn=4:2:3; and a stacked-layer structure of gallium oxide and a layer in which an atomic ratio of In to Ga and Zn is In:Ga:Zn=4:2:3.

For example, in the case where the atomic ratio of In to the element M in the metal oxide used as the oxide 530a is lower than the atomic ratio of In to the element M in the metal oxide used as the oxide 530b, an In—Ga—Zn oxide having a composition with an atomic ratio of In:Ga:Zn=5:1:6 or a neighborhood thereof, In:Ga:Zn=5:1:3 or a neighborhood thereof, In:Ga:Zn=10:1:3 or a neighborhood thereof, or the like can be used as the oxide 530b.

As the oxide 530b, it is also possible to use a metal oxide having a composition of In:Zn=2:1, a composition of In:Zn=5:1, a composition of In:Zn=10:1, or a composition in the neighborhood of any one of these compositions, other than the above-described compositions, for example.

The oxide 530a, the oxide 530b, and the oxide 530c are preferably combined to satisfy the above relation of the atomic ratios. For example, it is preferable that the oxide 530a and the oxide 530c each be a metal oxide having a composition of In:Ga:Zn=1:3:4 or a composition in the neighborhood thereof and the oxide 530b be a metal oxide having a composition of In:Ga:Zn=4:2:3 to 4:2:4.1 or a composition in the neighborhood thereof. Note that the above composition represents the atomic ratio of an oxide formed over a base or the atomic ratio of a sputtering target. Moreover, the proportion of In is preferably increased in the composition of the oxide 530b because the transistor can have a higher on-state current, higher field-effect mobility, or the like.

The energy of the conduction band minimum of the oxide 530a and the oxide 530c is preferably higher than the energy of the conduction band minimum of the oxide 530b. In other words, the electron affinity of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the density of defect states in a mixed layer formed at the interface between the oxide 530a and the oxide 530b and the interface between the oxide 530b and the oxide 530c is preferably decreased.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, it is preferable to use an In—Ga—Zn oxide, a Ga—Zn oxide, gallium oxide, or the like as the oxide 530a and the oxide 530c.

At this time, the oxide 530b serves as a main carrier path. When the oxide 530a and the oxide 530c have the above structure, the density of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and the conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements as its component; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. Furthermore, a metal nitride film of tantalum nitride or the like is preferable because it has a barrier property against hydrogen or oxygen.

The conductor 542a and the conductor 542b are illustrated to have a single-layer structure in FIG. 35A and FIG. 35B, but may have a stacked-layer structure of two or more layers. For example, it is preferable to stack a tantalum nitride film and a tungsten film. Alternatively, a titanium film and an aluminum film may be stacked. Alternatively, a two-layer structure in which an aluminum film is stacked over a tungsten film, a two-layer structure in which a copper film is stacked over a copper-magnesium-aluminum alloy film, a two-layer structure in which a copper film is stacked over a titanium film, or a two-layer structure in which a copper film is stacked over a tungsten film may be employed.

Other examples include a three-layer structure in which a titanium film or a titanium nitride film is formed, an aluminum film or a copper film is stacked over the titanium film or the titanium nitride film, and a titanium film or a titanium nitride film is formed over the aluminum film or the copper film; and a three-layer structure in which a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

As illustrated in FIG. 35A, a region 543a and a region 543b are sometimes formed as low-resistance regions in the oxide 530 at and near the interface with the conductor 542a (the conductor 542b). In that case, the region 543a functions as one of a source region and a drain region, and the region 543b functions as the other of the source region and the drain region. Furthermore, the channel formation region is formed in a region sandwiched between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier concentration of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one or more selected from hafnium, aluminum, gallium, yttrium, zirconium, tungsten, titanium, tantalum, nickel, germanium, neodymium, lanthanum, magnesium, and the like can be used as the insulator 544. Moreover, silicon nitride oxide, silicon nitride, or the like can be used as the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542*a* and the conductor 542*b* are oxidation-resistant materials or do not significantly lose the conductivity even after absorbing oxygen. Design is appropriately determined in consideration of required transistor characteristics.

With the insulator 544, diffusion of impurities such as water and hydrogen contained in the insulator 580 into the oxide 530*b* through the oxide 530*c* and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with the inner side (the top surface and the side surface) of the oxide 530*c*. Like the insulator 524 described above, the insulator 550 is preferably formed using an insulator that contains excess oxygen and releases oxygen by heating.

Specifically, it is possible to use any of silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide, each of which contains excess oxygen. In particular, silicon oxide and silicon oxynitride, which have thermal stability, are preferable.

When an insulator that releases oxygen by heating is provided as the insulator 550 in contact with the top surface of the oxide 530*c*, oxygen can be effectively supplied from the insulator 550 to the channel formation region of the oxide 530*b* through the oxide 530*c*. Furthermore, as in the insulator 524, the concentration of impurities such as water and hydrogen in the insulator 550 is preferably lowered. The thickness of the insulator 550 is preferably greater than or equal to 1 nm and less than or equal to 20 nm.

To efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current may arise because of a thinner gate insulating film; for that reason, when the insulator functioning as a gate insulating film has a stacked-layer structure of a high-k material and a thermally stable material, a gate potential at the time when the transistor operates can be lowered while the physical thickness of the gate insulating film is maintained. Furthermore, the stacked-layer structure can be thermally stable and have a high dielectric constant.

The conductor 560 functioning as the first gate electrode is illustrated to have a two-layer structure in FIG. 35A and FIG. 35B, but may have a single-layer structure or a stacked-layer structure of three or more layers.

For the conductor 560*a*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560*a* has a function of inhibiting diffusion of oxygen, it is possible to inhibit a reduction in conductivity of the conductor 560*b* due to oxidation caused by oxygen contained in the insulator 550. As a conductive material having a function of inhibiting oxygen diffusion, tantalum, tantalum nitride, ruthenium, or ruthenium oxide is preferably used, for example. For the conductor 560*a*, the oxide semiconductor that can be used as the oxide 530 can be used. In that case, when the conductor 560*b* is deposited by a sputtering method, the conductor 560*a* can have a reduced electrical resistance value to be a conductor. This can be referred to as an OC (Oxide Conductor) electrode.

For the conductor 560*b*, it is preferable to use a conductive material containing tungsten, copper, or aluminum as its main component. Furthermore, the conductor 560*b* also functions as a wiring and thus a conductor having high conductivity is preferably used as the conductor 560*b*. For example, a conductive material containing tungsten, copper, or aluminum as its main component can be used. Moreover, the conductor 560*b* may have a stacked-layer structure, for example, a stacked-layer structure of any of the above conductive materials and titanium or titanium nitride.

The insulator 580 is provided over the conductor 542*a* and the conductor 542*b* with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. Silicon oxide and silicon oxynitride, which have thermal stability, are particularly preferable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530*c*, oxygen in the insulator 580 can be efficiently supplied to the oxide 530 through the oxide 530*c*. The concentration of impurities such as water and hydrogen in the insulator 580 is preferably lowered.

The opening in the insulator 580 is formed to overlap with the region between the conductor 542*a* and the conductor 542*b*. Accordingly, the conductor 560 is formed to be embedded in the opening in the insulator 580 and the region sandwiched between the conductor 542*a* and the conductor 542*b*.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening in the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, an excess-oxygen region can be provided in the insulator 550 and the insulator 580. Thus, oxygen can be supplied from the excess-oxygen regions to the oxide 530.

For example, a metal oxide containing one or more selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Thus, aluminum oxide deposited by a sputtering method serves as an oxygen supply source and can also have a function of a barrier film against impurities such as hydrogen.

An insulator 581 functioning as an interlayer film is preferably provided over the insulator 574. As in the insulator 524 and the like, the concentration of impurities such as water and hydrogen in the insulator 581 is preferably lowered.

A conductor 540a and a conductor 540b are positioned in openings formed in the insulator 581, the insulator 574, the insulator 580, and the insulator 544. The conductor 540a and the conductor 540b are provided to face each other with the conductor 560 sandwiched therebetween. The conductor 540a and the conductor 540b each have a structure similar to that of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For example, a metal oxide such as aluminum oxide, hafnium oxide, or tantalum oxide is preferably used for the insulator 582.

In particular, aluminum oxide has an excellent blocking effect that prevents transmission of oxygen and impurities such as hydrogen and moisture which would cause a change in the electrical characteristics of the transistor. Accordingly, the use of aluminum oxide can prevent entry of impurities such as hydrogen and moisture into the transistor 500 in and after the manufacturing process of the transistor. In addition, release of oxygen from the oxide included in the transistor 500 can be inhibited. Therefore, aluminum oxide is suitably used for a protective film of the transistor 500.

An insulator 586 is provided over the insulator 582. For the insulator 586, a material similar to that for the insulator 320 can be used. Furthermore, when a material with a comparatively low dielectric constant is used for these insulators, parasitic capacitance generated between wirings can be reduced. A silicon oxide film, a silicon oxynitride film, or the like can be used for the insulator 586, for example.

The conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 function as plugs or wirings that are connected to the capacitor 600, the transistor 500, or the transistor 300. The conductor 546 and the conductor 548 can be provided using a material similar to those for the conductor 328 and the conductor 330.

Note that after the transistor 500 is formed, an opening may be formed to surround the transistor 500 and an insulator having a high barrier property against hydrogen or water may be formed to cover the opening. Surrounding the transistor 500 by the insulator having a high barrier property can prevent entry of moisture and hydrogen from the outside. Alternatively, a plurality of transistors 500 may be collectively surrounded by the insulator having a high barrier property against hydrogen or water. In the case where an opening is formed to surround the transistor 500, for example, the formation of an opening reaching the insulator 514 or the insulator 522 and the formation of the insulator having a high barrier property in contact with the insulator 514 or the insulator 522 are suitable because these formation steps can also serve as some of the manufacturing steps of the transistor 500. For the insulator having a high barrier property against hydrogen or water, a material similar to that for the insulator 522 is used, for example.

The capacitor 600 is provided above the transistor 500. The capacitor 600 includes a conductor 610, a conductor 620, and an insulator 630.

A conductor 612 may be provided over the conductor 546 and the conductor 548. The conductor 612 has a function of a plug or a wiring that is connected to the transistor 500. The conductor 610 has a function of an electrode of the capacitor 600. The conductor 612 and the conductor 610 can be formed at the same time.

As the conductor 612 and the conductor 610, it is possible to use a metal film containing an element selected from molybdenum, titanium, tantalum, tungsten, aluminum, copper, chromium, neodymium, and scandium; a metal nitride film containing any of the above elements as its component (a tantalum nitride film, a titanium nitride film, a molybdenum nitride film, or a tungsten nitride film); or the like. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

The conductor 612 and the conductor 610 are each illustrated to have a single-layer structure in FIG. 33; however, the structure is not limited thereto, and a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. For the conductor 620, a conductive material such as a metal material, an alloy material, or a metal oxide material can be used. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 650 is provided over the conductor 620 and the insulator 630. The insulator 650 can be provided using a material similar to that for the insulator 320. The insulator 650 may function as a planarization film that covers an uneven shape thereunder.

With the use of this structure, a change in electrical characteristics can be inhibited and reliability can be improved in a semiconductor device using a transistor including an oxide semiconductor. Alternatively, a semiconductor device using a transistor including an oxide semiconductor can be miniaturized or highly integrated.

Figure 36A:
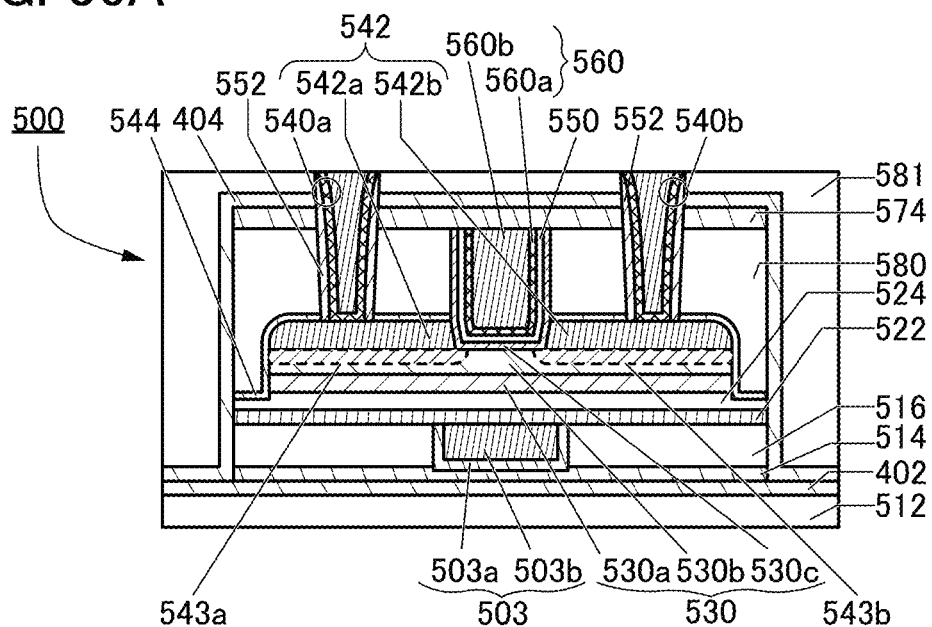
FIG. 36A and FIG. 36B are schematic cross-sectional views illustrating a structure example of a transistor.
Figure 36B:
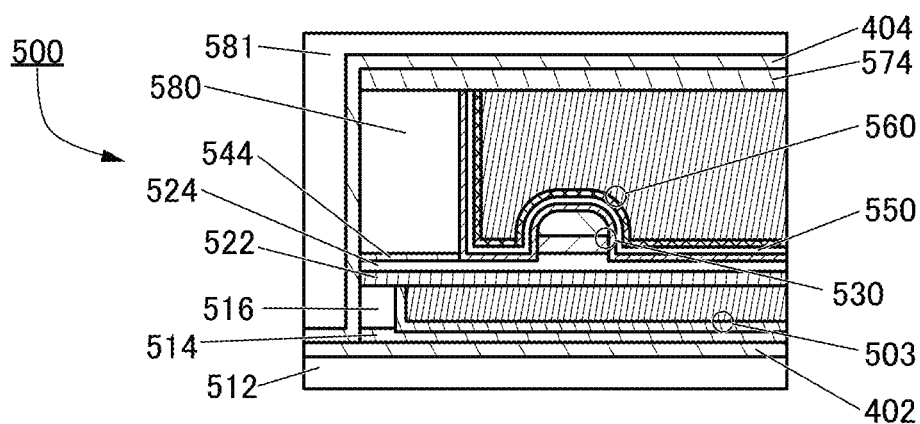

Next, other structure examples of the OS transistors illustrated in FIG. 33 and FIG. 34 are described. FIG. 36A and FIG. 36B illustrate a modification example of the transistor 500 illustrated in FIG. 35A and FIG. 35B; FIG. 36A is a cross-sectional view of the transistor 500 in the channel length direction and FIG. 36B is a cross-sectional view of the transistor 500 in the channel width direction. Note that the structure illustrated in FIG. 36A and FIG. 36B can also be employed for other transistors, such as the transistor 300, included in the semiconductor device of one embodiment of the present invention.

The transistor 500 having the structure illustrated in FIG. 36A and FIG. 36B is different from the transistor 500 having the structure illustrated in FIG. 35A and FIG. 35B in including an insulator 402 and an insulator 404. Another difference from the transistor 500 having the structure illustrated in FIG. 35A and FIG. 35B is that an insulator 552 is provided in contact with a side surface of the conductor 540a and the insulator 552 is provided in contact with a side surface of the conductor 540b. Another difference from the transistor 500 having the structure illustrated in FIG. 35A and FIG. 35B is that the insulator 520 is not included.

In the transistor 500 having the structure illustrated in FIG. 36A and FIG. 36B, the insulator 402 is provided over the insulator 512. In addition, the insulator 404 is provided over the insulator 574 and the insulator 402.

In the transistor 500 having the structure illustrated in FIG. 36A and FIG. 36B, the insulator 514, the insulator 516, the insulator 522, the insulator 524, the insulator 544, the insulator 580, and the insulator 574 are provided and covered with the insulator 404. That is, the insulator 404 is in contact with a top surface of the insulator 574, a side surface of the insulator 574, a side surface of the insulator 580, a side surface of the insulator 544, a side surface of the insulator 524, a side surface of the insulator 522, a side surface of the insulator 516, a side surface of the insulator 514, and a top surface of the insulator 402. Thus, the oxide 530 and the like are isolated from the outside by the insulator 404 and the insulator 402.

The insulator 402 and the insulator 404 preferably have high capability of inhibiting diffusion of hydrogen (e.g., at least one of a hydrogen atom, a hydrogen molecule, and the like) or a water molecule. For example, for the insulator 402 and the insulator 404, silicon nitride or silicon nitride oxide that is a material having a high hydrogen barrier property is preferably used. This can inhibit diffusion of hydrogen or the like into the oxide 530, thereby suppressing the degradation of the characteristics of the transistor 500. Consequently, the reliability of the semiconductor device of one embodiment of the present invention can be increased.

The insulator 552 is provided in contact with the insulator 581, the insulator 404, the insulator 574, the insulator 580, and the insulator 544. The insulator 552 preferably has a function of inhibiting diffusion of hydrogen or water molecules. For example, as the insulator 552, an insulator such as silicon nitride, aluminum oxide, or silicon nitride oxide that is a material having a high hydrogen barrier property is preferably used. In particular, silicon nitride is suitably used for the insulator 552 because it is a material having a high hydrogen barrier property. The use of a material having a high hydrogen barrier property for the insulator 552 can inhibit diffusion of impurities such as water and hydrogen from the insulator 580 and the like into the oxide 530 through the conductor 540a and the conductor 540b. Furthermore, oxygen contained in the insulator 580 can be inhibited from being absorbed by the conductor 540a and the conductor 540b. As described above, the reliability of the semiconductor device of one embodiment of the present invention can be increased.

Figure 37:
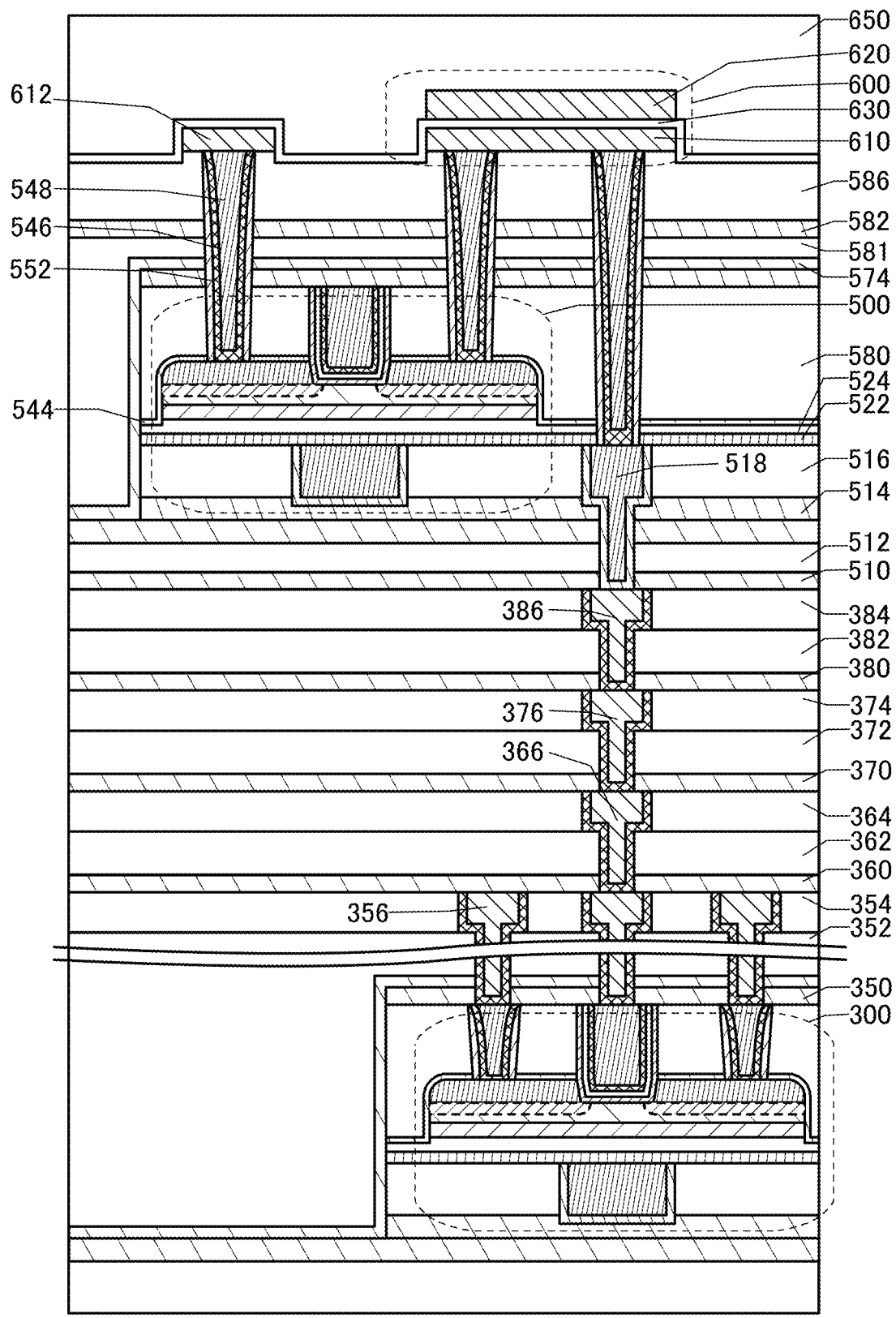
FIG. 37 is a schematic cross-sectional view illustrating a structure example of a semiconductor device.

FIG. 37 is a cross-sectional view illustrating a structure example of a semiconductor device in the case where the transistor 500 and the transistor 300 each have the structure illustrated in FIG. 36A and FIG. 36B. The insulator 552 is provided on a side surface of the conductor 546.

Figure 38A:
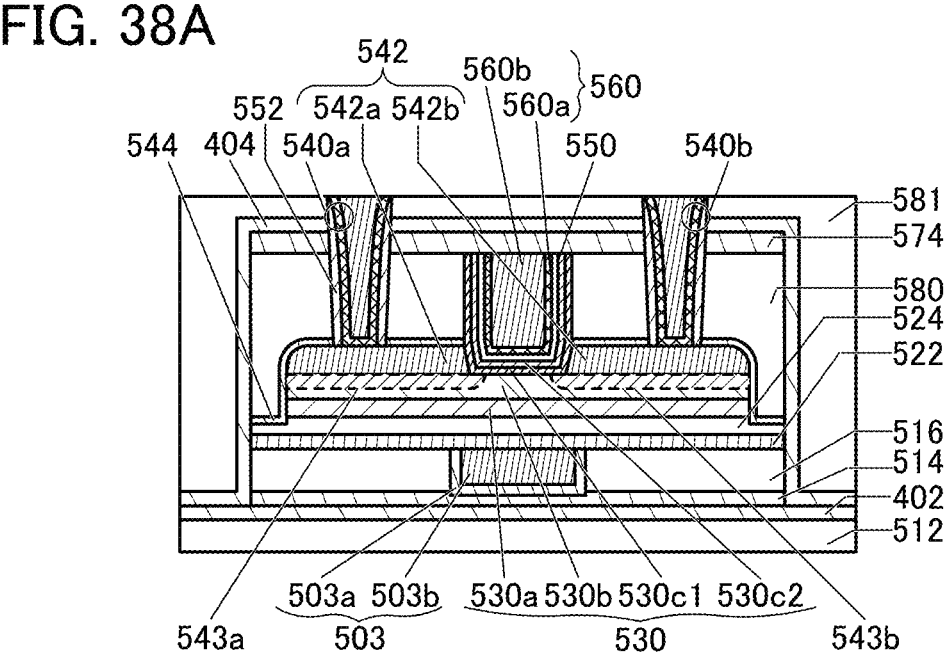
FIG. 38A and FIG. 38B are schematic cross-sectional views illustrating a structure example of a transistor.
Figure 38B:
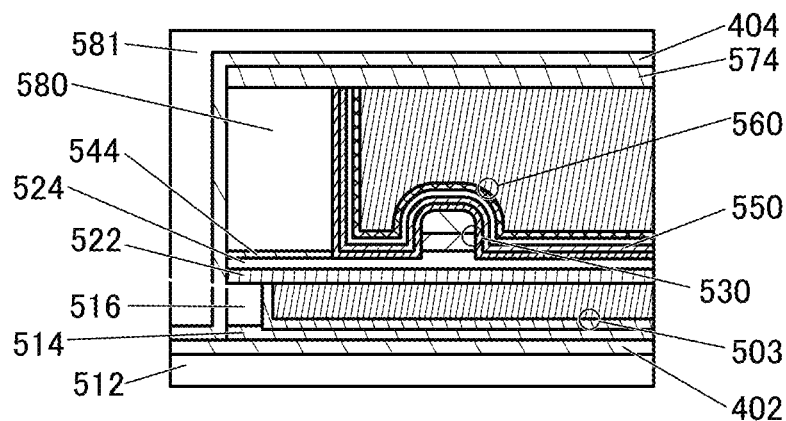

The transistor structure of the transistor 500 illustrated in FIG. 36A and FIG. 36B may be changed depending on the situation. As the modification example of the transistor 500 in FIG. 36A and FIG. 36B, a transistor illustrated in FIG. 38 can be employed, for example. FIG. 38A is a cross-sectional view of the transistor in the channel length direction and FIG. 38B is a cross-sectional view of the transistor in the channel width direction. The transistor illustrated in FIG. 38A and FIG. 38B is different from the transistor illustrated in FIG. 36A and FIG. 36B in that the oxide 530c has a two-layer structure of an oxide 530c1 and an oxide 530c2.

The oxide 530c1 is in contact with a top surface of the insulator 524, a side surface of the oxide 530a, a top surface and a side surface of the oxide 530b, side surfaces of the conductor 542a and the conductor 542b, a side surface of the insulator 544, and a side surface of the insulator 580. The oxide 530c2 is in contact with the insulator 550.

An In—Zn oxide can be used as the oxide 530c1, for example. For the oxide 530c2, it is possible to use a material similar to a material that can be used for the oxide 530c when the oxide 530c has a single-layer structure. As the oxide 530c2, a metal oxide with n:Ga:Zn=1:3:4 [atomic ratio], Ga:Zn=2:1 [atomic ratio], or Ga:Zn=2:5 [atomic ratio] can be used, for example.

When the oxide 530c has a two-layer structure of the oxide 530c1 and the oxide 530c2, the on-state current of the transistor can be increased as compared with the case where the oxide 530c has a single-layer structure. Thus, the transistor can be used as a power MOS transistor, for example. Note that the oxide 530c included in the transistor having the structure illustrated in FIG. 35A and FIG. 35B can also have a two-layer structure of the oxide 530c1 and the oxide 530c2.

The transistor having the structure illustrated in FIG. 38A and FIG. 38B can be used as, for example, the transistor 300 illustrated in FIG. 33 and FIG. 34. The transistor 300 can be used as, for example, the transistor M1 and the like of the circuit MP included in the arithmetic circuit 110, the arithmetic circuit 120, the arithmetic circuit 140, and the like that are described in the above embodiment. Note that the transistor illustrated in FIG. 38A and FIG. 38B can be used as a transistor, other than the transistor 300 and the transistor 500, included in the semiconductor device of one embodiment of the present invention.

Figure 39:
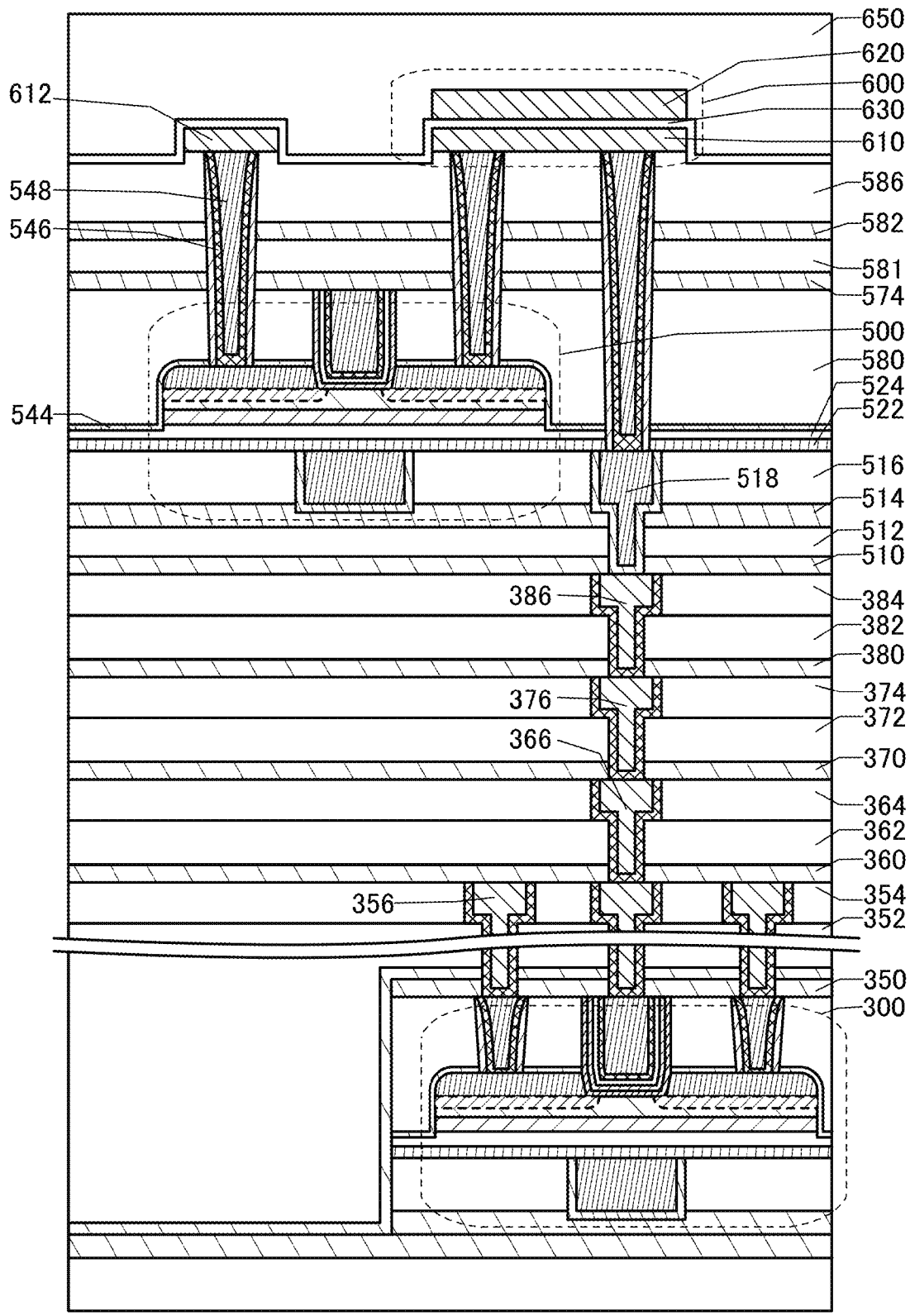
FIG. 39 is a schematic cross-sectional view illustrating a structure example of a semiconductor device.

FIG. 39 is a cross-sectional view illustrating a structure example of a semiconductor device in the case where the transistor 500 has the transistor structure illustrated in FIG. 35A and the transistor 300 has the transistor structure illustrated in FIG. 38A. Note that as in FIG. 37, the structure is employed in which the insulator 552 is provided on the side surface of the conductor 546. As illustrated in FIG. 39, in the semiconductor device of one embodiment of the present invention, the transistor 300 and the transistor 500 can have different structures while the transistor 300 and the transistor 500 are both OS transistors.

Next, a capacitor that can be used in the semiconductor devices in FIG. 33 and FIG. 34 is described.

Figure 40A:
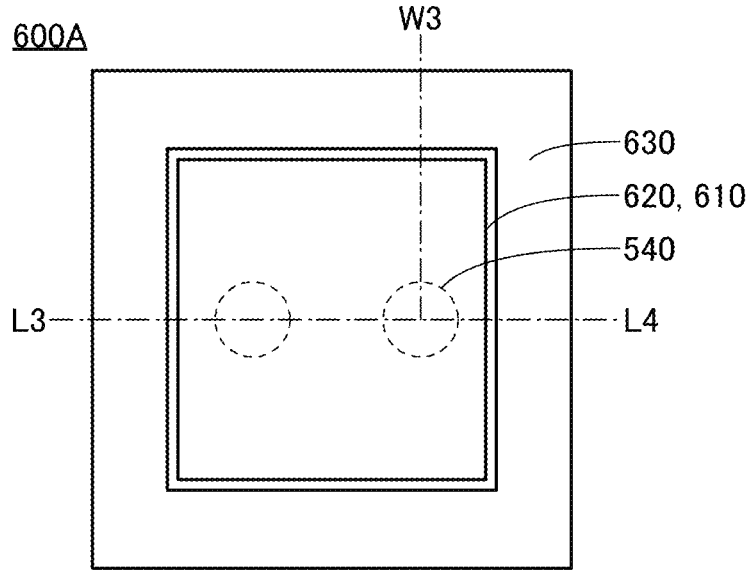
FIG. 40A is a top view illustrating a structure example of a capacitor.
Figure 40B:
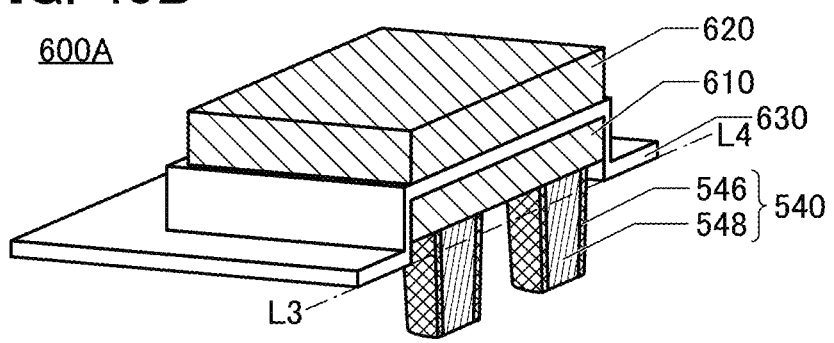
FIG. 40B and FIG. 40C are cross-sectional perspective views illustrating a structure example of a capacitor.
Figure 40C:
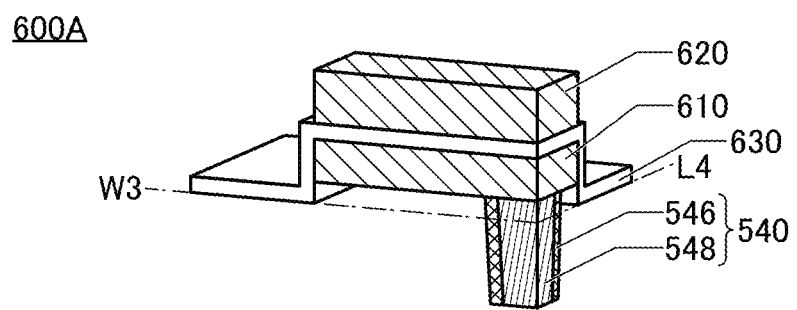

FIG. 40 illustrates a capacitor 600A as an example of the capacitor 600 that can be used in the semiconductor device illustrated in FIG. 33. FIG. 40A is a top view of the capacitor 600A, FIG. 40B is a perspective view illustrating a cross section of the capacitor 600A along the dashed-dotted line L3-L4, and FIG. 40C is a perspective view illustrating a cross section of the capacitor 600A along the dashed-dotted line W3-L4.

The conductor 610 functions as one of a pair of electrodes of the capacitor 600A, and the conductor 620 functions as the other of the pair of electrodes of the capacitor 600A. The insulator 630 functions as a dielectric sandwiched between the pair of electrodes.

The insulator 630 can be provided to have a single-layer structure or a stacked-layer structure using, for example, silicon oxide, silicon oxynitride, silicon nitride oxide, silicon nitride, aluminum oxide, aluminum oxynitride, aluminum nitride oxide, aluminum nitride, hafnium oxide, hafnium oxynitride, hafnium nitride oxide, hafnium nitride, or zirconium oxide.

Alternatively, for the insulator 630, a stacked-layer structure using a material with high dielectric strength such as silicon oxynitride and a high dielectric constant (high-k) material may be used, for example. In the capacitor 600A having such a structure, a sufficient capacitance can be ensured owing to the high dielectric constant (high-k) insulator, and the dielectric strength can be increased owing to the insulator with high dielectric strength, so that the electrostatic breakdown of the capacitor 600A can be inhibited.

As the insulator of a high dielectric constant (high-k) material (a material having a high dielectric constant), gallium oxide, hafnium oxide, zirconium oxide, an oxide containing aluminum and hafnium, an oxynitride containing aluminum and hafnium, an oxide containing silicon and hafnium, an oxynitride containing silicon and hafnium, a nitride containing silicon and hafnium, or the like can be given.

Alternatively, for example, a single layer or stacked layers of an insulator containing a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST), may be used as the insulator 630. In the case where the insulator 630 has stacked layers, a three-layer structure in which zirconium oxide, aluminum oxide, and zirconium oxide are formed in this order, or a four-layer structure in which zirconium oxide, aluminum oxide, zirconium oxide, and aluminum oxide are formed in this order can be employed, for example. For the insulator 630, a compound containing hafnium and zirconium may be employed, for example. As miniaturization and high integration of a semiconductor device progress, a problem such as leakage current from a transistor and a capacitor may arise because of a thinner gate insulator and a thinner dielectric used for a capacitor. When a high-k material is used for a gate insulator and an insulator functioning as a dielectric used for a capacitor, a gate potential during operation of the transistor can be lowered and capacitance of the capacitor can be ensured while the physical thickness is maintained.

The bottom portion of the conductor 610 in the capacitor 600 is electrically connected to the conductor 546 and the conductor 548. The conductor 546 and the conductor 548 function as plugs or wirings for connection to another circuit element. In FIG. 40A to FIG. 40C, the conductor 546 and the conductor 548 are collectively denoted as a conductor 540.

For clarification of the drawing, the insulator 586 in which the conductor 546 and the conductor 548 are embedded and the insulator 650 that covers the conductor 620 and the insulator 630 are omitted in FIG. 40A to FIG. 40C.

Although the capacitor 600 illustrated in each of FIG. 33, FIG. 34, and FIG. 40A to FIG. 40C is a planar capacitor, the shape of the capacitor is not limited thereto. For example, the capacitor 600 may be a cylindrical capacitor 600B illustrated in FIG. 41A to FIG. 41C.

Figure 41A:
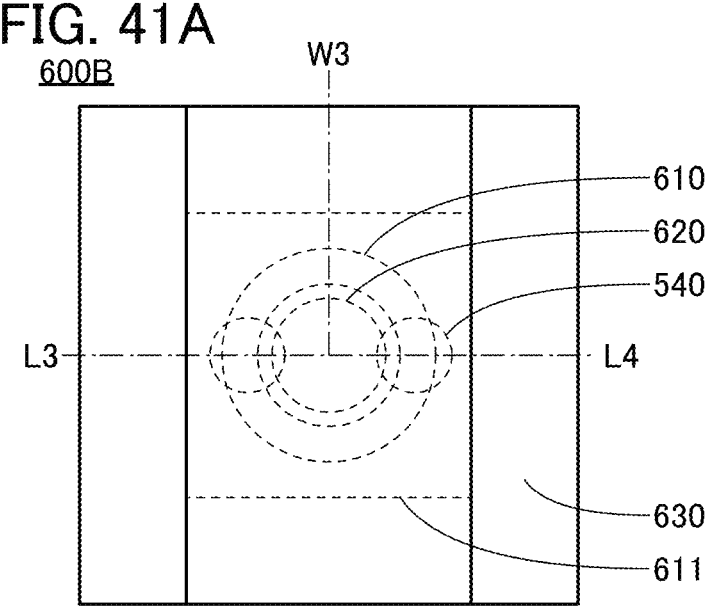
FIG. 41A is a top view illustrating a structure example of a capacitor.
Figure 41B:
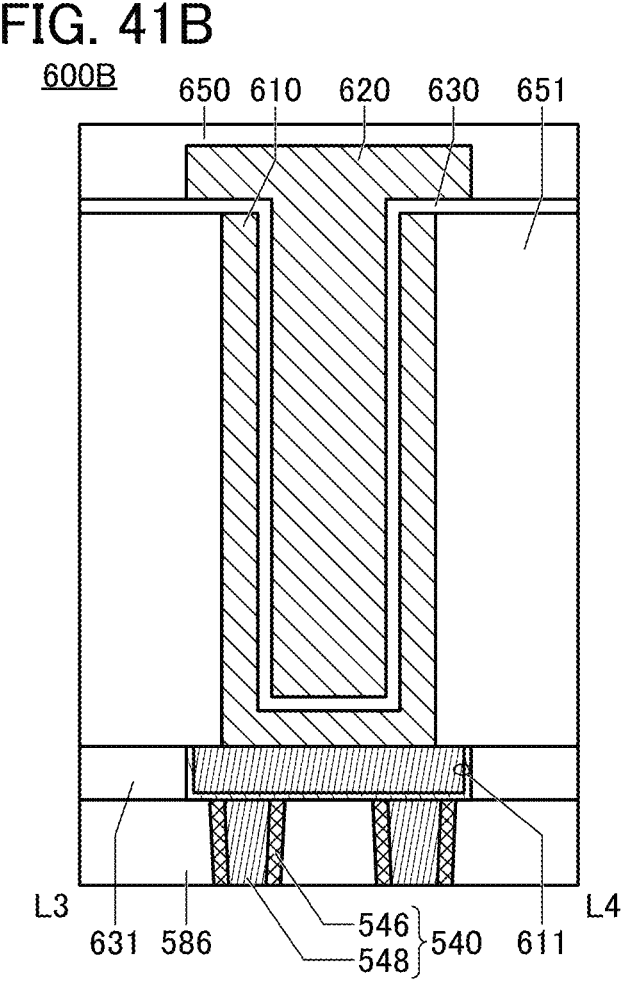
FIG. 41B is a cross-sectional view illustrating a structure example of a capacitor.
Figure 41C:
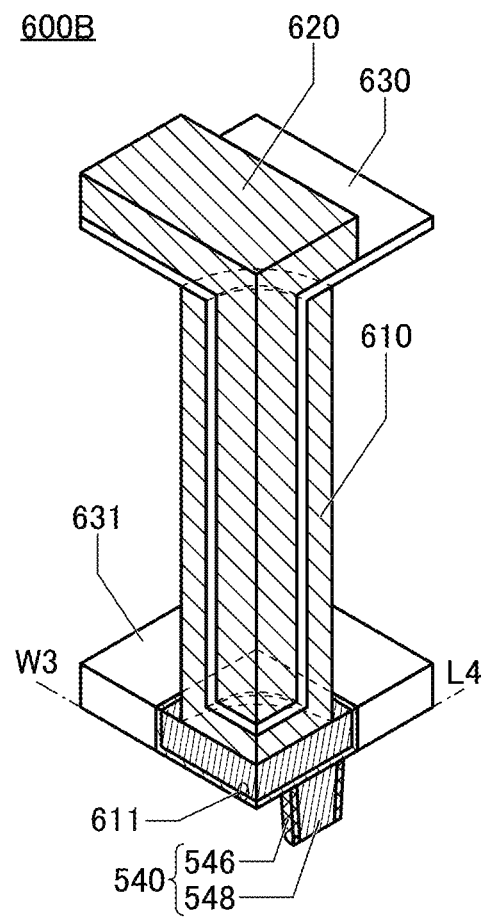
FIG. 41C is a cross-sectional perspective view illustrating a structure example of a capacitor.

FIG. 41A is a top view of the capacitor 600B, FIG. 41B is a cross-sectional view of the capacitor 600B along the dashed-dotted line L3-L4, and FIG. 41C is a perspective view illustrating a cross section of the capacitor 600B along the dashed-dotted line W3-L4.

In FIG. 41B, the capacitor 600B includes an insulator 631 over the insulator 586 in which the conductor 540 is embedded, an insulator 651 having an opening portion, the conductor 610 functioning as one of a pair of electrodes, and the conductor 620 functioning as the other of the pair of electrodes.

For clarification of the drawing, the insulator 586, the insulator 650, and the insulator 651 are omitted in FIG. 41C.

For the insulator 631, a material similar to that for the insulator 586 can be used, for example.

A conductor 611 is embedded in the insulator 631 to be electrically connected to the conductor 540. For the conductor 611, a material similar to those for the conductor 330 and the conductor 518 can be used, for example.

For the insulator 651, a material similar to that for the insulator 586 can be used, for example.

The insulator 651 has an opening portion as described above, and the opening portion overlaps with the conductor 611.

The conductor 610 is formed on the bottom portion and the side surface of the opening portion. In other words, the conductor 610 overlaps with the conductor 611 and is electrically connected to the conductor 611.

The conductor 610 is formed in such a manner that an opening portion is formed in the insulator 651 by an etching method or the like, and then the conductor 610 is deposited by a sputtering method, an ALD method, or the like. After that, the conductor 610 deposited over the insulator 651 is removed by a CMP (Chemical Mechanical Polishing) method or the like while the conductor 610 deposited in the opening portion is left.

The insulator 630 is positioned over the insulator 651 and over the formation surface of the conductor 610. Note that the insulator 630 functions as a dielectric sandwiched between the pair of electrodes in the capacitor.

The conductor 620 is formed over the insulator 630 so as to fill the opening portion of the insulator 651.

The insulator 650 is formed to cover the insulator 630 and the conductor 620.

The capacitance value of the cylindrical capacitor 600B illustrated in FIG. 41A to FIG. 41C can be higher than that of the planar capacitor 600A. Thus, when the capacitor 600B is used as the capacitor C1 and the like described in the above embodiment, for example, voltage between the terminals of the capacitor can be maintained for a long time.

Note that this embodiment can be combined with any of the other embodiments in this specification as appropriate.

Embodiment 6

Described in this embodiment is a metal oxide (hereinafter, also referred to as an oxide semiconductor) that can be used in the OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structure>

First, the classification of the crystal structures of an oxide semiconductor will be described with reference to FIG. 42A. FIG. 42A is a diagram showing the classification of crystal structures of an oxide semiconductor, typically IGZO (a metal oxide containing In, Ga, and Zn).

As shown in FIG. 42A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (cloud-aligned composite) (excluding single crystal and poly crystal). Note that the term "Crystalline" excludes single crystal, poly crystal, and completely amorphous. The term "Crystal" includes single crystal and poly crystal.

Note that the structures in the thick frame in FIG. 42A are in an intermediate state between "Amorphous" and "Crystal", and belong to a new crystalline phase. That is, these structures are completely different from "Amorphous", which is energetically unstable, and "Crystal".

Note that a crystal structure of a film or a substrate can be evaluated with an X-ray diffraction (XRD) spectrum. FIG. 42B shows an XRD spectrum, which is obtained by GIXD (Grazing-Incidence XRD) measurement, of a CAAC-IGZO film classified into "Crystalline" (the vertical axis represents intensity in arbitrary unit (a.u.)). Note that a GIXD method is also referred to as a thin film method or a Seemann-Bohlin method. The XRD spectrum that is shown in FIG. 42B and obtained by GIXD measurement is hereinafter simply referred to as an XRD spectrum. The CAAC-IGZO film in FIG. 42B has a composition in the neighborhood of In:Ga:Zn=4:2:3 [atomic ratio]. The CAAC-IGZO film in FIG. 42B has a thickness of 500 nm.

As shown in FIG. 42B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. As shown in FIG. 42B, the peak at 2θ of around 31° is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 42C shows a diffraction pattern of the CAAC-IGZO film. FIG. 42C shows a diffraction pattern obtained by the NBED method in which an electron beam is incident in the direction parallel to the substrate. The composition of the CAAC-IGZO film in FIG. 42C is In:Ga:Zn=4:2:3 [atomic ratio] or the neighborhood thereof. In the nanobeam electron diffraction method, electron diffraction is performed with a probe diameter of 1 nm.

As shown in FIG. 42C, a plurality of spots indicating c-axis alignment are observed in the diffraction pattern of the CAAC-IGZO film.

<<Structure of Oxide Semiconductor>>

Oxide semiconductors might be classified in a manner different from one shown in FIG. 42A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (also referred to as grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

Note that a crystal structure in which a clear crystal grain boundary is observed is what is called polycrystal. It is highly probable that the crystal grain boundary becomes a recombination center and traps carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is unlikely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., 1 nm or larger and 30 nm or smaller).

[A-Like OS]

The a-like OS is an oxide semiconductor having a structure between those of the nc-OS and the amorphous oxide semiconductor. The a-like OS contains a void or a low-density region. That is, the a-like OS has low crystallinity as compared with the nc-OS and the CAAC-OS. Moreover, the a-like OS has a higher hydrogen concentration in the film than the nc-OS and the CAAC-OS.

<<Structure of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region includes indium oxide, indium zinc oxide, or the like as its main component. The second region includes gallium oxide, gallium zinc oxide, or the like as its main component. That is, the first region can be rephrased as a region containing In as its main component. The second region can be rephrased as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current (Ion), high field-effect mobility (μ), and excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor having a low carrier concentration is preferably used in a transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus also has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained by SIMS, is lower than or equal to $1\times10^{18}$ atoms/cm$^3$, preferably lower than or equal to $2\times10^{16}$ atoms/cm$^3$.

Furthermore, when the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

Note that this embodiment can be combined with any of the other embodiments in this specification as appropriate.

Embodiment 7

This embodiment will show examples of a semiconductor wafer where the semiconductor device or the like described in the above embodiment is formed and electronic components incorporating the semiconductor device.

<Semiconductor Wafer>

First, an example of a semiconductor wafer where a semiconductor device or the like is formed is described with reference to FIG. 43A.

Figure 43A:
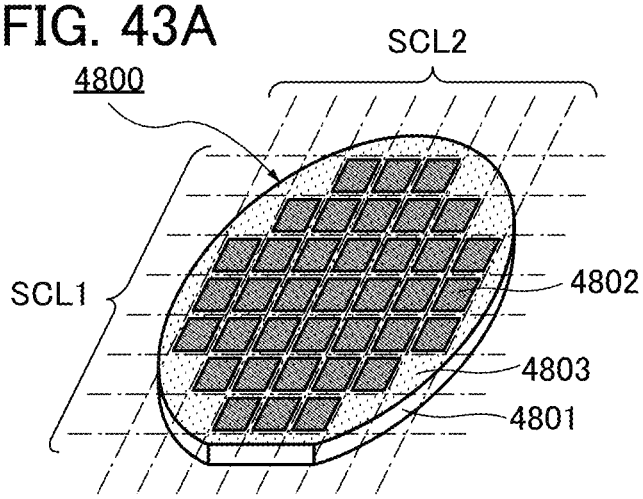
FIG. 43A is a perspective view illustrating an example of a semiconductor wafer.

A semiconductor wafer 4800 illustrated in FIG. 43A includes a wafer 4801 and a plurality of circuit portions 4802 provided on the top surface of the wafer 4801. A portion without the circuit portion 4802 on the top surface of the wafer 4801 is a spacing 4803 that is a region for dicing.

The semiconductor wafer 4800 can be fabricated by forming the plurality of circuit portions 4802 on the surface of the wafer 4801 by a pre-process. After that, a surface of the wafer 4801 opposite to the surface provided with the plurality of circuit portions 4802 may be ground to thin the wafer 4801. Through this step, warpage or the like of the wafer 4801 is reduced and the size of the component can be reduced.

A dicing step is performed as the next step. The dicing is performed along scribe lines SCL1 and scribe lines SCL2 (referred to as dicing lines or cutting lines in some cases) indicated by dashed-dotted lines. Note that to perform the dicing step easily, it is preferable that the spacing 4803 be provided so that the plurality of scribe lines SCL1 are parallel to each other, the plurality of scribe lines SCL2 are parallel to each other, and the scribe lines SCL1 are perpendicular to the scribe line SCL2.

Figure 43B:
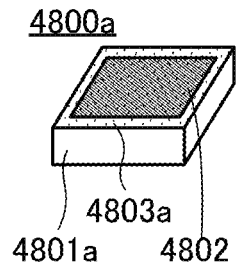
FIG. 43B is a perspective view illustrating an example of a chip.

With the dicing step, a chip 4800a as illustrated in FIG. 43B can be cut out from the semiconductor wafer 4800. The chip 4800a includes a wafer 4801a, the circuit portion 4802, and a spacing 4803a. Note that it is preferable to make the spacing 4803a as small as possible. In this case, the width of the spacing 4803 between adjacent circuit portions 4802 is substantially the same as a cutting allowance of the scribe line SCL1 or a cutting allowance of the scribe line SCL2.

Note that the shape of the element substrate of one embodiment of the present invention is not limited to the shape of the semiconductor wafer 4800 illustrated in FIG. 43A. The element substrate may be a rectangular semiconductor wafer, for example. The shape of the element substrate can be changed as appropriate, depending on a manufacturing process of an element and an apparatus for manufacturing the element.

<Electronic Component>

Figure 43C:
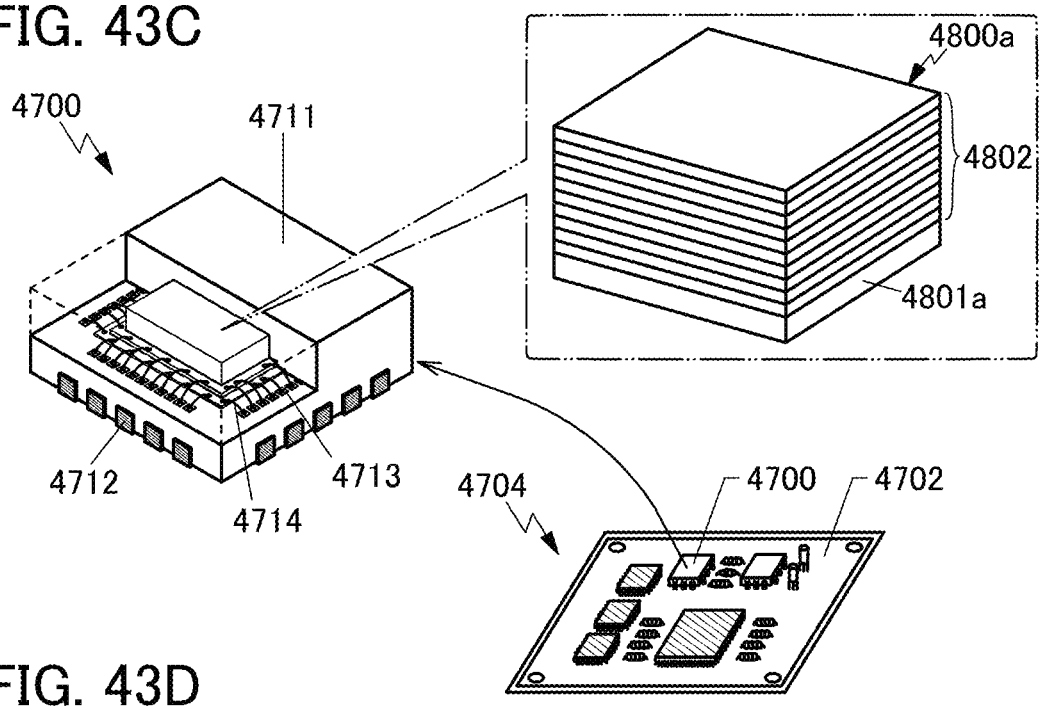
FIG. 43C and FIG. 43D are perspective views illustrating examples of electronic components.

FIG. 43C is a perspective view of an electronic component 4700 and a substrate (a mounting board 4704) on which the electronic component 4700 is mounted. The electronic component 4700 illustrated in FIG. 43C includes the chip 4800a in a mold 4711. Note that the chip 4800a illustrated in FIG. 43C has a structure in which the circuit portions 4802 are stacked. That is, the semiconductor device described in the above embodiment can be used for the circuit portion 4802. To illustrate the inside of the electronic component 4700, some portions are omitted in FIG. 43C. The electronic component 4700 includes a land 4712 outside the mold 4711. The land 4712 is electrically connected to an electrode pad 4713, and the electrode pad 4713 is electrically connected to the chip 4800a through a wire 4714. The electronic component 4700 is mounted on a printed circuit board 4702, for example. A plurality of such electronic components are combined and electrically connected to each other on the printed circuit board 4702, whereby the mounting board 4704 is completed.

Figure 43D:
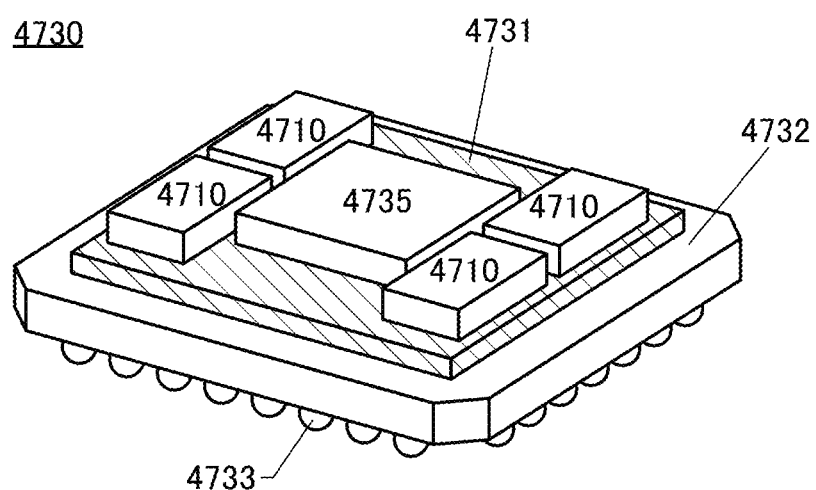

FIG. 43D is a perspective view of an electronic component 4730. The electronic component 4730 is an example of a SiP (System in package) or an MCM (Multi Chip Module). In the electronic component 4730, an interposer 4731 is provided on a package substrate 4732 (a printed circuit board), and a semiconductor device 4735 and a plurality of semiconductor devices 4710 are provided on the interposer 4731.

The electronic component 4730 includes the semiconductor devices 4710. Examples of the semiconductor devices 4710 include the semiconductor device described in the above embodiment and a high bandwidth memory (HBM). An integrated circuit (a semiconductor device) such as a CPU, a GPU, an FPGA, or a memory device can be used as the semiconductor device 4735.

As the package substrate 4732, a ceramic substrate, a plastic substrate, a glass epoxy substrate, or the like can be used. As the interposer 4731, a silicon interposer, a resin interposer, or the like can be used.

The interposer 4731 includes a plurality of wirings and has a function of electrically connecting a plurality of integrated circuits with different terminal pitches. The plurality of wirings are provided in a single layer or multiple layers. Moreover, the interposer 4731 has a function of electrically connecting an integrated circuit provided on the interposer 4731 to an electrode provided on the package substrate 4732. Accordingly, the interposer is referred to as a "redistribution substrate" or an "intermediate substrate" in some cases. A through electrode is provided in the interposer 4731 and the through electrode is used to electrically connect an integrated circuit and the package substrate 4732 in some cases. In a silicon interposer, a TSV (Through Silicon Via) can also be used as the through electrode.

A silicon interposer is preferably used as the interposer 4731. A silicon interposer can be manufactured at lower cost than an integrated circuit because it is not necessary to provide an active element. Meanwhile, since wirings of a silicon interposer can be formed through a semiconductor process, formation of minute wirings, which is difficult for a resin interposer, is easy.

In order to achieve a wide memory bandwidth, many wirings need to be connected to an HBM. Therefore, formation of minute and high-density wirings is required for an interposer on which an HBM is mounted. For this reason, a silicon interposer is preferably used as the interposer on which an HBM is mounted.

In a SiP, an MCM, or the like using a silicon interposer, a decrease in reliability due to a difference in expansion coefficient between an integrated circuit and the interposer is less likely to occur. Furthermore, the surface of a silicon interposer has high planarity, so that a poor connection between the silicon interposer and an integrated circuit provided on the silicon interposer is less likely to occur. It is particularly preferable to use a silicon interposer for a 2.5D package (2.5-dimensional mounting) in which a plurality of integrated circuits are arranged side by side on an interposer.

A heat sink (a radiator plate) may be provided to overlap with the electronic component 4730. In the case of providing a heat sink, the heights of integrated circuits provided on the interposer 4731 are preferably equal to each other. For example, in the electronic component 4730 described in this embodiment, the heights of the semiconductor devices 4710 and the semiconductor device 4735 are preferably equal to each other.

To mount the electronic component 4730 on another substrate, an electrode 4733 may be provided on the bottom portion of the package substrate 4732. FIG. 43D illustrates an example in which the electrode 4733 is formed of a solder ball. Solder balls are provided in a matrix on the bottom portion of the package substrate 4732, whereby BGA (Ball Grid Array) mounting can be achieved. Alternatively, the electrode 4733 may be formed of a conductive pin. When conductive pins are provided in a matrix on the bottom portion of the package substrate 4732, PGA (Pin Grid Array) mounting can be achieved.

The electronic component 4730 can be mounted on another substrate by various mounting methods other than BGA and PGA. For example, a mounting method such as SPGA (Staggered Pin Grid Array), LGA (Land Grid Array), QFP (Quad Flat Package), QFJ (Quad Flat J-leaded package), or QFN (Quad Flat Non-leaded package) can be employed.

Note that this embodiment can be combined with any of the other embodiments in this specification as appropriate.

Embodiment 8

Figure 44:
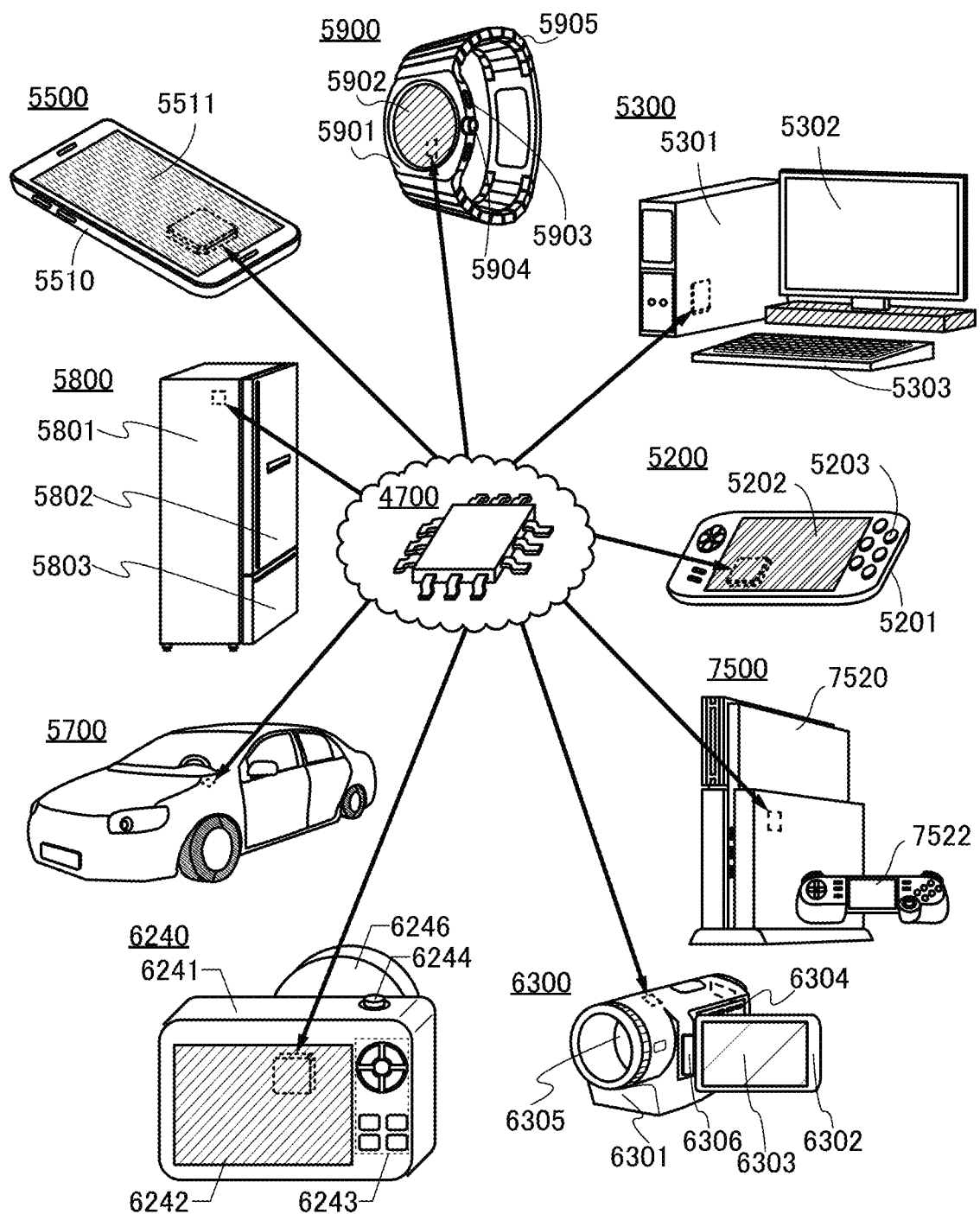
FIG. 44 is a perspective view illustrating examples of electronic devices.

This embodiment will show examples of electronic devices including the semiconductor device described in the above embodiment. FIG. 44 illustrates electronic devices each of which includes the electronic component 4700 (BMP, sometimes referred to as a brain-morphic processor or the like) including the semiconductor device.

[Mobile Phone]

An information terminal 5500 illustrated in FIG. 44 is a mobile phone (smartphone), which is a type of information terminal. The information terminal 5500 includes a housing 5510 and a display portion 5511, and as input interfaces, a touch panel is provided in the display portion 5511 and a button is provided in the housing 5510.

The information terminal 5500 can execute an application utilizing artificial intelligence with the use of the semiconductor device described in the above embodiment. Examples of the application utilizing artificial intelligence include an application for interpreting a conversation and displaying its content on the display portion 5511; an application for recognizing letters, diagrams, and the like input to the touch panel of the display portion 5511 by a user and displaying them on the display portion 5511; and an application for biometric authentication using fingerprints, voice prints, or the like.

[Wearable Terminal]

FIG. 44 illustrates a smartwatch 5900 as an example of a wearable terminal. The smartwatch 5900 includes a housing 5901, a display portion 5902, an operation button 5903, an operator 5904, a band 5905, and the like.

The wearable terminal can execute an application utilizing artificial intelligence with the use of the semiconductor device described in the above embodiment, like the information terminal 5500 described above. Examples of the application utilizing artificial intelligence include an application for managing the health condition of the user of the wearable terminal and a navigation system that selects the optimal route and navigates the user on the basis of the input of the destination.

[Information Terminal]

FIG. 44 illustrates a desktop information terminal 5300. The desktop information terminal 5300 includes a main body 5301 of the information terminal, a display 5302, and a keyboard 5303.

The desktop information terminal 5300 can execute an application utilizing artificial intelligence with the use of the semiconductor device described in the above embodiment, like the information terminal 5500 described above. Examples of the application utilizing artificial intelligence include design-support software, text correction software, and software for automatic menu generation. Furthermore, with the use of the desktop information terminal 5300, novel artificial intelligence can be developed.

Note that although FIG. 44 illustrates the smartphone and the desktop information terminal as examples of the electronic device as described above, application to information terminals other than a smartphone and a desktop information terminal is also possible. Examples of information terminals other than a smartphone and a desktop information terminal include a PDA (Personal Digital Assistant), a laptop information terminal, and a workstation.

[Household Appliance]

FIG. 44 illustrates an electric refrigerator-freezer 5800 as an example of a household appliance. The electric refrigerator-freezer 5800 includes a housing 5801, a refrigerator door 5802, a freezer door 5803, and the like.

When the semiconductor device described in the above embodiment is used for the electric refrigerator-freezer 5800, the electric refrigerator-freezer 5800 including artificial intelligence can be achieved. Utilizing the artificial intelligence enables the electric refrigerator-freezer 5800 to have a function of automatically making a menu based on foods stored in the electric refrigerator-freezer 5800 and the food expiration dates, for example, a function of automatically adjusting the temperature to be appropriate for the foods stored in the electric refrigerator-freezer 5800, and the like.

The electric refrigerator-freezer is described in this example as a household appliance; other examples of household appliances include a vacuum cleaner, a microwave oven, an electric oven, a rice cooker, a water heater, an IH cooker, a water server, a heating-cooling combination appliance such as an air conditioner, a washing machine, a drying machine, and an audio visual appliance.

[Game Machine]

FIG. 44 illustrates a portable game machine 5200 as an example of a game machine. The portable game machine 5200 includes a housing 5201, a display portion 5202, a button 5203, and the like.

FIG. 44 illustrates a stationary game machine 7500 as another example of a game machine. The stationary game machine 7500 includes a main body 7520 and a controller 7522. The controller 7522 can be connected to the main body 7520 with or without a wire. Although not illustrated in FIG. 44, the controller 7522 can include a display portion that displays a game image, and an input interface besides a button, such as a touch panel, a stick, a rotating knob, and a sliding knob, for example. The shape of the controller 7522 is not limited to that illustrated in FIG. 44, and the shape of the controller 7522 may be changed variously in accordance with the genres of games. For example, for a shooting game such as an FPS (First Person Shooter) game, a gun-shaped controller having a trigger button can be used. As another example, for a music game or the like, a controller having a shape of a musical instrument, audio equipment, or the like can be used. Furthermore, the stationary game machine may include a camera, a depth sensor, a microphone, and the like so that the game player can play a game using a gesture and/or a voice instead of a controller.

Videos displayed on the game machine can be output with a display device such as a television device, a personal computer display, a game display, or a head-mounted display.

When the semiconductor device described in the above embodiment is used for the portable game machine 5200, the portable game machine 5200 with low power consumption can be achieved. Moreover, heat generation from a circuit can be reduced owing to low power consumption; thus, the influence of heat generation on the circuit, the peripheral circuit, and the module can be reduced.

Furthermore, when the semiconductor device described in the above embodiment is used for the portable game machine 5200, the portable game machine 5200 including artificial intelligence can be achieved.

In general, the progress of a game, the actions and words of game characters, and expressions of a phenomenon and the like in the game are programed in the game; however, the use of artificial intelligence in the portable game machine 5200 enables expressions not limited by the game program.

For example, questions posed by the player, the progress of the game, time, and actions and words of game characters can be changed for various expressions.

When a game requiring a plurality of players is played on the portable game machine 5200, the artificial intelligence can create a virtual game player; thus, the game can be played alone with the game player created by the artificial intelligence as an opponent.

Although FIG. 44 illustrates the portable game machine as an example of a game machine, the electronic device of one embodiment of the present invention is not limited thereto. Examples of the electronic device of one embodiment of the present invention include a home stationary game machine, an arcade game machine installed in entertainment facilities (e.g., a game center and an amusement park), and a throwing machine for batting practice installed in sports facilities.

[Moving Vehicle]

The semiconductor device described in the above embodiment can be used for an automobile, which is a moving vehicle, and around the driver's seat in an automobile.

FIG. 44 illustrates an automobile 5700 as an example of a moving vehicle.

An instrument panel that can display a speedometer, a tachometer, a mileage, a fuel meter, a gearshift state, air-conditioning setting, and the like is provided around the driver's seat in the automobile 5700. In addition, a display device showing the above information may be provided around the driver's seat.

In particular, the display device can compensate for the view obstructed by the pillar or the like, the blind areas for the driver's seat, and the like by displaying an image taken by an imaging device (not illustrated) provided for the automobile 5700, which improves safety.

Since the semiconductor device described in the above embodiment can be used as the components of artificial intelligence, the computer can be used for an automatic driving system of the automobile 5700, for example. The semiconductor device can also be used for a system for navigation, risk prediction, or the like. The display device may display navigation information, risk prediction information, or the like.

Although an automobile is described above as an example of a moving vehicle, moving vehicles are not limited to an automobile. Examples of moving vehicles include a train, a monorail train, a ship, and a flying object (a helicopter, an unmanned aircraft (a drone), an airplane, and a rocket), and these moving objects can include a system utilizing artificial intelligence when equipped with the semiconductor device of one embodiment of the present invention.

[Camera]

The semiconductor device described in the above embodiment can be used for a camera.

FIG. 44 illustrates a digital camera 6240 as an example of an imaging device. The digital camera 6240 includes a housing 6241, a display portion 6242, operation buttons 6243, a shutter button 6244, and the like, and an attachable lens 6246 is attached to the digital camera 6240. Here, the lens 6246 of the digital camera 6240 is detachable from the housing 6241 for replacement; alternatively, the lens 6246 may be incorporated into the housing 6241. A stroboscope, a viewfinder, or the like may be additionally attached to the digital camera 6240.

When the semiconductor device described in the above embodiment is used for the digital camera 6240, the digital camera 6240 with low power consumption can be achieved. Moreover, heat generation from a circuit can be reduced owing to low power consumption; thus, the influence of heat generation on the circuit, the peripheral circuit, and the module can be reduced.

Furthermore, when the semiconductor device described in the above embodiment is used for the digital camera 6240, the digital camera 6240 including artificial intelligence can be achieved. Utilizing the artificial intelligence enables the digital camera 6240 to have a function of automatically recognizing a subject such as a face or an object, a function of adjusting a focus on the subject, a function of automatically using a flash in accordance with environments, a function of toning a taken image, and the like.

[Video Camera]

The semiconductor device described in the above embodiment can be used for a video camera.

FIG. 44 illustrates a video camera 6300 as an example of an imaging device. The video camera 6300 includes a first housing 6301, a second housing 6302, a display portion 6303, operation keys 6304, a lens 6305, a joint 6306, and the like. The operation keys 6304 and the lens 6305 are provided in the first housing 6301, and the display portion 6303 is provided in the second housing 6302. The first housing 6301 and the second housing 6302 are connected to each other with the joint 6306, and the angle between the first housing 6301 and the second housing 6302 can be changed with the joint 6306. Images displayed on the display portion 6303 may be changed in accordance with the angle at the joint 6306 between the first housing 6301 and the second housing 6302.

When images taken by the video camera 6300 are recorded, the images need to be encoded in accordance with a data recording format. With the use of artificial intelligence, the video camera 6300 can perform the pattern recognition by artificial intelligence in encoding of the images. The pattern recognition is used to calculate a difference in the human, the animal, the object, and the like between continuously taken image data, so that the data can be compressed.

[Extension Device for PC]

The semiconductor device described in the above embodiment can be used for a calculator such as a PC (Personal Computer) and an extension device for an information terminal.

Figure 45A:
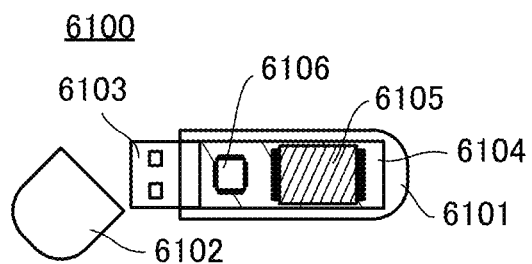
FIG. 45A to FIG. 45C are perspective views illustrating examples of electronic devices.

FIG. 45A illustrates, as an example of the extension device, a portable extension device 6100 that includes a chip capable of arithmetic processing and is externally attached to a PC. The extension device 6100 can perform arithmetic processing using the chip when connected to a PC with a USB (Universal Serial Bus), for example. FIG. 45A illustrates the portable extension device 6100; however, the extension device of one embodiment of the present invention is not limited thereto and may be a relatively large extension device including a cooling fan or the like, for example.

The expansion device 6100 includes a housing 6101, a cap 6102, a USB connector 6103, and a substrate 6104. The substrate 6104 is held in the housing 6101. The substrate 6104 is provided with a circuit for driving the semiconductor device described in the above embodiment or the like. For example, a chip 6105 (e.g., the semiconductor device described in the above embodiment, the electronic component 4700, or a memory chip) and a controller chip 6106 are attached to the substrate 6104. The USB connector 6103 functions as an interface for connection to an external device.

The use of the extension device 6100 for a PC and the like can increase the arithmetic processing capability of the PC.

Thus, a PC with insufficient processing capability can perform arithmetic operation of artificial intelligence, moving image processing, and the like.

[Broadcasting System]

The semiconductor device described in the above embodiment can be used for a broadcasting system.

Figure 45B:
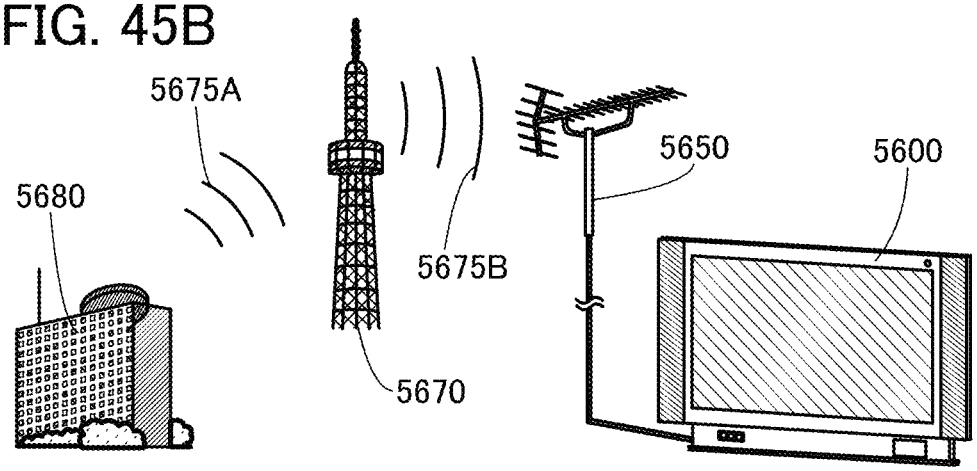

FIG. 45B schematically illustrates data transmission in a broadcasting system. Specifically, FIG. 45B illustrates a path in which a radio wave (a broadcasting signal) transmitted from a broadcast station 5680 reaches a television receiver (TV) 5600 of each household. The TV 5600 includes a receiving device (not illustrated), and the broadcasting signal received by an antenna 5650 is transmitted to the TV 5600 through the receiving device.

Although a UHF (Ultra High Frequency) antenna is illustrated as the antenna 5650 in FIG. 45B, a BS/110° CS antenna, a CS antenna, or the like can also be used as the antenna 5650.

A radio wave 5675A and a radio wave 5675B are broadcasting signals for terrestrial broadcasting; a radio wave tower 5670 amplifies the received radio wave 5675A and transmits the radio wave 5675B. Each household can view terrestrial TV broadcasting on the TV 5600 by receiving the radio wave 5675B with the antenna 5650. Note that the broadcasting system is not limited to the terrestrial broadcasting illustrated in FIG. 45B and may be satellite broadcasting using an artificial satellite, data broadcasting using an optical line, or the like.

The above-described broadcasting system may be a broadcasting system that utilizes artificial intelligence by including the semiconductor device described in the above embodiment. When the broadcast data is transmitted from the broadcast station 5680 to the TV 5600 of each household, the broadcast data is compressed by an encoder. When the antenna 5650 receives the compressed broadcast data, the compressed broadcast data is decompressed by a decoder of the receiving device in the TV 5600. With the use of artificial intelligence, for example, a display pattern included in an image to be displayed can be recognized in motion compensation prediction, which is one of the compressing methods for the encoder. In-frame prediction utilizing artificial intelligence, for example, can also be performed. As another example, when the broadcast data with low resolution is received and the broadcast data is displayed on the TV 5600 with high resolution, image interpolation such as upconversion can be performed in the broadcast data decompression by the decoder.

The above-described broadcasting system utilizing artificial intelligence is suitable for ultra-high definition television (UHDTV: 4K, 8K) broadcasting, which needs a large amount of broadcast data.

As an application of artificial intelligence in the TV 5600, a recording device including artificial intelligence may be provided in the TV 5600, for example. With such a structure, the artificial intelligence can learn the user's preference, so that TV programs that suit the user's preference can be recorded automatically in the recording device.

[Authentication System]

The semiconductor device described in the above embodiment can be used for an authentication system.

Figure 45C:
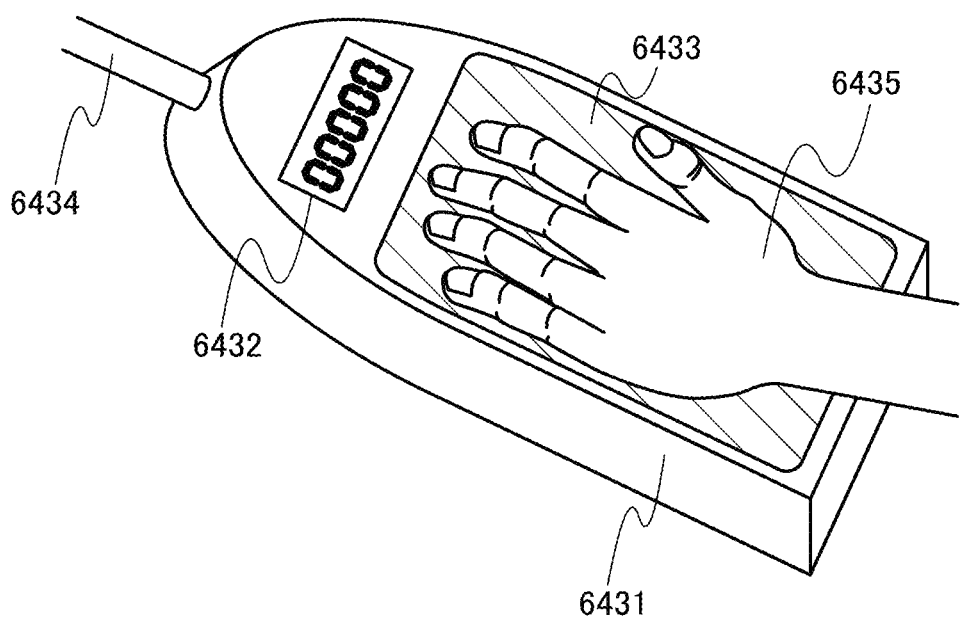

FIG. 45C illustrates a palm print authentication device including a housing 6431, a display portion 6432, a palm print reading portion 6433, and a wiring 6434.

FIG. 45C illustrates a situation in which the palm print authentication device obtains a palm print of a hand 6435. The obtained palm print is subjected to the pattern recognition utilizing artificial intelligence, so that personal authentication of the palm print can be performed. Thus, a system that performs highly secure authentication can be constructed. Without limitation to the palm print authentication device, the authentication system of one embodiment of the present invention may be a device that performs biometric authentication by obtaining biological information of fingerprints, veins, faces, iris, voice prints, genes, physiques, or the like.

Note that this embodiment can be combined with any of the other embodiments in this specification as appropriate.

REFERENCE NUMERALS $N_1^{(1)}$: neuron, $N_p^{(1)}$: neuron, $N_1^{(k-1)}$: neuron, $N_i^{(k-1)}$: neuron, $N_m^{(k-1)}$: neuron, $N_1^{(k)}$: neuron, $N_j^{(k)}$: neuron, $N_n^{(k)}$: neuron, $N_1^{(R)}$: neuron, $N_q^{(R)}$: neuron, ALP: array portion, ILD: circuit, WLD: circuit, XLD: circuit, AFP: circuit, MP: circuit, MP[1, 1]: circuit, MP[m, 1]: circuit, MP[1, n]: circuit, MP[m, n]: circuit, MP[i, j]: circuit, MC: circuit, MCr: circuit, HC: holding portion, HCr: holding portion, ACTF[1]: circuit, ACTF[j]: circuit, ACTF[n]: circuit, ISC: current source circuit, IVTR: circuit, IVTRr: circuit, AC: circuit, ACM: circuit, ACP: circuit, TW[1]: switching circuit, TW[j]: switching circuit, TW[n]: switching circuit, IL[1]: wiring, IL[j]: wiring, IL[n]: wiring, ILB[1]: wiring, ILB[j]: wiring, ILB[n]: wiring, OL[1]: wiring, OL[j]: wiring, OL[n]: wiring, OLB[1]: wiring, OLB[j]: wiring, OLB[n]: wiring, WLS[1]: wiring, WLS[i]: wiring, WLS[m]: wiring, XLS[1]: wiring, XLS[i]: wiring, XLS[m]: wiring, WL[i]: wiring, W1L[i]: wiring, W2L[i]: wiring, XL[i]: wiring, X1L[i]: wiring, X2L[i]: wiring, WX1L[i]: wiring, VE[j]: wiring, VEr[j]: wiring, VCN: wiring, VCN2: wiring, VCN3: wiring, VCN4: wiring, VCN5: wiring, VSO: wiring, VB: wiring, Vref1L: wiring, Vref2L: wiring, SRL1: wiring, SRL2-1: wiring, SRL2-2: wiring, SRL3: wiring, mbt1: terminal, mbt2: terminal, mbt1*m*: terminal, mbt2*m*: terminal, mbt1*p*: terminal, mbt2*p*: terminal, TSa: terminal, TSaB: terminal, TSb: terminal, TSbB: terminal, TSb1: terminal, TSbB1: terminal, TSb2: terminal, TSbB2: terminal, TSb3: terminal, TSbB3: terminal, TSc: terminal, TScB: terminal, T1: terminal, T2: terminal, n1: node, n1*r*: node, n4: node, n4*r*: node, n5: node, n5*r*: node, ina: node, inb: node, outa: node, outb: node, SWIA: switch, SWIAB: switch, SWLA: switch, SWLAB: switch, SWC1: switch, SWC2: switch, SWC3: switch, SWR1: switch, SWR1B: switch, SWR1M: switch, SWR1 MB: switch, SWR1P: switch, SWR1PB: switch, SWR2: switch, SWR2B: switch, SWR2M: switch, SWR2 MB: switch, SWR2P: switch, SWR2PB: switch, SWR3: switch, SWR3B: switch, SWR4: switch, SWR4B: switch, SWR5: switch, SWR6: switch, SWR6B: switch, SWR7: switch, SWR7B: switch, SWI: switch, SWIB: switch, SWO: switch, SWOB: switch, SWL: switch, SWLB: switch, SWH: switch, SWHB: switch, ISC1: constant current source circuit, ISC2: constant current source circuit, ISC3: constant current source circuit, CRE: capacitor, CREM: capacitor, CREP: capacitor, CRT: capacitor, CRTB: capacitor, RRT: resistor, RRTB: resistor, LE: load, LEB: load, LEA: load, LEAB: load, OP: operational amplifier, OPB: operational amplifier, OPA: operational amplifier, CRET: transistor, M1: transistor, M1*r*: transistor, M1*p*: transistor, M1*pr*: transistor, M10: transistor, M10*r*: transistor, M11: transistor, M11*r*: transistor, M12: transistor, M12*r*: transistor, M13: transistor, M13*r*: transistor, M14: transistor, M14*r*: transistor, NTr: transistor, PTr: transistor, C1: capacitor, C1*r*: capacitor, C5: capacitor, Cyr: capacitor, C6: capacitor, C6*r*: capacitor, C7: capacitor, C7*r*: capacitor, S2: switch, S2*r*: switch, S3: switch, S3*r*: switch, S4: switch, S4*r*: switch, S5: switch, S5r: switch, AS3: analog switch, AS3r: analog switch, AS4: analog switch, AS4r: analog switch, RM: variable resistor, RMr: variable resistor, MR: MTJ element, MRr: MTJ element, PCM1: phase-change memory, PCM1r: phase-change memory, IVRS: inverter loop circuit, IVRSr: inverter loop circuit, IV1: inverter circuit, IV1r: inverter circuit, IV2: inverter circuit, IV2r: inverter circuit, IL: wiring, ILB: wiring, OL: wiring, OLB: wiring, WL: wiring, W1L: wiring, W2L: wiring, X1L: wiring, X2L: wiring, X1LB: wiring, X2LB: wiring, WX1L: wiring, WR1L: wiring, WR2L: wiring, RL: wiring, VE: wiring, VEr: wiring, VEm: wiring, VEmr: wiring, VEA: wiring, VEAr: wiring, HL: wiring, HLr: wiring, MZ: transistor, M20: transistor, M20r: transistor, VL: wiring, NM: circuit, NMr: circuit, 100: neural network, 110: arithmetic circuit, 110A: arithmetic circuit, 120: arithmetic circuit, 130: arithmetic circuit, 130A: arithmetic circuit, 140: arithmetic circuit, 150: arithmetic circuit, 300: transistor, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 402: insulator, 404: insulator, 500: transistor, 503: conductor, 503a: conductor, 503b: conductor, 505: conductor, 510: insulator, 512: insulator, 514: insulator, 516: insulator, 518: conductor, 520: insulator, 522: insulator, 524: insulator, 530: oxide, 530a: oxide, 530b: oxide, 530c: oxide, 530c1: oxide, 530c2: oxide, 540: conductor, 540a: conductor, 540b: conductor, 542a: conductor, 542b: conductor, 543a: region, 543b: region, 544: insulator, 546: conductor, 548: conductor, 550: insulator, 552: insulator, 560: conductor, 560a: conductor, 560b: conductor, 574: insulator, 580: insulator, 581: insulator, 582: insulator, 586: insulator, 600: capacitor, 600A: capacitor, 600B: capacitor, 610: conductor, 611: conductor, 612: conductor, 620: conductor, 621: conductor, 630: insulator, 631: insulator, 650: insulator, 651: insulator, 4700: electronic component, 4702: printed circuit board, 4704: mounting board, 4710: semiconductor device, 4730: electronic component, 4731: interposer, 4732: package substrate, 4733: electrode, 4735: semiconductor device, 4800: semiconductor wafer, 4800a: chip, 4801: wafer, 4801a: wafer, 4802: circuit portion, 4803: spacing, 4803a: spacing, 5200: portable game machine, 5201: housing, 5202: display portion, 5203: button, 5300: desktop information terminal, 5301: main body, 5302: display, 5303: keyboard, 5500: information terminal, 5510: housing, 5511: display portion, 5600: TV, 5650: antenna, 5670: radio wave tower, 5675A: radio wave, 5675B: radio wave, 5680: broadcast station, 5700: automobile, 5800: electric refrigerator-freezer, 5801: housing, 5802: refrigerator door, 5803: freezer door, 5901: housing, 5902: display portion, 5903: operation button, 5904: operator, 5905: band, 6100: extension device, 6101: housing, 6102: cap, 6103: USB connector, 6104: substrate, 6105: chip, 6106: controller chip, 6240: digital camera, 6241: housing, 6242: display portion, 6243: operation button, 6244: shutter button, 6246: lens, 6300: video camera, 6301: first housing, 6302: second housing, 6303: display portion, 6304: operation key, 6305: lens, 6306: joint, 6431: housing, 6432: display portion, 6433: palm print reading portion, 6434: wiring, 6435: hand, 7500: stationary game machine, 7520: main body, 7522: controller

The invention claimed is:

1. A semiconductor device comprising a cell and a first circuit,
wherein the first circuit comprises a first capacitor, a first input terminal, a second input terminal, and a second circuit,
wherein the cell is electrically connected to the first input terminal through a first wiring,
wherein the cell is electrically connected to the second input terminal through a second wiring,
wherein the cell is configured to:
hold first data; and
pass a first current corresponding to the first data and second data between the cell and the first wiring and pass a second current corresponding to the first data and the second data between the cell and the second wiring when the second data is input to the cell,
wherein the first capacitor is configured to hold a differential voltage between a first potential corresponding to the first current and a second potential corresponding to the second current, and
wherein the second circuit is configured to obtain the differential voltage and output a signal corresponding to the differential voltage.

2. The semiconductor device according to claim 1,
wherein the first circuit comprises a first current-voltage converter circuit, a second current-voltage converter circuit, a first switch, a second switch, a third switch, and a fourth switch,
wherein the first input terminal is electrically connected to a first terminal of the first switch and a first terminal of the first current-voltage converter circuit,
wherein a second terminal of the first switch is electrically connected to a first terminal of the second switch and a first terminal of the first capacitor,
wherein the second input terminal is electrically connected to a first terminal of the third switch and a first terminal of the second current-voltage converter circuit,
wherein a second terminal of the third switch is electrically connected to a first terminal of the fourth switch and a second terminal of the first capacitor,
wherein a second terminal of the fourth switch is electrically connected to a first terminal of the second circuit,
wherein the first current-voltage converter circuit is configured to set a potential of the first terminal of the first current-voltage converter circuit to the first potential on the basis of the first current input to the first terminal of the first current-voltage converter circuit, and
wherein the second current-voltage converter circuit is configured to set a potential of the first terminal of the second current-voltage converter circuit to the second potential on the basis of the second current input to the first terminal of the second current-voltage converter circuit.

3. The semiconductor device according to claim 2,
wherein a second terminal of the second switch is electrically connected to a third wiring supplying a reference potential, and
wherein the first circuit is configured to:
set the first terminal of the first capacitor to the first potential and set the second terminal of the first capacitor to the second potential by turning on the first switch and the third switch and turning off the second switch and the fourth switch;
change the second potential of the second terminal of the first capacitor to a third potential owing to a capacitive coupling caused by a change of the potential of the first terminal of the first capacitor from the first potential to the reference potential by turning off the first switch, the third switch, and the fourth switch and turning on the second switch; and
input the third potential corresponding to the differential voltage to the first terminal of the second circuit by turning off the first switch, the second switch, and the third switch and turning on the fourth switch.

4. A semiconductor device comprising a cell and a first circuit,
wherein the first circuit comprises a first capacitor, a second capacitor, a first input terminal, and a second input terminal,
wherein the cell is electrically connected to the first input terminal through a first wiring,
wherein the cell is electrically connected to the second input terminal through a second wiring,
wherein the cell is configured to:
hold first data; and
pass a first current corresponding to the first data and second data between the cell and the first wiring and pass a second current corresponding to the first data and the second data between the cell and the second wiring when the second data is input to the cell,
wherein the first capacitor is configured to hold a first differential voltage between a first potential corresponding to the first current and a second potential corresponding to the second current, and
wherein the second capacitor is configured to hold a second differential voltage between the first potential corresponding to the first current and the second potential corresponding to the second current.

5. The semiconductor device according to claim 4,
wherein the first circuit comprises a second circuit and a third circuit,
wherein the second circuit is configured to obtain the first differential voltage based on a potential of a first terminal of the first capacitor and output a first signal corresponding to the first differential voltage, and
wherein the third circuit is configured to obtain the second differential voltage based on a potential of a second terminal of the second capacitor and output a second signal corresponding to the second differential voltage.

6. The semiconductor device according to claim 5,
wherein the first circuit comprises a first current-voltage converter circuit, a second current-voltage converter circuit, a first switch, a second switch, a third switch, a fourth switch, a fifth switch, a sixth switch, a seventh switch, and an eighth switch,
wherein the first input terminal is electrically connected to a first terminal of the first switch, a first terminal of the fifth switch, and a first terminal of the first current-voltage converter circuit,
wherein a second terminal of the first switch is electrically connected to a first terminal of the second switch and the first terminal of the first capacitor,
wherein a second terminal of the fifth switch is electrically connected to a first terminal of the sixth switch and a first terminal of the second capacitor,
wherein the second input terminal is electrically connected to a first terminal of the third switch, a first terminal of the seventh switch, and a first terminal of the second current-voltage converter circuit,
wherein a second terminal of the third switch is electrically connected to a first terminal of the fourth switch and a second terminal of the first capacitor,
wherein a second terminal of the seventh switch is electrically connected to a first terminal of the eighth switch and the second terminal of the second capacitor,
wherein a second terminal of the fourth switch is electrically connected to a first terminal of the second circuit,
wherein a second terminal of the sixth switch is electrically connected to a first terminal of the third circuit,
wherein the first current-voltage converter circuit is configured to set a potential of the first terminal of the first current-voltage converter circuit to the first potential on the basis of the first current input to the first terminal of the first current-voltage converter circuit, and
wherein the second current-voltage converter circuit is configured to set a potential of the first terminal of the second current-voltage converter circuit to the second potential on the basis of the second current input to the first terminal of the second current-voltage converter circuit.

7. The semiconductor device according to claim 6,
wherein a second terminal of the second switch is electrically connected to a third wiring supplying a reference potential,
wherein a second terminal of the eighth switch is electrically connected to the third wiring supplying the reference potential, and
wherein the first circuit is configured to:
set the first terminal of the first capacitor to the first potential and set the second terminal of the first capacitor to the second potential by turning on the first switch and the third switch and turning off the second switch and the fourth switch;
set the first terminal of the second capacitor to the first potential and set the second terminal of the second capacitor to the second potential by turning on the fifth switch and the seventh switch and turning off the sixth switch and the eighth switch;
change the second potential of the second terminal of the first capacitor to a third potential owing to a capacitive coupling caused by a change of the potential of the first terminal of the first capacitor from the first potential to the reference potential by turning off the first switch, the third switch, and the fourth switch and turning on the second switch;
change the first potential of the first terminal of the second capacitor to a fourth potential owing to a capacitive coupling caused by a change of the potential of the second terminal of the second capacitor from the second potential to the reference potential by turning off the fifth switch, the sixth switch, and the seventh switch and turning on the eighth switch;
input the third potential corresponding to the first differential voltage to the first terminal of the second circuit by turning off the first switch, the second switch, and the third switch and turning on the fourth switch; and
input the fourth potential corresponding to the second differential voltage to the first terminal of the third circuit by turning off the fifth switch, the seventh switch, and the eighth switch and turning on the sixth switch.

8. The semiconductor device according to claim 4,
wherein the cell comprises a first cell and a second cell,
wherein the first cell is electrically connected to the first wiring, the second wiring, a first input wiring, and a second input wiring,
wherein the second cell is electrically connected to the first wiring, the second wiring, the first input wiring, and the second input wiring, wherein each of the first input wiring and the second input wiring is configured to supply a potential corresponding to the second data, wherein the first cell is configured to:
- pass the first current to the first wiring when a first input potential is input to the first input wiring and a second input potential is input to the second input wiring;
- pass the second current to the second wiring when the second input potential is input to the first input wiring and the first input potential is input to the second input wiring; and
- break electrical continuity between the first cell and the first wiring and between the first cell and the second wiring when the second input potential is input to the first input wiring and the second input potential is input to the second input wiring, and wherein the second cell is configured to:
- pass the second current to the second wiring when the first input potential is input to the first input wiring and the second input potential is input to the second input wiring;
- pass the first current to the first wiring when the second input potential is input to the first input wiring and the first input potential is input to the second input wiring; and
- break electrical continuity between the second cell and the first wiring and between the second cell and the second wiring when the second input potential is input to the first input wiring and the second input potential is input to the second input wiring.

9. The semiconductor device according to claim 8, wherein the first cell comprises a first transistor, a ninth switch, a tenth switch, an eleventh switch, a twelfth switch, and a third capacitor, wherein the second cell comprises a second transistor, a thirteenth switch, a fourteenth switch, a fifteenth switch, a sixteenth switch, and a fourth capacitor, wherein a first terminal of the first transistor is electrically connected to a first terminal of the ninth switch, a first terminal of the tenth switch, and a first terminal of the eleventh switch, wherein a gate of the first transistor is electrically connected to a first terminal of the third capacitor and a first terminal of the twelfth switch, wherein a second terminal of the ninth switch is electrically connected to a second terminal of the twelfth switch, wherein a second terminal of the tenth switch is electrically connected to the first wiring, wherein a control terminal of the tenth switch is electrically connected to the first input wiring, wherein a second terminal of the eleventh switch is electrically connected to the second wiring, wherein a control terminal of the eleventh switch is electrically connected to the second input wiring, wherein a first terminal of the second transistor is electrically connected to a first terminal of the thirteenth switch, a first terminal of the fourteenth switch, and a first terminal of the fifteenth switch, wherein a gate of the second transistor is electrically connected to a first terminal of the fourth capacitor and a first terminal of the sixteenth switch, wherein a second terminal of the thirteenth switch is electrically connected to a second terminal of the sixteenth switch, wherein a second terminal of the fourteenth switch is electrically connected to the second wiring, wherein a control terminal of the fourteenth switch is electrically connected to the first input wiring, wherein a second terminal of the fifteenth switch is electrically connected to the first wiring, and wherein a control terminal of the fifteenth switch is electrically connected to the second input wiring.

10. The semiconductor device according to claim 9, wherein the twelfth switch comprises a third transistor, wherein the third transistor comprises a metal oxide in a channel formation region, wherein the sixteenth switch comprises a fourth transistor, and wherein the fourth transistor comprises a metal oxide in a channel formation region.

11. An electronic device comprising the semiconductor device according to claim 4 and a housing, wherein arithmetic operation in a neural network is performed by the semiconductor device.

12. An electronic device comprising the semiconductor device according to claim 1 and a housing, wherein arithmetic operation in a neural network is performed by the semiconductor device.

* * * * *